US009320997B2

(12) United States Patent  
Campbell et al.

(10) Patent No.: US 9,320,997 B2  
(45) Date of Patent: Apr. 26, 2016

(54) AIR FILTER CARTRIDGES; AIR CLEANER ASSEMBLIES; HOUSINGS; FEATURES; COMPONENTS; AND, METHODS

(71) Applicant: Donaldson Company, Inc., Minneapolis, MN (US)

(72) Inventors: Steven K. Campbell, Lakeville, MN (US); Steven Gieseke, Richfield, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 14/855,860

(22) Filed: Sep. 16, 2015

(65) Prior Publication Data

US 2016/0045848 A1 Feb. 18, 2016

Related U.S. Application Data

(63) Continuation of application No. PCT/US2014/044712, filed on Jun. 27, 2014.

(60) Provisional application No. 61/841,005, filed on Jun. 28, 2013.

(51) Int. Cl.
| | |
|---|---|
| *B01D 46/00* | (2006.01) |
| *B01D 46/52* | (2006.01) |
| *B01D 46/10* | (2006.01) |

(52) U.S. Cl.
CPC .......... *B01D 46/0005* (2013.01); *B01D 46/009* (2013.01); *B01D 46/10* (2013.01);
(Continued)

(58) Field of Classification Search
CPC ........... B01D 45/0002; B01D 46/0005; B01D 46/009; B01D 46/10; B01D 46/525; B01D 46/526; B01D 46/527; B01D 2265/026; B01D 2271/02; B01D 2271/022; B01D 2201/34; B01D 2201/342; B01D 2201/4046
See application file for complete search history.

(56) References Cited

U.S. PATENT DOCUMENTS

| | | |
|---|---|---|
| 2,093,877 A | 9/1937 | Pentz |
| 2,270,969 A | 1/1942 | Robinson |

(Continued)

FOREIGN PATENT DOCUMENTS

| | | |
|---|---|---|
| CN | 2296402 Y | 11/1998 |
| CN | 2372041 Y | 1/2000 |

(Continued)

OTHER PUBLICATIONS

U.S. Appl. No. 60/556,133, filed Mar. 2004, Krisko et al.

(Continued)

*Primary Examiner* — Robert Clemente  
(74) *Attorney, Agent, or Firm* — Merchant & Gould, P.C.

(57) ABSTRACT

According to the present disclosure, features, components and techniques useable for providing air cleaner arrangements are provided. Many of the features relate to an axial seal arrangement provided on a filter cartridge. A typical filter cartridge, for use with these features, is a filter cartridge having opposite flow ends. Example media arrangements that fit this characterization are described. Seal arrangements provided with an axial housing sealing engagement surface are shown. A seal arrangement is provided with variations therein, to advantage. These variations can be in both of an outer peripheral edge surface and a housing seal engagement surface. Also, air cleaner assemblies having advantageous features therein are provided. Further, air cleaner housings are described, with selected, preferred features for engagement with filter cartridges.

20 Claims, 120 Drawing Sheets

(52) U.S. Cl.
CPC .......... *B01D 46/525* (2013.01); *B01D 46/527* (2013.01); *B01D 2201/342* (2013.01); *B01D 2201/4046* (2013.01); *B01D 2265/026* (2013.01); *B01D 2271/022* (2013.01)

(56) References Cited

U.S. PATENT DOCUMENTS

| | | | |
|---|---|---|---|
| 2,306,325 A | 12/1942 | Allam |
| 2,915,188 A | 12/1959 | Buker |
| 2,955,028 A | 10/1960 | Bevans |
| 3,025,963 A | 3/1962 | Bauer |
| 3,224,592 A | 12/1965 | Bums et al. |
| 3,494,113 A | 2/1970 | Kinney |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,169 A | 3/1979 | Grueschow |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,589,983 A | 5/1986 | Wydevan |
| 4,600,420 A | 7/1986 | Wydeven et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,925,561 A | 5/1990 | Ishii et al. |
| 4,979,969 A | 12/1990 | Herding |
| 5,024,268 A | 6/1991 | Cheadle et al. |
| 5,050,549 A | 9/1991 | Sturmon |
| 5,064,799 A | 11/1991 | Monte et al. |
| 5,069,799 A | 12/1991 | Brownawell et al. |
| 5,094,745 A | 3/1992 | Reynolds |
| 5,120,334 A | 6/1992 | Cooper |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell et al. |
| 5,258,118 A | 11/1993 | Gouritin et al. |
| 5,298,160 A | 3/1994 | Ayers et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda |
| 5,541,330 A | 7/1996 | Wear et al. |
| 5,556,542 A | 9/1996 | Berman et al. |
| 5,560,330 A | 10/1996 | Andress et al. |
| 5,562,825 A | 10/1996 | Yamada et al. |
| 5,575,826 A | 11/1996 | Gillingham et al. |
| 5,591,330 A | 1/1997 | Lefebvre |
| 5,605,554 A | 2/1997 | Kennedy |
| 5,643,541 A | 7/1997 | Peddicord et al. |
| 5,662,799 A | 9/1997 | Hudgens et al. |
| 5,672,399 A | 9/1997 | Kahlbaugh et al. |
| 5,709,722 A | 1/1998 | Nagai et al. |
| 5,738,785 A | 4/1998 | Brown et al. |
| 5,753,116 A | 5/1998 | Baumann et al. |
| 5,759,217 A | 6/1998 | Joy et al. |
| 5,772,883 A | 6/1998 | Rothman et al. |
| 5,795,361 A | 8/1998 | Lanier, Jr. et al. |
| 5,803,024 A | 9/1998 | Brown |
| 5,820,646 A | 10/1998 | Gillingham et al. |
| 5,853,439 A | 12/1998 | Gieseke et al. |
| 5,891,402 A | 4/1999 | Sassa et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Gillingham |
| 6,086,763 A | 7/2000 | Baumann |
| 6,096,208 A | 8/2000 | Connelly et al. |
| 6,098,575 A | 8/2000 | Mulshine et al. |
| 6,129,852 A | 10/2000 | Elliott et al. |
| 6,149,700 A | 11/2000 | Morgan et al. |
| 6,165,519 A | 12/2000 | Lehrer et al. |
| 6,171,355 B1 | 1/2001 | Gieseke et al. |
| 6,179,890 B1 | 1/2001 | Ranos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |

(56) References Cited

U.S. PATENT DOCUMENTS

| | | |
|---|---|---|
| 7,182,864 B2 | 2/2007 | Brown et al. |
| 7,211,124 B2 | 5/2007 | Gieseke et al. |
| 7,247,183 B2 * | 7/2007 | Connor .............. B01D 46/0002 55/495 |
| 7,258,719 B2 | 8/2007 | Miller et al. |
| 7,282,075 B2 | 10/2007 | Sporre et al. |
| 7,338,544 B2 | 3/2008 | Sporre et al. |
| 7,351,270 B2 | 4/2008 | Engelland et al. |
| 7,396,375 B2 | 7/2008 | Nepsund et al. |
| 7,491,254 B2 | 2/2009 | Krisko et al. |
| 7,494,017 B2 | 2/2009 | Miller |
| 7,540,895 B2 | 6/2009 | Furseth et al. |
| D600,790 S | 9/2009 | Nelson et al. |
| 6,996,940 B2 | 12/2009 | Krisko et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,799,108 B2 | 9/2010 | Connor et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,061,530 B2 * | 11/2011 | Kindkeppel ........... B01D 29/01 210/232 |
| 8,062,399 B2 | 11/2011 | Nelson et al. |
| 8,101,003 B2 | 1/2012 | Krisko et al. |
| 8,119,002 B2 | 2/2012 | Schiavon et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,518,141 B2 | 8/2013 | Schrage et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,778,043 B2 | 7/2014 | Krisko et al. |
| 8,840,699 B2 | 9/2014 | Bruce et al. |
| 8,906,128 B2 | 12/2014 | Reichter et al. |
| 9,114,346 B2 | 8/2015 | Schrage et al. |
| 2001/0032545 A1 | 10/2001 | Goto et al. |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0218150 A1 | 11/2003 | Blakemore et al. |
| 2004/0035097 A1 | 2/2004 | Schlensker et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0166561 A1 | 8/2005 | Schrage et al. |
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0113233 A1 | 6/2006 | Merritt et al. |
| 2006/0180537 A1 | 8/2006 | Loftis et al. |
| 2007/0261374 A1 | 11/2007 | Nelson et al. |
| 2008/0022641 A1 | 1/2008 | Engelland et al. |
| 2008/0110142 A1 | 5/2008 | Nelson et al. |
| 2008/0250766 A1 | 10/2008 | Schrage et al. |
| 2008/0307759 A1 | 12/2008 | Reichter et al. |
| 2009/0057213 A1 | 3/2009 | Schiavon et al. |
| 2009/0064646 A1 | 3/2009 | Reichter et al. |
| 2009/0151311 A1 | 6/2009 | Reichter et al. |
| 2010/0043366 A1 | 2/2010 | Boehrs et al. |
| 2010/0170209 A1 | 7/2010 | Nelson et al. |

FOREIGN PATENT DOCUMENTS

| | | |
|---|---|---|
| DE | 88 08 632 | 9/1988 |
| DE | 296 13 098 | 10/1996 |
| EP | 0 747 579 | 12/1996 |
| EP | 0 982 062 | 3/2000 |
| EP | 1 166 843 A1 | 1/2002 |
| EP | 1 208 902 | 5/2002 |
| EP | 1 233 173 A2 | 8/2002 |
| EP | 1 129 760 | 7/2007 |
| EP | 1 747 053 B1 | 10/2007 |
| FR | 2 214 505 A | 8/1974 |
| GB | 970826 | 11/1964 |
| GB | 2 082 932 A | 3/1982 |
| JP | 60-112320 | 7/1985 |
| JP | 1-171615 | 4/1989 |
| JP | 1-163408 | 11/1989 |
| JP | 2-25009 | 2/1990 |
| WO | 2004/054684 A1 | 7/2004 |
| WO | 2005/058461 A1 | 6/2005 |
| WO | WO 2005/077487 A1 | 8/2005 |
| WO | 2007/009039 | 1/2007 |

OTHER PUBLICATIONS

Pending claims corresponding to U.S. Appl. No. 13/936,518 dated Sep. 16, 2015.

Pending claims corresponding to U.S. Appl. No. 14/563,561 dated Sep. 16, 2015.

Pending claims corresponding to U.S. Appl. No. 14/165,042 dated Sep. 16, 2015.

Pending claims corresponding to U.S. Appl. No. 14/263,195 dated Sep. 16, 2015.

Pending claims corresponding to U.S. Appl. No. 14/492,315 dated Sep. 16, 2015.

PCT search report and written opinion corresponding to PCT/US2014/044712.

* cited by examiner

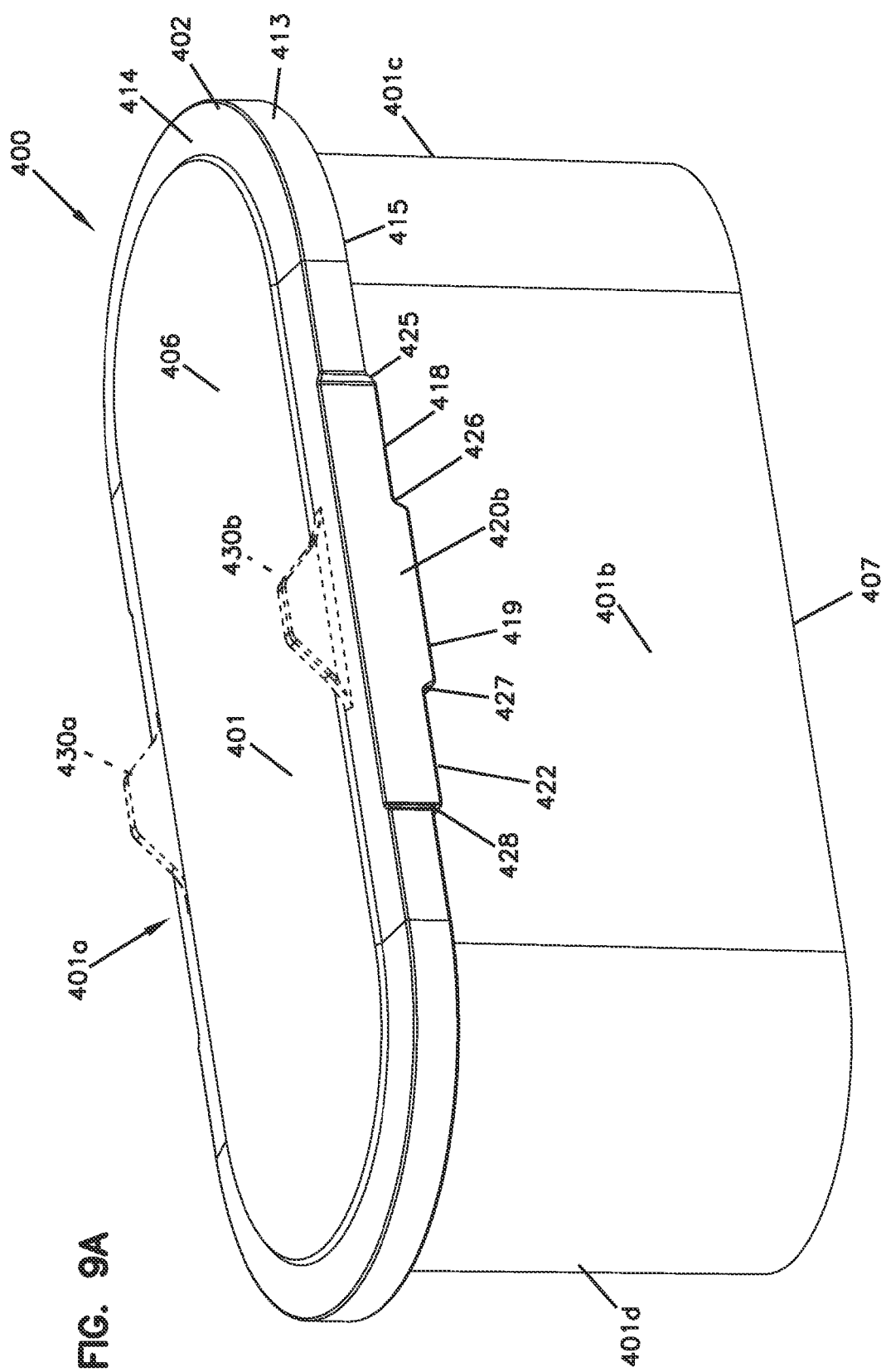

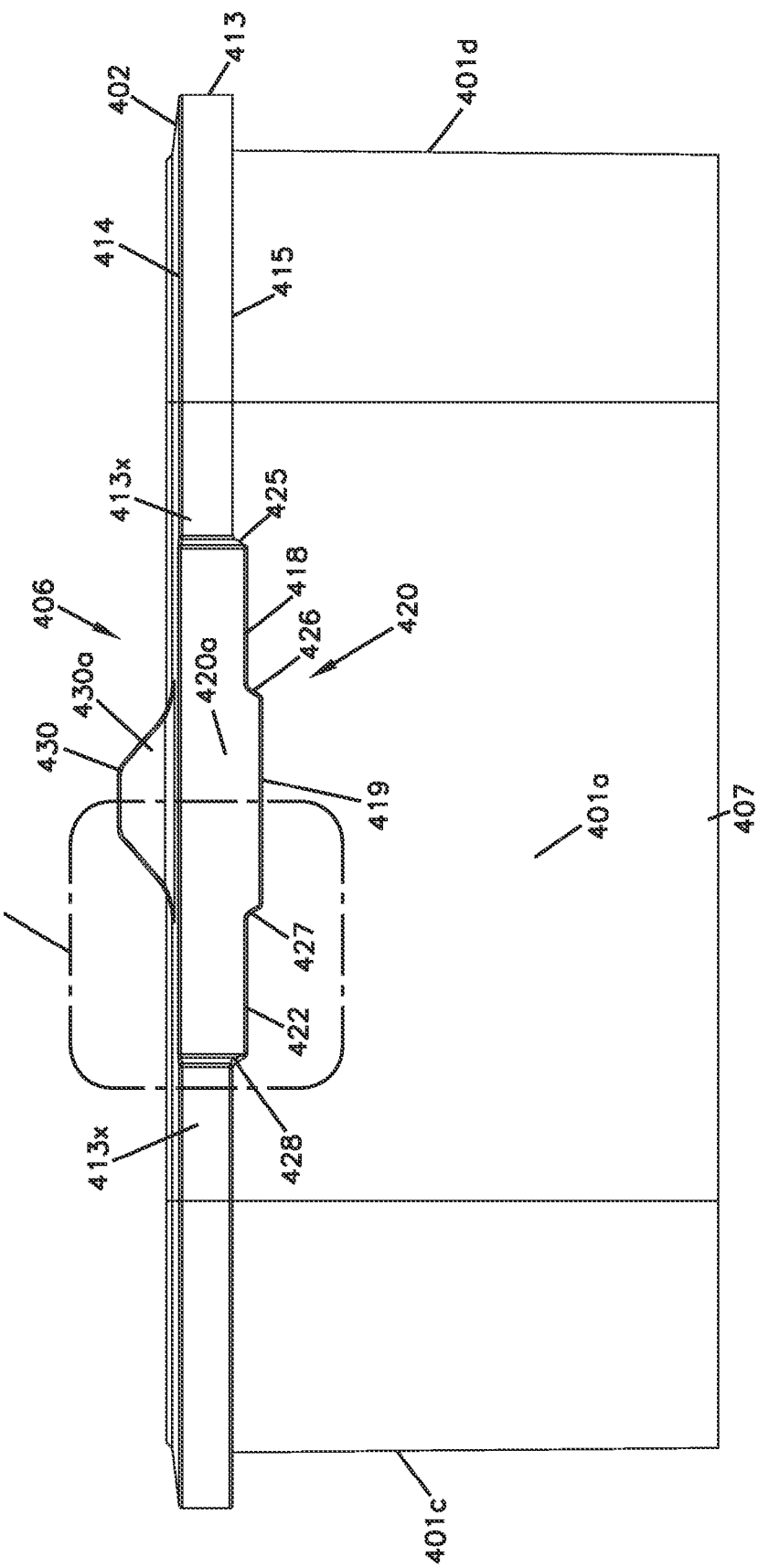

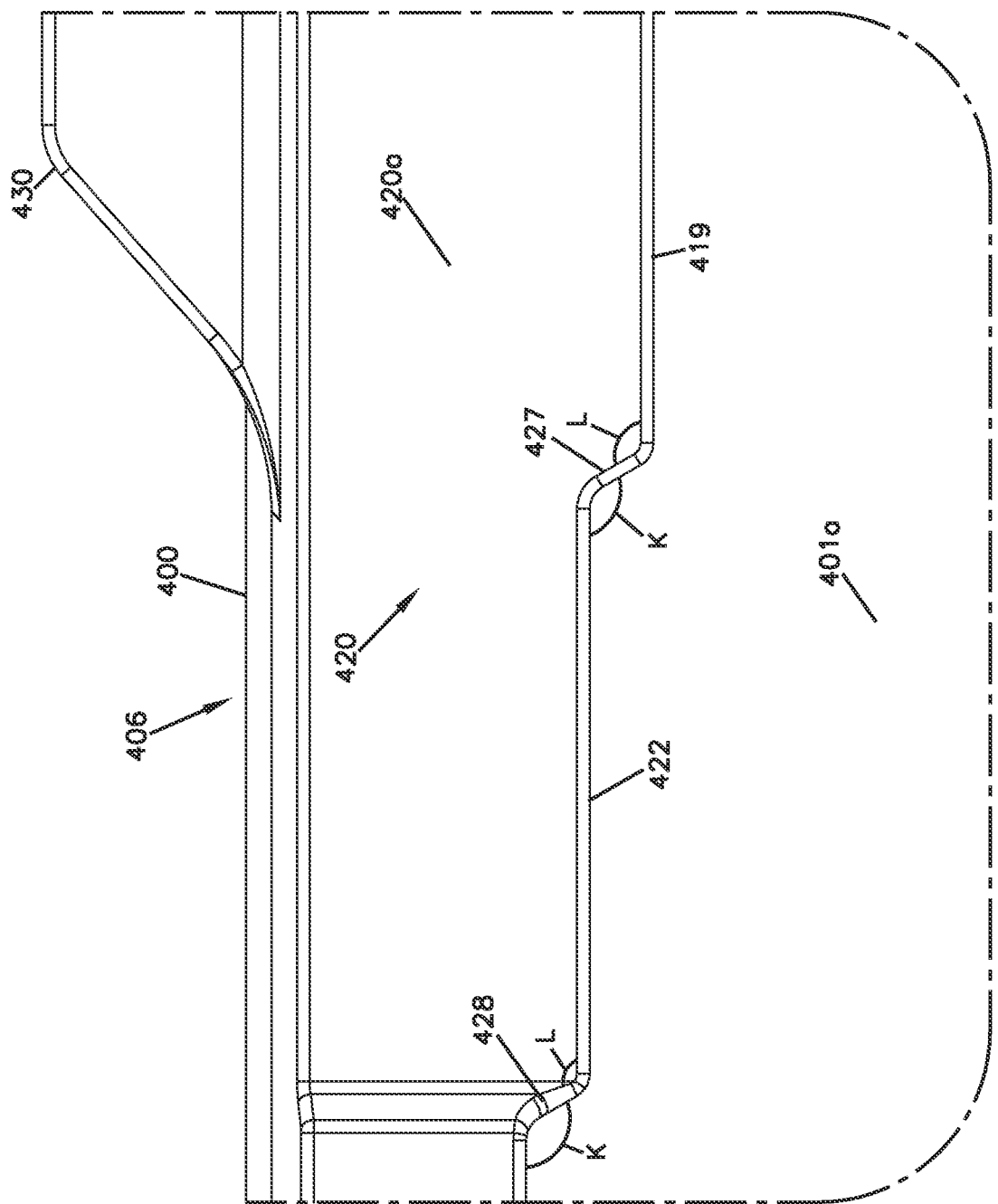

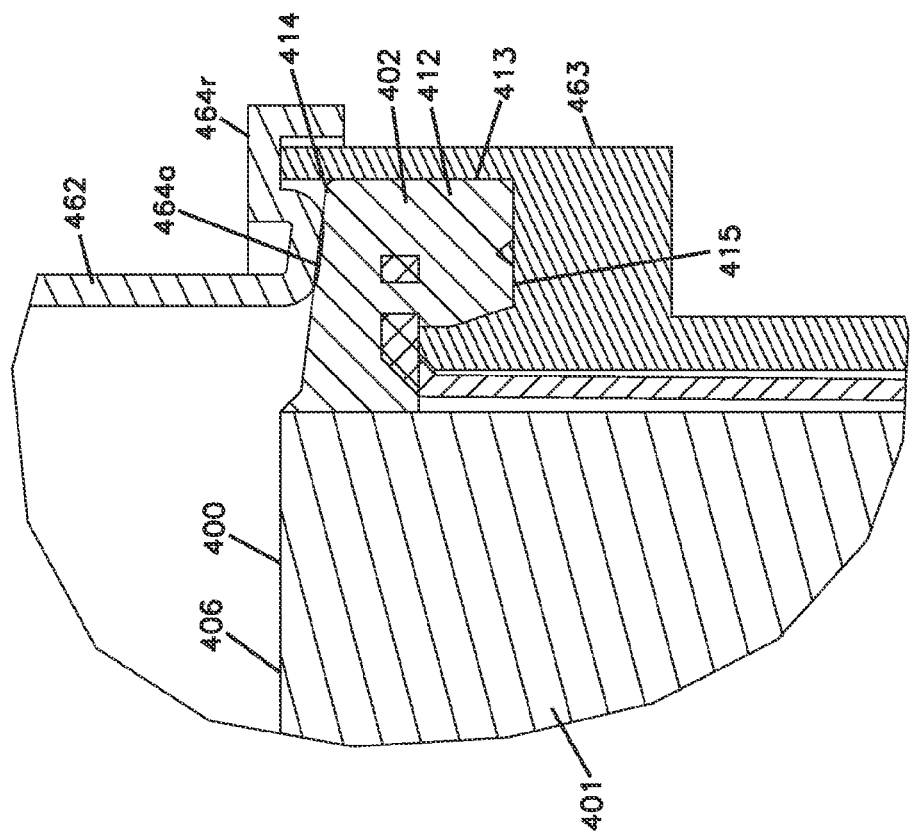
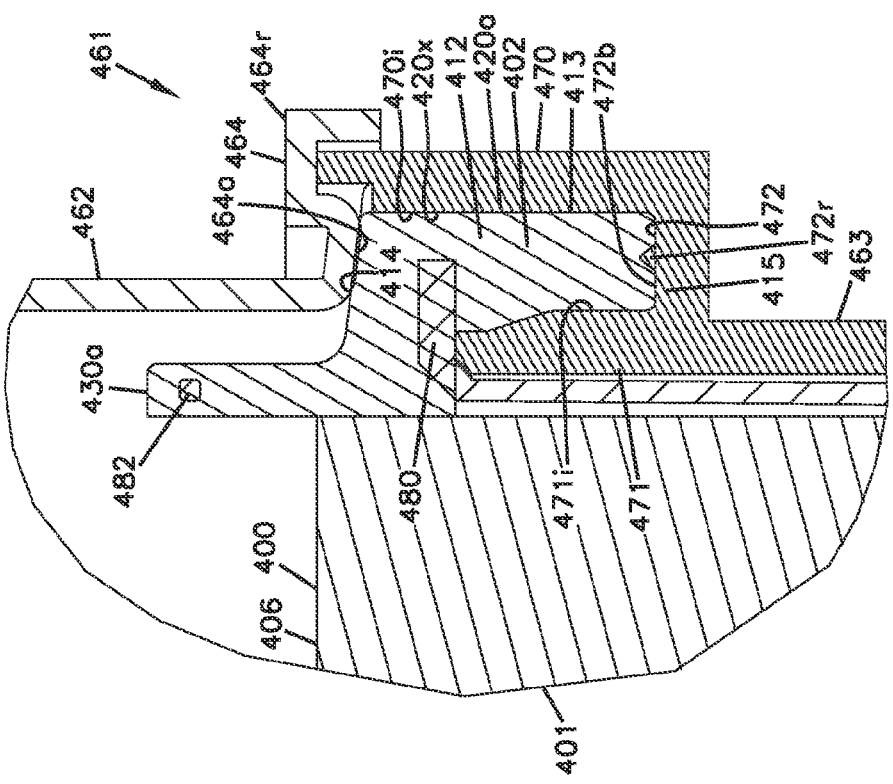
FIG. 18A
FIG. 18B

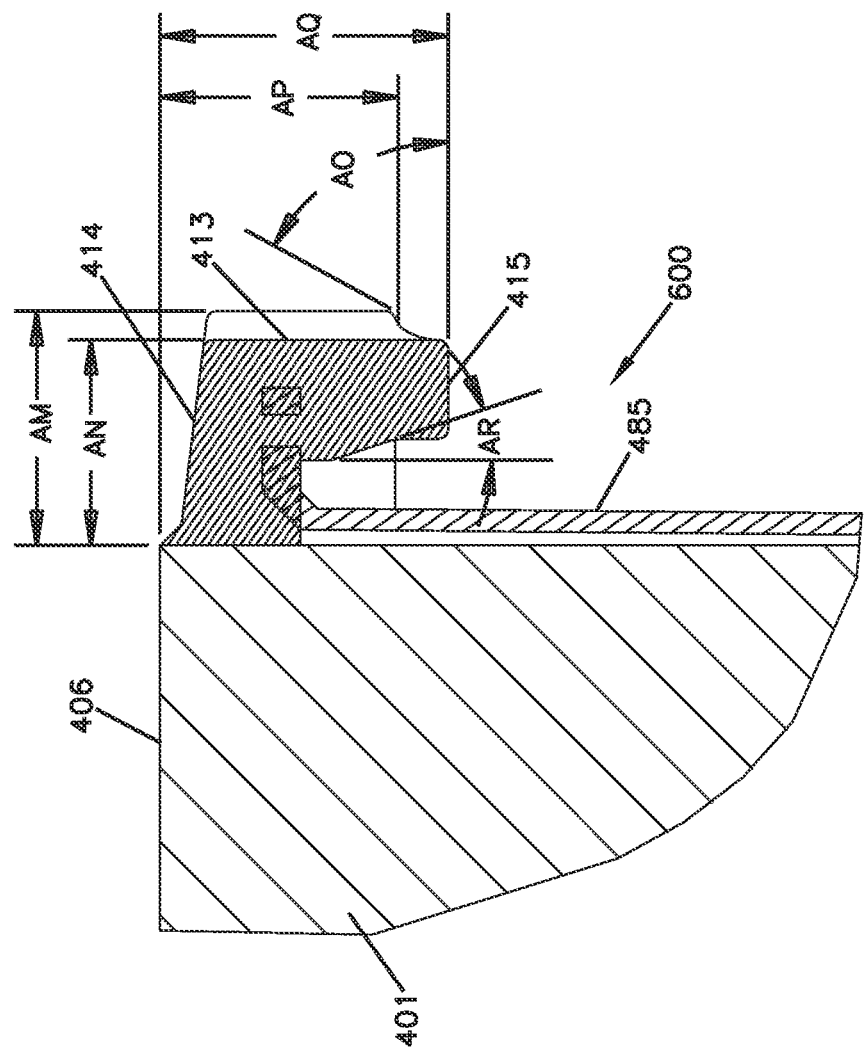

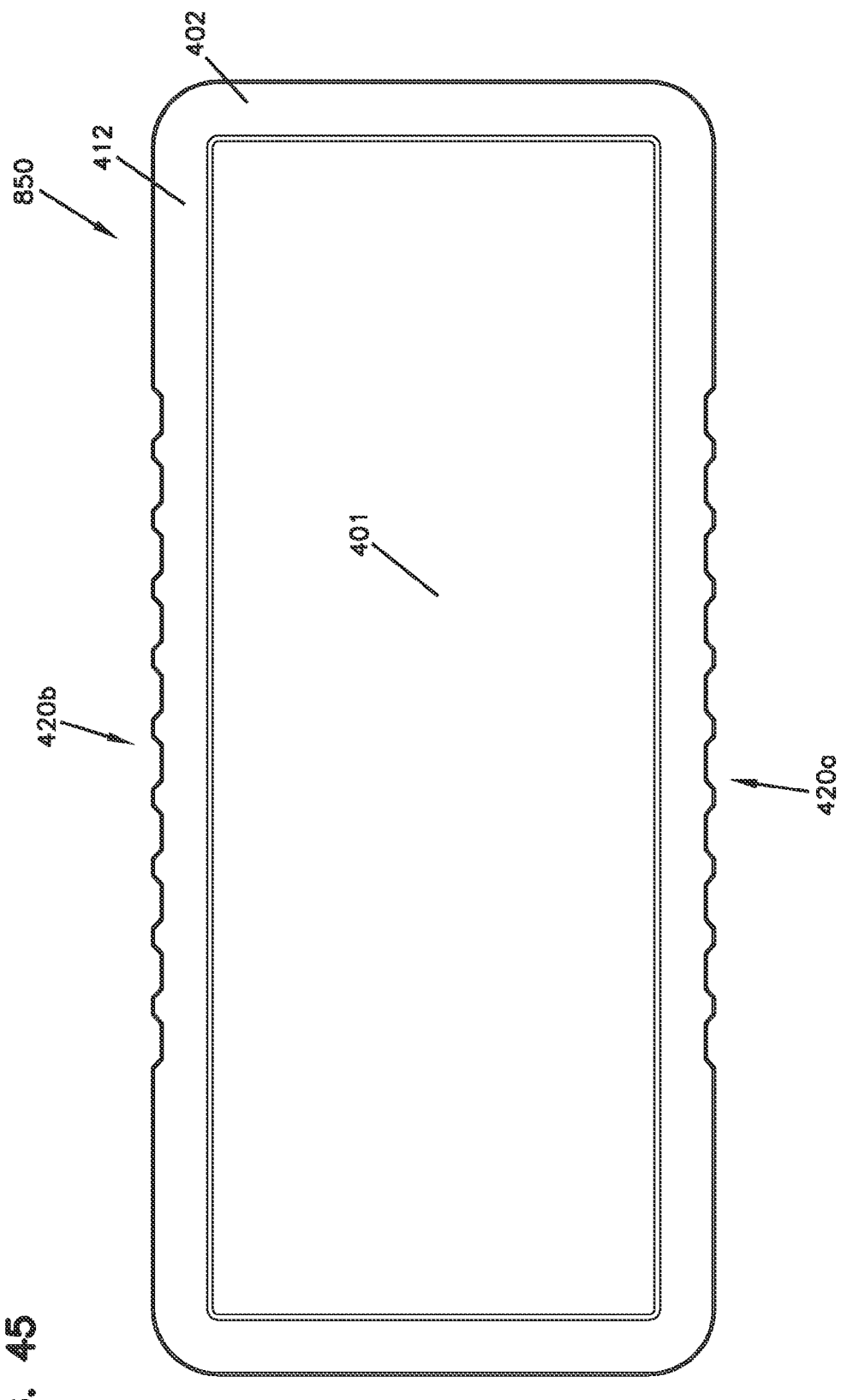

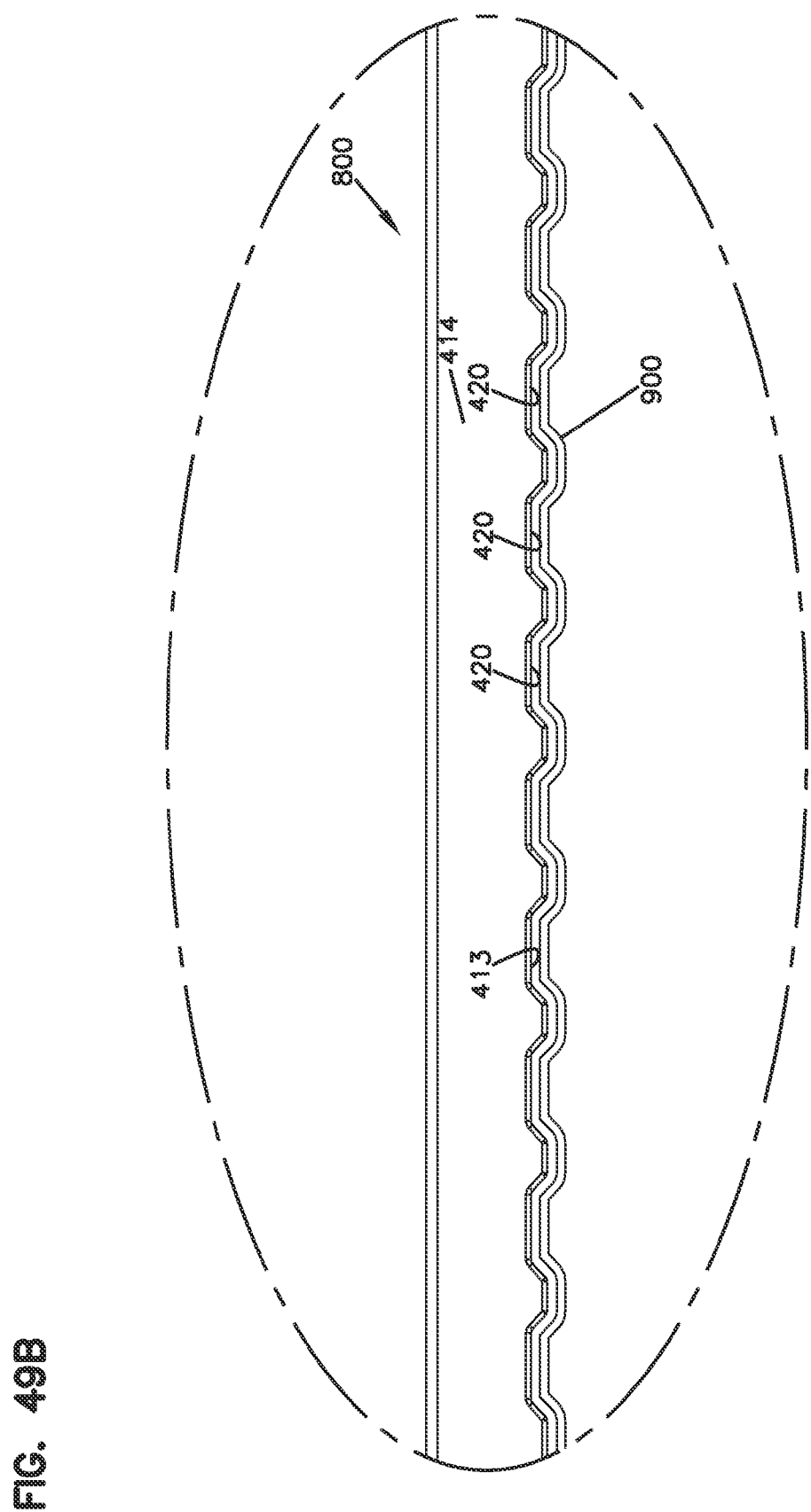

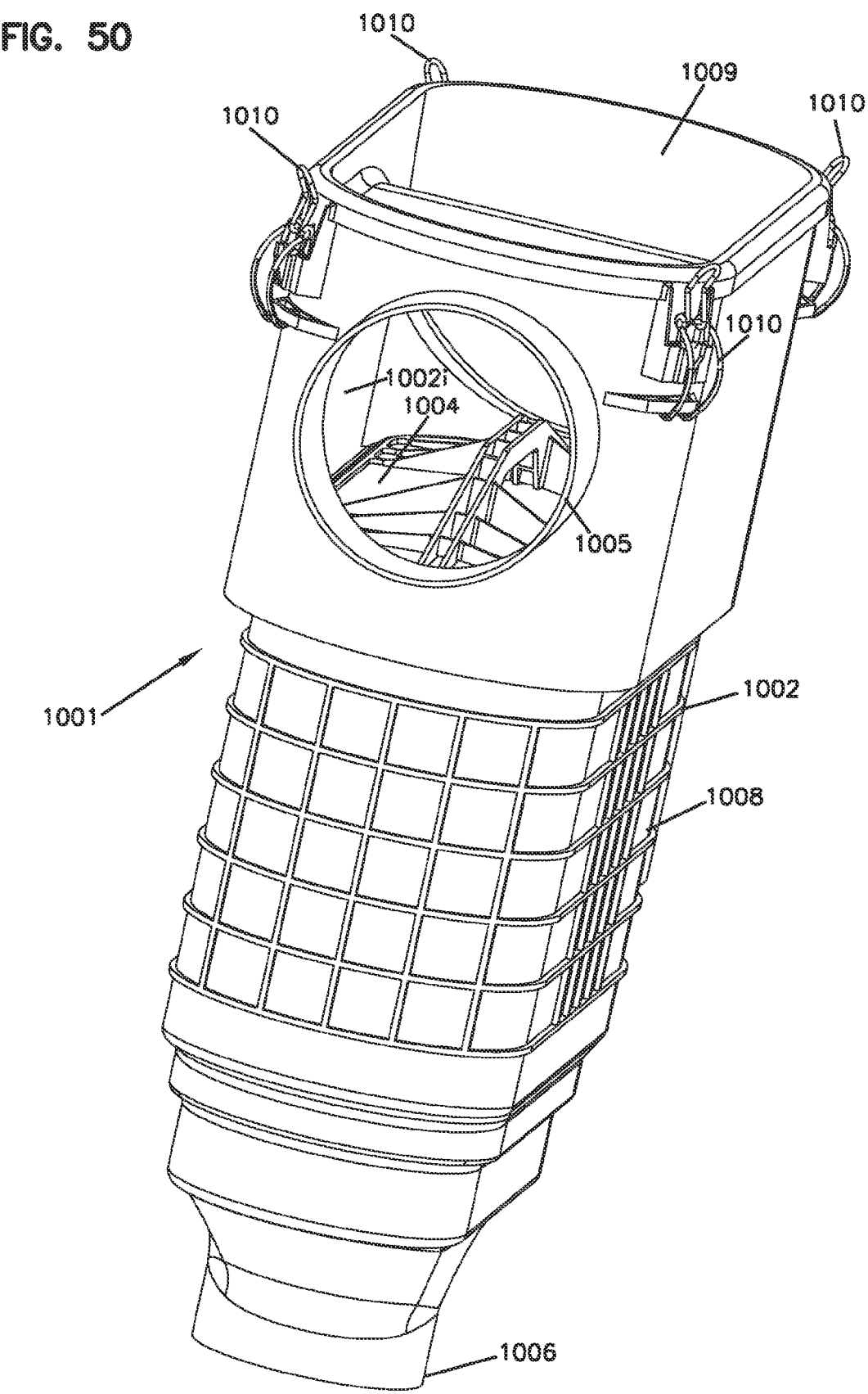

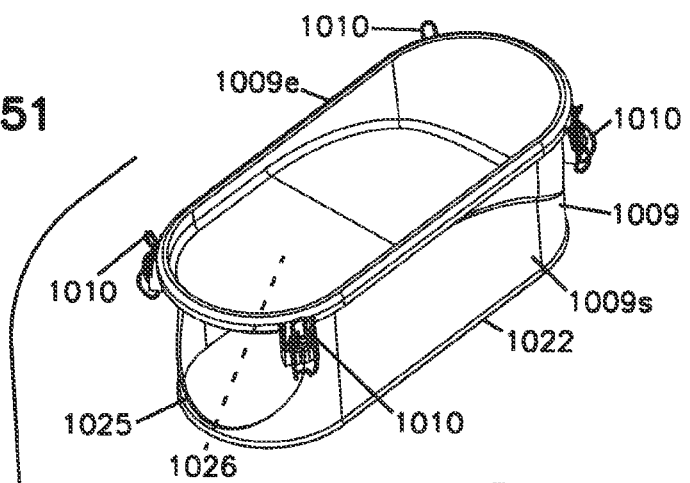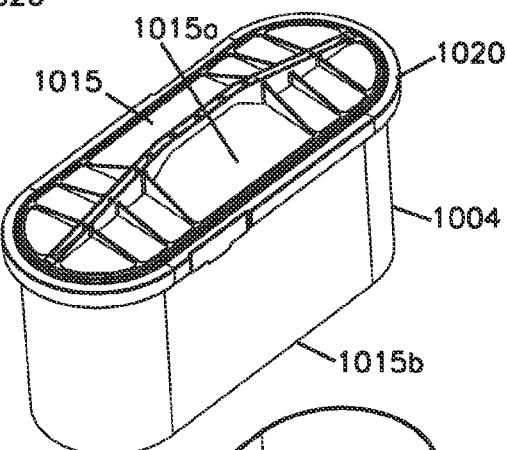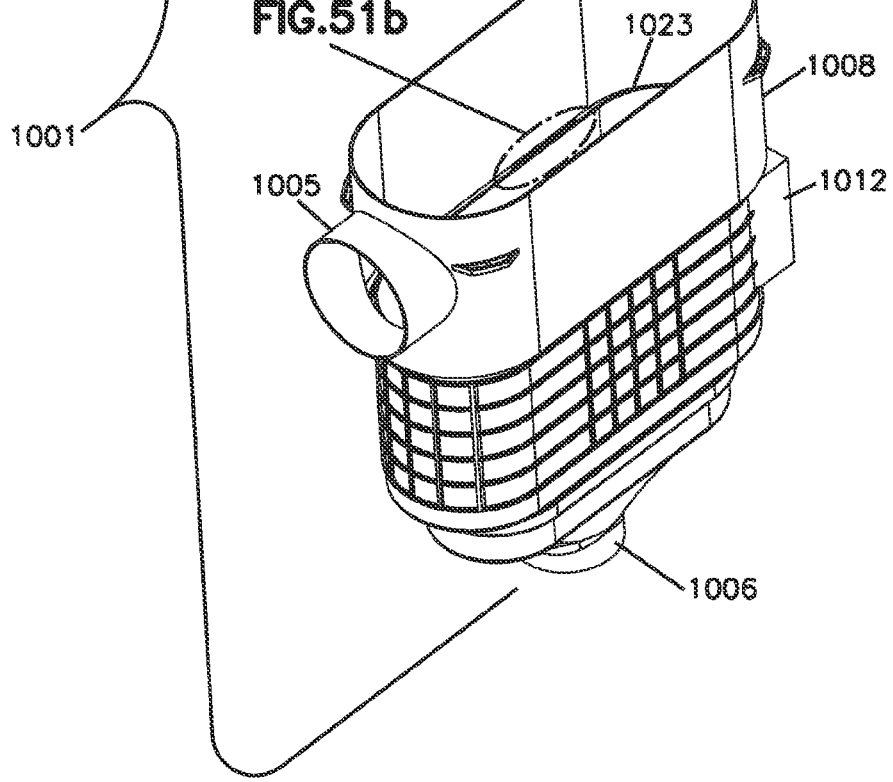

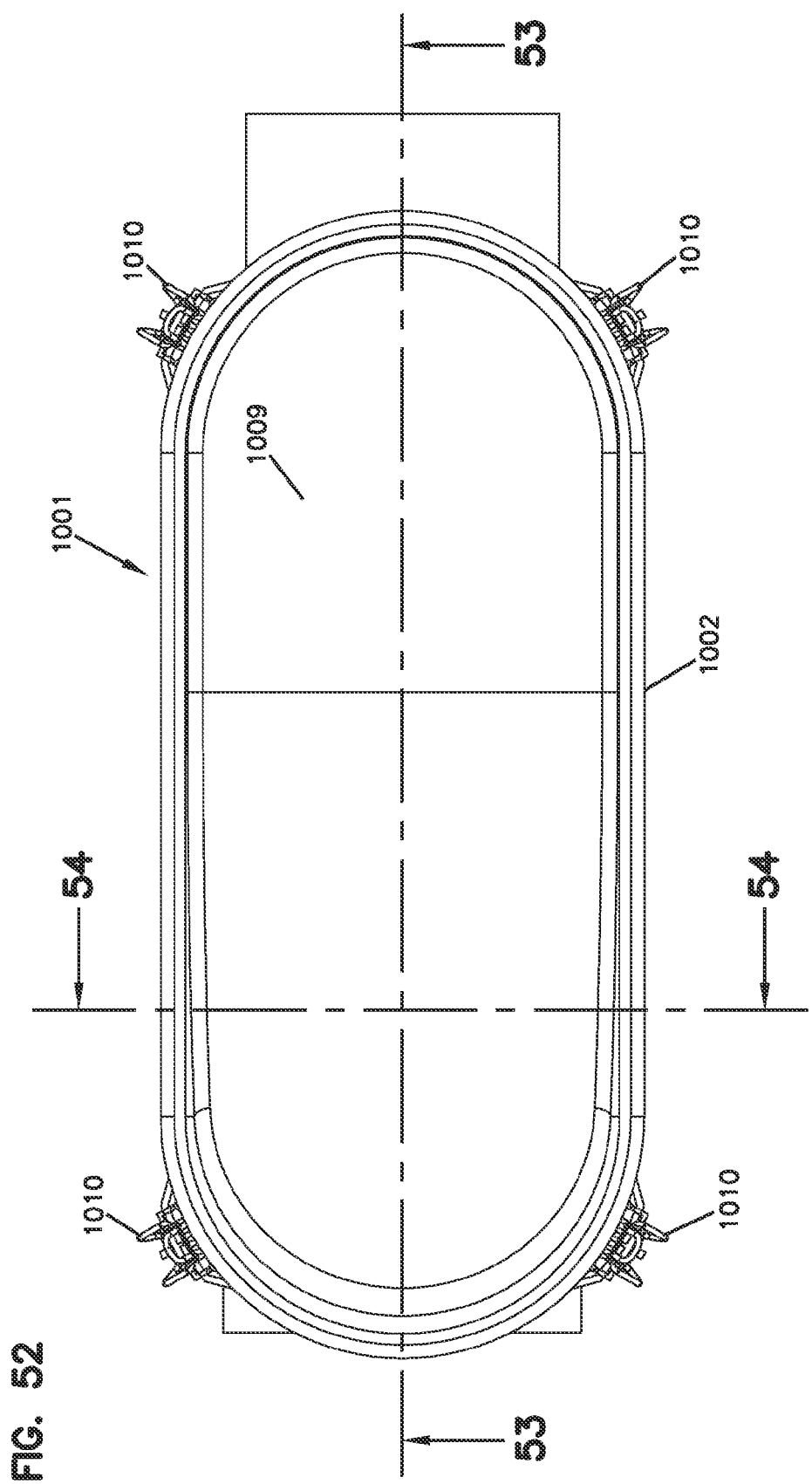

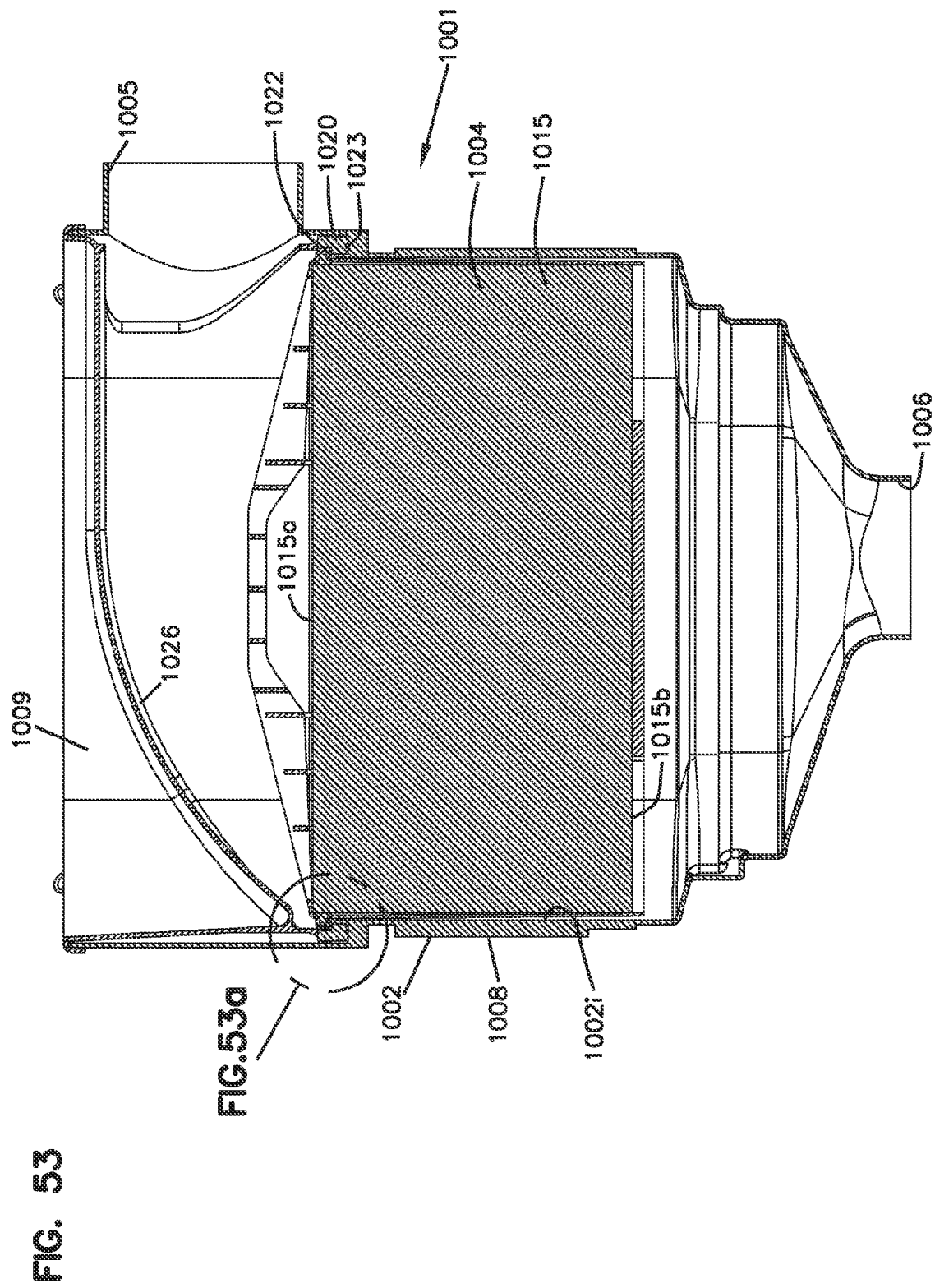

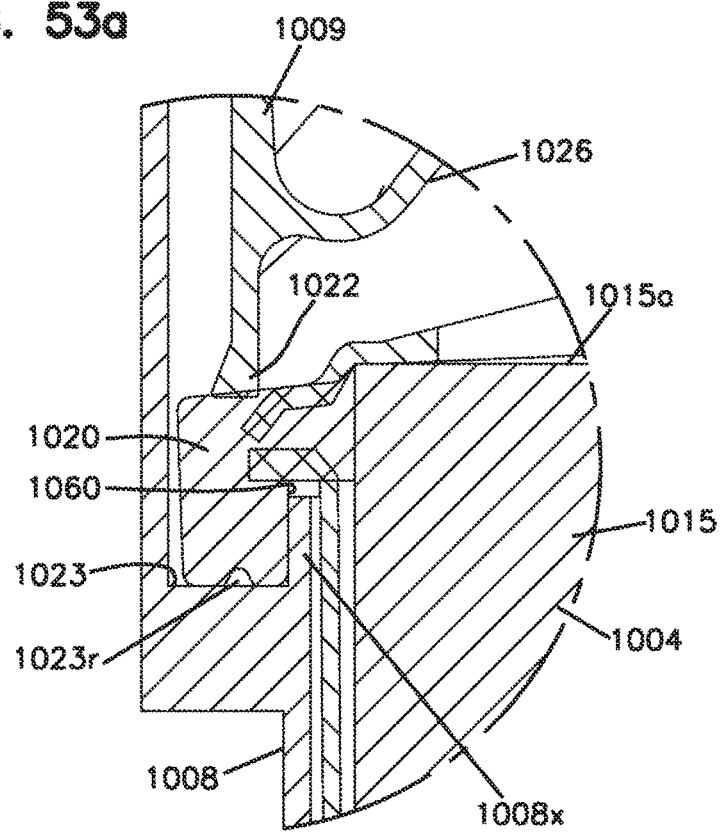

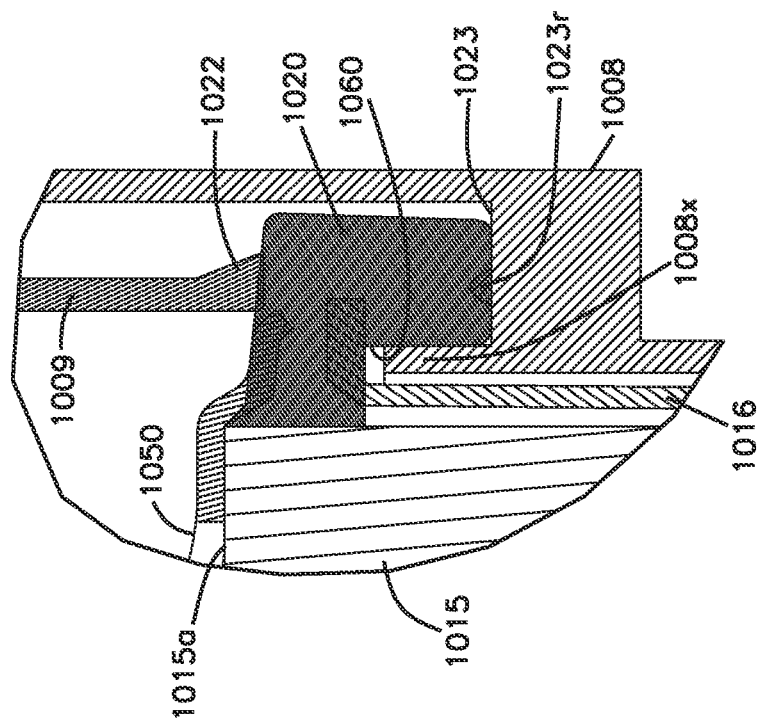
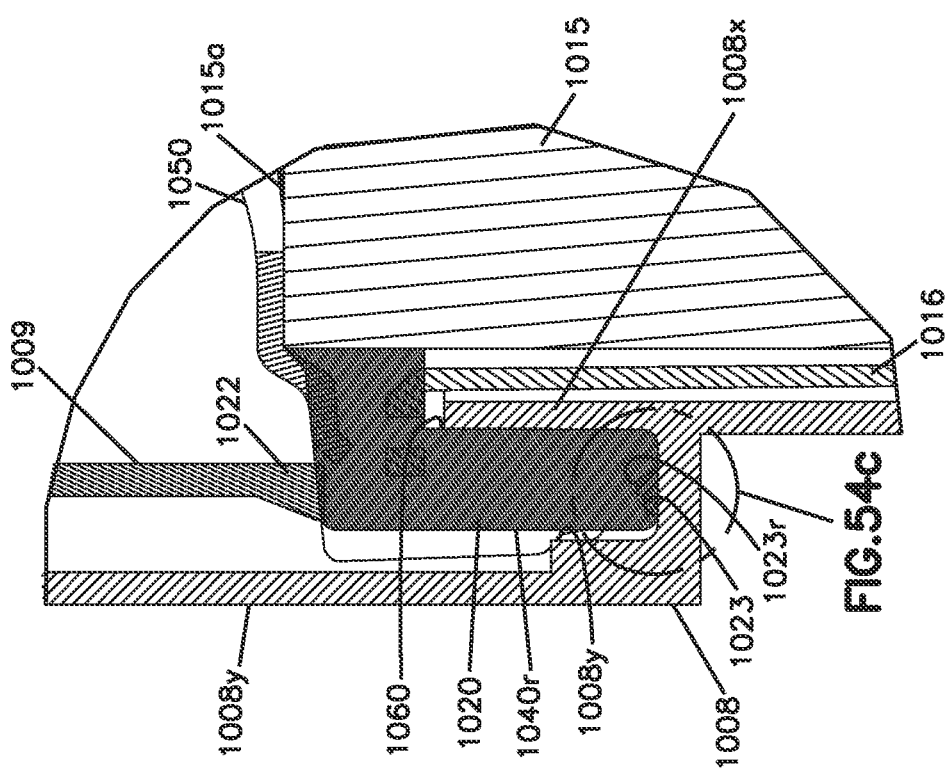

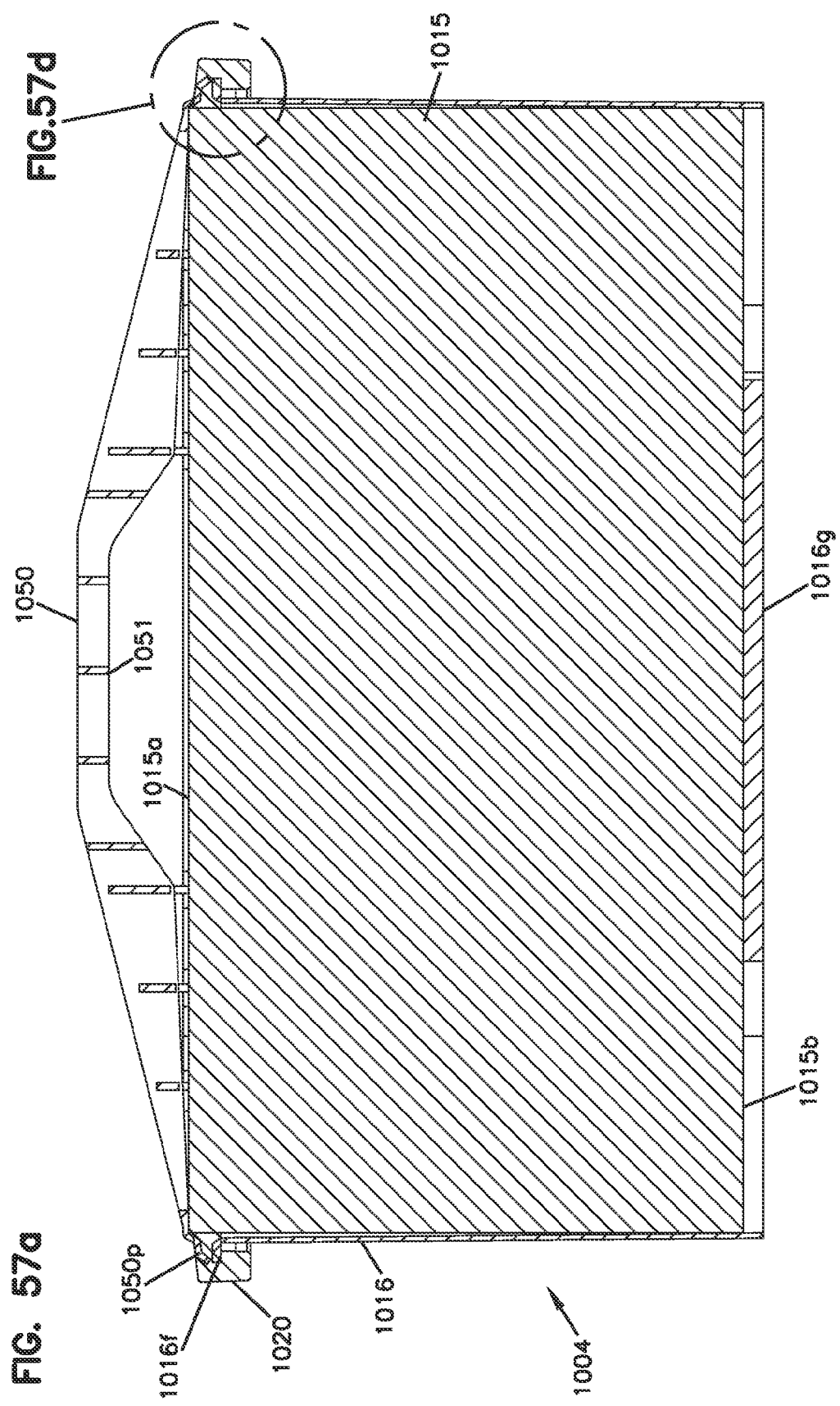

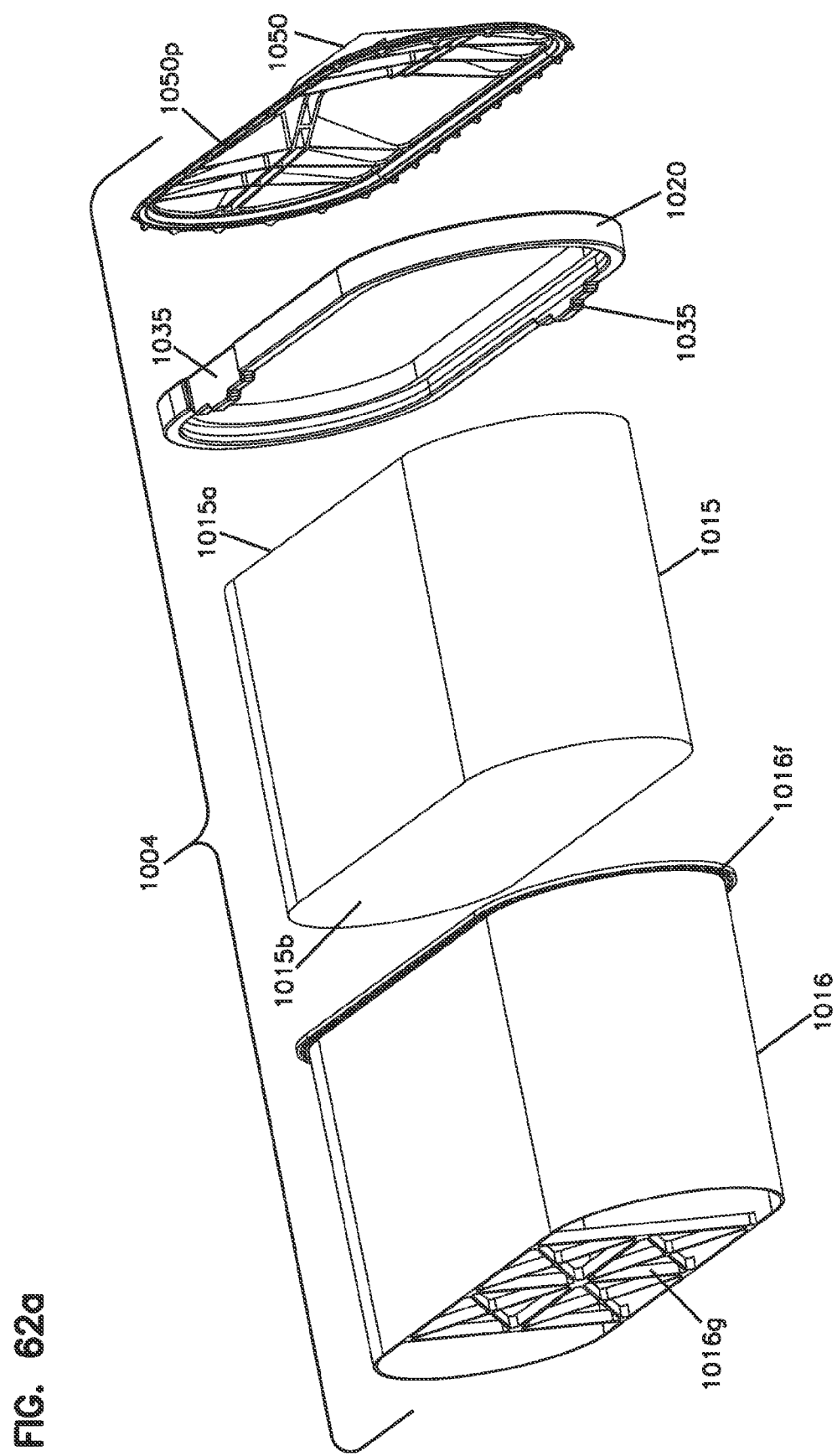

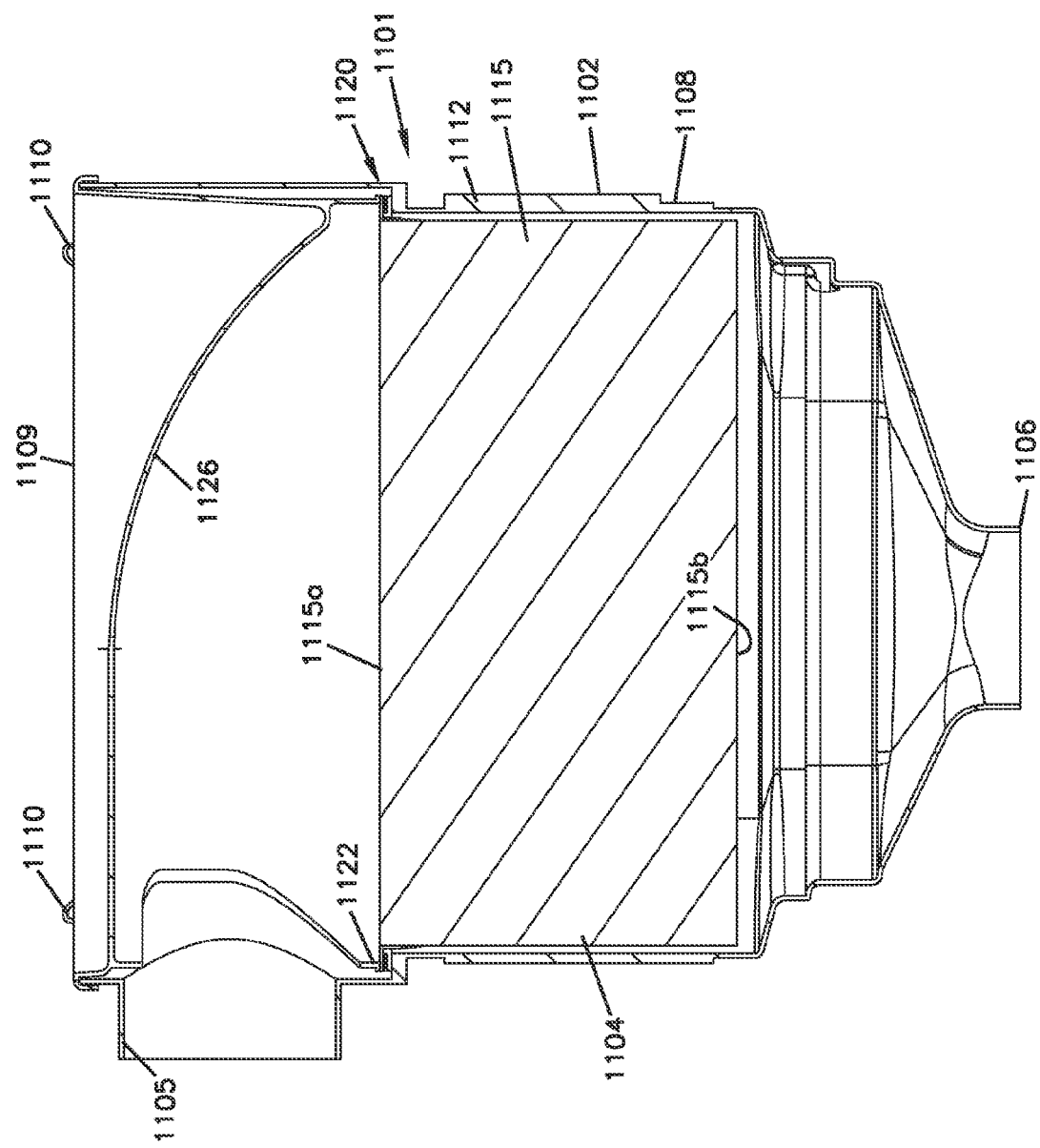

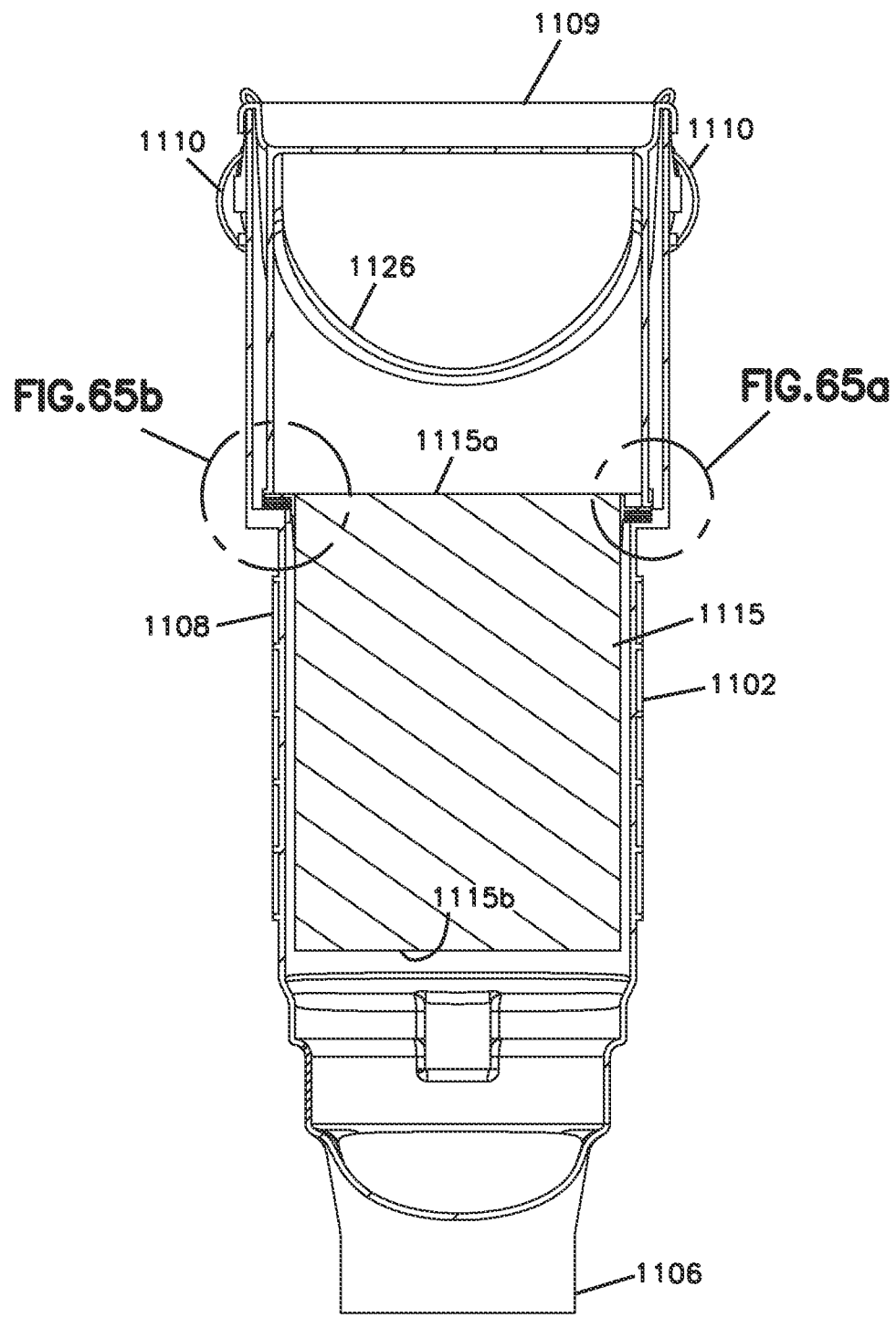

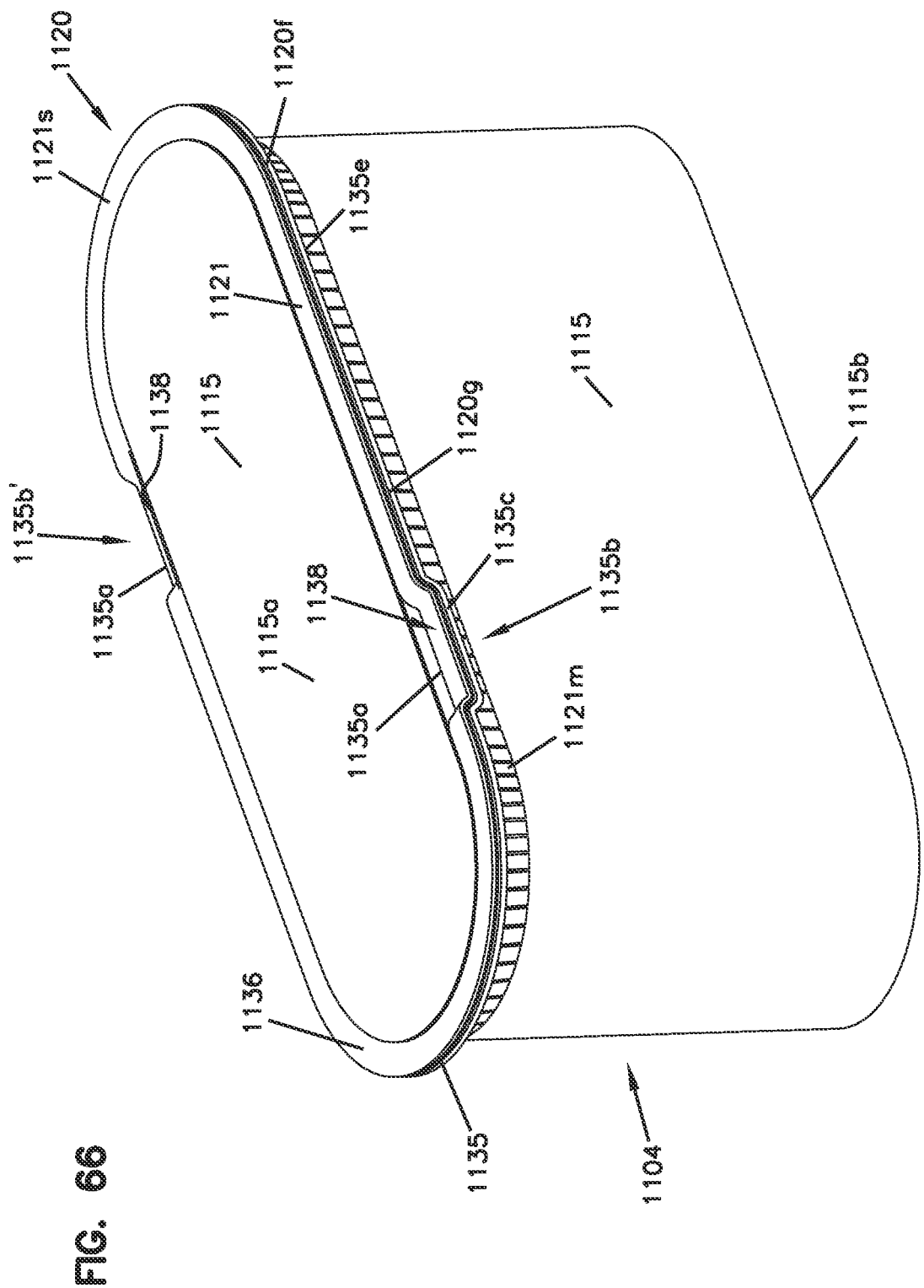

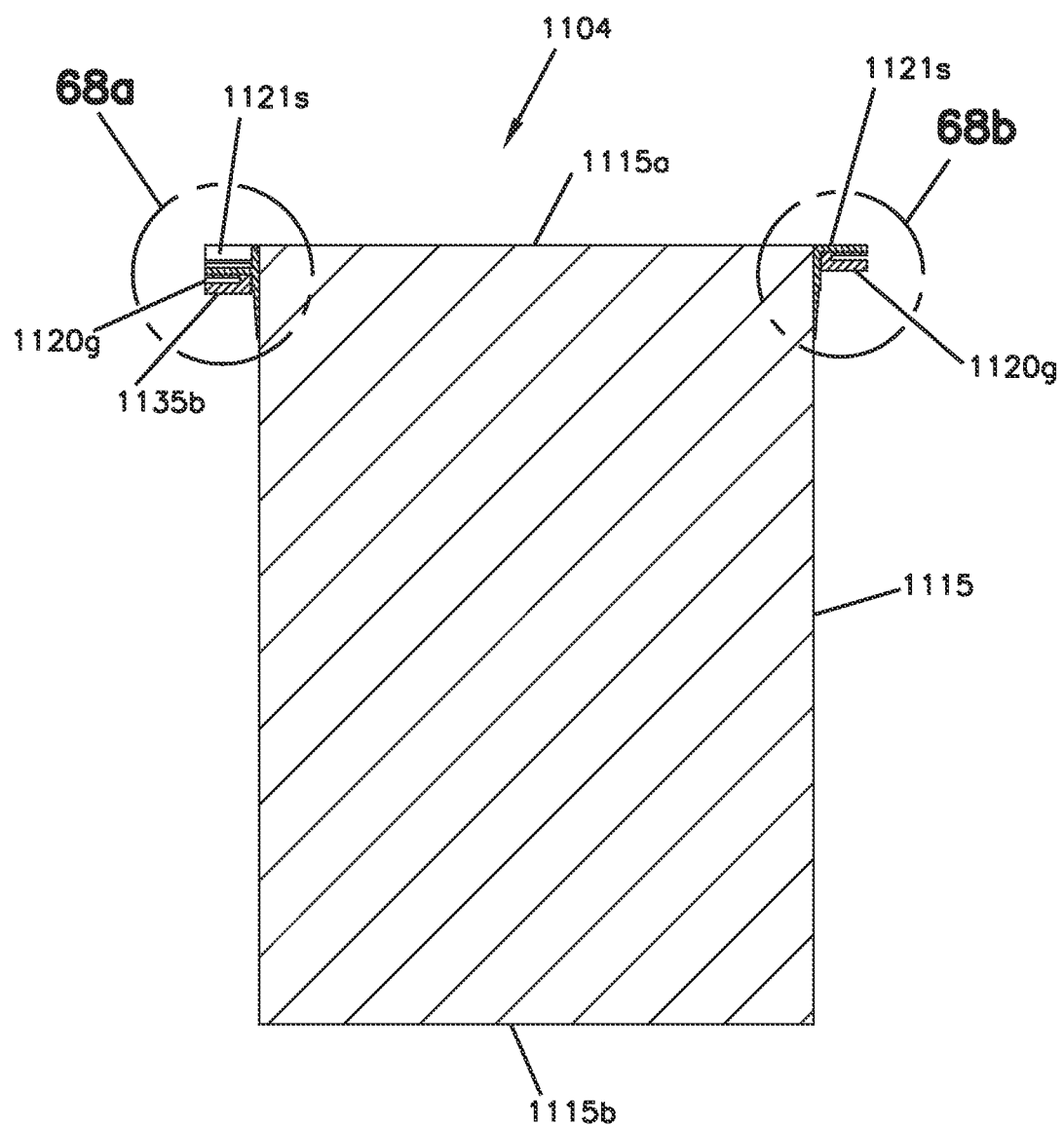

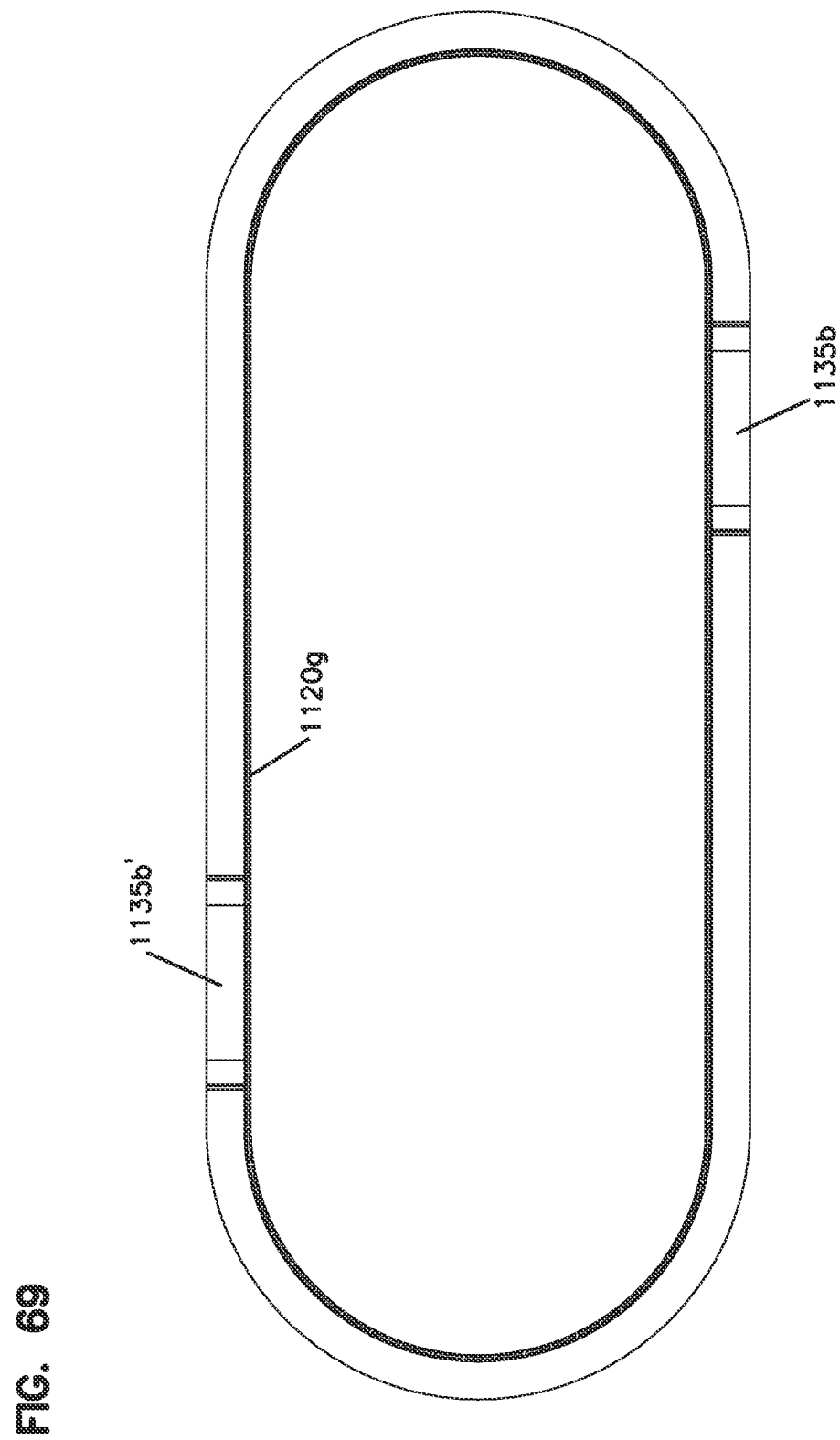

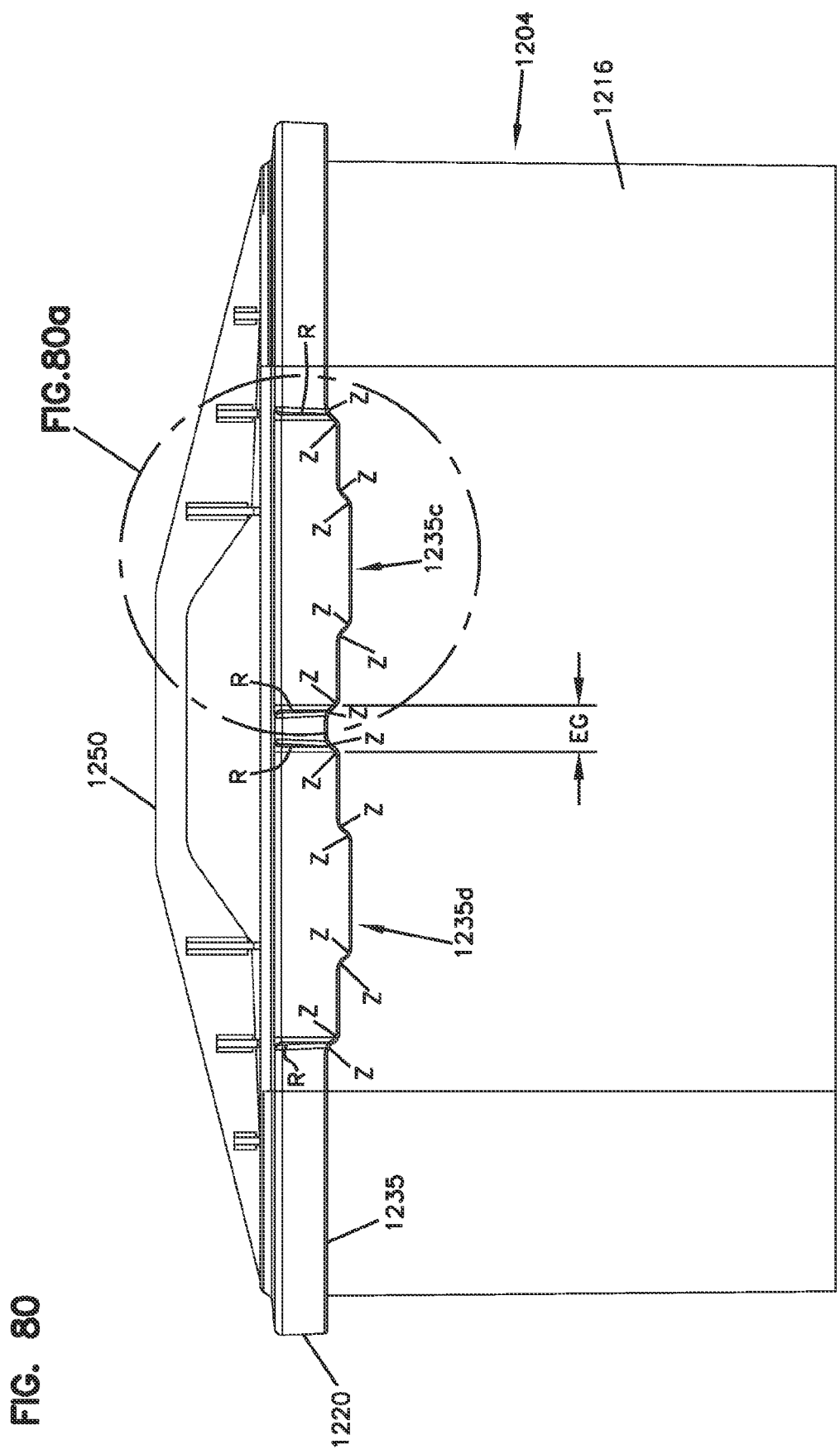

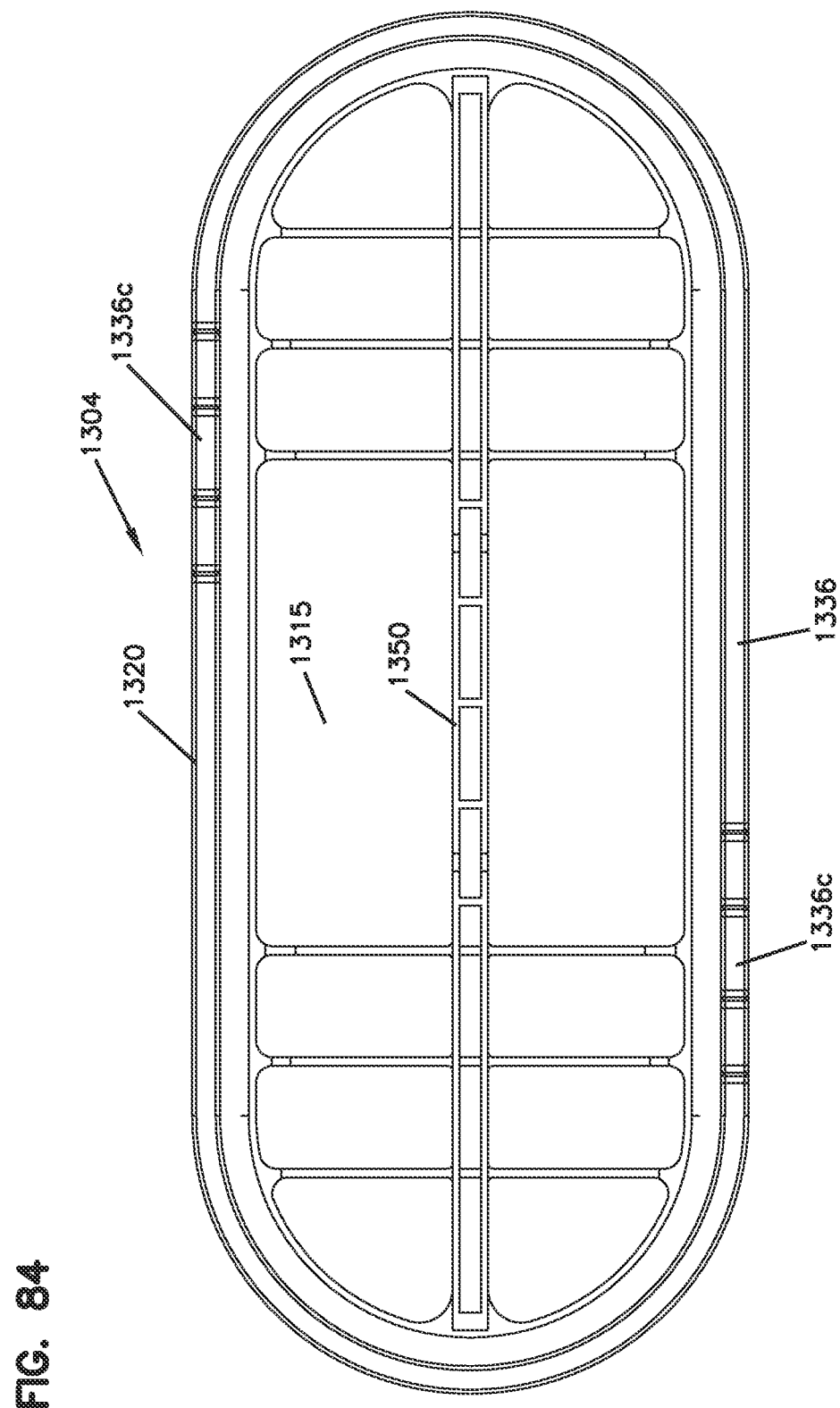

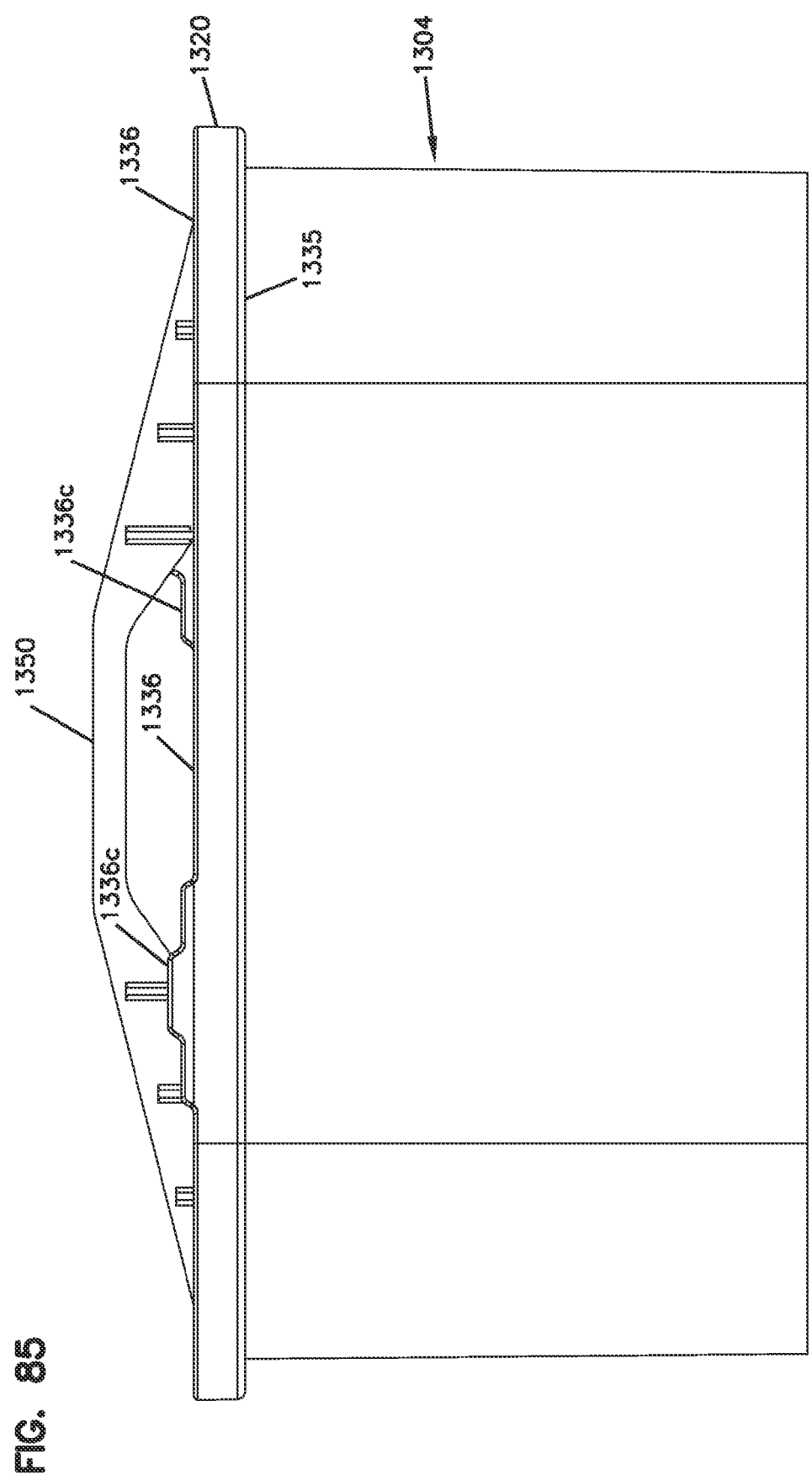

AIR FILTER CARTRIDGES; AIR CLEANER ASSEMBLIES; HOUSINGS; FEATURES; COMPONENTS; AND, METHODS

CROSS REFERENCE TO RELATED APPLICATION

The present application is a continuation of PCT/US2014/044712, filed Jun. 27, 2014 and published as WO 2014/210541 on Dec. 31, 2014. The present application includes the disclosure, with edits, of U.S. Provisional 61/841,005, filed Jun. 28, 2013. A claim of priority is made to each of PCT/US2014/044712 and U.S. Provisional 61/841,005, to the extent appropriate. The complete disclosures of each of U.S. Provisional 61/841,005 and PCT/US2014/044712 are incorporated herein by reference.

FIELD OF THE DISCLOSURE

The present disclosure relates to filter arrangements for use in filtering air. The disclosure particularly relates to filter arrangements having opposite flow ends. More specifically, the disclosure relates to such use of such filter arrangements and their inclusion in serviceable air filter cartridges for use in air cleaners. Air cleaner arrangements and methods of assembly and use are also described.

BACKGROUND

Air streams can carry contaminant material therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air. A variety of air filter arrangements have been developed for contaminant removal. Improvements are sought.

SUMMARY

According to the present disclosure, features, components and techniques useable for providing filter assemblies, such as air cleaner arrangements, are provided. Many of the features relate to a pinch arrangement having an axial seal surface provided on a filter cartridge. A typical filter cartridge, for use with these features, is a filter cartridge having opposite flow ends with media positioned to filter fluid flow in a direction between the opposite flow ends. Example media arrangements that fit this characterization are described.

According to the present disclosure, the seal arrangements are provided with one or more axial housing seal engagement surfaces. The seal arrangement is typically provided with contour variations therein, to advantage. Such variations can be in either or both of: a typically (outer) peripheral (or perimeter edge) surface; and/or, a housing axial seal engagement surface, for example a pinch seal surface.

Also according to the present disclosure, air cleaner assemblies having advantageous features therein are provided. Further, air cleaner housings are described, with selected, preferred features for engagement with filter cartridges.

There is no specific requirement that an air cleaner assembly, component or feature include all of the details characterized herein, in order to obtain some benefit according to the present disclosure. Thus, the specific examples characterized are meant to be exemplary applications of the techniques described, and alternatives are possible.

BRIEF DESCRIPTION OF THE DRAWINGS

FIG. 9A is an alternate schematic perspective view to the filter cartridge of FIG. 9.

FIG. 11 is a schematic wide side elevational view of the filter cartridge of FIGS. 9 and 9A.

FIG. 11A is an enlarged fragmentary, schematic view of an identified portion of FIG. 11.

FIG. 18A is an enlarged fragmentary schematic view of a selected portion of FIG. 18.

FIG. 18B is an enlarged fragmentary schematic cross-sectional view depicting the portion of the cartridge analogous to FIG. 15A, in the assembly of FIG. 10.

FIG. 26A is an enlarged fragmentary schematic view of a portion of the cartridge depicted in FIG. 26.

FIG. 45 is a schematic top plan view of another embodiment of a filter cartridge according to the present disclosure; the embodiment of FIG. 45 including a seal arrangement having features analogous to the arrangement of FIG. 39, but depicted in an embodiment of a generally rectangular perimeter for the seal arrangement and media pack.

FIG. 49B is a second schematic, fragmentary, exploded view of a portion of a cartridge in accord with FIG. 39 engaging a housing.

FIG. 50 is a schematic perspective view of an alternate air cleaner assembly according to the present disclosure.

FIG. 51 is a schematic, exploded, perspective view of the air cleaner assembly of FIG. 50.

FIG. 52 is a schematic top plan view of the assembly of FIGS. 50 and 51.

FIG. 53 is a schematic, cross-sectional view of the air cleaner assembly of FIG. 50, taken generally along line 53-53, FIG. 52.

FIG. 53a is an enlarged, fragmentary, schematic, cross-sectional view of an identified portion of FIG. 53.

FIG. 54a is an enlarged fragmentary schematic cross-sectional view of an identified portion of FIG. 54.

FIG. 54b is an enlarged fragmentary schematic cross-sectional view a second identified portion of FIG. 54.

FIG. 54c is an enlarged fragmentary schematic cross-sectional view of an identified portion of FIG. 34a.

FIG. 57a is a schematic, long dimension, cross-sectional view of the cartridge of FIG. 57, taken generally along line 57a-57a, FIG. 58.

FIG. 62a is a second schematic exploded perspective view of the filter cartridge of FIG. 57.

FIG. 64 is a first schematic, long-dimension cross-sectional view of the air cleaner assembly of FIG. 63.

FIG. 65 is the second schematic, short-dimension, cross-sectional view of the assembly of FIG. 63i.

FIG. 66 is a schematic, perspective view of a filter cartridge used in the assembly of FIG. 63.

FIG. 68 is a schematic, short dimension, cross-sectional view taken generally along the line 68-68, FIG. 67.

FIG. 69 is a schematic top plan view of the filter cartridge of FIG. 66.

FIG. 78 is a schematic perspective view of a further filter cartridge component according to a further embodiment of the present disclosure.

FIG. 79 is a schematic end elevational view of the filter cartridge of FIG. 78.

FIG. 80 is a schematic side elevational view of the filter cartridge of FIG. 78; the view being taken toward a side opposite that viewable in FIG. 78.

FIG. 80a is an enlarged fragmentary schematic view of an identified portion of FIG. 80.

FIG. 81 is a schematic top plan view of a filter cartridge of FIG. 78.

FIG. 81a is an enlarged fragmentary schematic cross-sectional view of selected portions of the filter cartridge of FIG. 80, taken generally along line 81-81, FIG. 81.

FIG. 82 is a schematic perspective view of a further embodiment of a filter cartridge according to the present disclosure.

FIG. 83 is a schematic end elevational view of the filter cartridge of FIG. 82.

FIG. 84 is a schematic top plan view of the filter cartridge of FIG. 82.

FIG. 85 is a schematic side elevational view of the filter cartridge of FIG. 82.

DETAILED DESCRIPTION

I. Example Media Configurations, Generally

Figure 1:
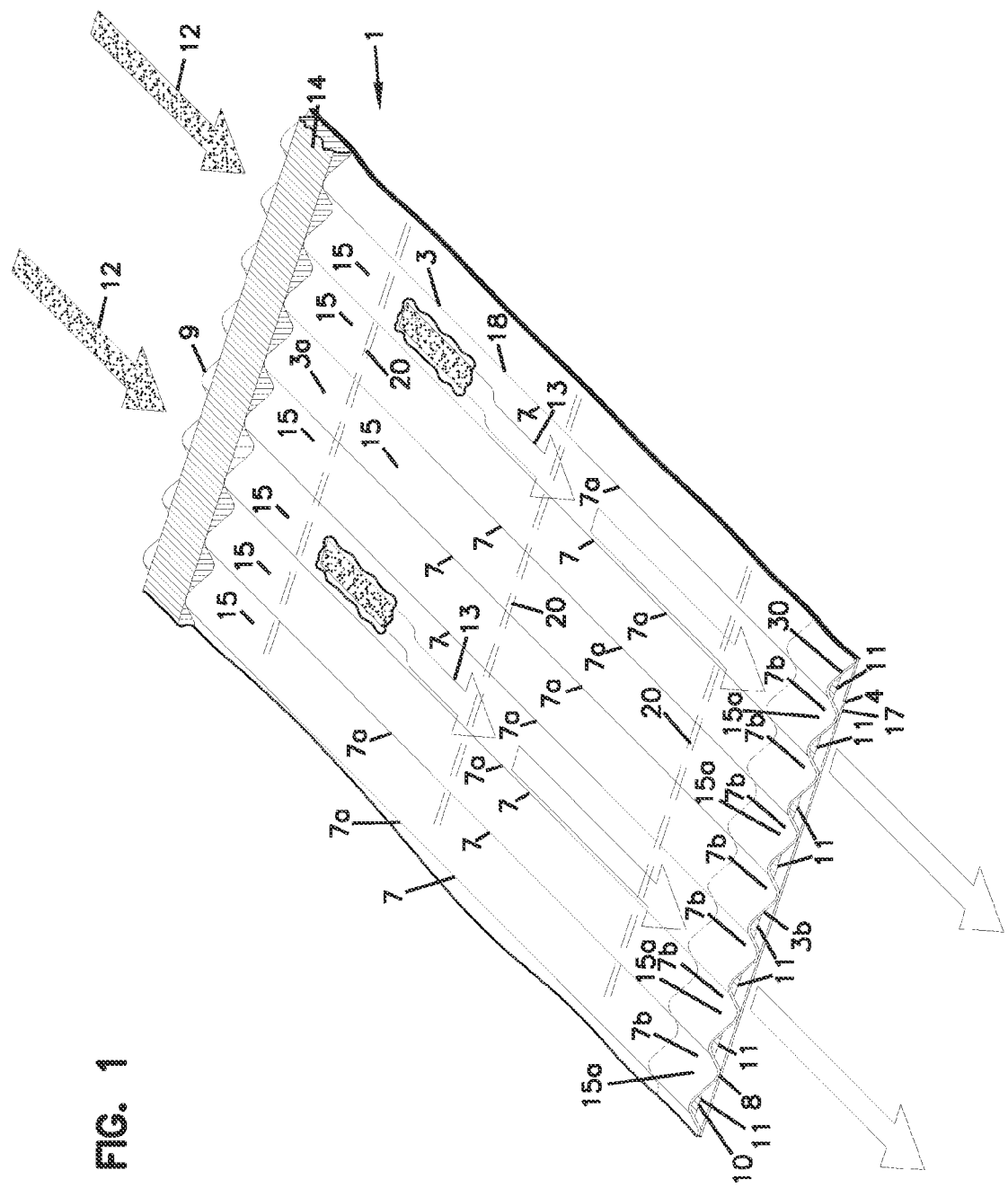
FIG. 1 is a fragmentary, schematic, perspective view of a first example media type useable in arrangements according to the present disclosure.

A. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396, 098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet, and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause corrugations in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media (media having media ridges) secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

In general, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7b and ridges 7a. The term "regular" in this context is meant to refer to the fact that the pairs of troughs and ridges (7b, 7a) alternate with generally the same repeating corrugation (flute or ridge) shape and size. (Also, typically in a regular configuration each trough 7b is substantially an inverse ridge for each ridge 7a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight. By "straight" in this context, it is meant that through at least 70%, typically at least 80% of the length between edges 8 and 9, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

Adjacent edge 8 is provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

Adjacent edge 9, is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.") Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes which are modified in shape to include various ridges are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
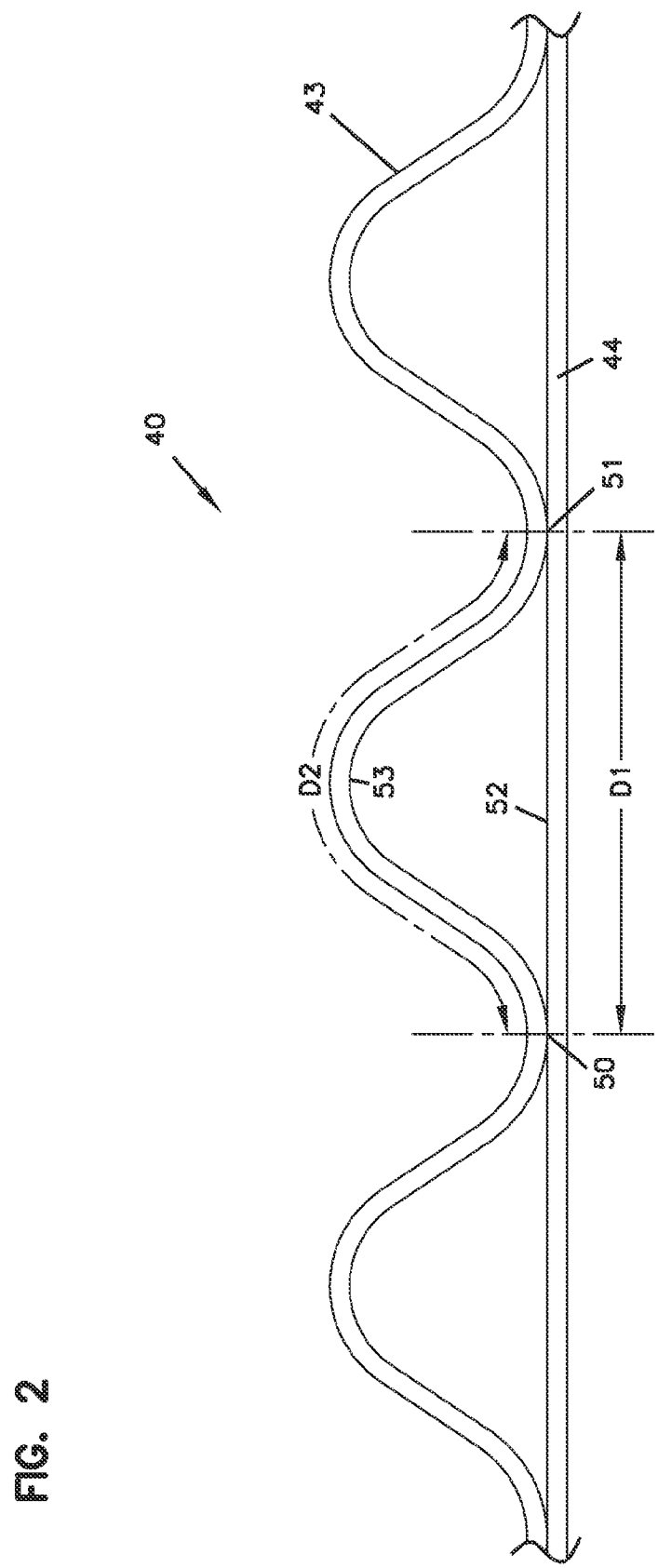
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
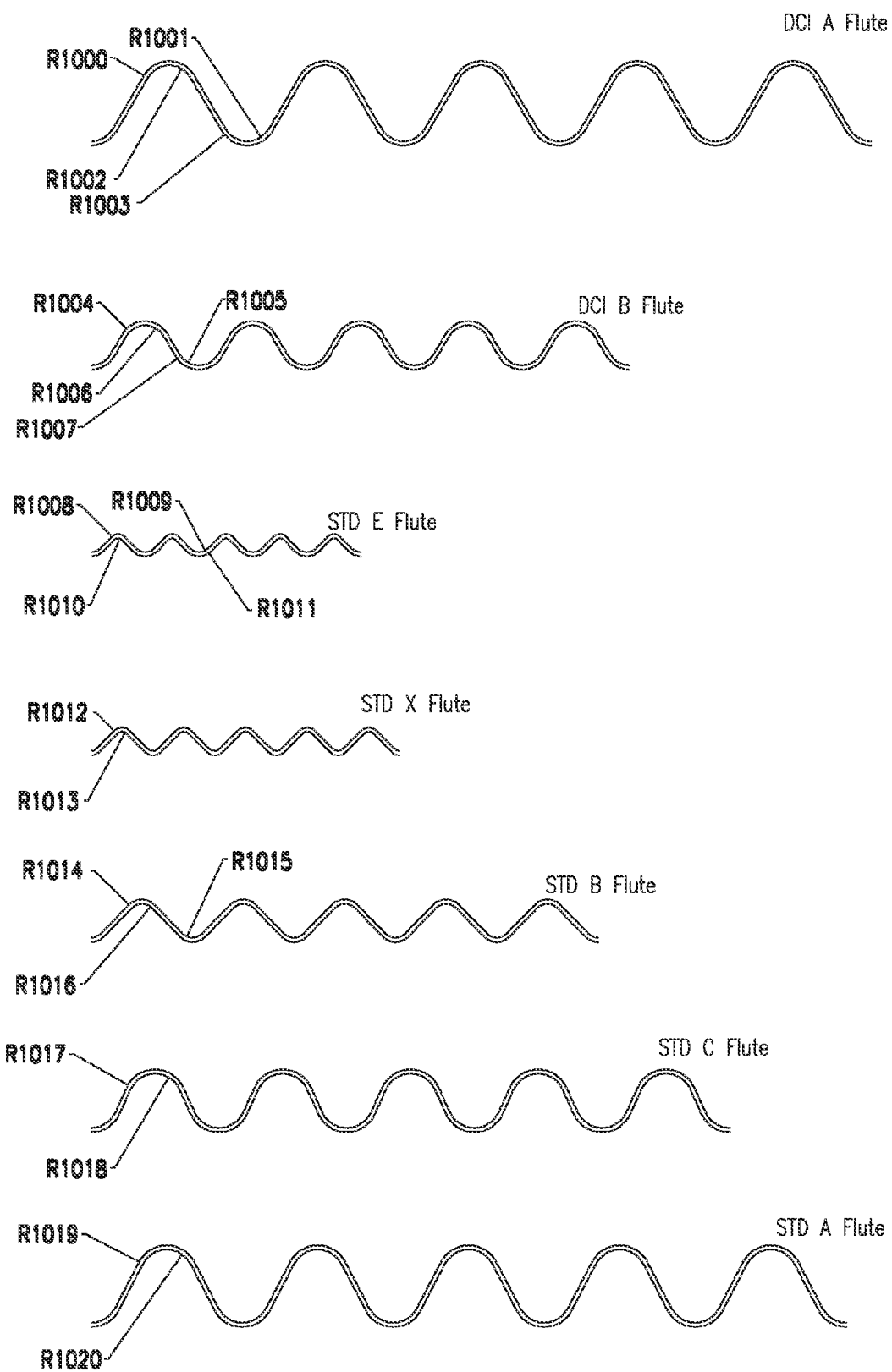
FIG. 3 includes schematic views of examples of various fluted media definitions, for media of the type of FIGS. 1 and 2.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI A Flute: Flute/flat = 1.52:1; The Radii (R) are as follows:
    R1000 = .0675 inch (1.715 mm); R1001 = .0581 inch (1.476 mm);
    R1002 = .0575 inch (1.461 mm); R1003 = .0681 inch (1.730 mm);
DCI B Flute: Flute/flat = 1.32:1; The Radii (R) are as follows:
    R1004 = .0600 inch (1.524 mm); R1005 = .0520 inch (1.321 mm);
    R1006 = .0500 inch (1.270 mm); R1007 = .0620 inch (1.575 mm);
Std. E Flute: Flute/flat = 1.24:1; The Radii (R) are as follows:
    R1008 = .0200 inch (.508 mm); R1009 = .0300 inch (.762 mm);
    R1010 = .0100 inch (.254 mm); R1011 = .0400 inch (1.016 mm);
Std. X Flute: Flute/flat = 1.29:1; The Radii (R) are as follows:
    R1012 = .0250 inch (.635 mm); R1013 = .0150 inch (.381 mm);
Std. B Flute: Flute/flat = 1.29:1; The Radii (R) are as follows:
    R1014 = .0410 inch (1.041 mm); R1015 = .0310 inch (.7874 mm);
    R1016 = .0310 inch (.7874 mm);
Std. C Flute: Flute/flat = 1.46:1; The Radii (R) are as follows:
    R1017 = .0720 inch (1.829 mm); R1018 = .0620 inch (1.575 mm);
Std. A Flute: Flute/flat = 1.53:1; The Radii (R) are as follows:
    R1019 = .0720 inch (1.829 mm); R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890 and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

B. Manufacture of Media Pack Configurations Including the Media of FIGS. 1-3, See FIGS. 4-7

Figure 4:
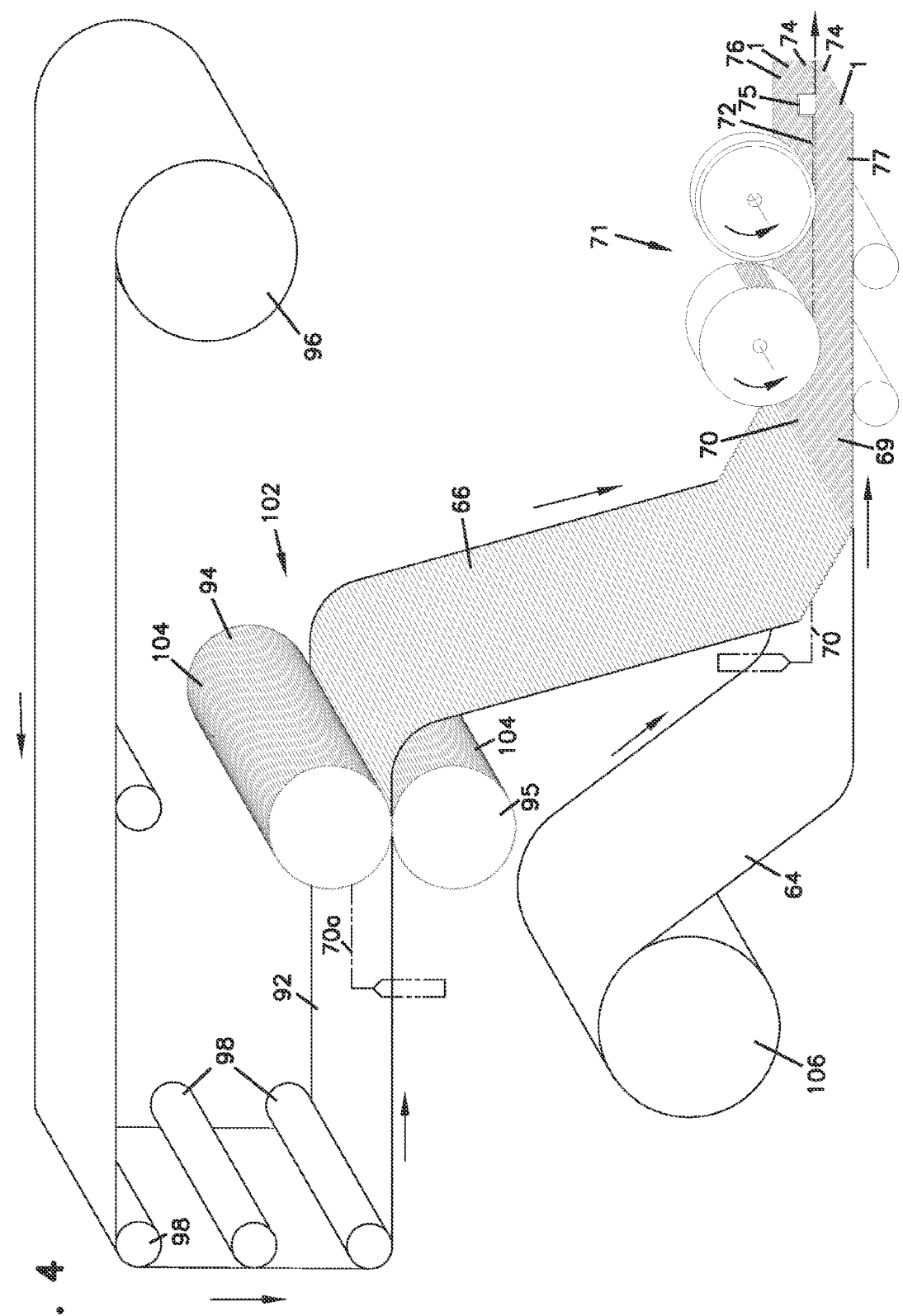
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 5:
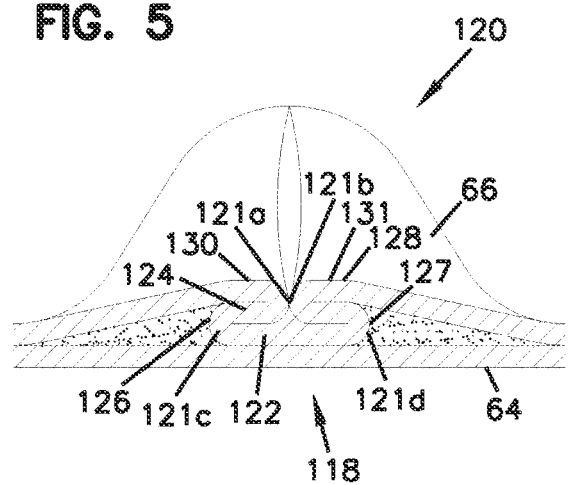
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
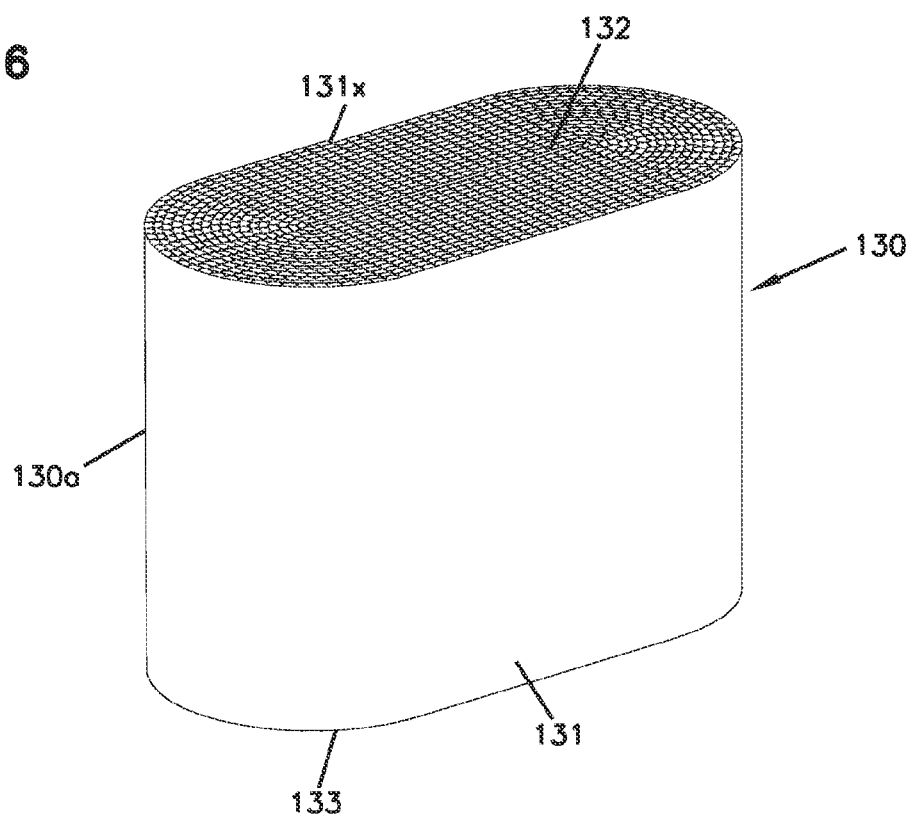
FIG. 6 is a schematic perspective view of a coiled filter arrangement usable in a filter cartridge according to the present disclosure, and made with media in accord with FIG. 1.

In FIG. 6, a coiled media pack (or coiled media) 130 constructed by coiling a single strip of single faced media is depicted, generally. The particular coiled media pack depicted is an oval media pack 130a, specifically a racetrack shaped media pack 131. The tail end of the media, at the outside of the media pack 130 is shown at 131x. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
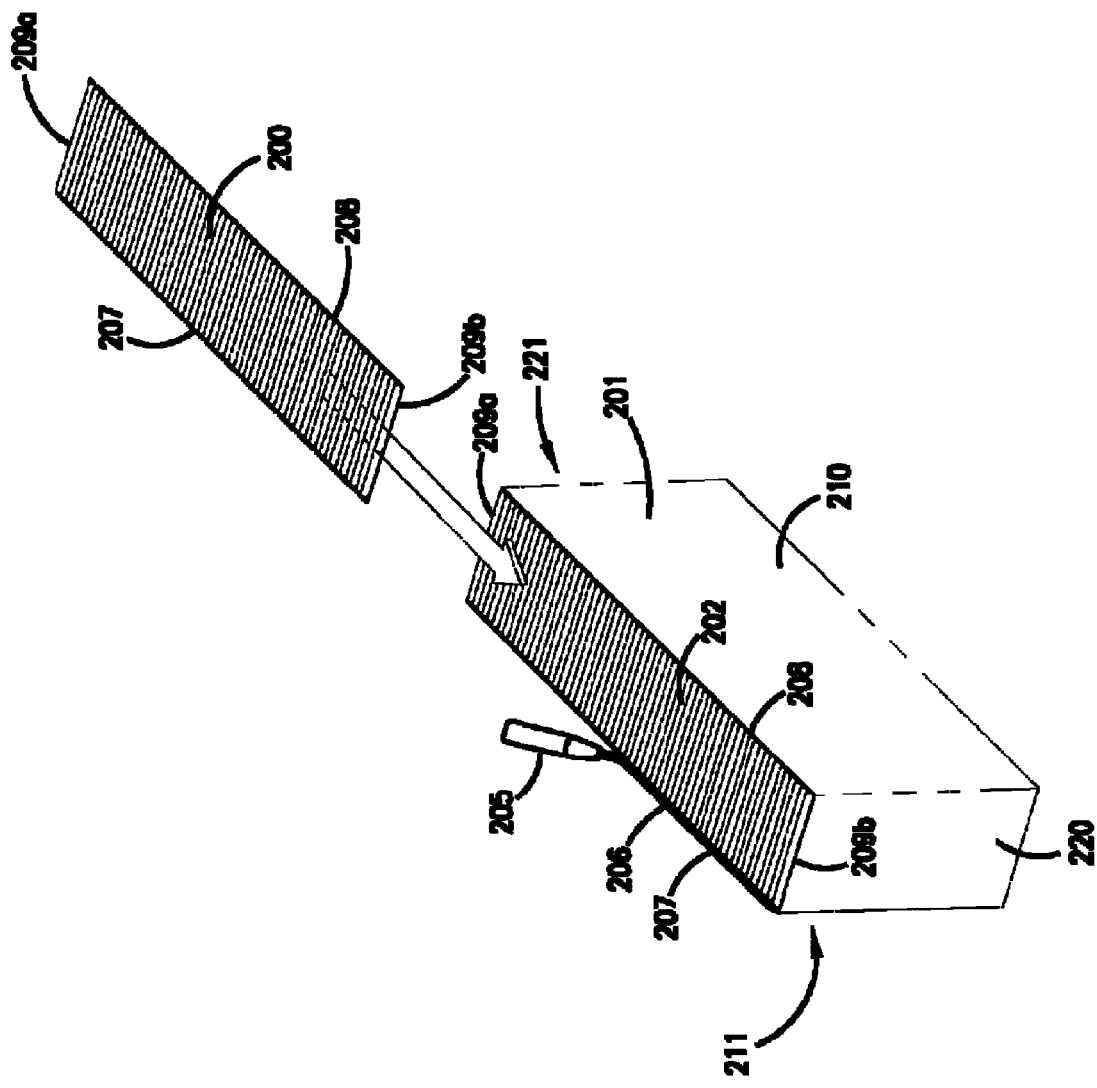
FIG. 7 is a schematic perspective view of a stacked media pack arrangement usable in an arrangement according to the present disclosure and made with media in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
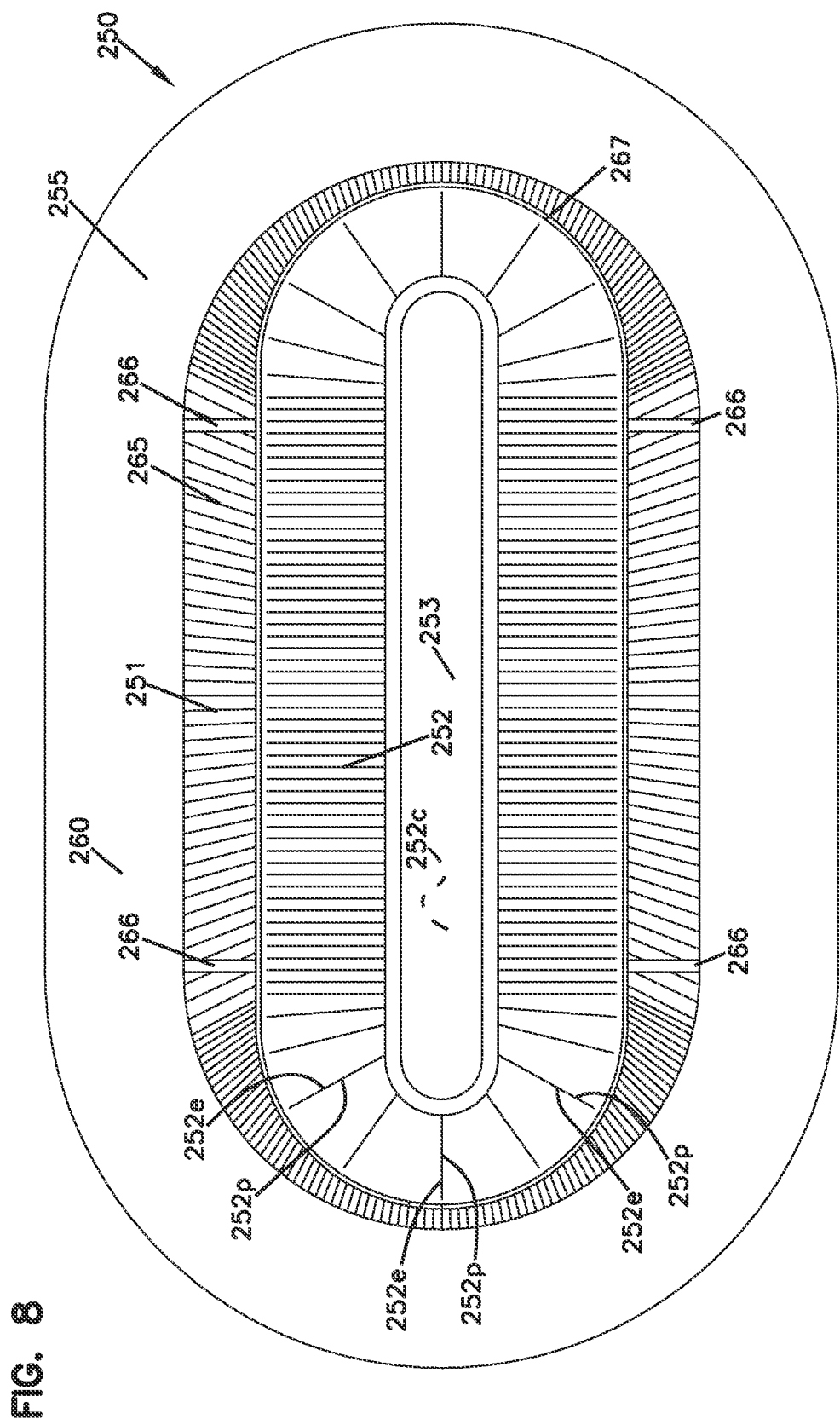
FIG. 8 is a schematic flow end view of a filter media pack using an alternate media to the media of FIG. 1, and alternately usable in filter cartridges in accord with the present disclosure.

C. Selected Media or Media Pack Arrangements Comprising Multiple Spaced Coils of Fluted Media; FIGS. 8-8B Alternate types of media arrangements or packs that involve flown between opposite ends extending between can be used with selected principles according to the present disclosure. An example of such alternate media arrangement or pack is depicted in FIGS. 8-8B. The media of FIGS. 8-8B is analogous to one depicted and described in DE 20 2008 017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252c that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
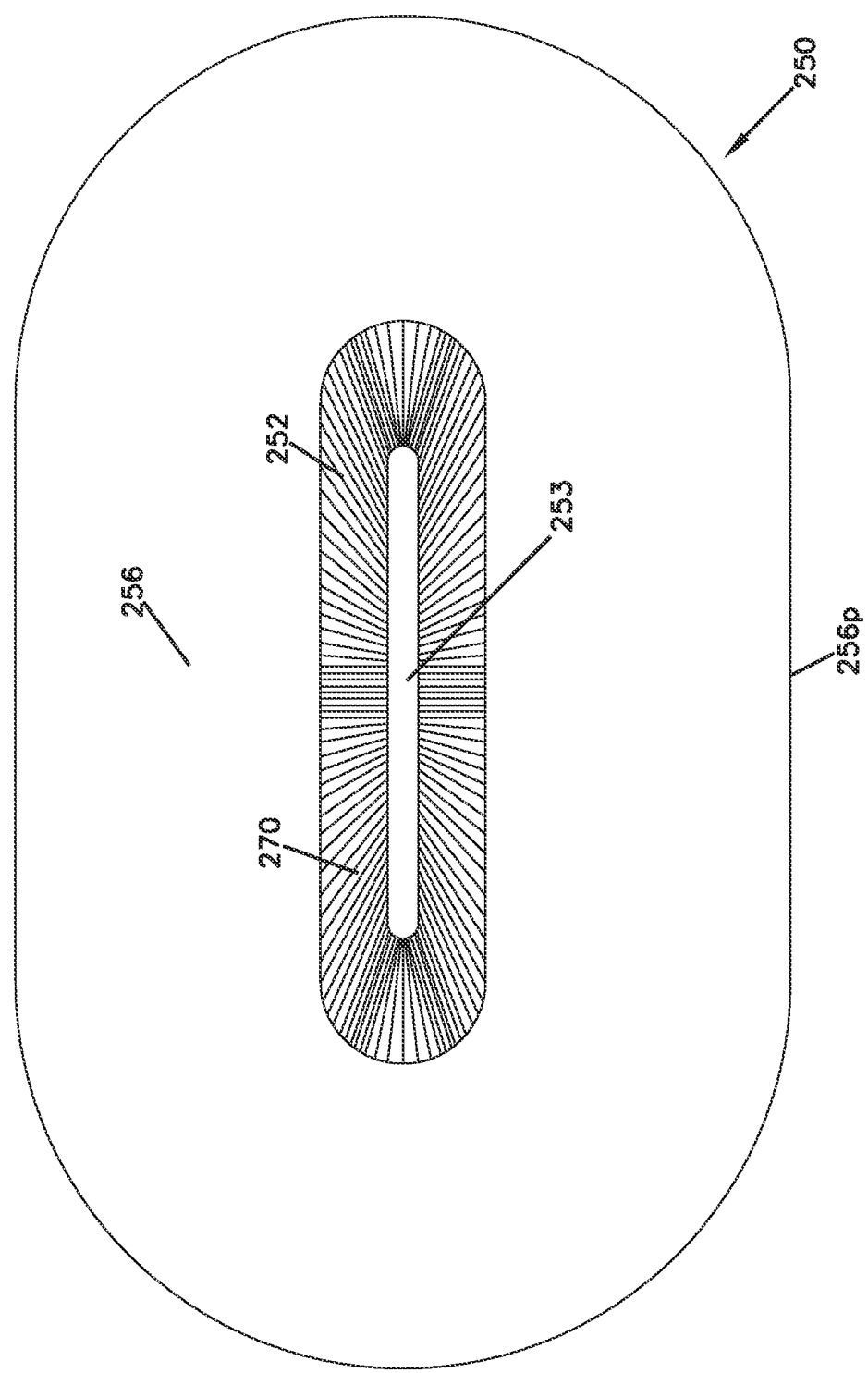
FIG. 8A is a schematic opposite flow end view to the view of FIG. 8.
Figure 8B:
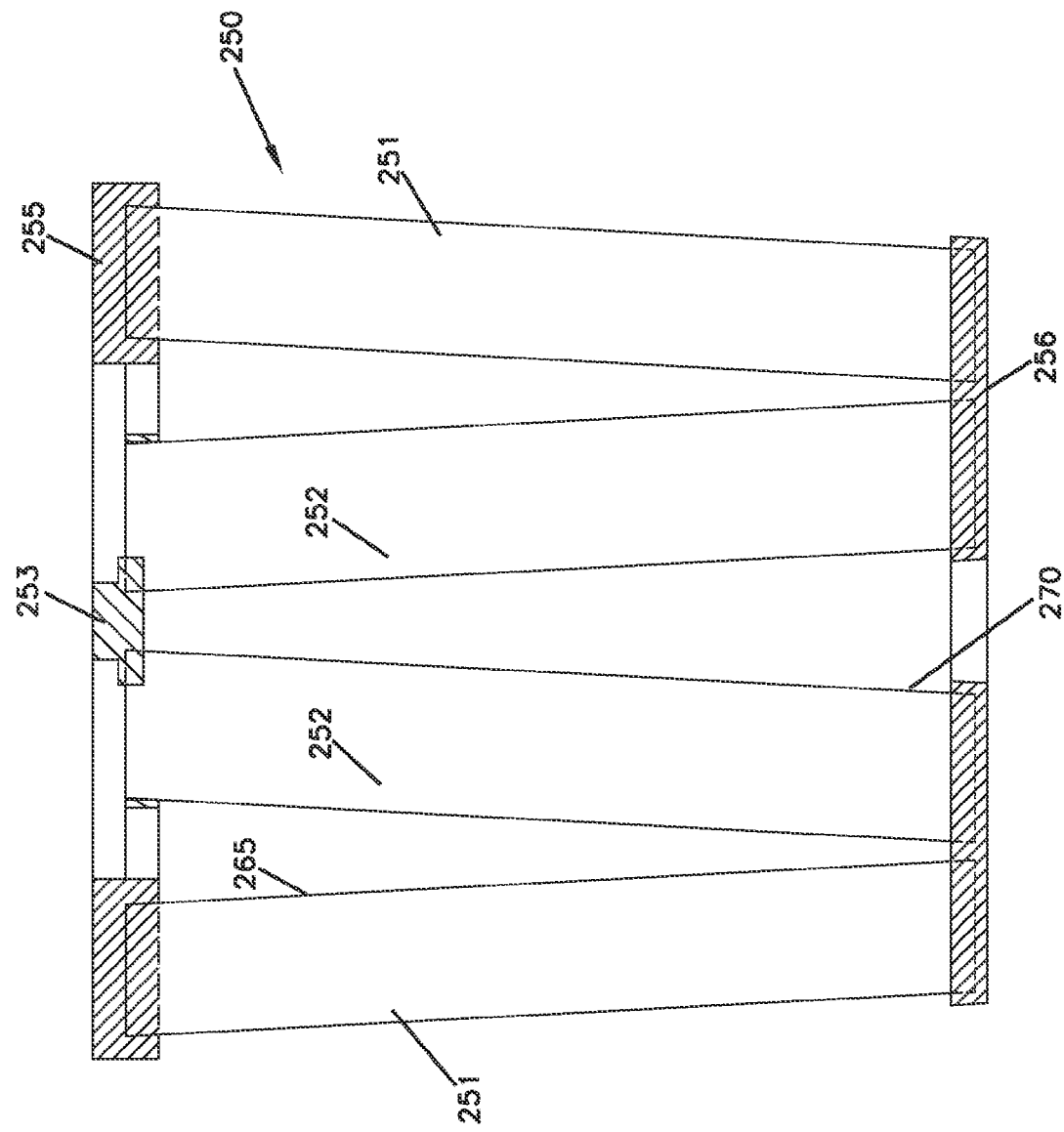
FIG. 8B is a schematic cross-sectional view of the media pack of FIGS. 8 and 8A.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256p of end 256.

In FIG. 8B a schematic cross sectional view of cartridge 250 is provided. Selected identified and described features are indicated by like reference numerals It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

B. Additional Media Types

Many of the techniques characterized herein will preferably be applied when the media orients for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, and are configured for large loading volume during use. These types of systems will typically be ones in which the media is configured with pleat tips or flutes extending in a direction between opposite flow ends.

II. Selected Identified Issues with Various Air Cleaners

A. General

Air cleaner assemblies that use relatively deep filter media packs, for example, in general accord with one or more of FIGS. 6-8B, have proliferated. As to example actual products in the marketplace, attention is directed to the air cleaners of Donaldson Company, Inc. the Assignee of the present disclosure sold under the trade designation "Powercore;" and, also, to the products of Mann & Hummel provided under the designation "IQORON."

In addition, air cleaner assemblies using such media packs can be incorporated in a wide variety of original equipment (on road trucks, buses; off road construction equipment, agriculture and mining equipment, etc.) on a global basis. Service parts and servicing are provided by a wide range of suppliers and service companies.

B. Identification of Appropriate Filter Cartridges

It is very important that the filter cartridge selected for servicing be an appropriate one for the air cleaner of concern. The air cleaner is a critical component in the overall equipment. If servicing is required to occur more frequently than intended, the result can be added expense, downtime for the equipment involved and lost productivity. If the servicing is not done with a proper part, there may be risk of equipment failure or other problems.

The proper cartridge for the air cleaner of concern and equipment of concern, is generally a product of: product engineering/testing by the air cleaner manufacturer; and, specification/direction/testing and qualification by the equipment manufacturer and/or engine manufacturer. Servicing in the field may involve personnel selecting a part that appears to be similar to the one previously installed, but which is not the proper, qualified, component for the system involved.

It is desirable to provide the air cleaner assembly, regardless of media type, with features that will help readily identify to the service provider that an effort to service the assembly is being made with a proper (or improper) filter cartridge. Features and techniques described herein can be provided to obtain this benefit as described below.

In addition, assembly features and techniques which are advantageous with respect to manufacture and/or filter component integrity are described. These can be implemented with features and techniques of the type relating to helping ensure that the proper cartridge is installed in an assembly, or in alternate applications.

C. Mass Air Flow Sensor Issues

In many systems, a mass air flow sensor is provided downstream from the filter cartridge and upstream from the engine, to monitor air flow characteristics and contaminant characteristics. In some instances, minor modifications in media pack configuration and orientation, can lead to fluctuations in mass air flow sensor operation. It is therefore sometimes desirable to provide the air cleaner assembly with features in the filter cartridge and air cleaner, such that variation in air flow from the filter cartridge is managed to a relative minimum. This can facilitate mass air flow sensor use and operation. The features and techniques described herein can be provided to obtain this benefit.

D. Stable Filter Cartridge Installation

In many instances, the equipment on which the air cleaner is positioned is subject to substantial vibration and shock during operation. The types of media packs described above in connection with FIGS. 6-8B, are often constructed relatively deep, i.e. with long flutes and having depth of extension in the air flow direction of at least 50 mm and often at least 80 mm more, in many instances more than 100 mm. Such deep filter cartridges can load with substantial amounts of contaminant during use, and gain substantially in weight. Thus, they can be subject to significant vibration momenta during operation. It is desirable to provide features in the filter cartridge that help ensure stable positioning of the cartridge, avoidance of damage to the media (or media pack) in the event of movement, and avoidance of seal failure during such vibration and shock.

Similarly, the equipment may be subject to a wide variety of temperature ranges during storage and use. These can lead to expansion/contraction of materials relative to one another. It is desirable to ensure that the filter cartridge and air cleaner are constructed in such a manner that seal integrity is not compromised under these circumstances. The features and techniques described herein can be applied to address these concerns, as discussed below.

E. Summary

The features characterized herein can be used to advantage to address one or more of the concerns described above. There is no specific requirement that the features be implemented in a manner that maximally addresses all concerns. However, selected embodiments are described in which all of the concerns identified above are addressed to a significant and desirable extent.

III. Example Air Cleaner and Filter Cartridge Arrangements, FIGS. 9-49B

A. A First Example Embodiment, FIGS. 9-18D

Principles according to the present disclosure can be applied in a wide variety of specific arrangements to accomplish advantage in accord with the present disclosure. This can be understood from a review of the embodiment and features of a filter cartridge and air cleaner, depicted in FIGS. 9-18D.

Figure 9:
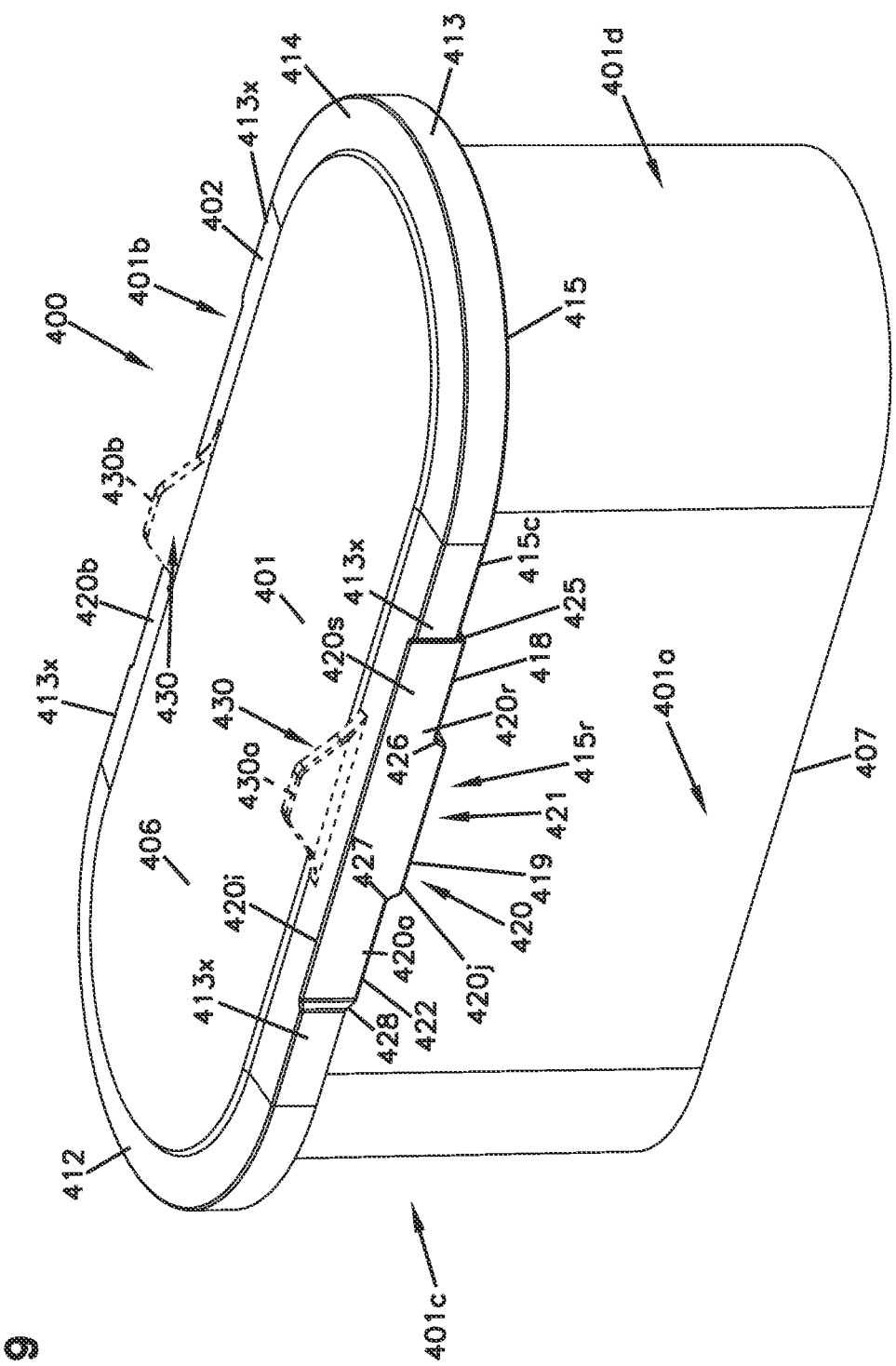
FIG. 9 is a schematic perspective view of a first example filter cartridge incorporating features according to the present disclosure.

Referring first to FIG. 9, at 400 an air filter cartridge having general features in accord with the present disclosure is depicted. The cartridge 400, generally, has opposite flow ends and comprises: media (i.e. a media pack) 401 oriented to filter fluid between those opposite ends; and, a seal arrangement 402.

As will be apparent from the further descriptions below, although alternatives are possible, the media pack 401 may be generally in accord with media packs described above in connection with FIGS. 6-8B. In the specific example 400 depicted, the media pack 401 has an oval perimeter shape. Thus, it can be used with a media pack in accord with FIG. 6 or FIGS. 8-8B. However, the principles can even be applied in connection with media pack in accord with FIG. 7, provided the outer perimeter is configured substantially oval, for example by cutting.

Alternatively, as discussed below, the seal features of the arrangement of FIG. 9 can be applied with alternately shaped media or media packs, including, for example, circular or rectangular ones. Thus, while the media or media pack 401 has a generally oval outer perimeter, there is no specific requirement that the perimeter definition be oval in order to obtain some advantage in accord with the present disclosure.

The particular seal arrangement 402 depicted is of a type generally characterized herein as a perimeter pinch seal arrangement. The term "pinch seal arrangement" in this context is meant to refer to a seal member that is pinched between air cleaner (housing) features, when the cartridge is assembled.

The term "perimeter" in connection with seal arrangement 402, is meant to refer to a seal arrangement that generally defines an outer most perimeter of the cartridge 400. In this example, the perimeter seal arrangement 402 is positioned to surround the media pack 401.

For the example media pack 401 depicted, the perimeter shape definition of the media pack 401 is of an oval shape, sometimes referred to herein as "racetrack", since it has two opposite straight sides 401a, 401b and two opposite curved ends 401c, 401d. Alternate oval shapes, for example elliptical, and indeed non-oval shapes can be practiced with arrangements according to the present disclosure.

The particular media pack 401 depicted has a length to width ratio of greater than 1. Although alternatives are possible, length to width ratios within the range of at least 1.3:1, for example, about 1.3:1 to 5:1, inclusive, for example, 1.1:1 to 3.5:1, inclusive, are typical for many applications of the principles described herein. The principles can be applied in alternate media packs, however. Indeed, they can be applied with circular or square media packs in some instances.

The particular media pack 401 depicted has a first flow end 406 (corresponding to a cartridge first flow end) and a second, opposite, flow end 407 (corresponding to the second, opposite, second cartridge flow end). The (fluid) air during filtering is generally passed from one flow end toward or past the other. In a typical application, end 406 will be the inlet flow end and end 407 will be outlet flow end, but the alternative is possible. The media pack 401, then, is generally configured such that air (fluid) cannot flow through the media from one flow end (for example end 406) through (or past) the opposite end (for example end 407) without passing through the media and being filtered.

Although alternatives are possible, typically, the media pack 401 will have a dimension between the flow ends 406, 407 of at least 50 mm, typically at least 80 mm, often at least 100 mm, and in many instances 150 mm or more (indeed sometimes 200 mm or more). This is a relatively deep or long media pack. It will often be configured with flutes (or pleat tips) extending in a direction between the flow ends 406, 407. Of course, this will be the case when the media is in a media pack of the types characterized above in connection with FIGS. 6-8B.

The seal arrangement 402 generally comprises a seal member 412 having an (outer) peripheral perimeter edge surface 413. The (outer) peripheral perimeter edge surface 413 is often not a sealing surface, in many applications according to the present disclosure. While it may engage a surrounding housing feature, for example, with a surface-surface contact, it is typically not required that it be configured to form and maintain a seal with such a housing surface, in use. In some applications, a seal can be provided at this location, but it is typically not preferred. This will be apparent from later discussions herein.

The seal member 412 depicted is a resilient member that has first and second, opposite, pinch surfaces 414, 415, at least one of which, in the example at least surface 415, is an axial sealing surface. These surfaces are generally engaged by (between) housing components or sections in a compressive or pinch manner, providing for pinch seal when the cartridge 400 is installed. Typically, a selected one of the surfaces 414, 415 (which in the example is the one 415 toward the downstream side or end) but alternatives are possible, will be configured as a surface that forms a more critical housing engagement (for sealing). Although alternatives are possible, for a typical arrangement, the seal member 412 will be positioned more toward an upstream flow end than a downstream flow end. When this is the case, surface 414 will typically be a compression surface but not, specifically, the more critical sealing surface; and, surface 415 will be the more critical (axial) sealing surface, since it will engage the housing at a location downstream of a joint between housing pieces.

The (outer) peripheral perimeter edge surface 413 can be provided with a variety of shapes. In the example depicted, it is generally oval, but includes selected variations or contouring therein, discussed below. It can generally mimic the shape of the media or media pack, as shown, but can also be varied substantially therefrom if desired.

In the example, the peripheral perimeter surface 413 includes an optional but preferred member 420 of a peripheral perimeter edge projection/recess contour or contour arrangement 421 therein. The member 420 depicted, is a recess member 420, i.e. a portion of edge surface 413 that is recessed toward media pack 401 from immediately adjacent portions 413x of surface 413. This member 420 of the projection/receiver contour arrangement 421 can be used to help ensure that the cartridge 400 is properly positioned in a housing, and is a proper cartridge for the housing, in manners discussed herein below.

It is noted that the cartridge 401 includes a member 420 of an optional peripheral perimeter edge projection/receiver contour arrangement 421 that comprises two recessed sections 420a, 420b, in the example depicted, oppositely positioned on seal surface 413. In the example depicted, regions 420a and 420b are mirror images of one another, but there is no specific requirement that they be so. Indeed, in some instances, alternate positioning, for example, to provide an asymmetry between opposite sides of the surface 413 can be advantageous, as discussed below.

Consistent with the above, the first member 420 of the optional peripheral perimeter edge projection/recess contour arrangement 42l can be configured such that there is only one recess member, for example at 420a and in the region opposite, there would be no projection/recess member at all, in some applications.

It is noted that in some instances that the member 420 can be a projection member, as opposed to a recess member; i.e., a member that projects outwardly away from the media pack 401 further than adjacent portions of the surface 413. In some instances, the member 420 can comprise both a recess portion and a projection portion.

It is noted that in the example depicted, the member 420 is positioned on a straight section of edge surface 413, in overlap with one or both of straight sides 401a, 401b of the media or media pack. While this is typical, in addition or alternatively, a projection/receiver member can be located in a curved section of surface 413, for example, an overlap with one or both of curved ends 401c, 401d of the media or media pack.

In the example filter cartridge 400 depicted, seal surface 415, (which in the example is the downstream axial seal surface), is a contoured axial housing seal surface 415c. By the term "contoured" and variants thereof in this context, it is meant that the surface 415 is not merely flat in a single plane, in complete extension around the media pack 401. Rather, one or more selected portion(s) or sections along its length are varied from merely flat, i.e. it is contoured. In FIG. 9, a contoured region is depicted generally at 415r.

A typical such contoured arrangement used in cartridges according to the present disclosure, will sometimes be referred to as a projection or projection/recess contouring. An example is referred to as "stepped" or "step" contouring. By the term "stepped" or variants in this context, it is meant that the contour region 415r comprises one or more steps, each step comprising a flat region typically substantially, i.e. generally (or nearly) parallel to adjacent flat regions, except for separation by transition regions. In the example of FIG. 9, three example steps are indicated at 418, 419 and 422. A transition region between step 418 and a non-stepped portion of surface 415 is indicated at 425. A transition region between step 418 and step 419 is indicated at 426. A transition region between step 419 and step 422 is indicated at 427. A transition region between step 422 and an adjacent non-contoured portion of surface 415 is indicated at 428.

With respect to the contouring, attention is directed to the side elevation of FIG. 11, and the enlarged fragmentary view of FIG. 11a, in which these regions can be viewed in plan view. Referring to FIG. 11a, typically, the transition regions 427, 428 (and also 426, 425, not viewable in FIG. 11a, but typically mirror images of 427, 428) can be defined as extending downwardly at an angle K, from an adjacent portion of surface 415 and upwardly at an angle K, L, from an adjacent portion of surface 413. Typically, the angles K, L will be at least 5° often not greater than 90°, typically within the range of 5°-85° inclusive, often within the range of 15°-75°, inclusive, usually 30°-70°, inclusive and most often 30°-60°, inclusive. Preferably, the angles K, L will be 35°-85°, inclusive, more preferably 40°-80°, inclusive, most preferably 45°-75°, inclusive. This helps provide for seal engagement with an uneven housing member, as discussed below.

Referring again to FIG. 9, it is noted that each of the steps 418, 419 and 422 is itself a flat and uncontoured projection. This is typical, but not required in all applications. It is also noted that for the example cartridge 400 depicted, the steps for 418, 419 and 422 are also located in alignment with region 420a, which is a recess region. This is typical, but not required in all applications.

Further, it is noted that the steps 418, 419, 422 are provided along, and in overlap with, a straight side section 401a of media pack 401. This too is typical, but not required in all applications.

In a typical application, a corresponding housing or air cleaner surface, which is sealing by engaged by surface 415, is contoured analogously (as a mirror image) to receive contoured region 415r. Thus, the housing surface engaged by seal surface 415 would have stepped recesses generally as mirror images to steps 418, 419, 422 in a mating region that aligns with the cartridge 400 between section 425 and 428. This is described further below.

Still referring to FIG. 9, it is noted that recess 420b could be configured analogously to the region between sections 425-428. This is not required, but is typical in many instances. It is noted that in some instances asymmetry is desired instead, as discussed below.

It is noted that recessed surface 420s of region 420 may be tapered in extension in the flow direction, i.e., be shaped to not be parallel to a direction between ends 406, 407. When such tapering is used, typical tapering will be with at least a slight angle toward the media pack (media) in extension between upper edge 420i and lower edge 420j, although alternatives are possible. This is discussed further below.

Still referring to FIG. 9, attention is directed to optional, but advantageous, handle arrangement 430. The optional handle arrangement 430 comprises features positioned for convenient gripping, to manipulate the cartridge 400, especially during removal from a housing. This is discussed further below. Referring to FIG. 9, the handle arrangement 430, in the example depicted, comprises two handle projections 430a, 430b: on opposite sides of the cartridge 400; positioned adjacent to surface 414; and, projecting in a direction away from end 407 of the cartridge. Alternatives are possible.

A handle arrangement, which comprises one or more handle projections located at a region not an overlap with flow face 406, will sometimes be referred to as a "peripheral handle arrangement," or by similar terms. By this, it is meant that the handle member is secured to the cartridge at a location that does not substantially overlap the flow face 406 and is not surrounded by the media of the media pack 401.

In FIG. 9A, an alternate perspective view of cartridge 400 depicted. Here, the view is generally toward region 420b. Since region 420b is analogous and oriented as a mirror image of region 420a, like reference numerals are used to indicate like seal surface features.

Figure 10:
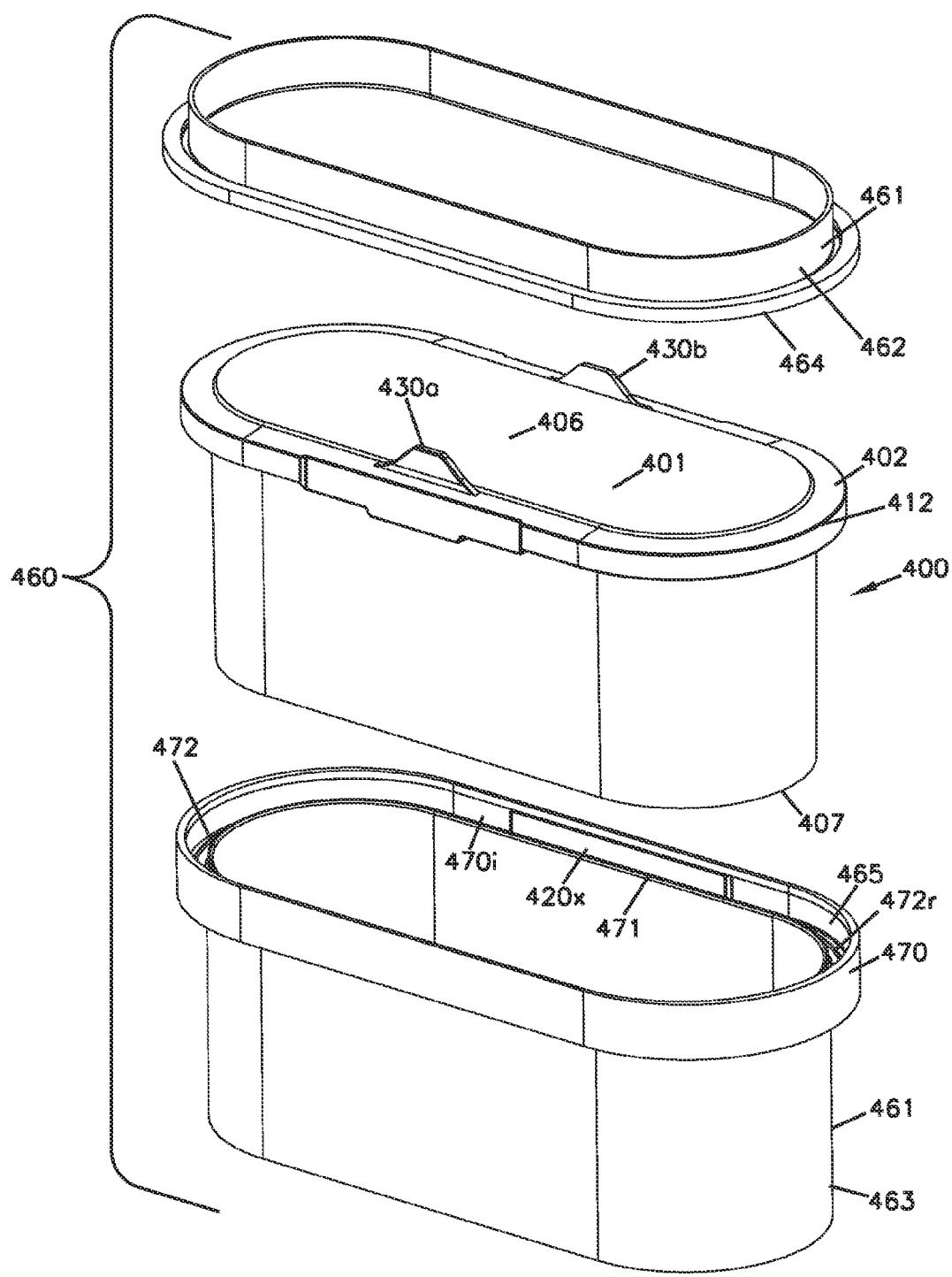
FIG. 10 is a schematic exploded perspective view of the filter cartridge of FIGS. 9 and 9A depicted in association and housing arrangement to form an air cleaner.

In FIG. 10, a schematic exploded perspective view of an air cleaner assembly 460 having a cartridge 400 therewith is depicted. The air cleaner assembly 460 would generally comprise a housing 461 having housing sections 462, 463 between which axial housing seal arrangement 402 would be positioned, and pinched, during installation. One of the housing sections 463 will typically be a cartridge receiver, and will include a receiving trough 465 therein, into which seal arrangement 402 is fit during installation. A second housing member 462 would generally include a pressure flange 464 oriented to apply pressure to surface 414 during installation, helping to ensure that seal surface 415 is pressed, to adequately pinch seal 412 against shelf or seal surface portions of trough 465 for sealing. Various retention mechanisms such as bolts or over center latches can be used to apply and retain the force.

Still referring to FIG. 10, it is noted that for the particular example air cleaner assembly 460 depicted, housing section 463 includes a seal region outer perimeter rim 470, which will surround surface 402 and project therefrom in the same direction as optional handle members 430a, 430b, during installation. Thus, an advantage to handle members 430a, 430b can be understood. That is, once housing section 462 is removed, in the absence of an optional handle, such as provided by optional handle members 430a, it could be difficult to remove cartridge 400 from housing section 463, due to its recessing within flange 470.

Still referring to FIG. 10, the housing section 463 also includes a seal region inner perimeter rim 471, surrounding by rim 470 and spaced therefrom by trough 472 which includes a seal engagement surface. Rim 471 is optional, but preferred. It will typically be positioned so that a portion of the seal arrangement or member 412 will be positioned between rim 471 and rim 470, when the cartridge 400 is property installed. This will be understood from further detail provided below.

It is noted that the housing 462 of FIG. 10 is schematic. The housing would typically have additional features relating to its installation, air flow inlet, air flow outlet etc., for use. With respect to this, attention is directed to FIG. 10A.

Figure 10A:
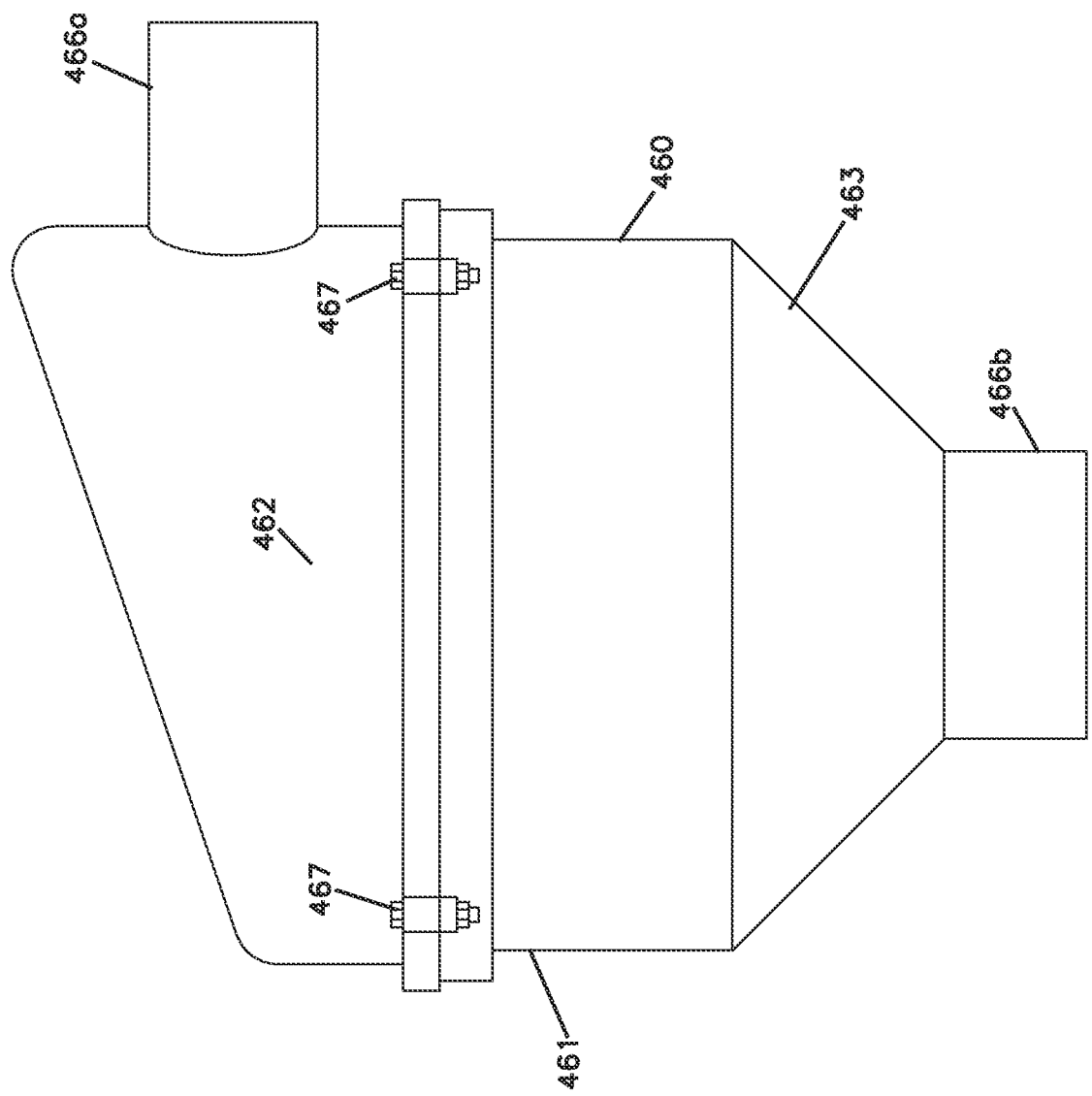
FIG. 10A is a schematic plan view of an air cleaner assembly using principles according to the present disclosure.

In FIG. 10A, an air cleaner arrangement or assembly 460 is shown schematically, comprising a housing 461 having first housing section 462 and second housing section 463. The housing 461 includes an airflow inlet 466a and an airflow outlet 466b. Bolts 467 secure the housing sections 462, 463 together, and will provide a pinching force to the seal member 402, FIG. 9.

It is noted that in the depiction of FIG. 10A, the inlet 406a is in section 462, and the outlet 466b is in section 463. In some applications, of the principles according to the present disclosure, both the inlet 466a and outlet 466b can be positioned in a single housing section, for example section 463, with the other section 462 operating as a separable access cover and contoured to provide the sealing pressure.

Referring again to FIG. 10, along interior surface 470i of rim 470 is provided another member 420x of projection/receiver arrangement 421. Member 420x is sized to project into one of recesses 420, 420b as the cartridge 400 is lowered into Section 403. Because the particular cartridge 400 depicted has opposite recessed members 420a, 420b, on the flange inner surface 470, there would be an analogous projection (to projection 420x) oppositely positioned on rim 470.

It is noted, again, that the receiver 465 includes a bottom or trough 472. The bottom would typically be a seal engagement surface contoured in appropriate regions where it would be engaged by contour regions 415r, FIGS. 9 and 9A, during installation. It may also include a continuous bottom rib 472r, to facilitate the sealing.

Additional description related to engagement between the seal member 402 and the seal trough 465 is discussed further below, in connection with other figures.

Additional views of the cartridge 400 are provided in FIGS. 11-13 as follows. In FIG. 11, the side elevational view taken toward recess 420a is provided. Like features are to ones already described are depicted and indicated by analogous reference numerals.

In FIG. 11A, as previously discussed, an enlarged fragmentary portion of FIG. 11 is depicted.

Figure 12:
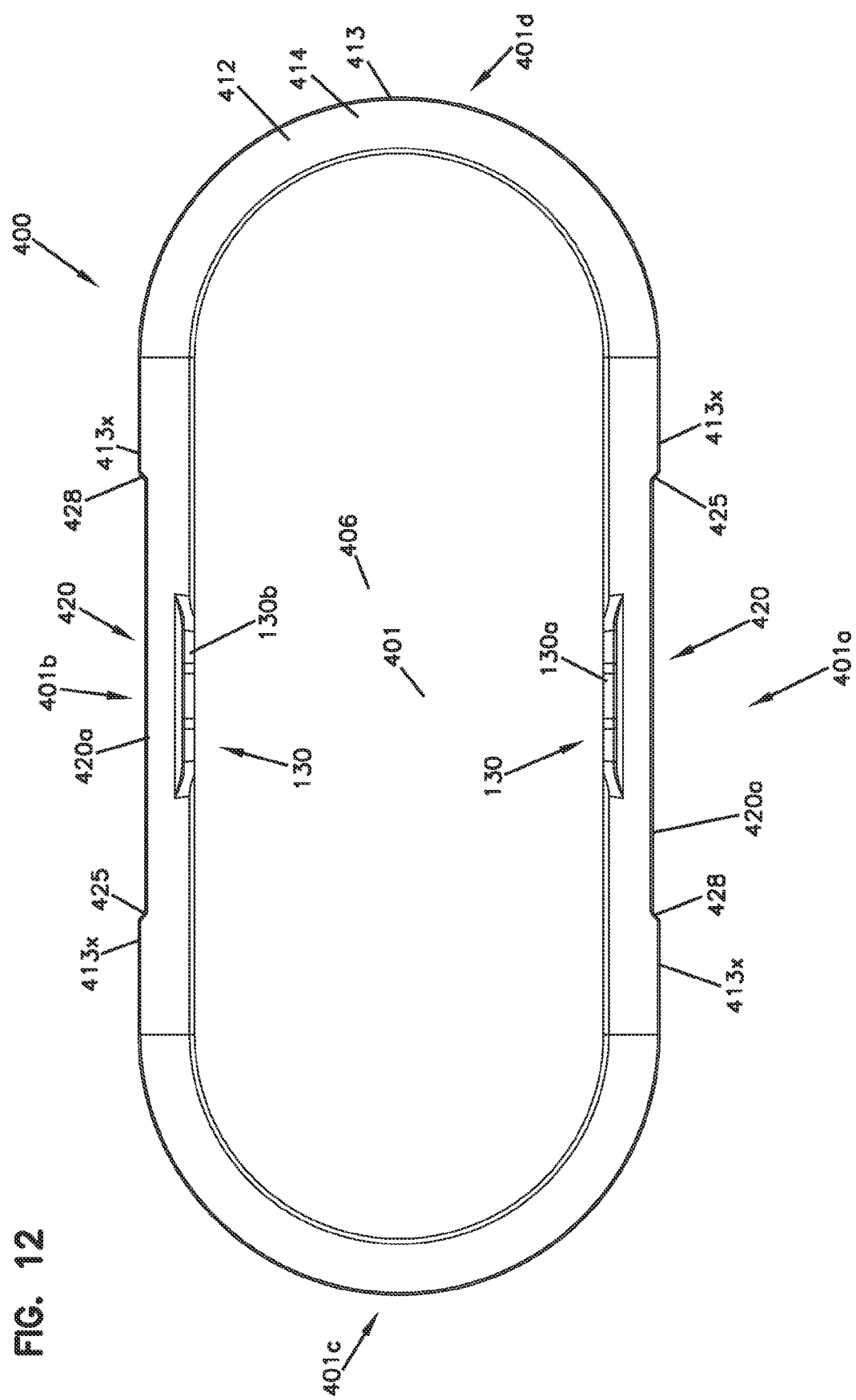
FIG. 12 is a schematic top plan view of a filter cartridge of FIGS. 9 and 9A.
Figure 13:
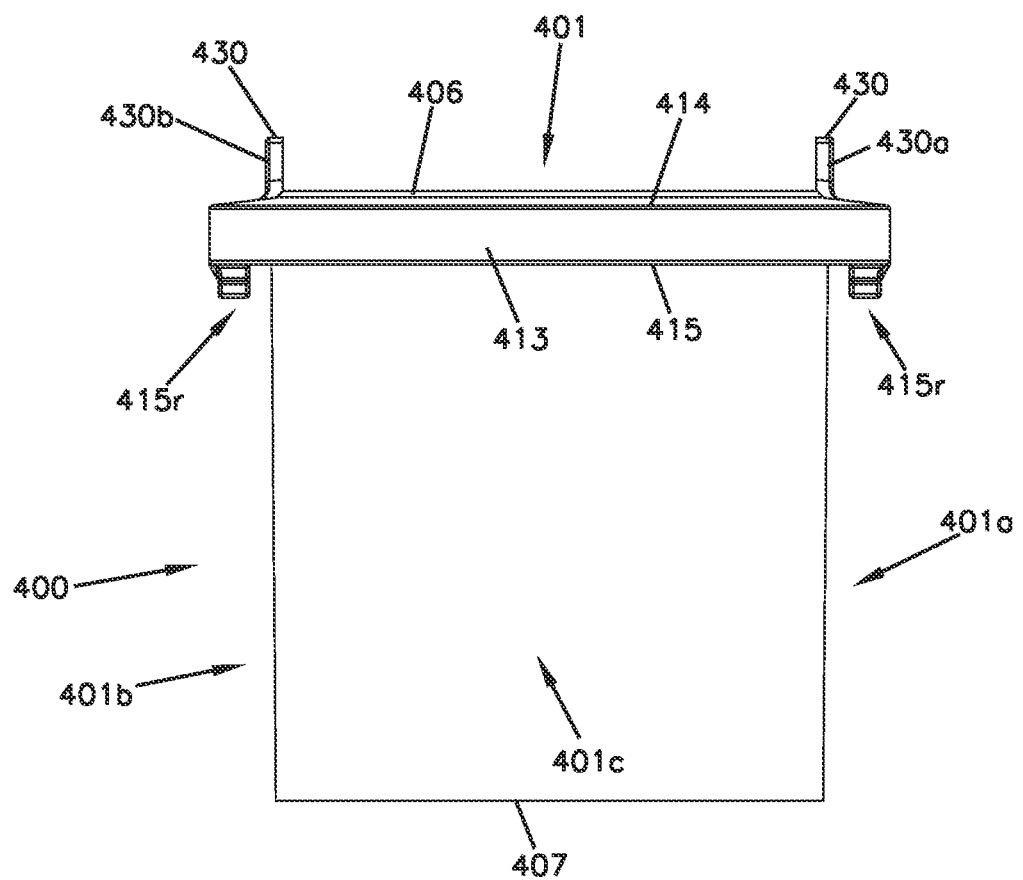
FIG. 13 is a schematic narrow side or curved end elevational view of the filter cartridge of FIGS. 9 and 9A.

In FIG. 12 a top plan view taken toward surface 406 is provided. In FIG. 13, an end view taken toward one of the ends, in this instance end 401c, FIG. 9, is provided. Features already described are indicated by like reference numerals.

Figure 14:
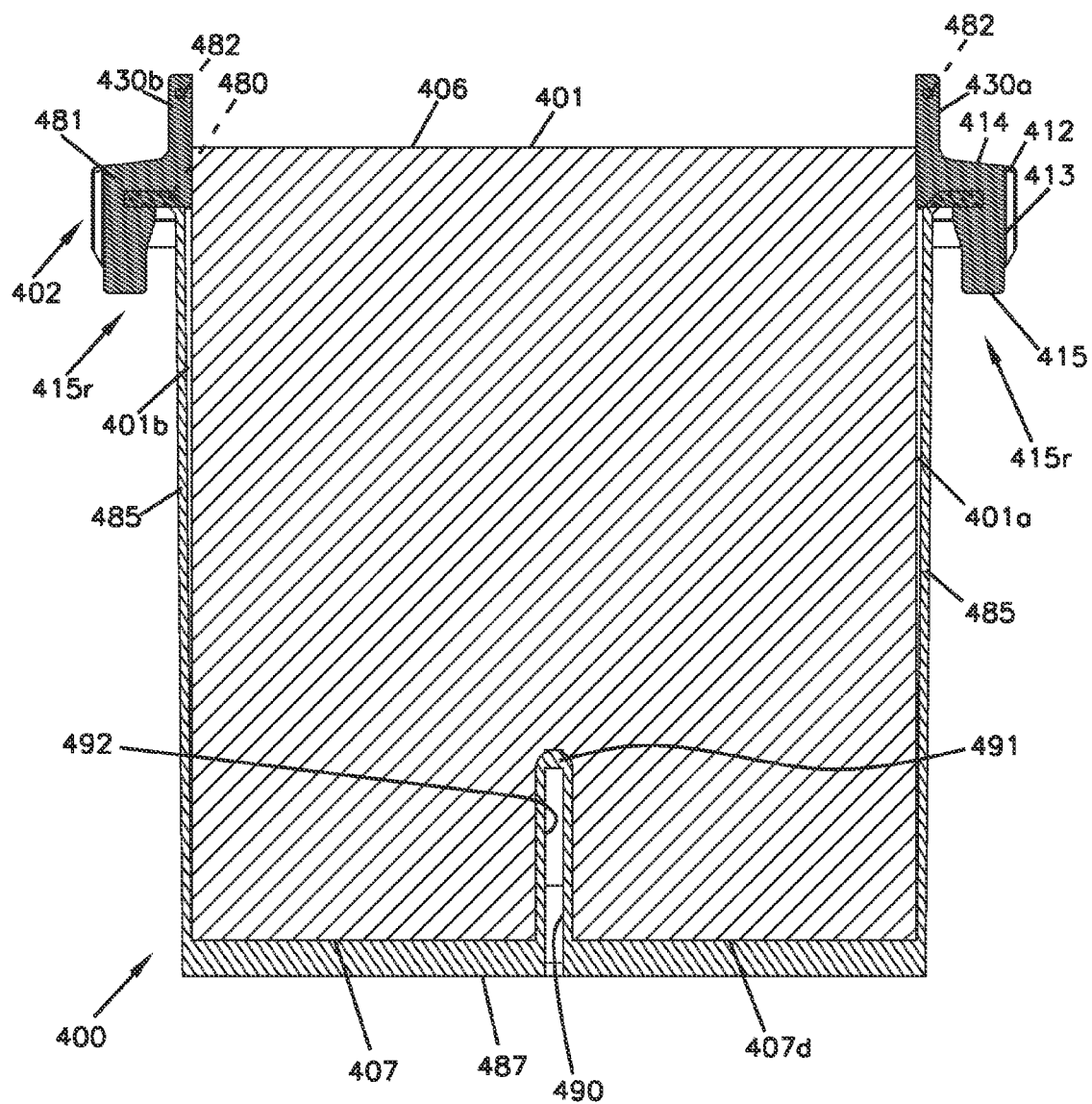
FIG. 14 is a schematic short dimension cross-sectional view of the filter cartridge of FIGS. 9 and 9A.
Figure 14A:
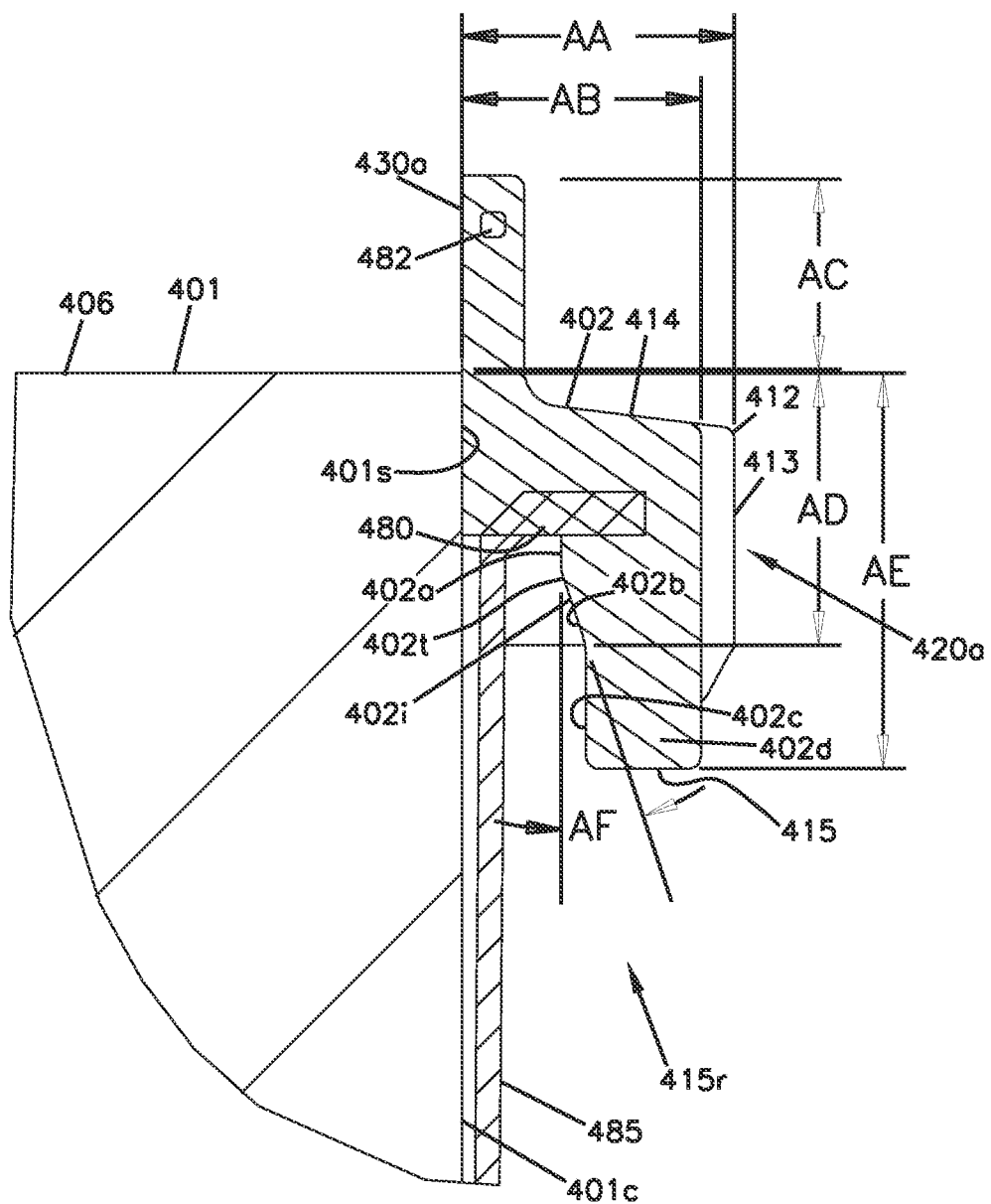
FIG. 14A is an enlarged, schematic, fragmentary view of a portion of FIG. 14.

In FIGS. 14-14A, selected features of the cartridge 400 are depicted in cross-sectional view. Attention is first directed to FIG. 14. Here, a cross-sectional view is taken through a short dimension of the cartridge 400, approximately in the center, i.e. such that the cross-section line will go through contour sections 415r.

In FIG. 14, the media or media pack 401 is generically indicated. It is not meant to be suggested at any particular one of the media or media pack types described in above in connection with FIGS. 6, 7 and 8 is used. The media pack, again, has opposite flow faces 406, 407 as shown.

Still referring to FIG. 14, the particular seal arrangement 402 depicted, is a supported seal arrangement 401s. By this it is meant that the seal member 412 comprises resilient material mounted on (typically molded-in-place) on a rigid preformed structure or seal support, a portion of which is indicated at 480. This will be typical in arrangements according to the present disclosure, although alternatives are possible. As will be understood from discussions below, although alternatives are possible, often the material 481 that forms the seal member 412 is molded-in-place on support 480. Typically support 480 is provided with apertures therein, so that the resin which forms seal region 481 can flow through the apertures, creating secure engagement. This is discussed further below in connection with example construction of cartridge 400.

Still referring to FIG. 14, it is noted that the optional handle members 430a, 430b are also provided with handle member support(s) 482. The handle member support(s) 482 are portions of preformed structure, upon which resin that forms the handle arrangements 430a, 430b is molded during assembly. Typically, when used, the handle members support(s) 482 will comprise integral portions of preform or support arrangement that also includes support member 480.

The filter cartridge 400 also includes an optional side protection extension, shield, shell or sheath 485, that extends around the media pack 401, protecting the media or media pack against damage during handling and installation. The optional sheath or shell 485 generally projects from seal arrangement 402 to end 407, and is preferably a solid and imperforate extension around the media pack 401, although alternatives are possible. In the example depicted, the shield, shell or protection member 485 is integral with a support arrangement that also includes support 480 and handle support 482. This will be typical when such an optional shield or shell is used, but alternatives are possible. The optional shell or sheath will often extend along at least 80° of an axial length of the media (media length between opposite ends) usually at least 90° of this length, but alternatives are possible.

Still referring to FIG. 14, a media pack and grid or support 487 is shown extending across end 407 of the media pack 401, which in this typical example is a downstream end 407d. Such a grid arrangement or support 487 helps protect the media pack 401 from distortion in a downstream direction during use. It also facilitates cartridge assembly. Such grid work is typical, but not required. It is noted that for the example arrangement, the grid work 487 is integral with shell or sheath 485 and a remainder of structure that includes seal support 480 and handle support 482. This is typical, but not required in all examples.

In FIG. 14, attention is now directed to a projection/recess member 490, which comprises a projection 491 that extends inwardly of the media or media pack 401, i.e. toward end (face) 406 from end 407; and, which defines an open receiver recess 492 therein for receiving a projection on a safety cartridge or in a housing, as discussed below. Member 490 is formed integral with grid work 487 and a remainder of the support that includes shield 485, housing seal support 480 and handle support 482. This is typical, but not required in all instances.

In FIG. 14A, an enlarged fragmentary view of a portion of FIG. 14 is depicted. The portion depicted in FIG. 14A shows features relating to handle member 430a and seal member 402, in a region where the contouring 415r and recess 420a are shown.

Referring to FIG. 14A, it is noted that the seal member 402 in the arrangement depicted, is not only sealed in place or molded in place on seal support 480, but it also is molded in direct contact with the media or media pack 401, at region 401s; and, as a result, in region 401s the seal member 401 secures the media pack 401 to the support 480. This is an advantageous construction, although alternatives are possible.

It is also noted that the example seal member 402 is molded with a receiver 402t recess or trough between portion 402d of the seal member 402 and the media pack 401, in this instance also between portion 402d of the seal arrangement 402 and the optional sheath 485. Receiver or trough recess 402t is configured to receive, projecting therein, inner rim 471 FIG. 10 of a housing, 401 doing installation. This is discussed further below, and can be used to help secure the cartridge 400 in place, during installation and use.

It is noted, referring to FIG. 14A, that along surface region 402i, adjacent trough 402t, the seal material adjacent recess receiver 402t, is contoured, in the example in sections 402a, 402b, 402c. In general, these will engage analogously contoured positions of flange 471, as discussed below.

Figure 15:
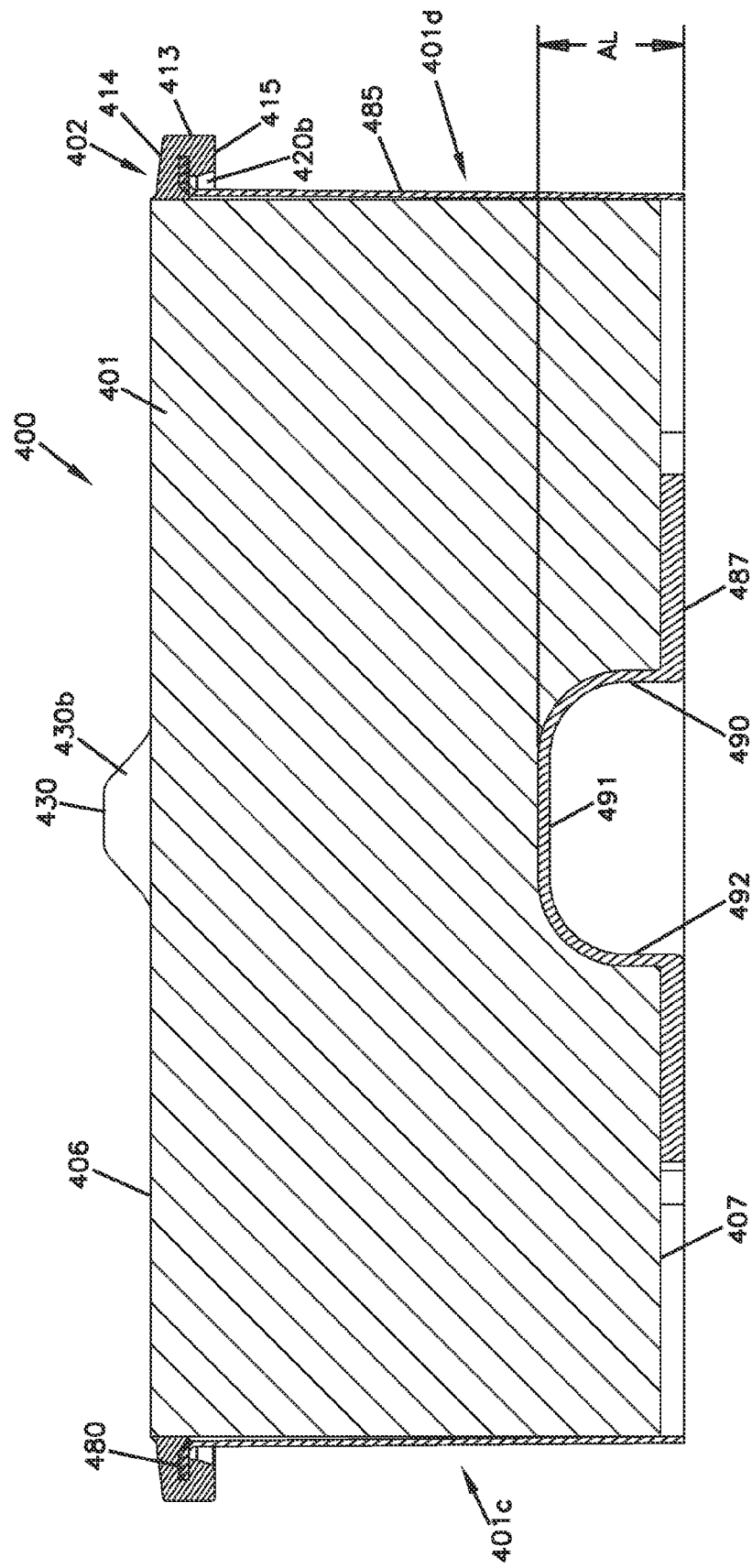
FIG. 15 is a schematic long dimension cross-sectional view taken at right angles to the view of FIG. 14.

Attention is now directed to FIG. 15. FIG. 15 is a long dimension cross-sectional view. Features already discussed and described are indicated by like reference numerals.

Figure 15A:
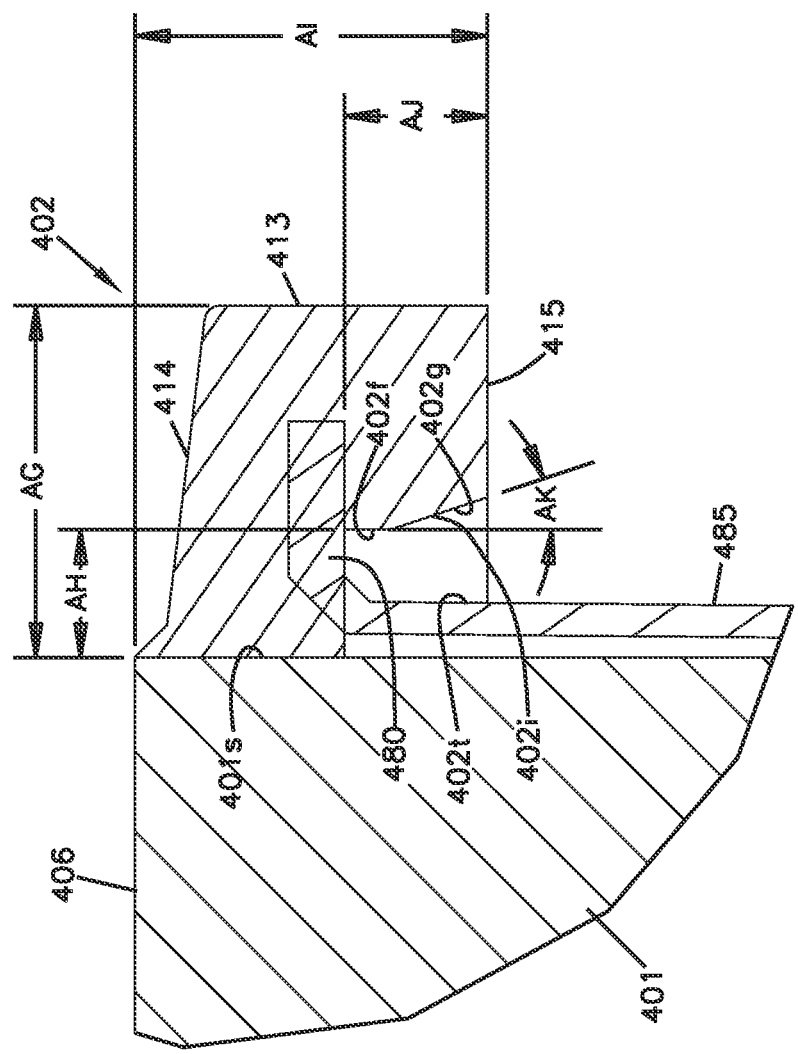
FIG. 15A is an enlarged fragmentary schematic view of a portion of FIG. 15.

In FIG. 15A, an enlarged fragmentary view of an identified portion of FIG. 15 is shown. In FIG. 15A, the view is a cross sectional view of the seal member 402, but in a region that does not include either a recess corresponding to recess 420a or a contour corresponded to contour region 415r.

Referring to FIG. 15A, attention is directed to trough region 402t. FIGS. 14A and 15A together are meant to indicate that trough 402t will typically extend completely around the media pack 401. Attention is also directed to radially interior surface 402i of member 402. Here, surface 402i is contoured, having sections 402f and 402g. These are generally configured to engage similarly contoured portions of flange 472 in the housing, during installation, as discussed below.

In general, from a comparison of FIGS. 14, 14A, 15 and 15A, it will be understood that in the example arrangement depicted, the seal arrangement or member 402 extends completely around the media pack 401, with receiving trough 402e between a portion of the seal member 402 and the media pack 401. Further, in a typical preferred arrangement, the seal arrangement or member 402 will be sealed directly to the media (or media pack) 401, thereon, at region 401s. Also, the seal arrangement 402 (seal 412) can be viewed as having an outer periphery or peripheral edge 413, a first axial (pinch) surface 414, and a second axial surface 415. Typically, the first surface 414 is located closer to an inlet face 406 of the media pack 401, then the surface 415. Typically, the surface 414 is relatively flat and featureless, although, in the arrangement depicted it angles somewhat as it extends radially outwardly from the media pack. The surface 415, on the other hand, is a critical (axial) sealing surface, depends from end 406 toward end 407, and is preferably contoured in selected regions 415*r*. An example contouring was discussed above, involving multiple steps. Also, recesses in surface 413 are described.

Around the media or media pack, the seal member 402 in the example depicted, includes, embedded, therein, a support 480, which in the example depicted, is integral with a sheath 485.

Example dimensions and engagement with housing features are discussed further herein below.

Figure 16:
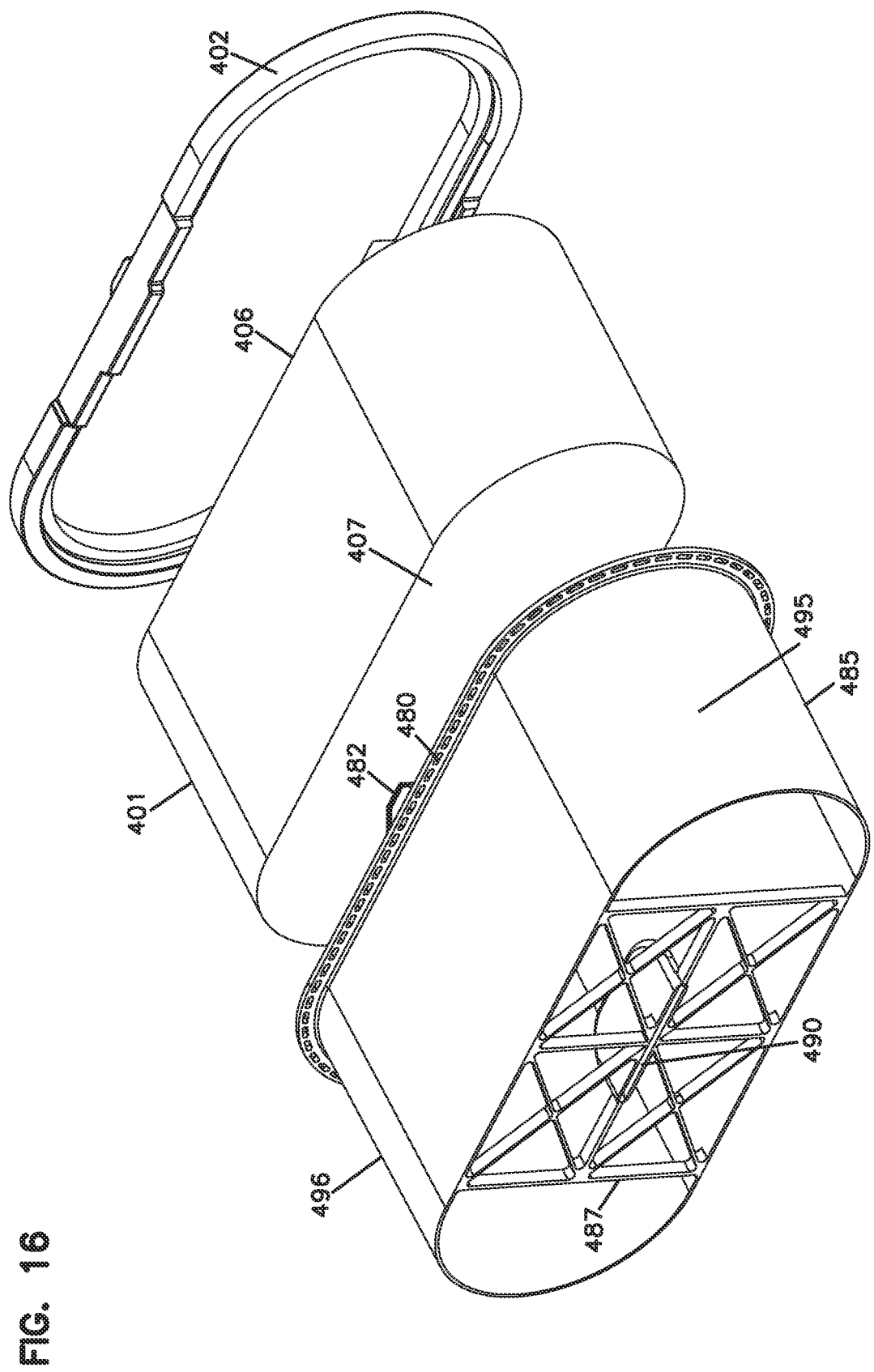
FIG. 16 is a second exploded perspective view of the filter cartridge of FIGS. 9 and 9A.

Referring to FIG. 16, an exploded perspective view depicting the media pack 401, a preformed support member 490 and molded-in-place of in place seal member 402 is shown. The media pack 401 can be any of the media packs described above in connection with FIGS. 6-8B. The example media pack depicted, is generally in accord with FIG. 6.

The seal material indicated at 402, is the material that would, in the example, be molded-in-place on a combination of the media pack 401 and support 496, to provide features previously described. In FIG. 16, the support 490 is depicted as a unitary preform support, typically molded from plastic, and including each of the following features described above: seal support 480; handle support 482; sheath 485; grid 487; and, receiver 490. It is noted that the seal support 480 includes a plurality of apertures therethrough, for the through-flow of resin during cartridge formation.

In typical assembly, the media or media pack 401 be preformed and pushed into preformed support 496. Projection 490 would be positioned at a location surrounded by media of the media or media pack 401. The media pack 401 would be inserted until it abuts against grid 487. The media or media pack 401 will be sized, preferably, such that when that abutment occurs, an end of the media or media pack adjacent surface 406 will project slightly outwardly from support 495. The combination of the media (pack) 401 and support 495 would then be inserted in a mold having contours appropriate to form member 402 in place on the media (pack) 401 in support 495.

Figure 16A:
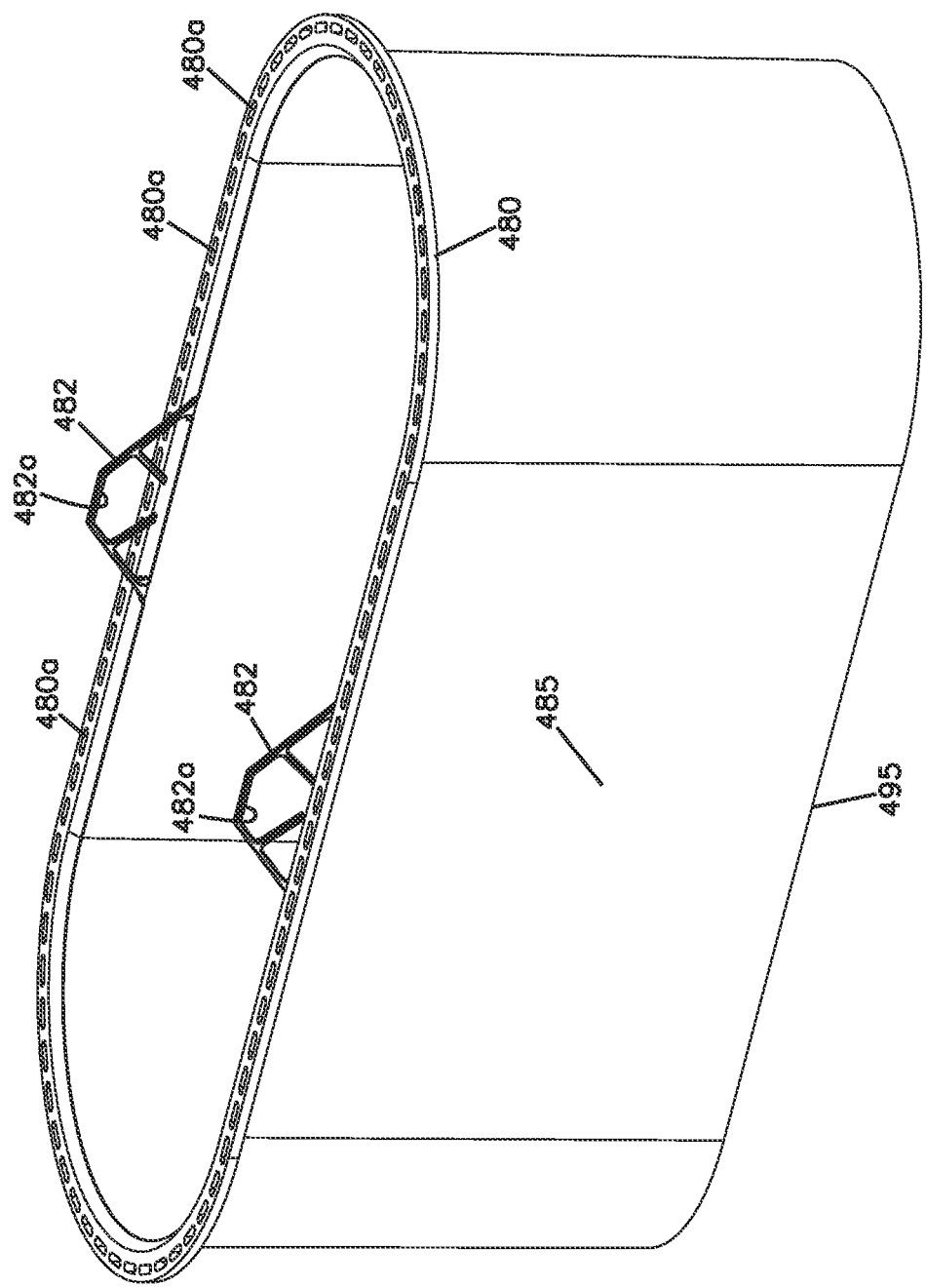
FIG. 16A is a perspective view of a frame support component of the filter cartridge of FIG. 16.

In FIG. 16A, the support 495 is shown in a perspective view. Optional handle members 482, seal support 480 and shell 485 can be viewed. It is noted that the handle members 482 include apertures 487*a* therethrough, for the seal material to flow into, during sealing. Also, apertures 480*a*, in support 480, for resin flow are viable.

Figure 17:
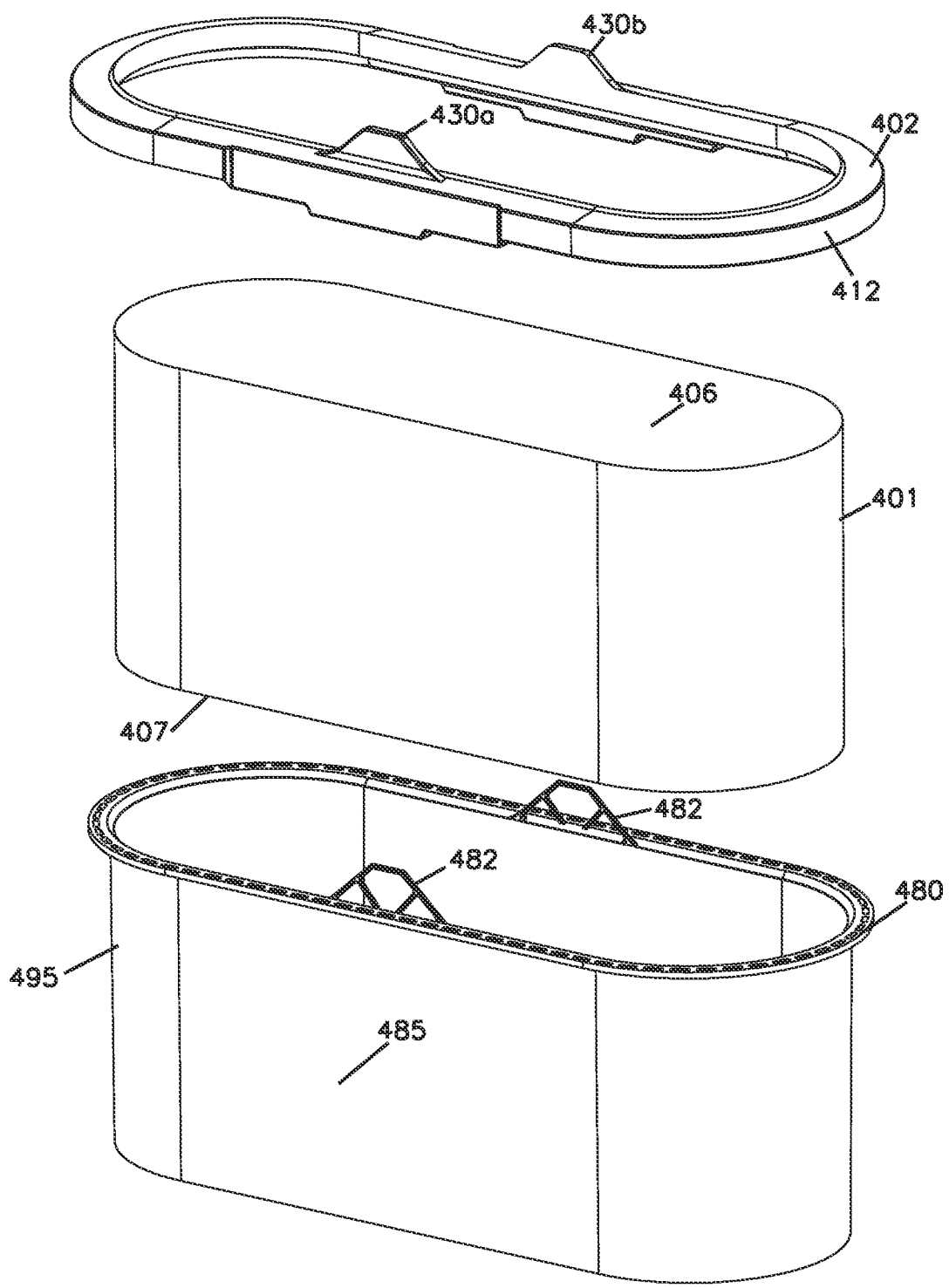
FIG. 17 is a second exploded view of the filter cartridge of FIGS. 9 and 9A.

In FIG. 17 an alternate exploded perspective view is depicted.

While a variety of materials can be used to form the molded-in-place into place seal portion 412. Typically, the materials will be sufficiently soft or resilient so that the contouring in surface 415 can fully engage housing features in a sealing manner. Typically a foamed polyurethane material or similar foamed material will be used. Examples of usable materials are ones that can be molded to an as molded density (desirable for providing seal materials), of typically no greater than 450 kg/cm$^3$, usually no greater than 355 kg/cm$^3$ and often no greater than 290 kg/cm$^3$, for example 190-300 kg/cm$^3$. Typically, they will be molded to a hardness, shore A, of no greater than 40, typically no greater than 30, often no greater than 22, for example 10-20. A variety of said usable materials can be obtained from various resin suppliers.

Figure 18:
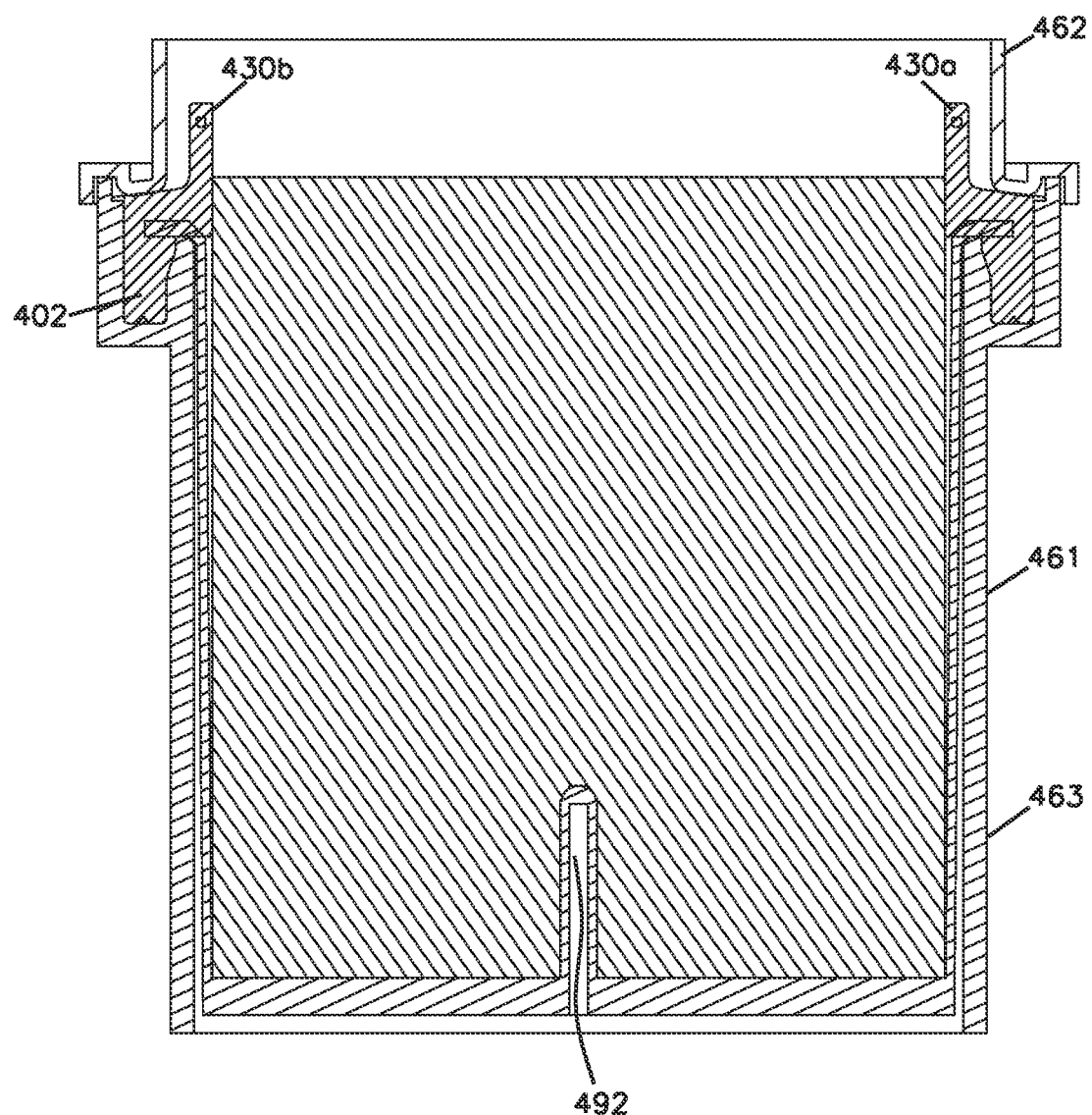
FIG. 18 is a schematic, fragmentary, cross-sectional view depicting an air cleaner assembly having an air filter cartridge in accord with FIGS. 9 and 9A therein, when incorporated into an assembly as depicted in the exploded view of FIG. 10.

In FIGS. 18-18B, example engagement of a cartridge 400 with a housing 461 can be viewed. Referring first to FIG. 18, the cartridge 400 is positioned within housing section 463, and housing section 462 is positioned there over, compressing the seal arrangement 402 in place. It is noted that the housing 463 (depicted schematically and in fragmentary view) can include a projection extending into region 452, or a safety element could be provided with a handle or other projection projecting into region 492. This can further stabilize the cartridge.

In FIG. 18A, an enlarged fragmentary cross-sectional view is taken through the assembly of FIG. 18, in the region of the seal arrangement 402, where the seal member 412 is contoured. This would be through the same region as shown in FIG. 14A.

Referring to FIG. 18A, housing 461 and be seen as comprising housing section 462, 463. Section 463 as shown including outer flange 470 and inner flange 471, with a receiver recess 472 therein, for receipt of housing seal arrangement 402, when the cartridge 400 is installed.

Pressure flange 464, in particular via abutment portion 464*a*, is shown pressing into seal member 412, driving it against recess 472. It is noted that pressure flange 464 includes a rim 464*r* in the example depicted sized and oriented bottom against a portion of flange 470, to ensure proper installation. This will be a convenient, typical approach, with alternatives possible.

Referring to FIG. 18A, optional rib 472*r* is shown engaged by surface 415 of seal member 412, to facilitate sealing. The optional rib 472*r* will be typical, and will preferably extend continuously around receiver recess 472.

Still referring to FIG. 18A, contouring in an interior portion 471*i* to receive and engage contoured regions of surface 402*i*, FIG. 14A, are shown. Thus, as the seal member 402 is pushed downwardly, good engagement with surface 470*i*, facilitating sealing, and positioning is obtained.

On flange 470, region 420*x*, projecting into the recess 420, of the peripheral surface 413 of seal member 412 in this region, is shown.

Referring to FIGS. 9, 9A and 11, it will be understood that a bottom surface 472*b*, a recess 472 will be contoured in analogous steps, for engagement. This is discussed further below, in connection with other figures.

In FIG. 18B, an enlarged fragmentary view analogous to FIG. 18A, but taken through portions of the assembly where the portion of the cartridge depicted in FIG. 15A engages the housing, is shown. Analogous features are depicted with similar reference numerals. Interior surface 471*i* of flange 471 is contoured in this region, for engagement with surface portions of the seal member 412, FIG. 15A.

Figure 18C:
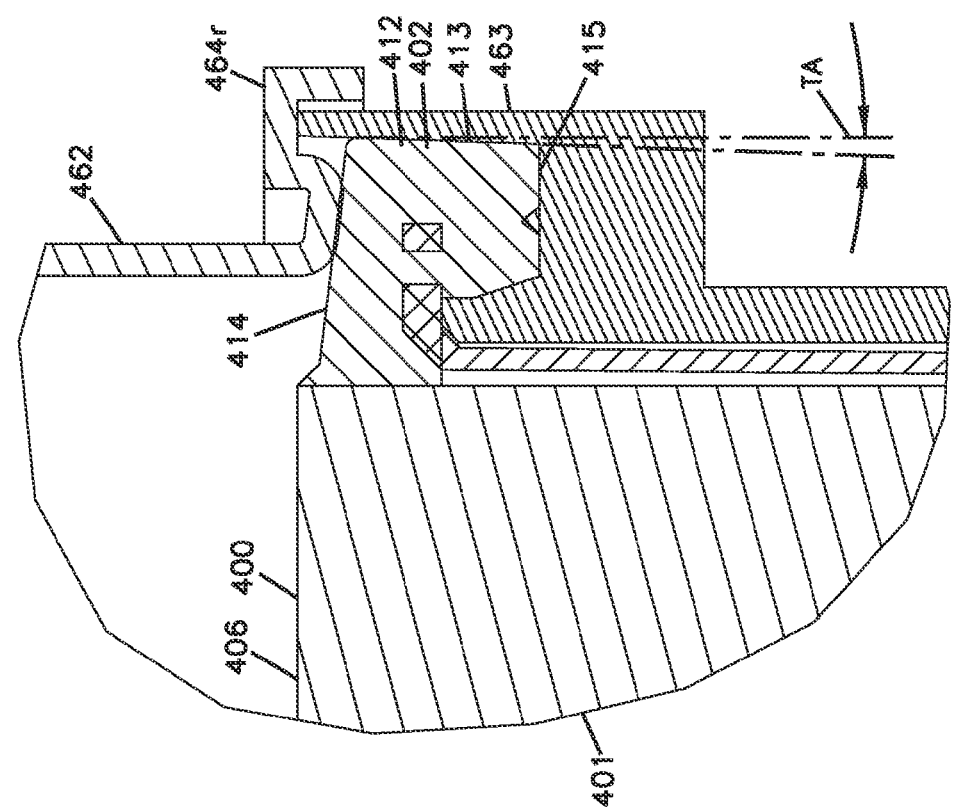
FIG. 18C is a schematic depiction of an alternate to FIG. 18A.
Figure 18D:
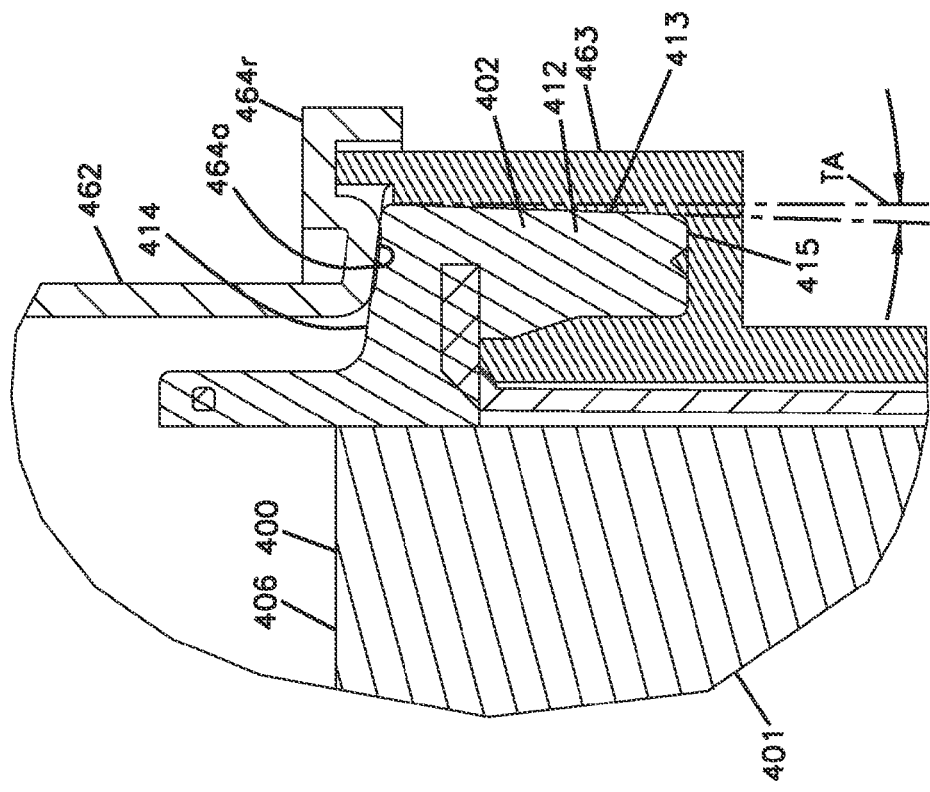
FIG. 18D is a schematic depiction of an alternate to FIG. 18B.

FIGS. 18C and 18D are generally analogous to FIGS. 18A and 18B, except they depict a variation in which the outer peripheral surface 413 of the seal member 412 is tapered inwardly in extension from surface 414 toward surface 415 shown by an angle TA in each figure. Other features would be generally analogous. A typical taper at TA could be a mere draft angle, but it could be more substantial. It would typically not be greater than 25°, usually not greater than 20°, but alternatives are possible.

Alternate tapering is also possible. A general teaching, provided by comparison of FIGS. 18A and 18B, to FIGS. 18C and 18D is that the peripheral surface 413 does not need to extend parallel to the media pack, but rather can taper inwardly or outwardly in extension.

B. A Second Example Arrangement of FIGS. 19-20

Figure 19:
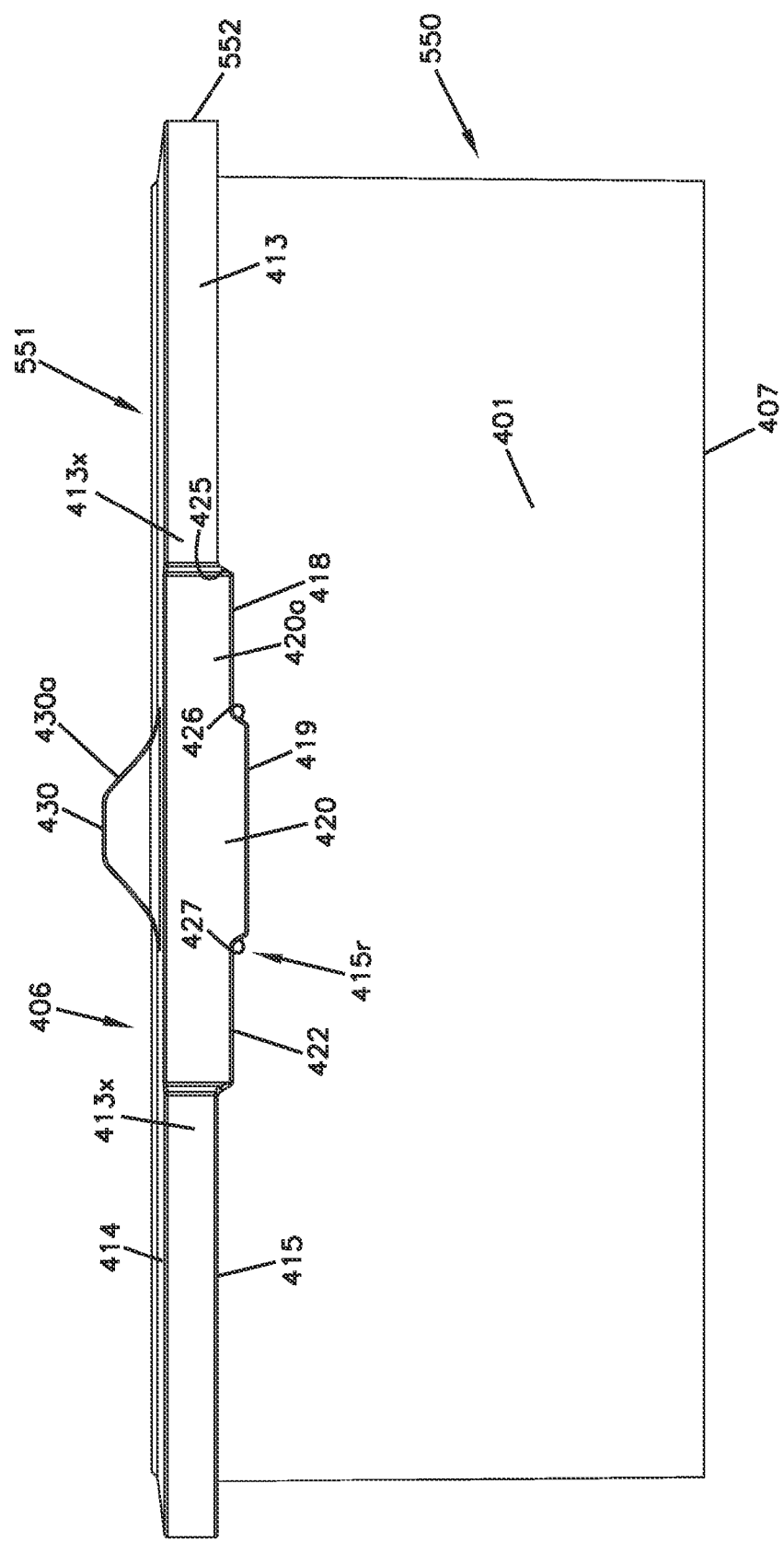
FIG. 19 is a schematic side elevational view depicting a variation of the cartridge of FIG. 9A, in which a similar seal arrangement is used but in association with a rectangular perimeter definition.
Figure 20:
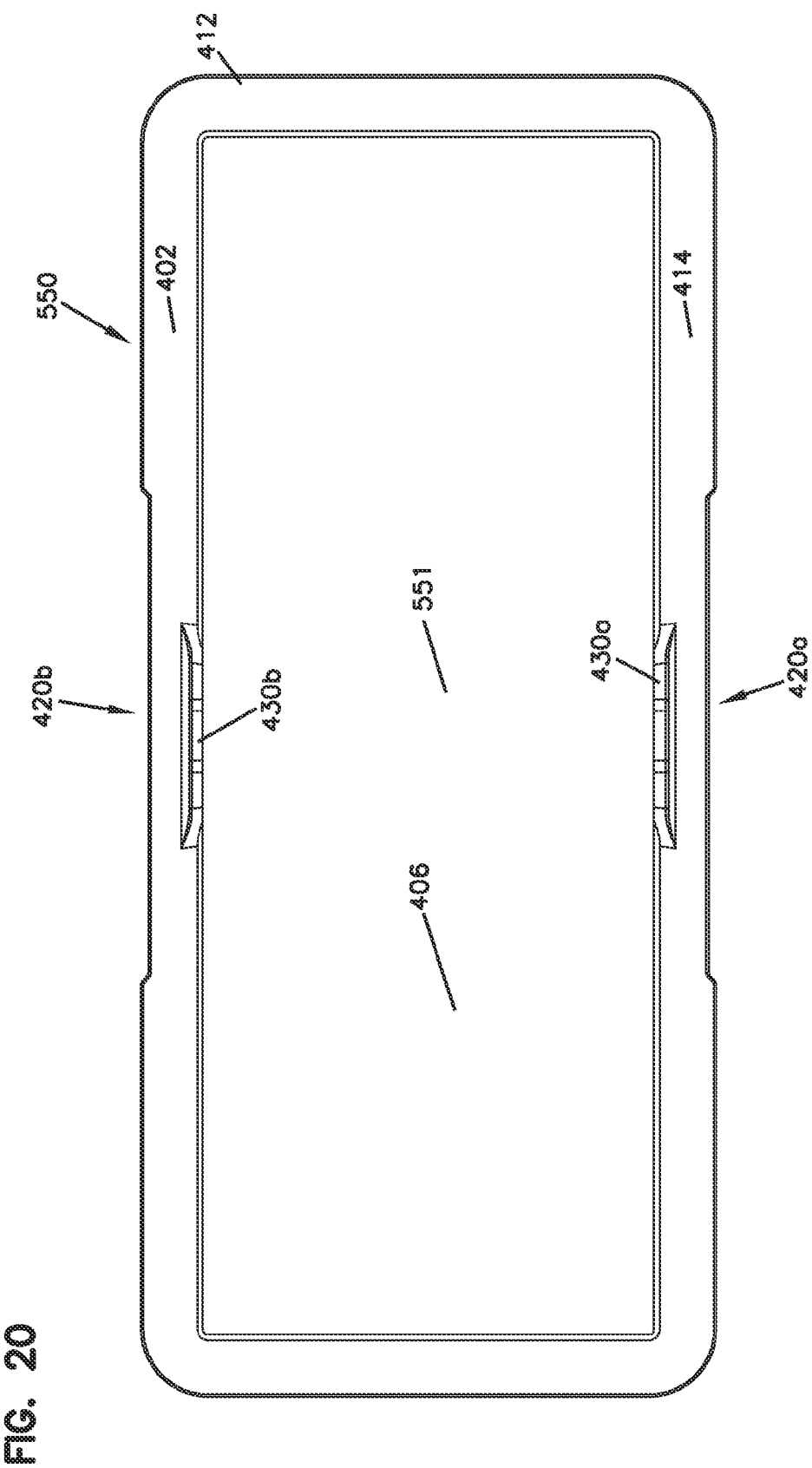
FIG. 20 is a schematic top plan view of the cartridge of FIG. 19.

As explained above, the general features characterized herein for a filter cartridge with opposite flow ends, can be used with a wide variety of shapes and types of media packs. In FIGS. 19 and 20, variation is depicted in which the seal figuration of FIG. 9 is adapted for use with a media pack (media) comprising a stack of strips of media (typically a stack of single faced strips) for example in accord with the description above for FIG. 7 and formed in a rectangular shape. The cartridge of FIGS. 19 and 20, however, is otherwise generally analogous to the cartridge of FIG. 9.

Referring to FIG. 19, then, cartridge 550 is depicted. The cartridge 550 has media or media pack 581 with a generally rectangular perimeter, and a rectangular perimeter seal member or arrangement 552. In FIGS. 19 and 20, like reference numerals to the embodiment of FIG. 9, are meant to indicate an analogously functioning features. Thus, the seal member 552 includes an edge recess arrangement 420 with recess member 420a and also an axial contour surface 415r.

In FIG. 20, a top plan view is provided, taken generally toward a surface 406 of the media pack 551 (or a flow end of the cartridge). It can be seen that the media pack (media) has a generally rectangular perimeter, and the seal member 552 is configured analogously with the rectangular contour.

It is noted that the arrangement can include a support member analogous to support member 485 but with an appropriate peripheral shaped definition if desired.

It is also noted that the media pack (media) used in the arrangement of FIGS. 19 and 20 could comprise coiled media in accord with FIG. 6 or FIGS. 8-8B. The coil would be formed into a somewhat rectangular pattern, and would likely have somewhat more rounded corners than shown in FIG. 20.

C. An Example Variation in the Seal Arrangement, FIGS. 21-27

Figure 21:
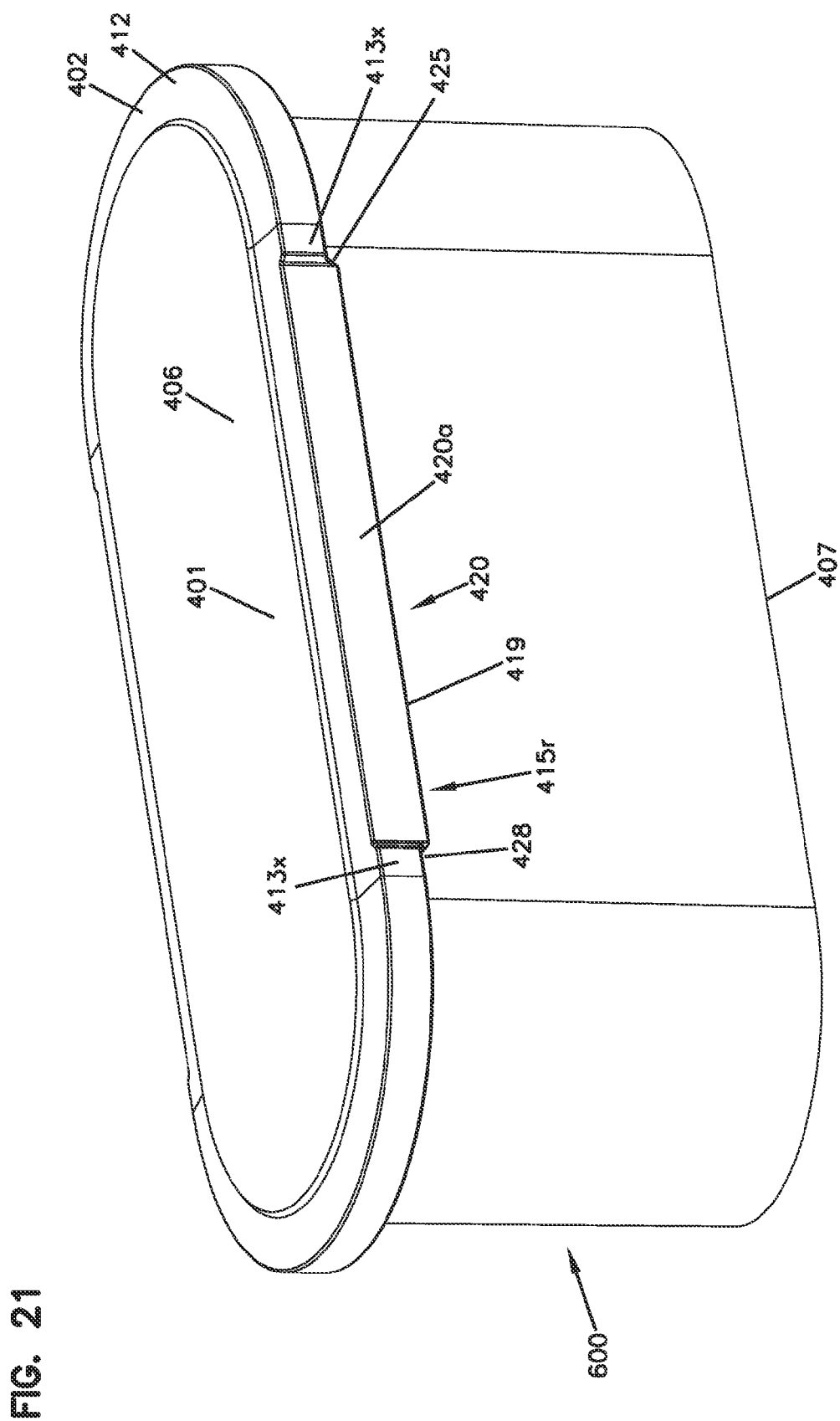
FIG. 21 is a schematic perspective view of a third filter cartridge incorporating principles according to the present disclosure.

In FIGS. 21-27, a filter cartridge 600 according to a second variation is depicted. Like reference numerals indicate generally analogous features. A difference between the cartridge 600 and the cartridge 400, is that the cartridge 600 includes a single step on each side in the axial housing seal arrangement surface contour region 415r, rather than a two-step contour. In FIG. 21, the single step is shown aligned with recess 420a between locations 425, 428, with a step indicated at 419, and transitions at 425, 428. The cartridge 600 is otherwise generally analogous to cartridge 400. It is noted that the cartridge 600 is depicted without the optional handle members 430s, but they can be analogously used in such an arrangement if desired.

In FIGS. 21-27, like reference numerals indicate structure as analogous function to those previously described.

Figure 22:
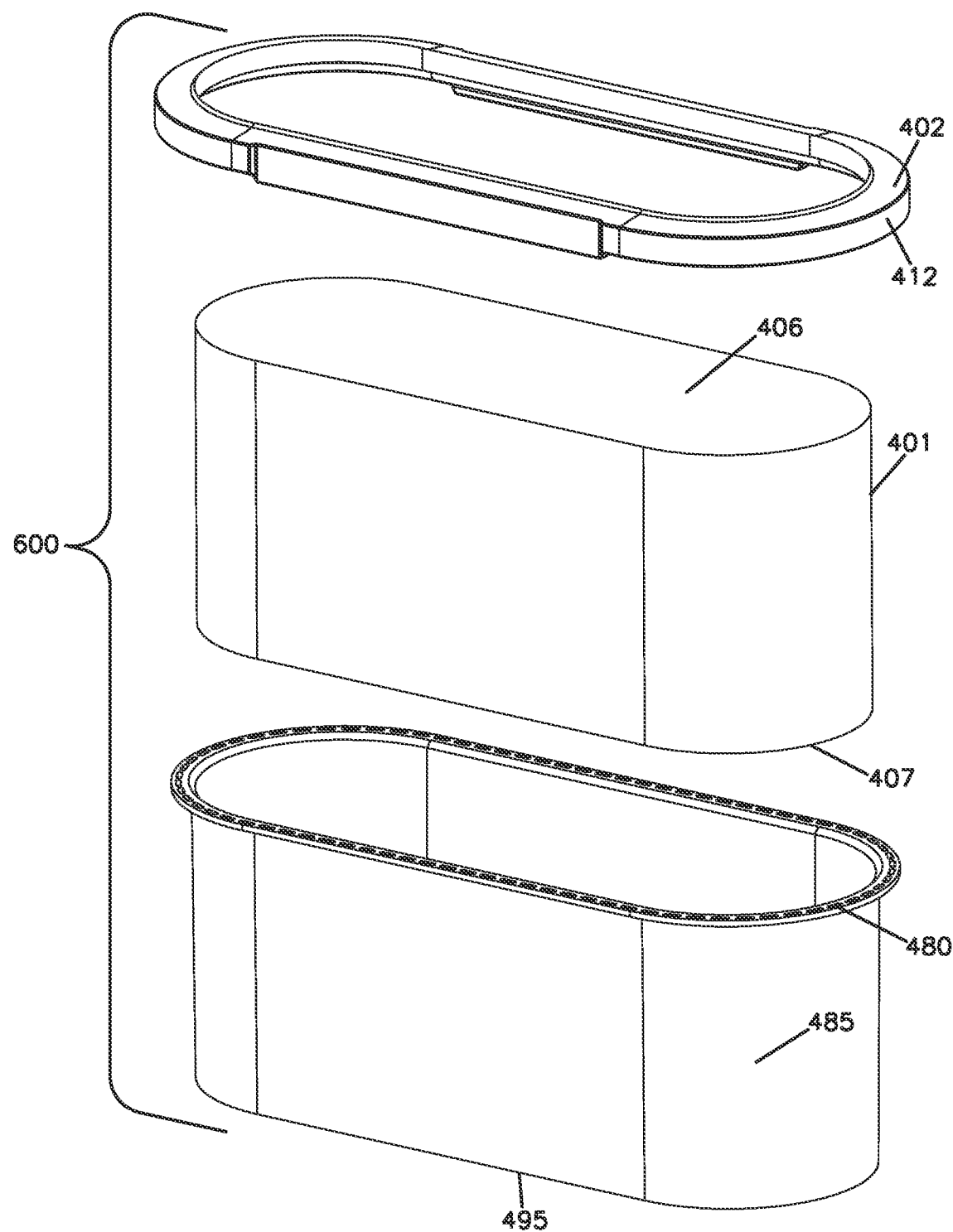
FIG. 22 is an exploded perspective view of the cartridge of FIG. 21.
Figure 23:
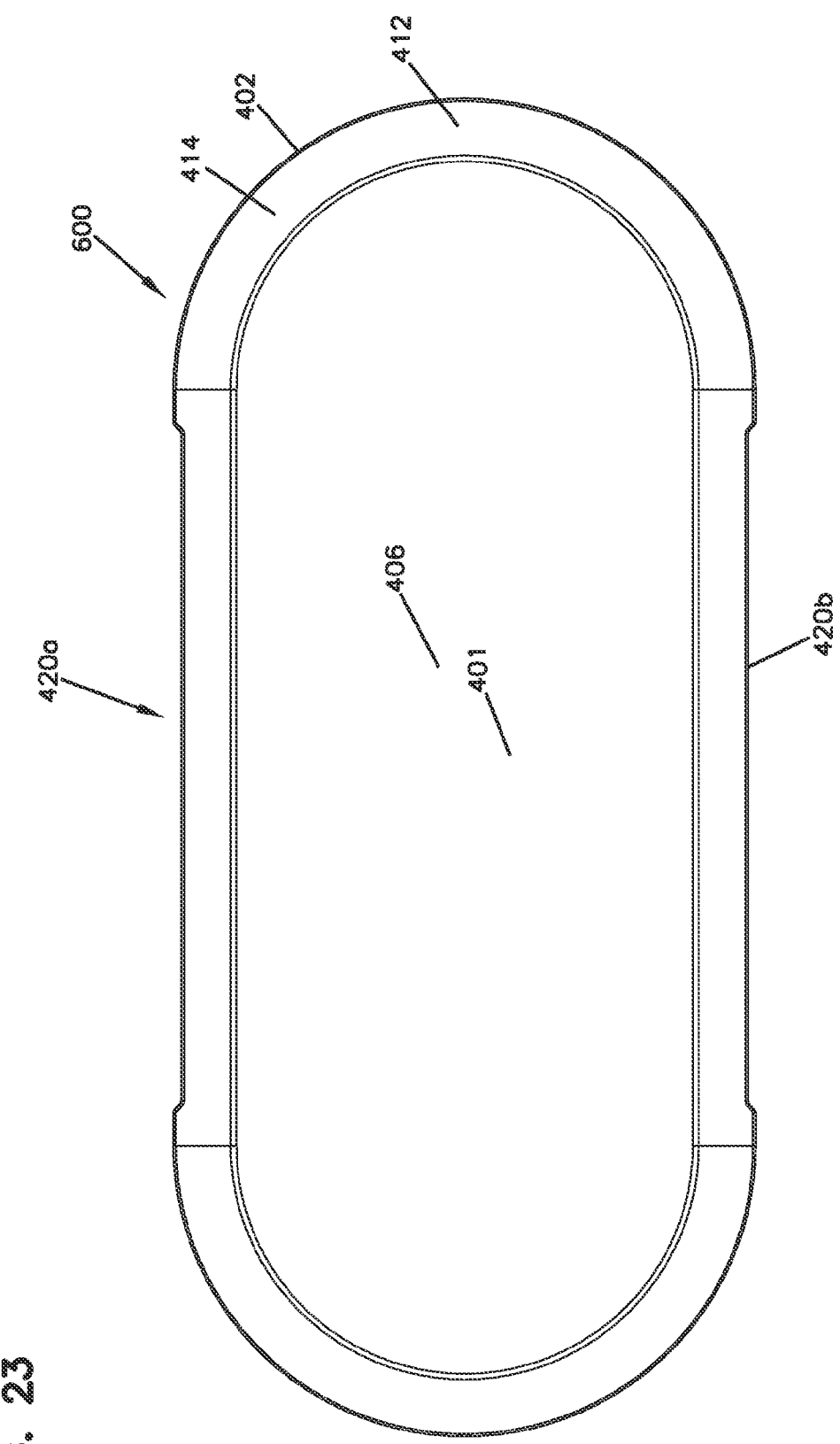
FIG. 23 is a top plan view of the cartridge of FIG. 21.
Figure 24:
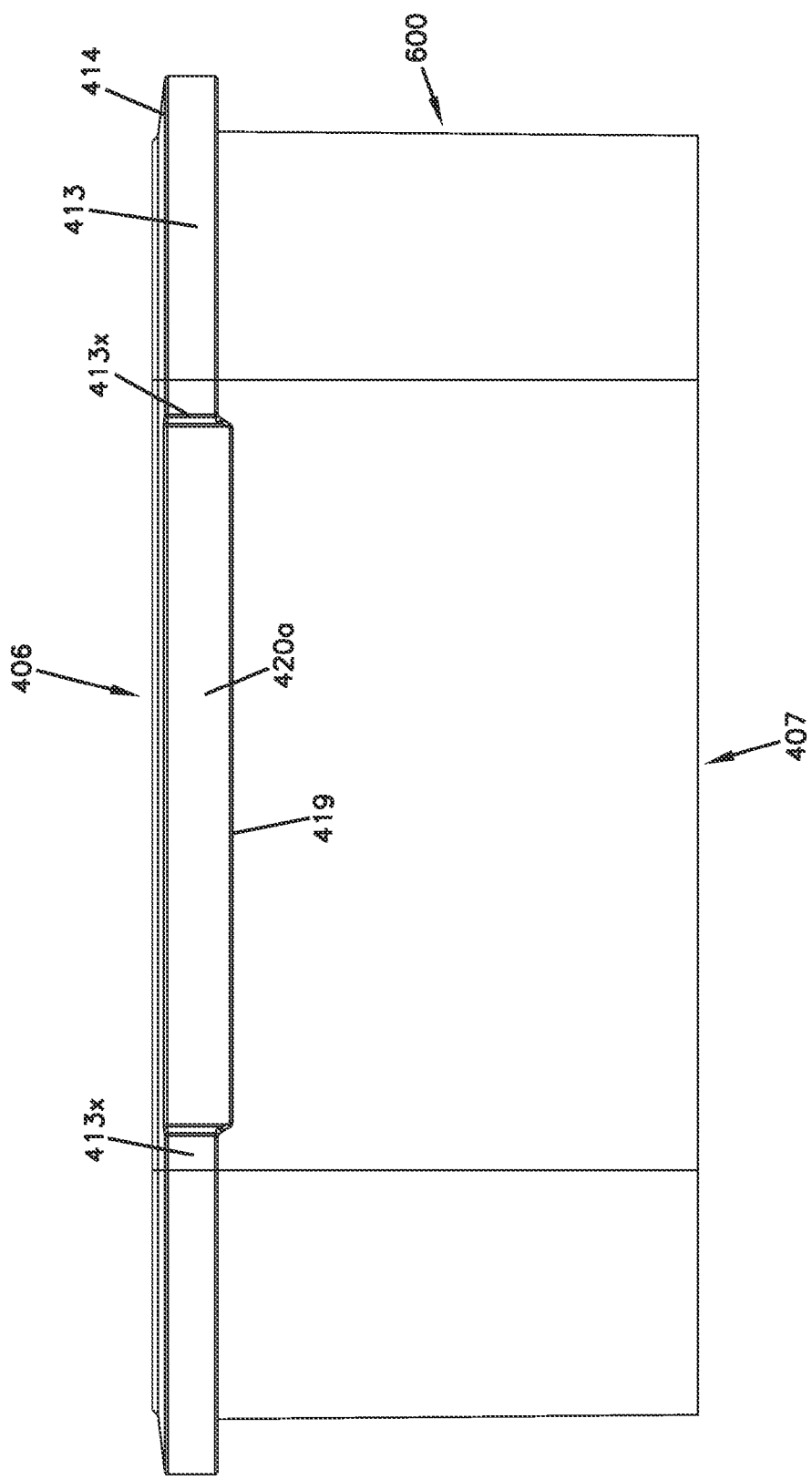
FIG. 24 is a schematic side elevational view of the cartridge of FIG. 21.
Figure 25:
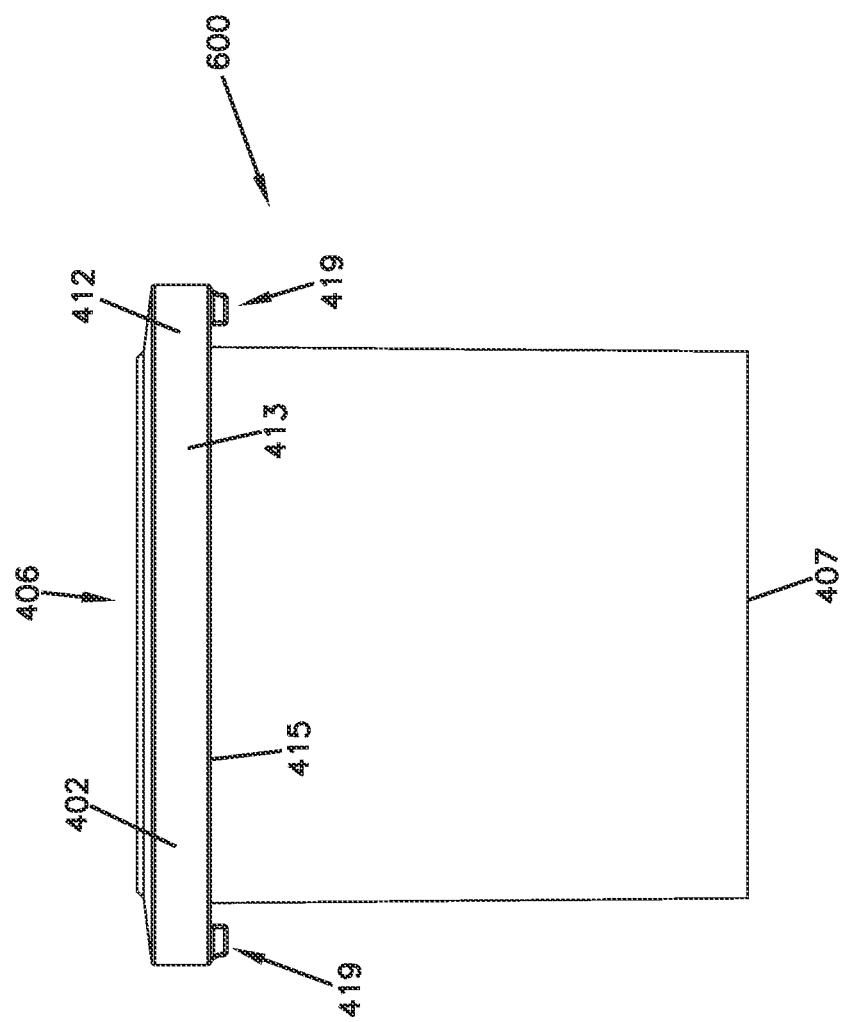
FIG. 25 is a schematic narrow or curved end elevational view of the cartridge of FIG. 21.

FIG. 22 is an exploded perspective view of cartridge 600. FIG. 23 is a plan view taken toward a first flow surface 401; FIG. 24 a side elevational view toward the long dimension; FIG. 25 a side elevational view toward the short dimension.

Figure 26:
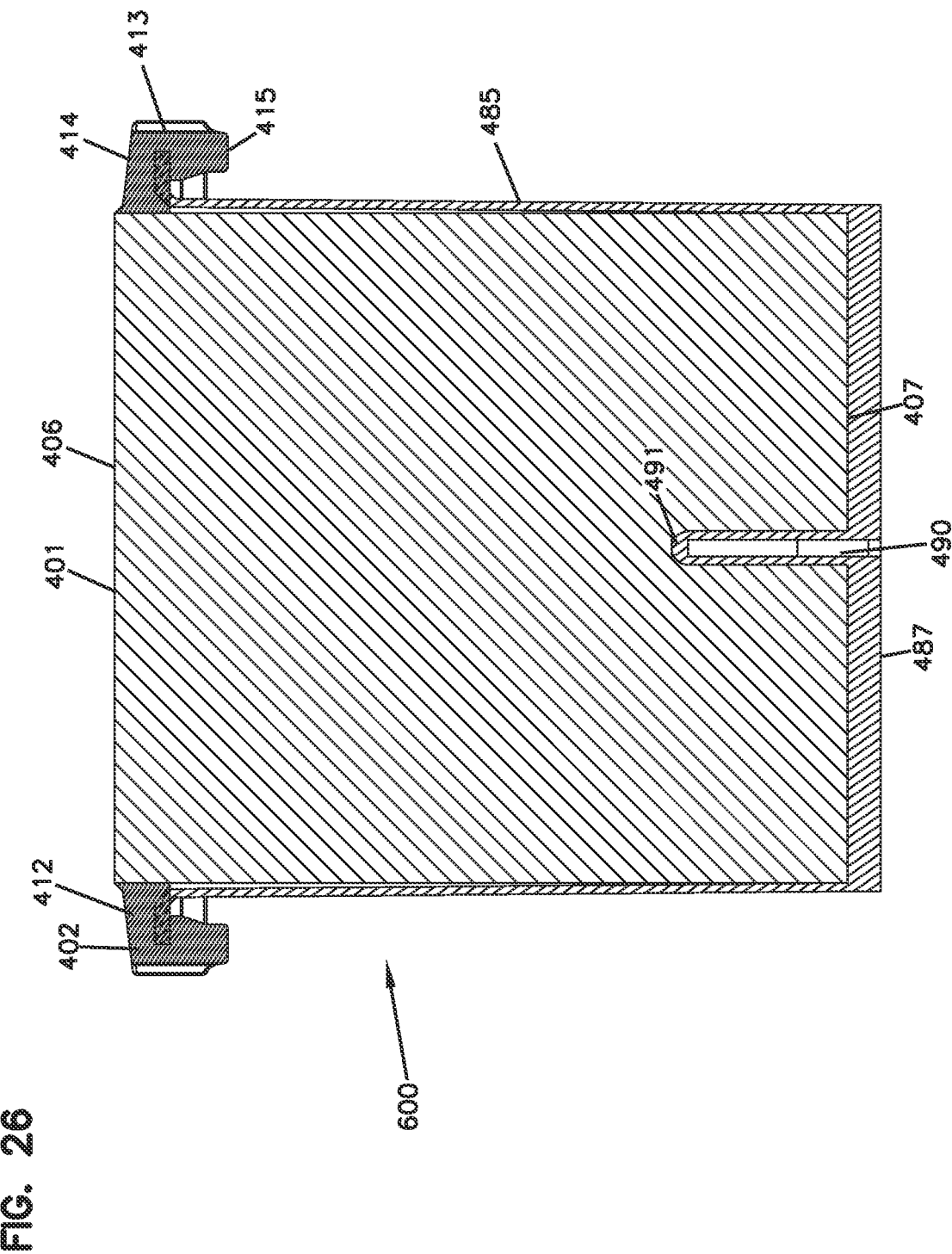
FIG. 26 is a schematic narrow dimension cross-sectional view of the cartridge of FIG. 21.
Figure 27:
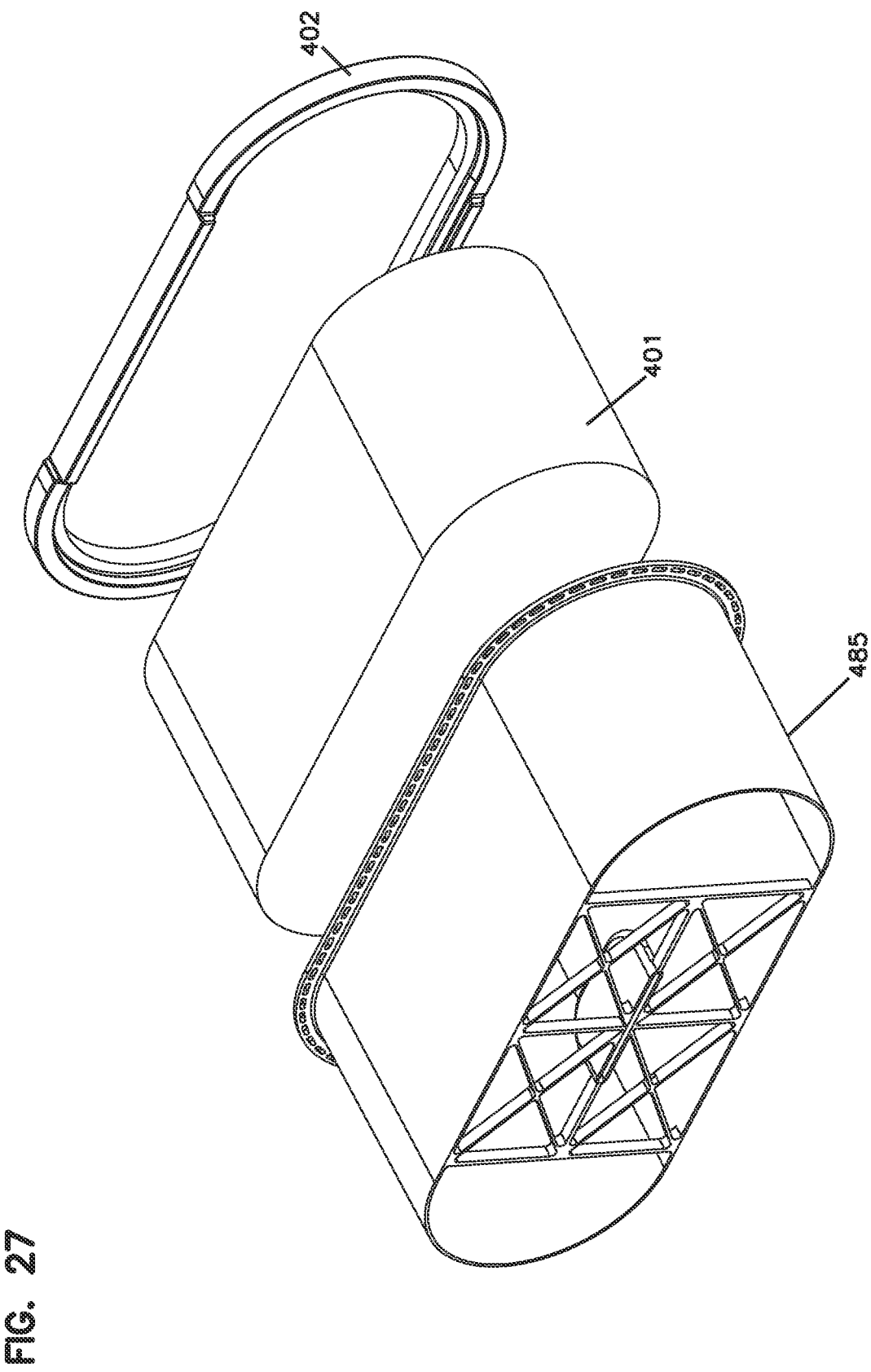
FIG. 27 is a second exploded perspective view of the cartridge of FIG. 21.

FIG. 26 is a cross-sectional view through the short dimension, and taken through the contour regions. It can be seen that it is generally analogous to FIG. 14 and like reference numerals indicate analogous parts. In FIG. 26A, an enlarged fragmentary cross-sectional view is provided, analogous to FIG. 14A with analogous reference numerals indicating analogous parts. Finally, FIG. 27 a second exploded perspective view is provided.

It will be understood that the cartridge 600 can be assembled analogously to cartridge 400 and cartridge 550. Further, it should be understood that one would use a housing analogously constructed, but with seal surface regions appropriately contoured for the seal member depicted.

D. The Embodiment of FIG. 28

Figure 28:
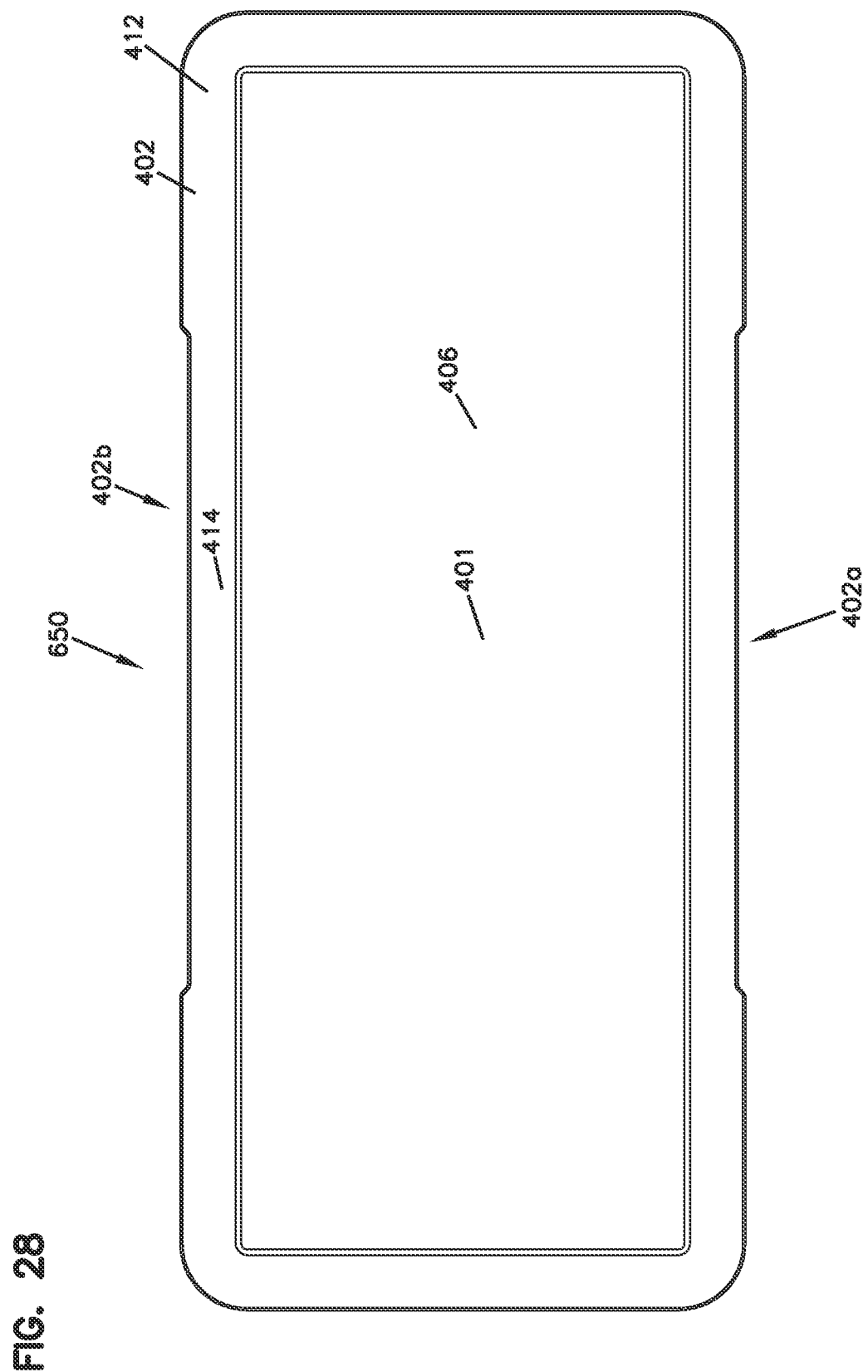
FIG. 28 is a schematic top plan view of an alternate cartridge embodying a seal arrangement analogous to the cartridge of FIG. 21, but in the configuration of a rectangular seal arrangement and media pack definition.

In FIG. 28, a view of a cartridge 650 with opposite flow ends analogous to cartridge 600, but using media (or a media pack) analogous to cartridge 550 FIGS. 19-20 is depicted. It is merely an indication that the type of seal arranged for use in the cartridge 600 of FIGS. 21-27 can be implemented with a different perimeter definition to one or both of the media pack and the seal member.

E. Another Example Variation, FIGS. 29-35

Thus far, variations in media (pack) perimeter definition and media (pack) seal perimeter definition have been provided, along with variations in the contour of a seal surface. In FIGS. 29-35, an additional variation, depicted in the embodiment of cartridge 700 with opposite flow ends, is provided. Here along each side of the edge of the seal member, multiple regions or sections of contour are depicted.

Figure 29:
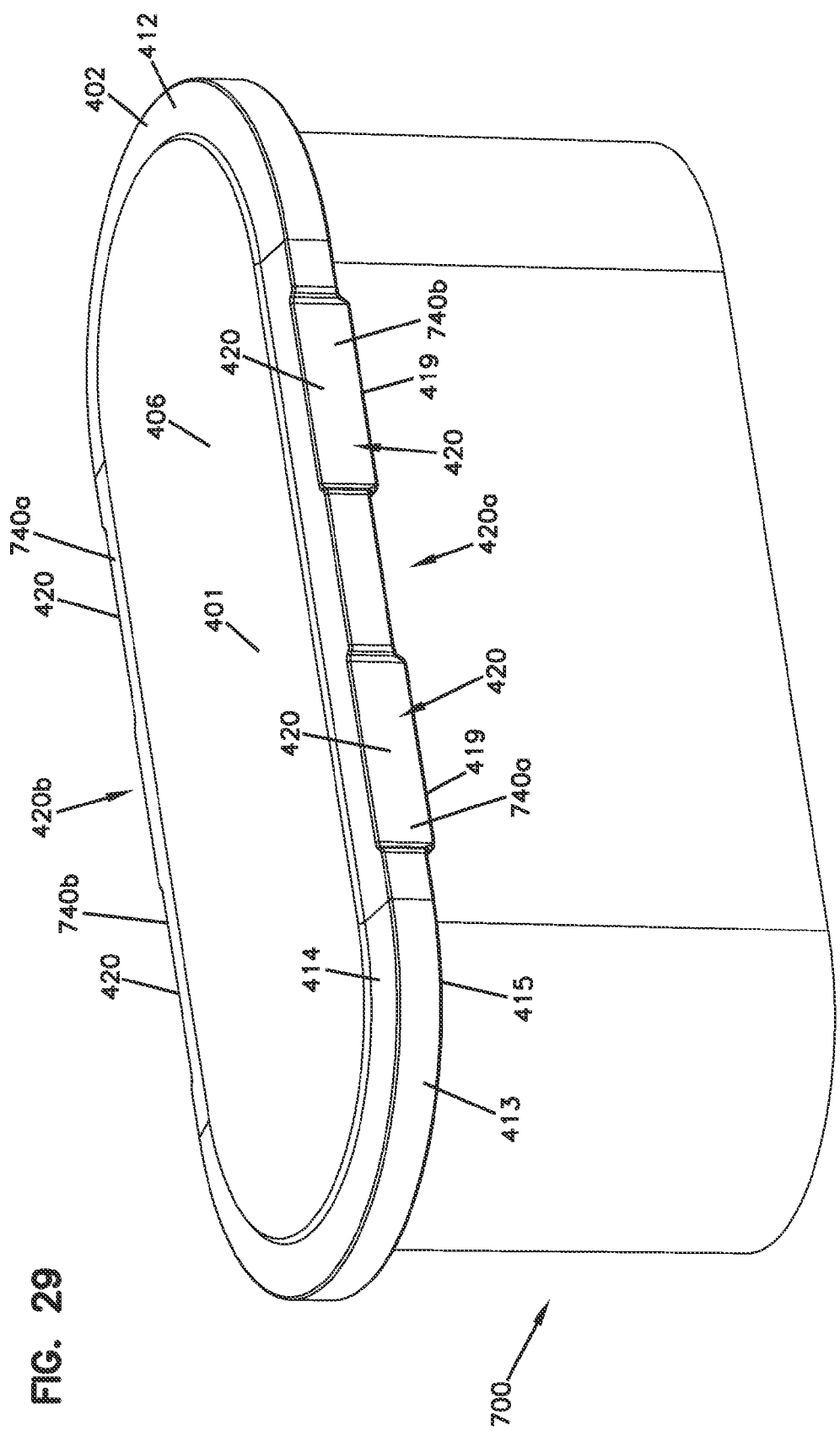
FIG. 29 is a schematic perspective view of a fifth embodiment of a filter cartridge incorporating selected principles according to the present disclosure.
Figure 30:
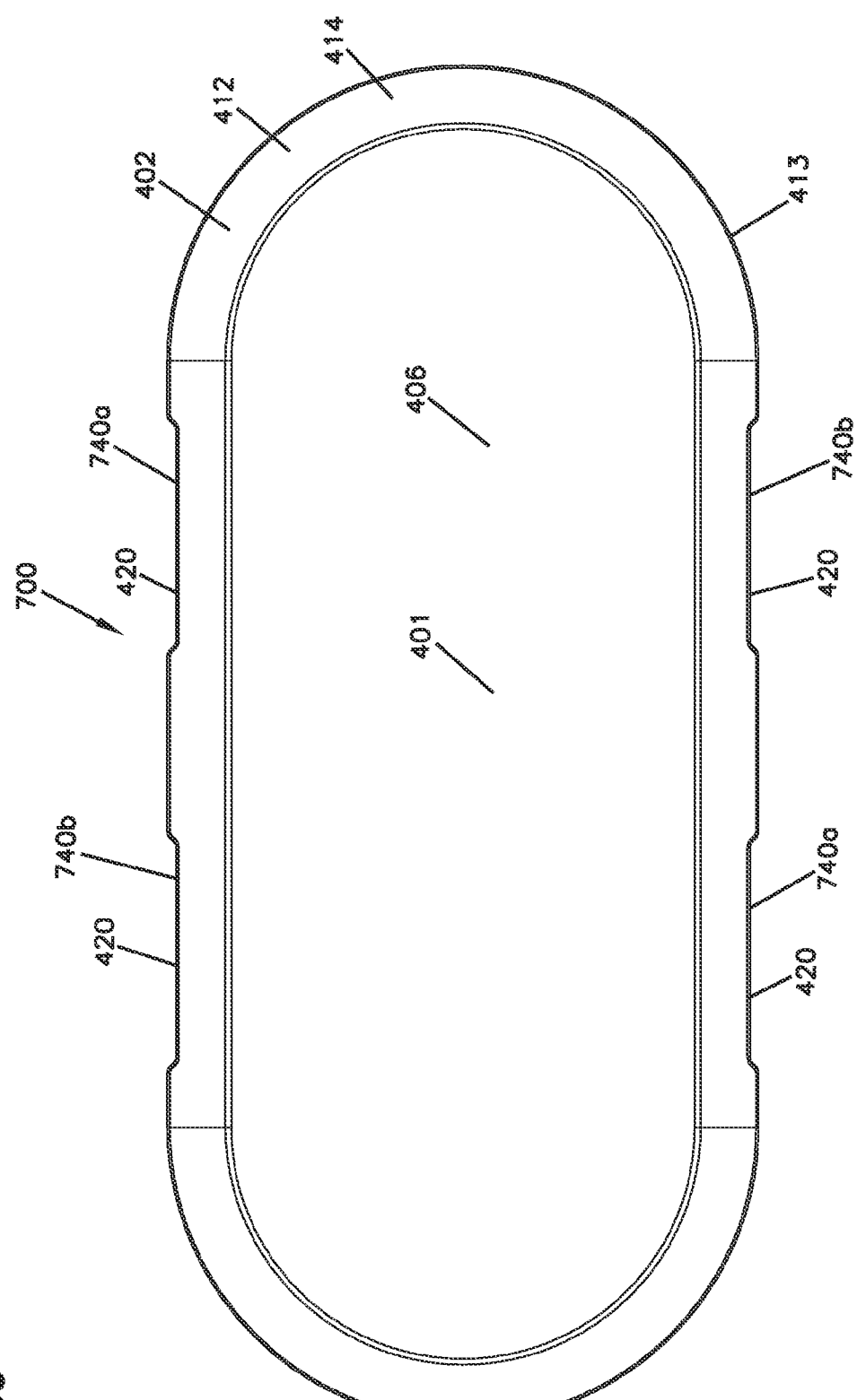
FIG. 30 is a schematic top plan view of the cartridge depicted in FIG. 29.

Referring to FIG. 29, cartridge 700 is depicted, with features generally analogous to those previous described indicated by analogous reference numerals. In FIG. 30, a top plan view is provided.

In FIG. 29, attention is directed to the fact that edge recess region 420 comprise opposite regions 420a, 420b that each actually comprise two regions, 740a, 740b.

Figure 31:
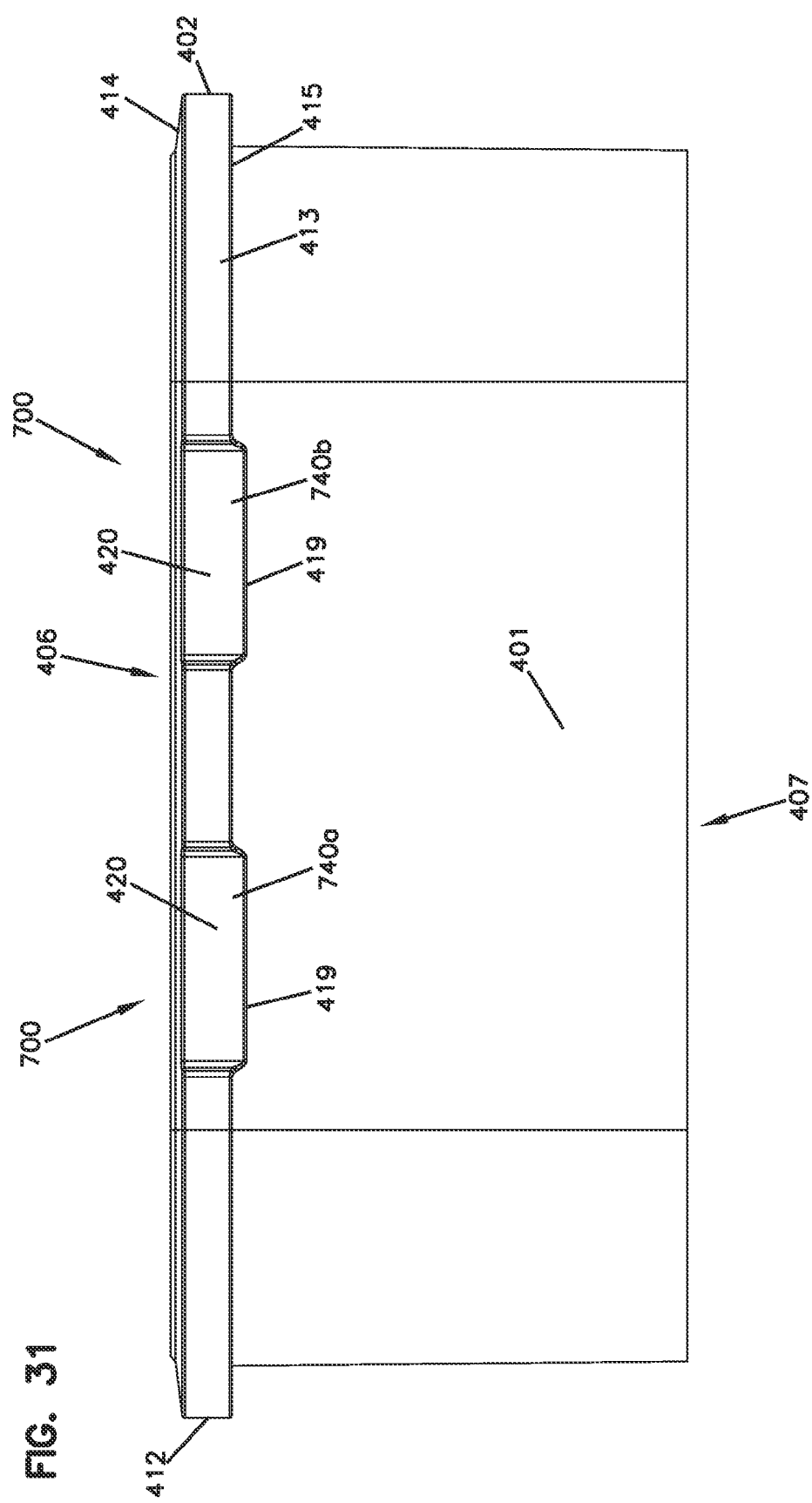
FIG. 31 is a schematic side elevational view of the cartridge depicted in FIG. 29.

Similarly, referring to FIG. 31, the contour stepped region 415r in the example shown, along each side comprising 719a, 719b, spaced from one another. Of course, multi-step arrangements analogous to FIG. 9 could also be used, in the arrangement of FIG. 31.

Figure 32:
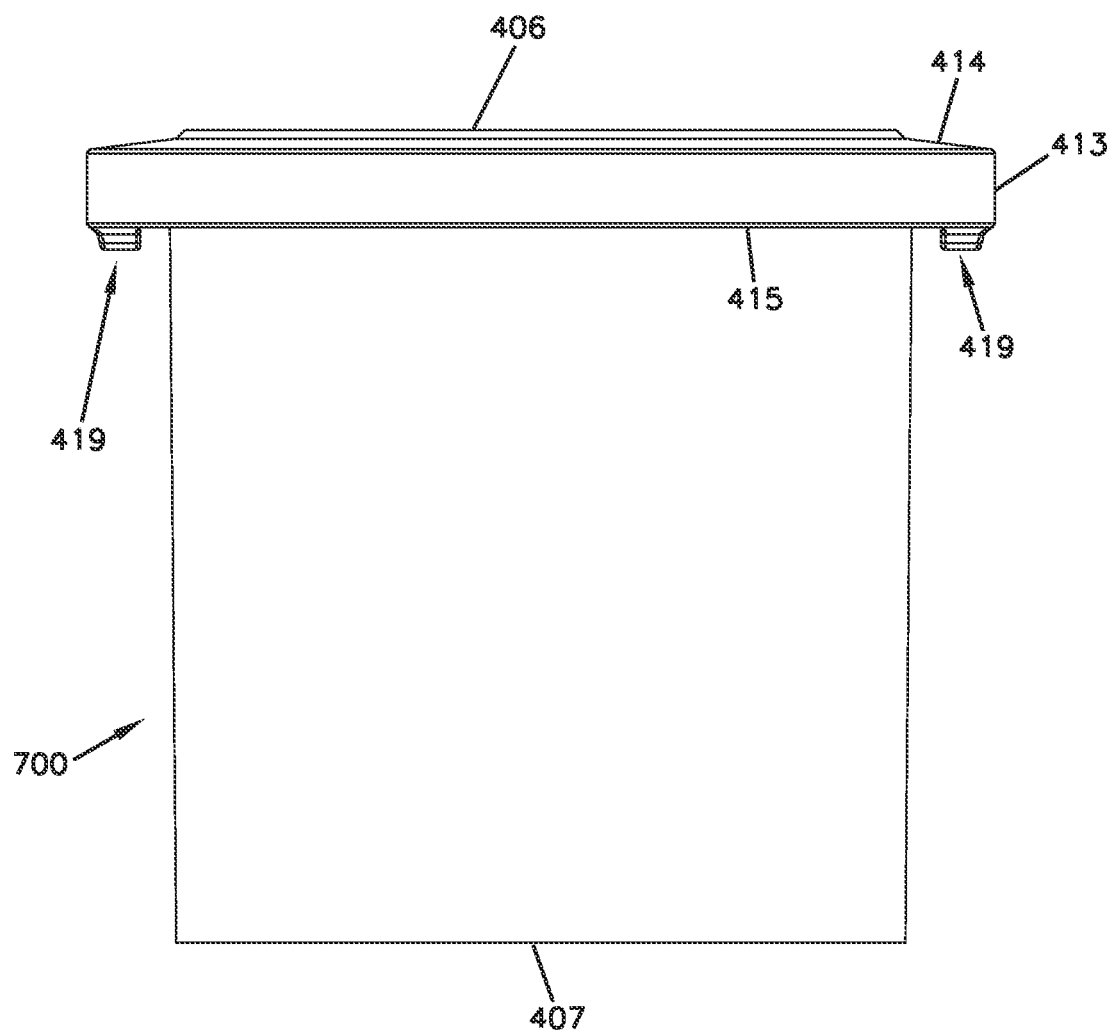
FIG. 32 is a schematic narrow or curved end elevational view of the cartridge depicted in FIG. 29.
Figure 33:
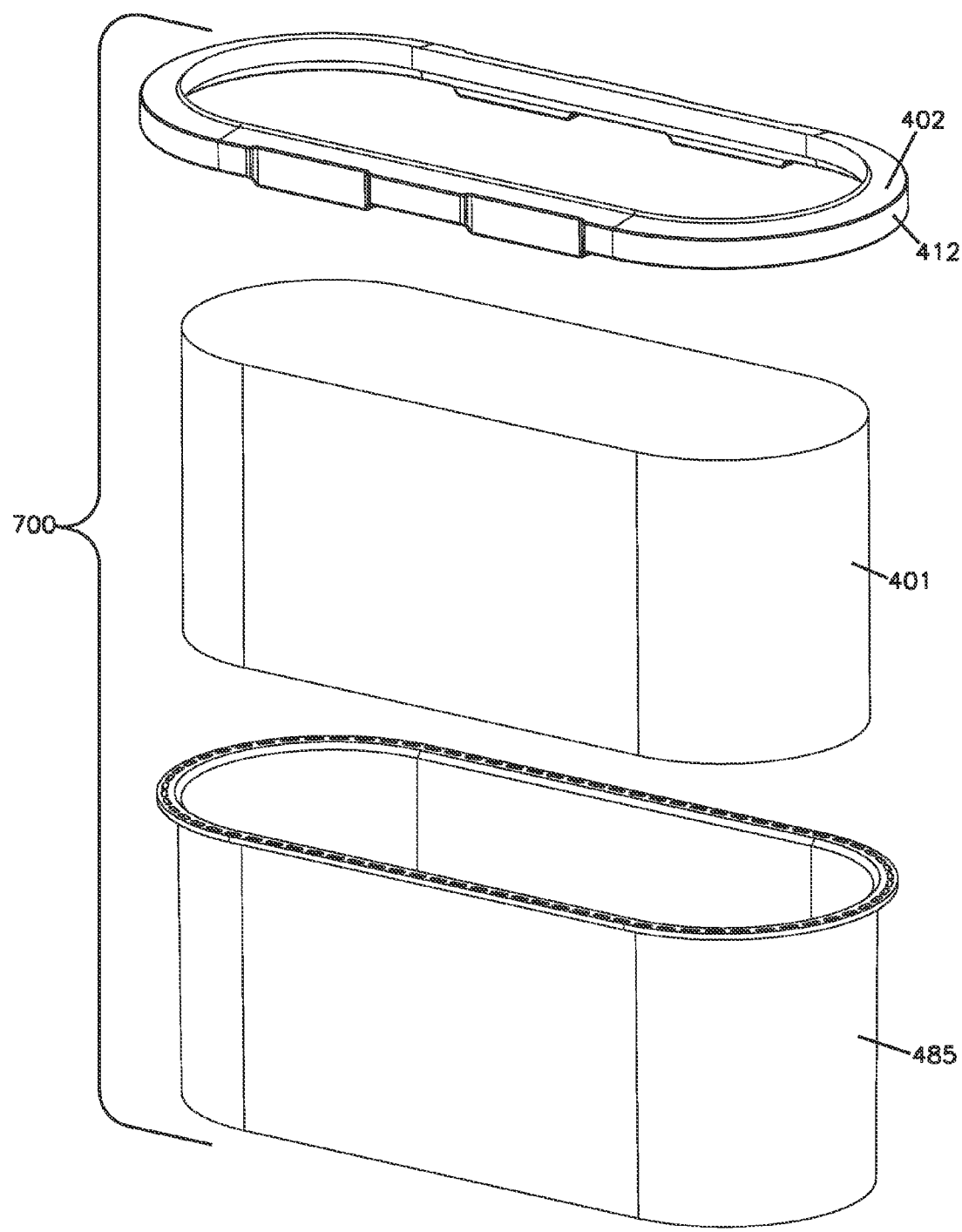
FIG. 33 is a schematic exploded view of the filter cartridge depicted in FIG. 29.

In FIG. 32, a side elevational view taken toward the short side. In FIG. 33, an exploded perspective view of cartridge 700 is provided.

Figure 34:
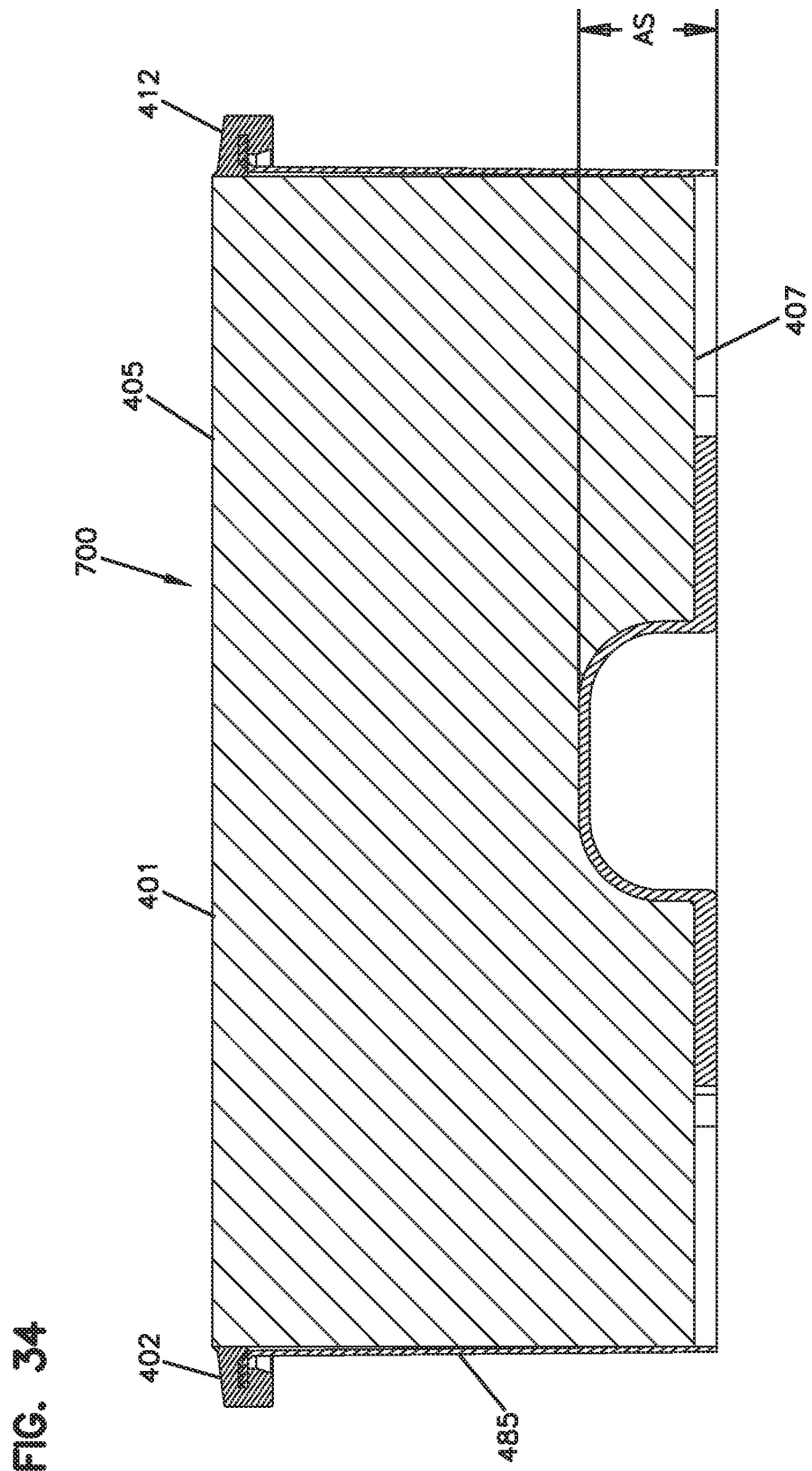
FIG. 34 is a schematic long-dimension cross-sectional view of the cartridge depicted in FIG. 29.
Figure 35:
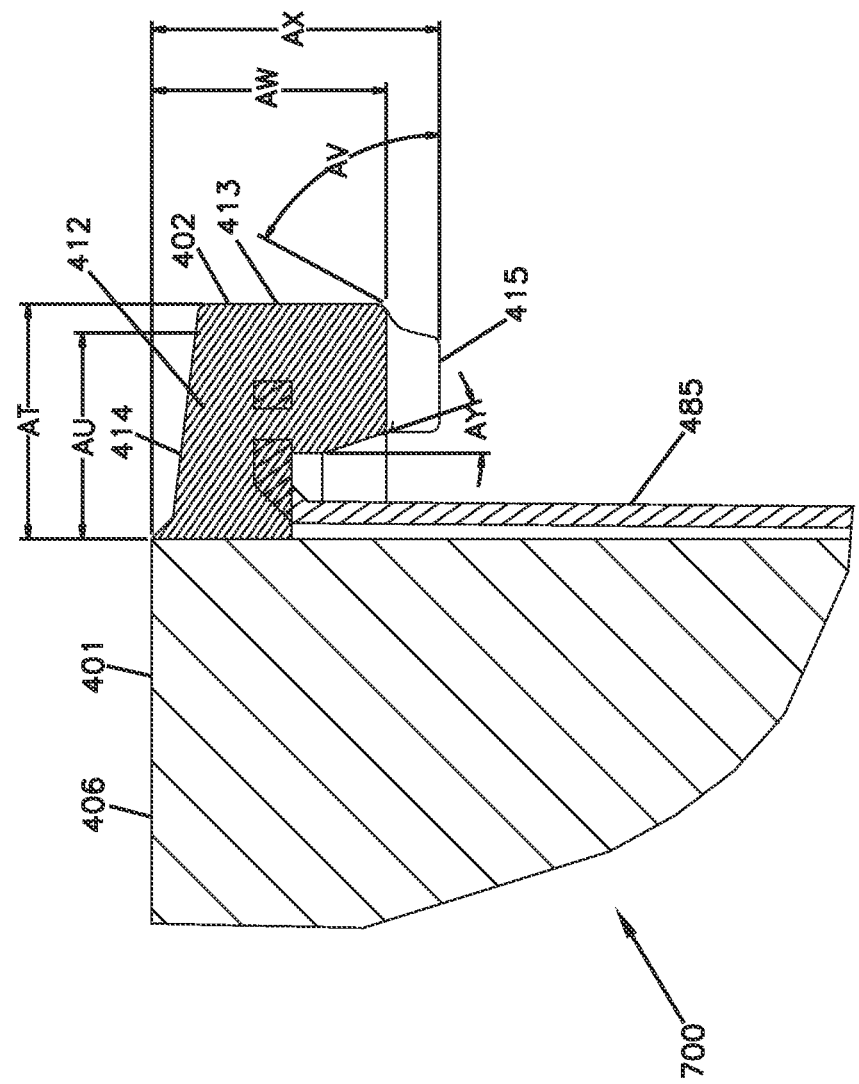
FIG. 35 is an enlarged fragmentary view of a selected portion of FIG. 34.

In FIG. 34 a cross-sectional view taken along the long dimension is shown, and in FIG. 35 an enlarged fragmentary view is shown. It is noted that cross-sectional views along the short dimension if taken through the seal member, would generally provide a fragmentary view analogous to FIG. 14A, with some variation if needed for specific contouring.

It will be understood that the cartridge of FIGS. 29-35 can be constructed analogously to cartridge 400, FIG. 9, can be used in an analogous housing, except with the housing feature that engage the cartridge appropriately sized, shaped and contoured for the variation in the seal member described and depicted.

F. An Additional Variation, FIG. 36

Figure 36:
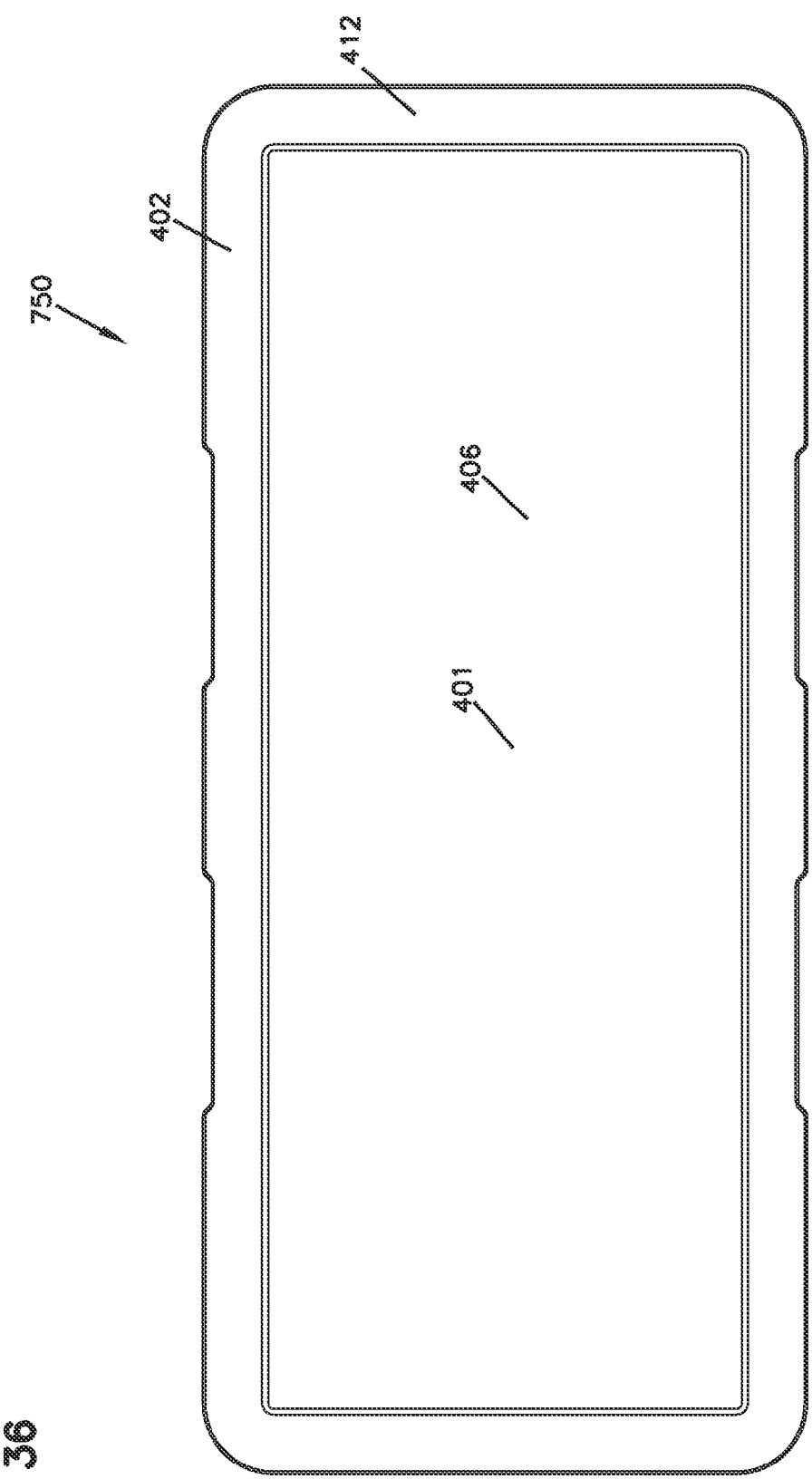
FIG. 36 is a schematic top plan view depicting a sixth embodiment of a filter cartridge; the view of FIG. 36 being of a cartridge having a seal arrangement analogous to that of FIG. 29, but embodied in a configuration having a rectangular perimeter for the seal member and the media pack.

In FIG. 36, a top plan view of cartridge 750 is depicted. Cartridge 750 is meant to demonstrate a rectangular variation of the seal arrangement and perimeter for the cartridge 700 of FIGS. 29-35.

G. An Additional Variation, FIG. 37-44a

In FIGS. 37-44A, cartridge 800, with opposite flow ends and also analogous to previously described cartridges, such as cartridge 400, is depicted. Here, the housing seal member 402 is modified, to have a plurality of edge recesses, and a plurality of single steps, shown along each side. The cartridge is otherwise analogous to previously depicted cartridges and can be used analogously, but with a housing arrangement appropriately configured for engagement with the depicted seal member. It can be constructed in analogous manners. In FIGS. 37-44A, numerals indicating analogous portions to those previously described are provided.

H. An Additional Variation, FIG. 45

In FIG. 45, a cartridge 850 having a seal member contoured somewhat analogously to the arrangement of FIGS. 37-44A is depicted, but in the embodiment of a member having a rectangular periphery for the seal member, and also a rectangular periphery for the media pack. Like reference numerals to those previously used, indicate analogous parts and analogously functioning features.

I. Additional Description of Engagement Between the Various Seal Arrangements Described, and the Housing, FIGS. 46A-49B In FIGS. 46A-49B, fragmentary views are provided to indicate engagement between cartridges as described, and housing arrangement, in the contour and recess/projection regions.

Figure 46A:
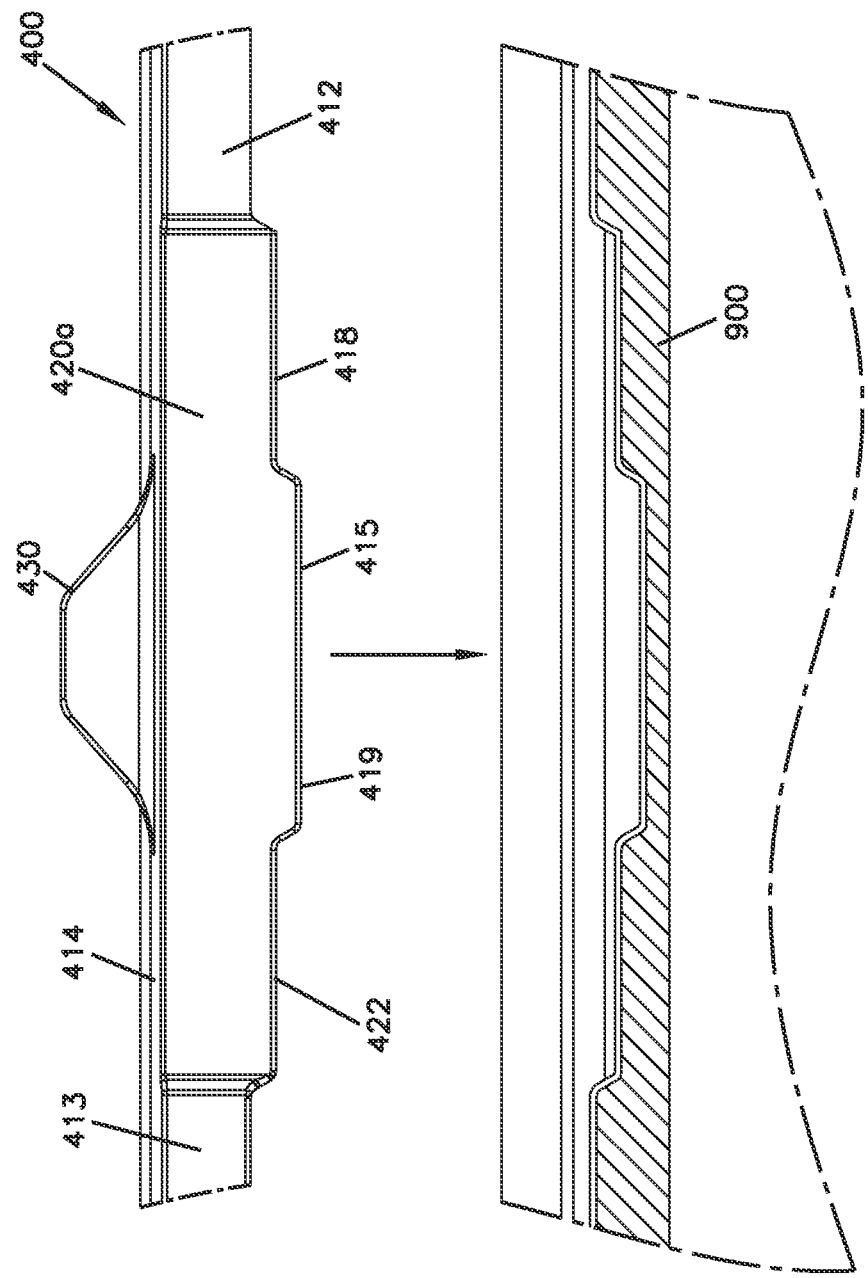
FIG. 46A is a schematic, exploded, fragmentary view depicting engagement between a portion of a filter cartridge in accord with FIG. 9, and a portion of a housing.
Figure 46B:
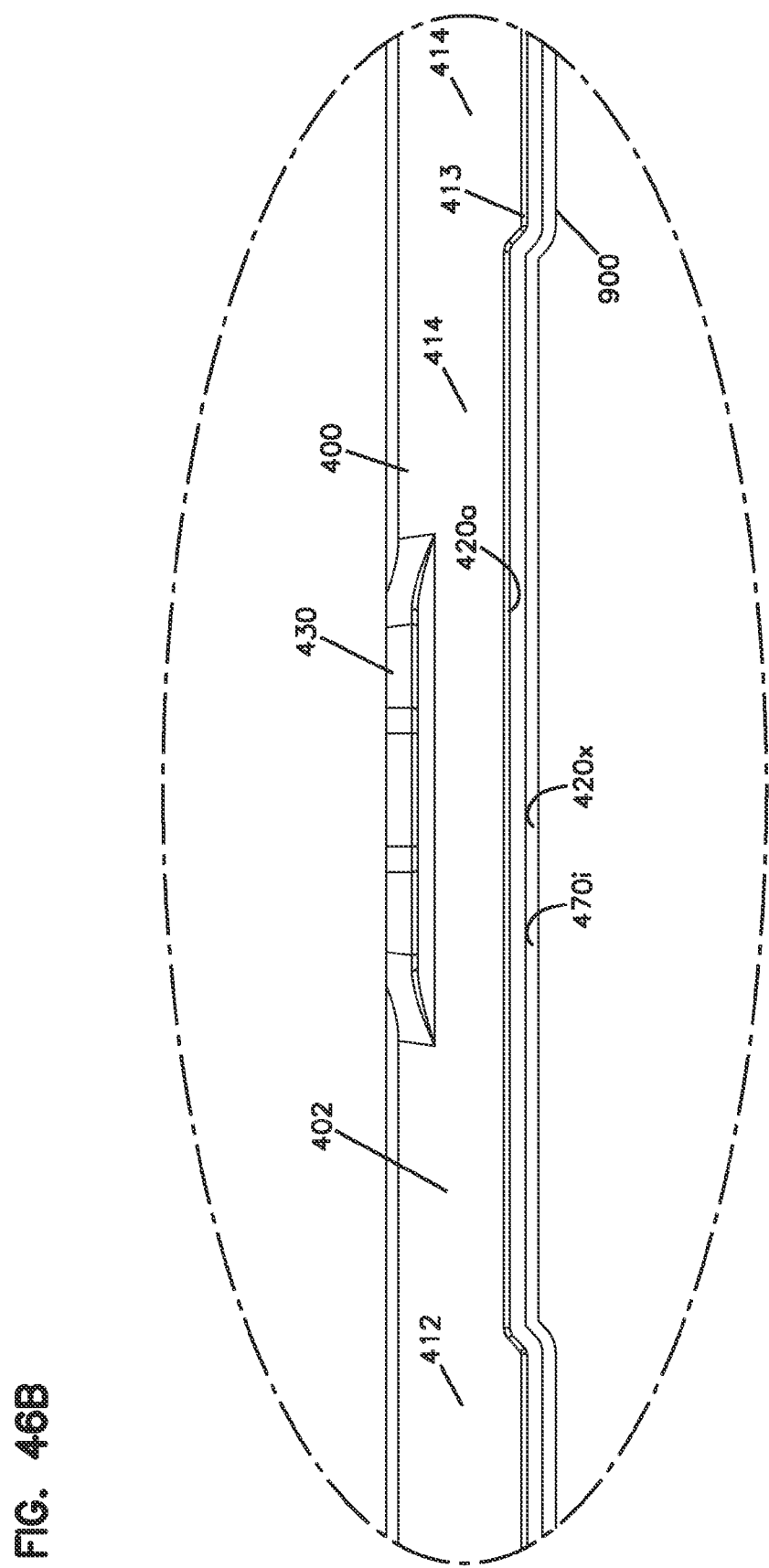
FIG. 46B is a second schematic, exploded, fragmentary view depicting a portion of the cartridge in accord with FIG. 9, moving into engagement with a portion of the housing.

FIGS. 46A and 46B are intended to depict, schematically, selected engagement between cartridge 400 and a housing or housing portion that would be used therewith. Referring to FIG. 46A, a portion of the pinch seal arrangement 402 of cartridge 9 is shown. At 900, a housing portion in particular corresponding surface portion of a bottom of a seal trough housing that will receive the pinch seal arrangement is shown, with motion steps. Also, optional rib 472r is shown. It can be seen that as the cartridge 400 is pushed into the housing, each of the projection steps 418, 419, 422 in the cartridge seal surface 415, will engage an analogous step and rib, in the housing 900. Also, preferred angles, discussed above, in connection with FIG. 11A, at K, L, will be better understood, since they facilitate a surface engagement doing sealing between the cartridge seal surface 415 and the housing 900, at analogous transition regions.

In FIG. 46B, a view is shown that indicates the recess 420a the cartridge surface 415, engaging a projection 420s in flange surface 470i of the housing 900, as the lowering occurs. It is noted that the inner surface 470 of the flange in the housing 900 engaged, is shown tapered outwardly somewhat as it extends downwardly, analogously to FIG. 18C. FIGS. 46A and 46B can be considered to also analogously show the engagement for cartridge 550, FIGS. 19 and 21.

Figure 47A:
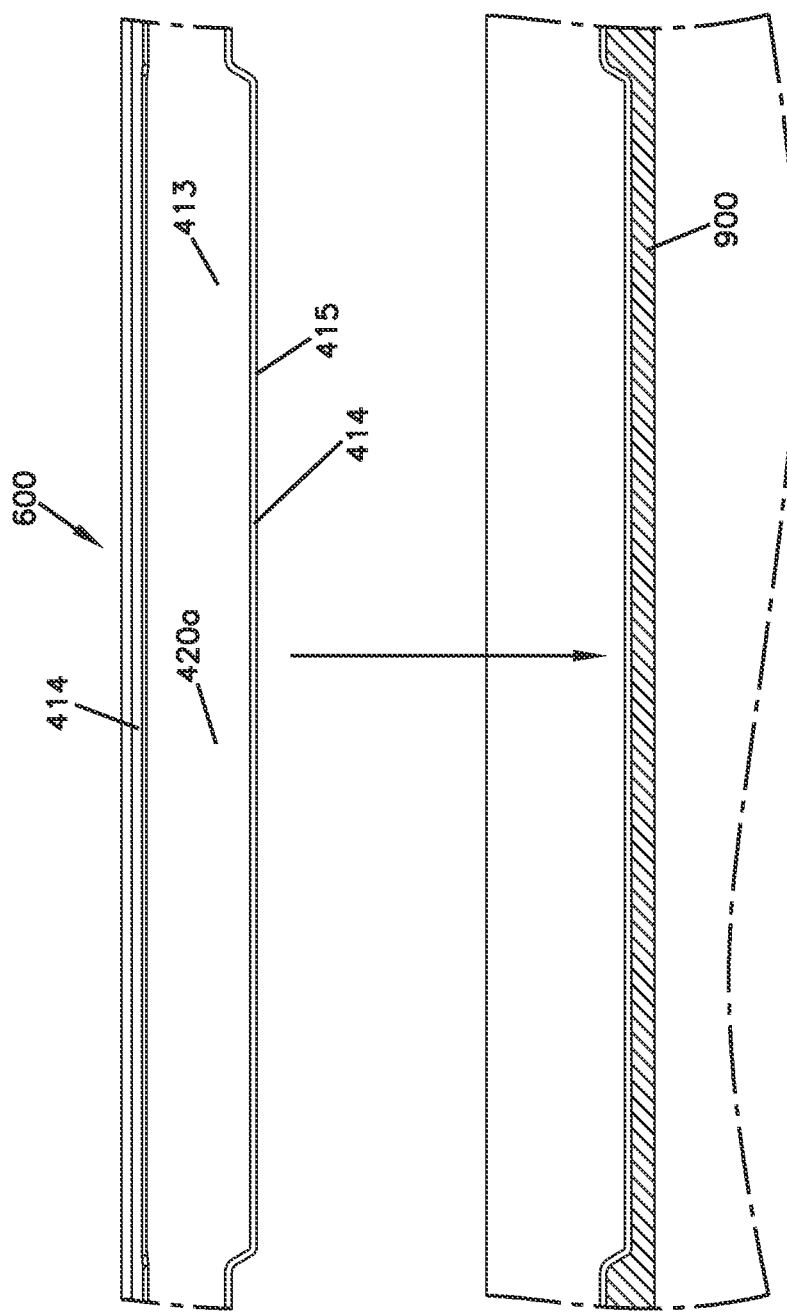
FIG. 47A is an exploded, schematic, fragmentary view of a portion of a cartridge in accord with FIG. 21, engaging a portion of a housing.
Figure 47B:
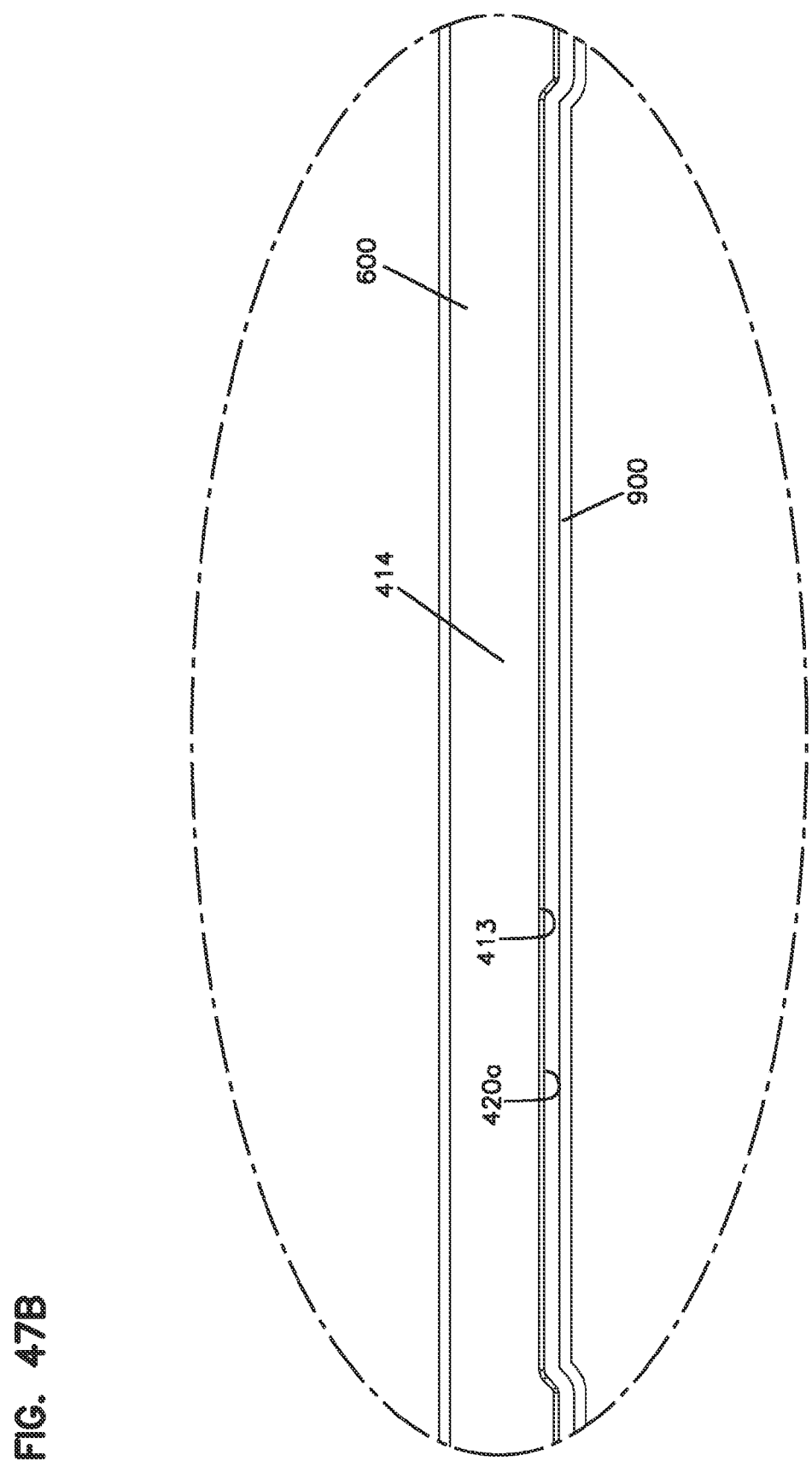
FIG. 47B is a second exploded, schematic, fragmentary view of a portion of a cartridge in accord with FIG. 21 engaging a portion of a housing.

FIGS. 47A and 47B are analogous views to FIGS. 46A and 46B, except depicting features of the cartridge of 600, FIGS. 21-27. Of course, it could analogously be applied to cartridge 650, FIG. 28.

Figure 48A:
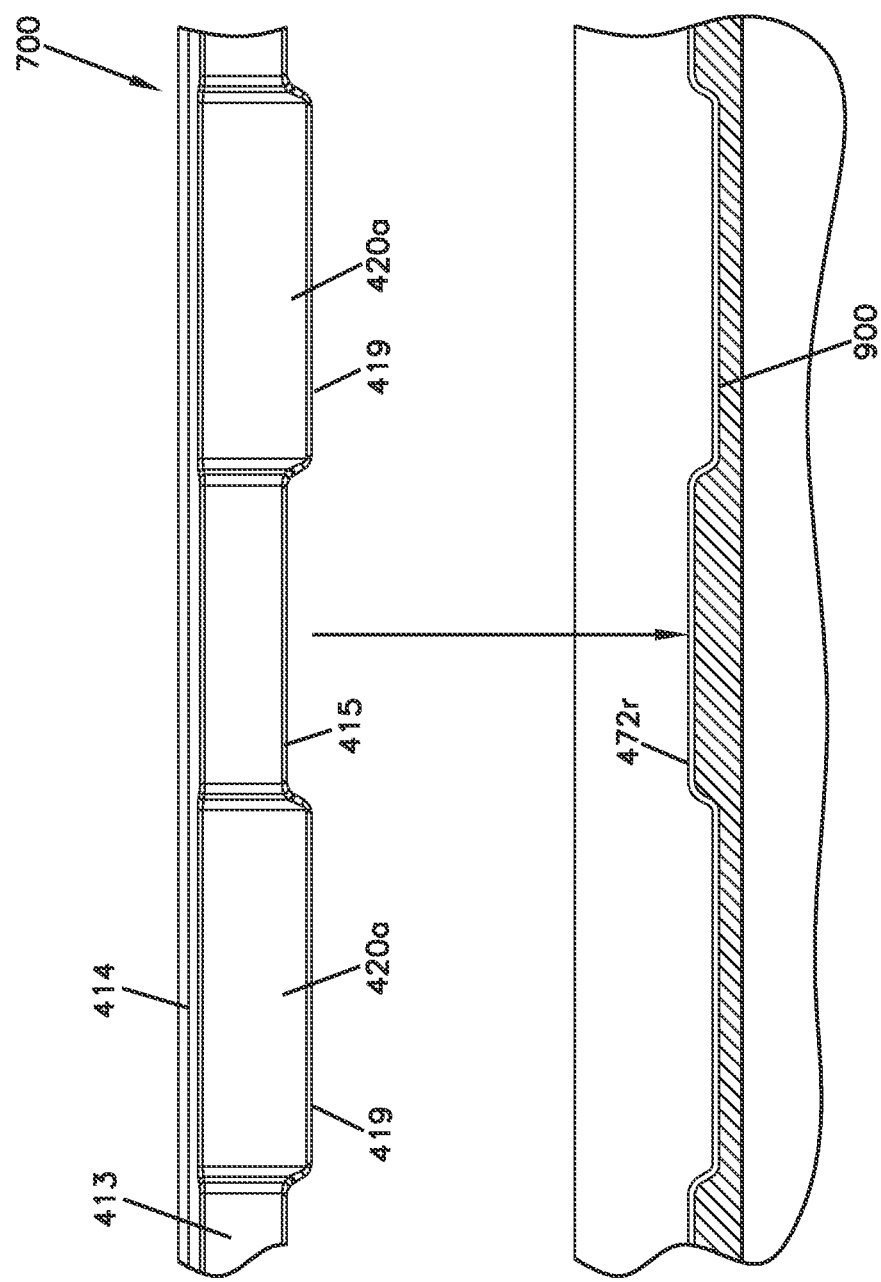
FIG. 48A is an exploded, fragmentary, schematic view of a portion of a cartridge in accord with FIG. 29, engaging a portion of a housing.
Figure 48B:
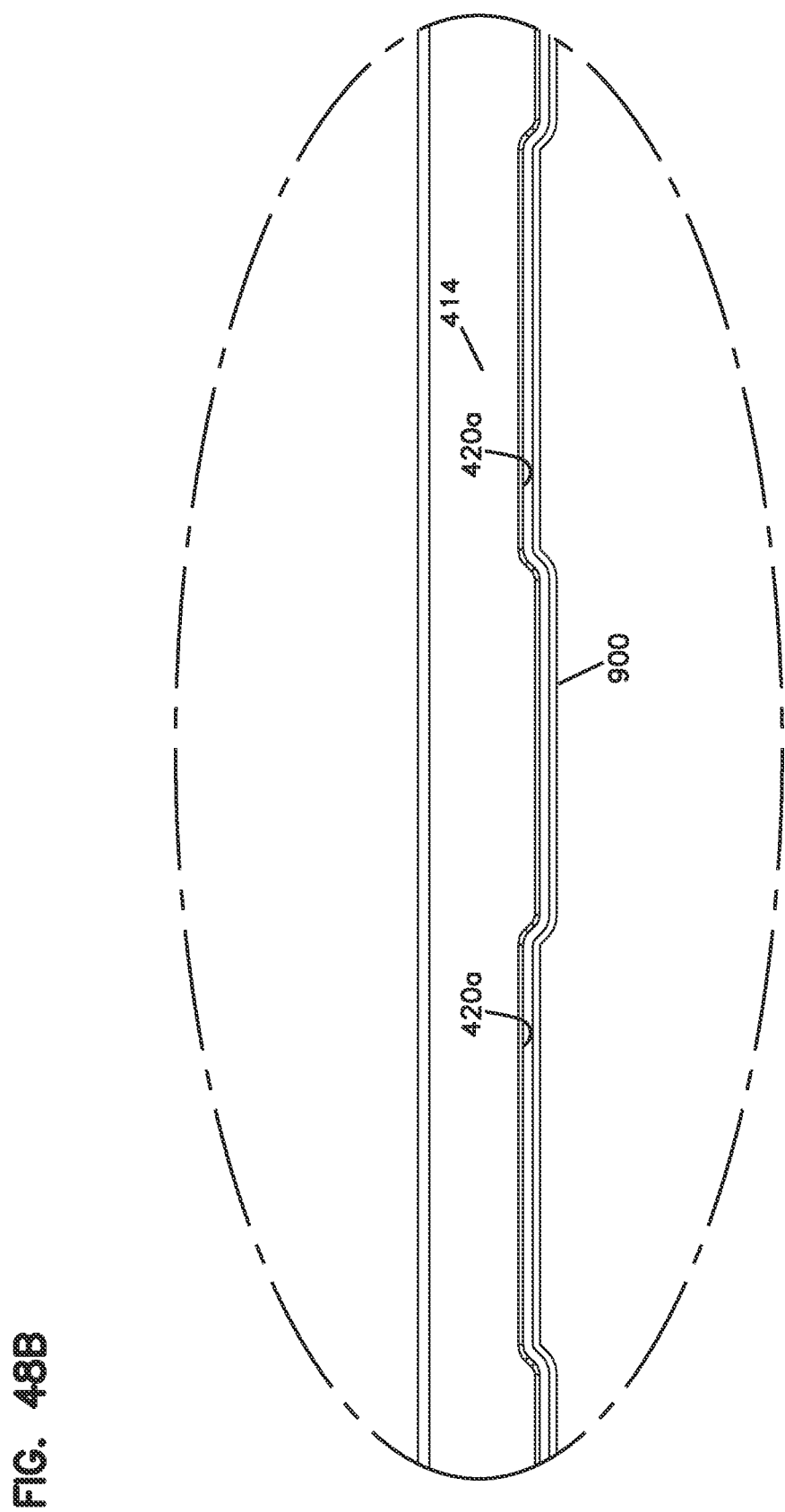
FIG. 48B is a second, exploded, fragmentary, schematic view of a portion of the cartridge in accord with FIG. 29 engaging a portion of the housing.

In FIGS. 48A, 48B, analogous views to FIGS. 46A and 46B are shown, except for the cartridge 700, FIGS. 30-35. Of course, it could be viewed to analogously show for the cartridge 50, FIG. 36.

Figure 49A:
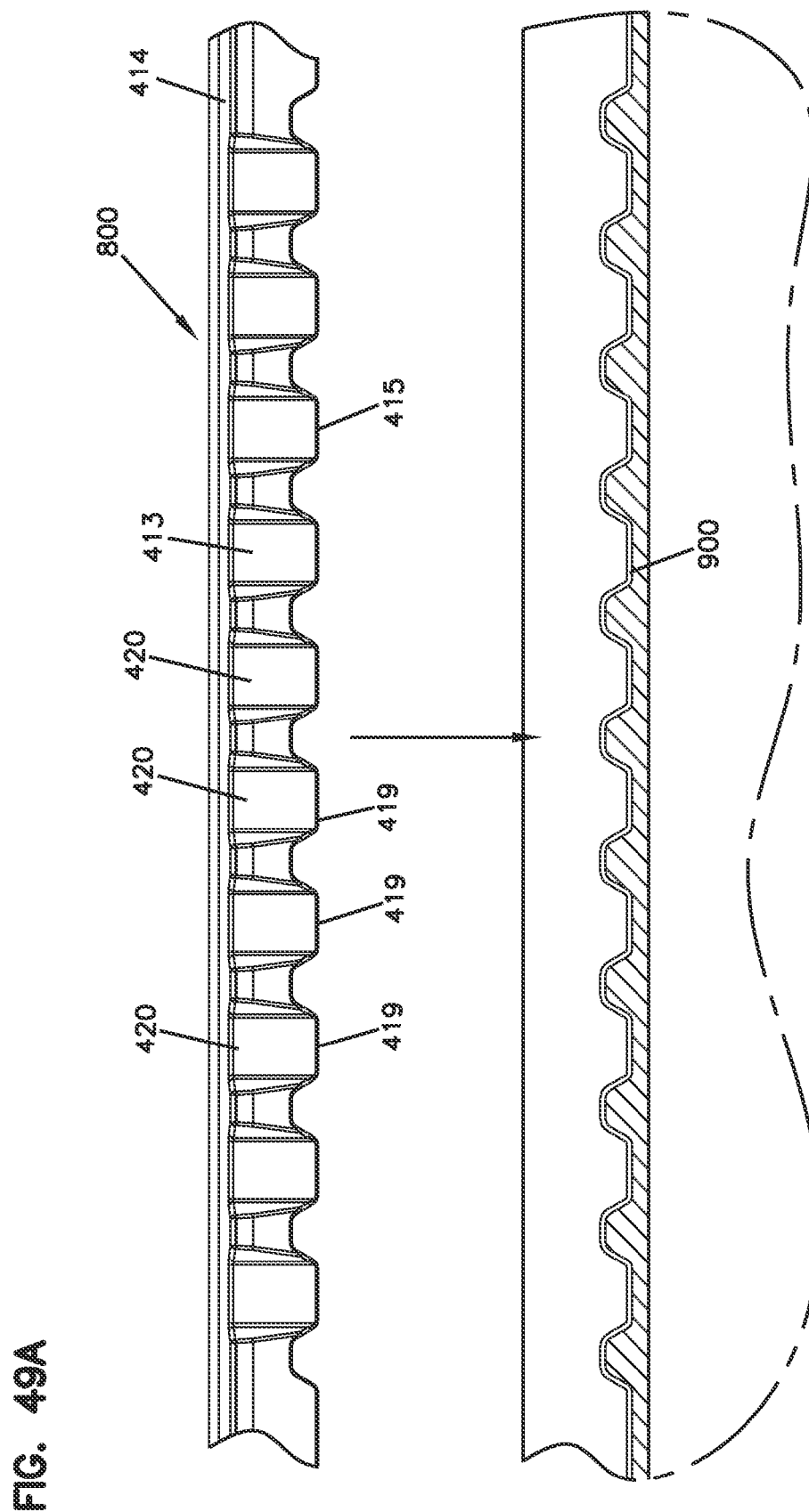
FIG. 49A is an exploded, fragmentary, schematic view of a portion of a cartridge in accord with FIG. 39, engaging a portion of a housing.

In FIGS. 49A and 49B, views analogous to FIGS. 46A, 46B are shown, but for the cartridge 800 of FIGS. 37-44D, and it could be analogously used for the cartridge 850 of FIG. 45.

J. Example Dimensions

Figure 42:
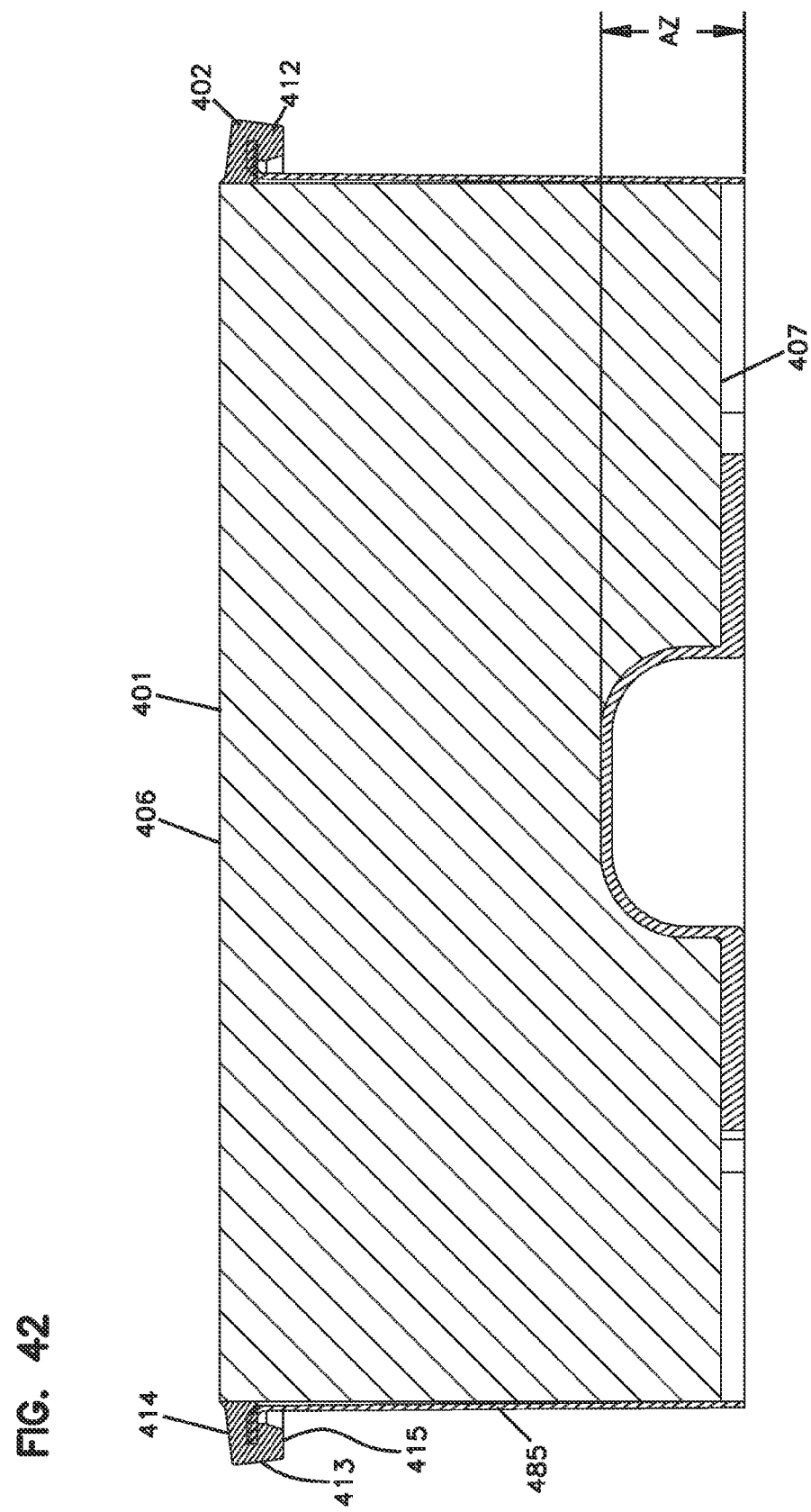
FIG. 42 is a schematic long-dimension cross-sectional view of the filter cartridge of FIG. 39.
Figure 43:
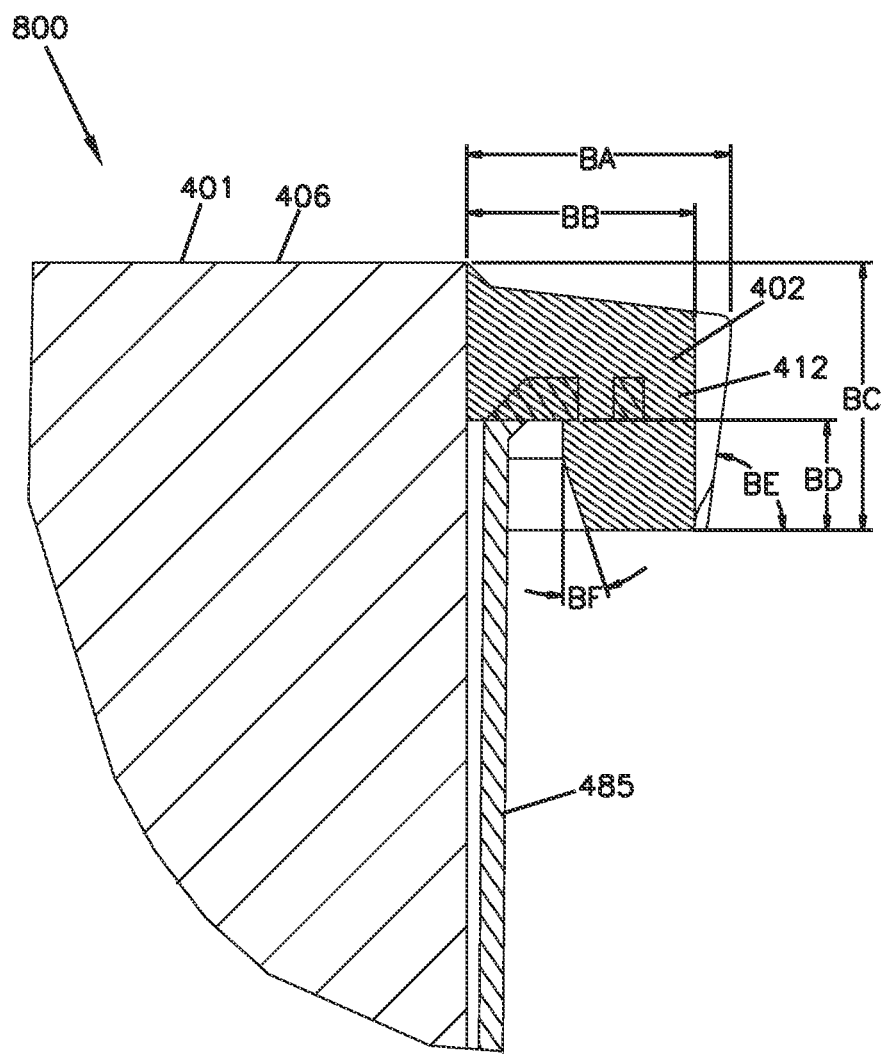
FIG. 43 is an enlarged fragmentary view of a selected portion of FIG. 42.
Figure 44:
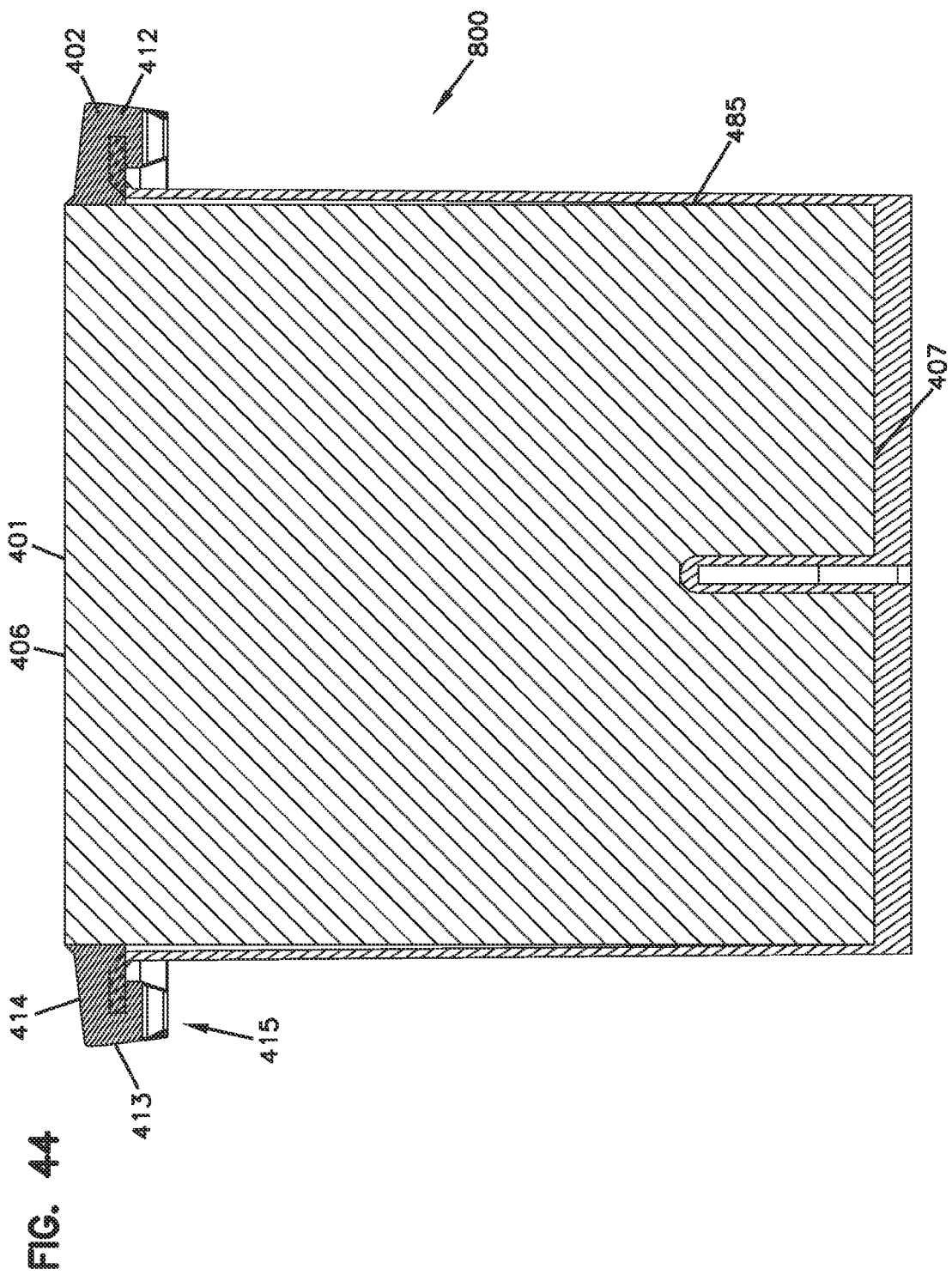
FIG. 44 is a schematic short dimension cross-sectional view of the filter cartridge of FIG. 39.
Figure 44A:
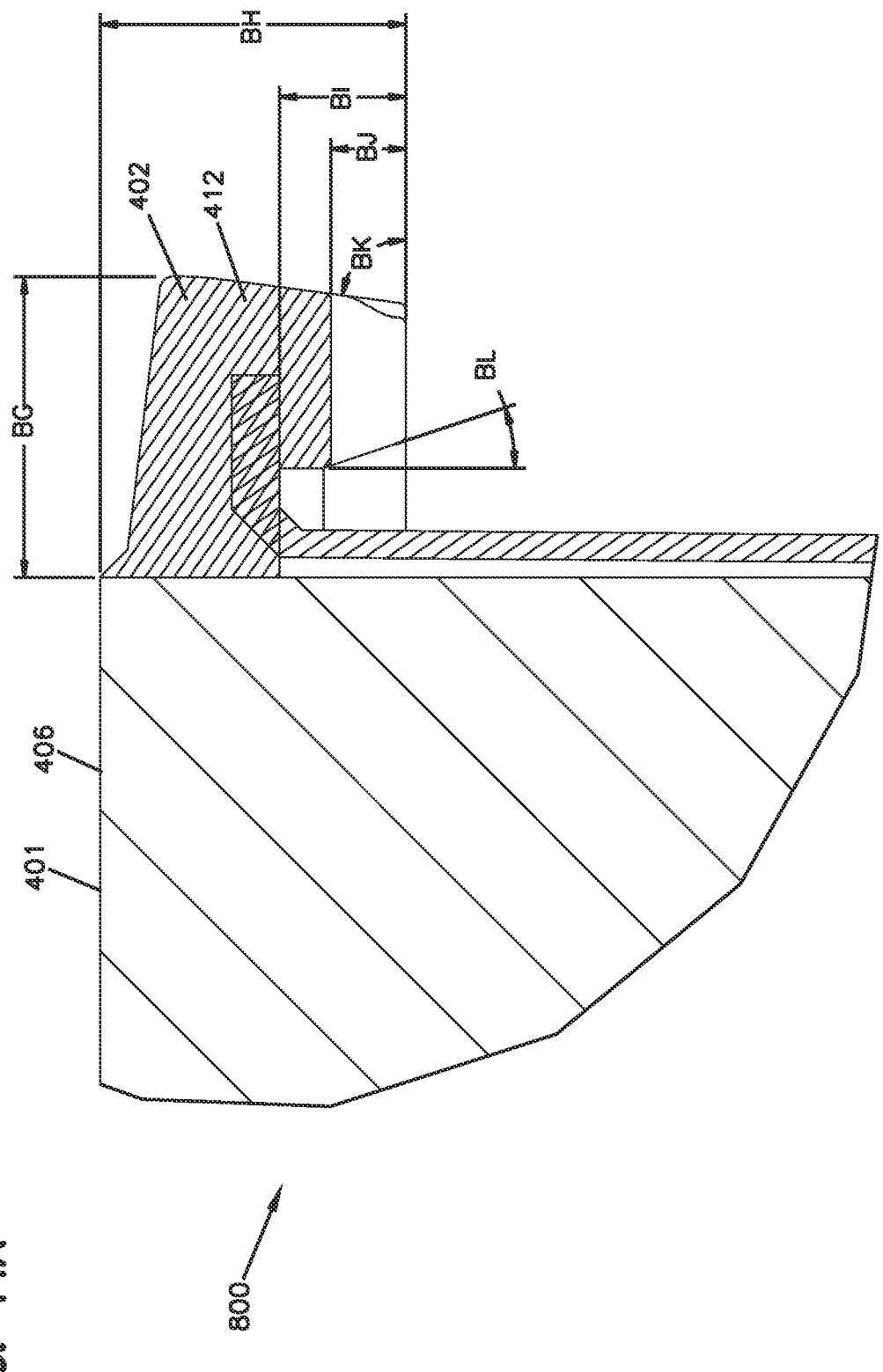
FIG. 44A is an enlarged fragmentary view of an identified portion of FIG. 44.

In the various drawings described, example dimension and angles are indicated. Useable dimensions and angles can be varied considerably from those shown. However, in the various examples depicted, useable dimensions, for example, are as follows:

1. In FIG. 14A, AA=22 mm; AB=19.3 mm; AC=15.4 mm; AD=22 mm; AE=32 mm; and AF=18°.
2. In FIG. 15, AL=50 mm.
3. In FIG. 15A, AG=22 mm; AH=8 mm; AI=22 mm; AJ=9 mm; and AK=1°.
4. In FIG. 26A, AM=22 mm; AN=19.3 mm; AP=22 mm; AQ=27 mm; AO=62°; and AR=18°.
5. In FIG. 34, AF=50 mm.
6. In FIG. 35, the indicated dimensions can be analogous to the ones depicted in FIG. 15A, with angle AV being about 60°.
7. In FIG. 42, AC=50 mm.
8. In FIG. 43, BA=22 mm; BB=19 mm; BC=22.3 mm; BD=9.2 mm; BE=82°; and, BF=90°.
9. In FIG. 44A, BG=22 mm; BH=22.3 mm; BI=9.2 mm; BJ=5.5 mm; BK=82°; and, BL=18°.

In FIG. 11A, angles are indicated at K and L. These angles can be characterized herein as "step angles," or "transition angles" and would correspond generally to the angle of the transition region for a step, to a plane extending through the media pack, generally perpendicular to an air flow direction through the media pack. It can also be viewed as an angle between the transition section and an adjacent step or seal surface, when such surface portions also generally extend parallel to a plane perpendicular to flow direction. Preferably, the angle (C, K) is not so steep that a good seal with corresponding portion of the housing cannot be obtained. Most preferably, it is sufficiently steep so is that step itself is significant. While potentially the angle can range from about 5° to 90°, inclusive, typically, the angles K, L will not be greater than about 85°. A typical, useful, range will be about 20° to 80°, inclusive, for each of angles K and L, most typically about 30° to 70° degrees, inclusive often 30°-60°, inclusive. Preferably the angles are 30°-85°, inclusive; more preferably 40°-80°, inclusive; most preferably 45°-75°, inclusive. In some instances, the angles K, L will be about 40° to 50°, inclusive. Often, the angles K, L will be the same.

In typical arrangements, each projection in an axial sealing surface 415 (for example step or step section) will extend axially, relative to adjacent portion of the seal arrangement, at least 2 mm, usually at least 3 mm, and often at least 4 mm, and typically not more than 8 mm. With a step member (projection) as shown in FIG. 11A, these distances would correspond to the axial distance between each sub-step or sub-step projection, for example, the axial difference between step 422 and step 419; and between step 419 and step 418; as well as the distance between step 422 and adjacent section 413x and between step 418 and adjacent section 413x.

Typically and preferably, each projection/recess member in a contoured portion of an axial sealing surface 415, and, each projection/recess contour in the peripheral edge surface 413, is a "discontinuous" member. By this, it is meant that each such member does not extend continuously around the entire circumferential extension, but rather, each is short in extension peripherally.

Typically, when a molded-in-place axial pinch seal is used, the principles will be applied in arrangements in which a distance between the opposite pinch seal engagement surfaces of the seal arrangement (indicated at 414, 415, FIG. 9, for example), whether in a stepped region or not, is at least 5 mm, usually at least 10 mm. Also, typically whether in a region stepped or not, this distance is typically not greater than 50 mm, usually not greater than 45 mm, and often the maximum thickness, for example, in a region of a projection location, is within the range of about 15 mm-40 mm, inclusive, although alternatives are possible.

Typically, the recess in a recess section, for example, section 420a, FIG. 9, is recessed toward the media pack relative to adjacent portions, by at least 1 mm, usually at least 2 mm; and, typically, not more than 10 mm, usually not more than 6 mm.

When a handle arrangement similar to that discussed in connection with FIGS. 9A and 9B is used, typically, its axial dimension of projection, away from adjacent portions of the cartridge, is at least 2 mm, often at least 5 mm, sometimes at least 10 mm, and typically not more than 40 mm, although alternatives are possible.

The overall axial length of the media or media pack, between the opposite flow ends or faces, for example, faces 406, 407, FIG. 9, is typically at least 50 mm, usually at least 80 mm, in many instances is 100 mm or greater, often 150 mm or greater, for example 200 mm or greater. and indeed lengths within the range of 100 mm-450 mm, inclusive, will sometimes be used, although alternatives are possible.

In connection with the discussion of FIGS. 18C and 18D, at angle TA was discussed as an optional angle of taper for the outer surface 413, FIG. 9 of the pinch seal member arrangement. This was an angle from parallel to air flow and in the example was a recess angle of the outer surface 413 in extension between the opposite pinch seal engagement surfaces 414, 415. TA can be merely a draft angle for molding, but it can be made greater. It will typically not be greater than about 30°, usually not greater than about 20°, and typically at least 0.1°. Again, it is an optional feature. Also, the taper need not be the same at all locations around the surface 413. Different tapers in different locations can be used as part of the interaction between the cartridge and the housing.

Referring to FIG. 14A, at 402b, an angled section of inner surface 402i is shown. The angle is indicated by angle AF. This would be an angle of a section of the internal surface 402i relative to a plane parallel to a direction between the opposite flow faces 406, 407 of the media pack. The angle F will typically be at least 5° and not greater than 30° although alternatives are possible. Surfaces 402a, 402c can be provided with some angle outward as well, if desired. In some instances, at least a small draft angle, for example, at least 0.1 degree, will be present, although alternatives are possible.

In FIG. 15A, at AK, an angle for section 402g is shown. Typically, angle AK will be about the same as AF, FIG. 14A, in many applications. The differences between the cross section of 14A and FIG. 15A relate to the fact that the FIG. 14A cross section is taken through the step or projection, and the 15A cross section is taken through a region of the sealed arrangement where the is no step or projection.

Referring to FIGS. 14A and 15A, it is noted that surface 414 is typically tapered to extend away from media end 406 as it extends outwardly from adjacent to media pack. Region 414 is an engagement surface for a housing member, but is not typically a critical sealing surface, as discussed herein. A typical angle for surface 414 will be at least 2°, typically 3° to 15° inclusive, often 5° to 10°, inclusive, relative to a plane perpendicular to the flow direction between surfaces 406, 407.

Typically, a portion of surface 414 will be non-contoured and complete peripheral or perimeter extension around the media pack.

Surface 415, on the other hand non-stepped regions (or regions of no projection/recess), is often parallel to, or nearly parallel to, a plane perpendicular to the direction between surfaces 406, 407. Typically, such portions of surface 415 will be in a plane extending at an angle from 0° to 4°, inclusive, relative to a plane perpendicular to the direction between the surfaces 406, 407.

Figure 37:
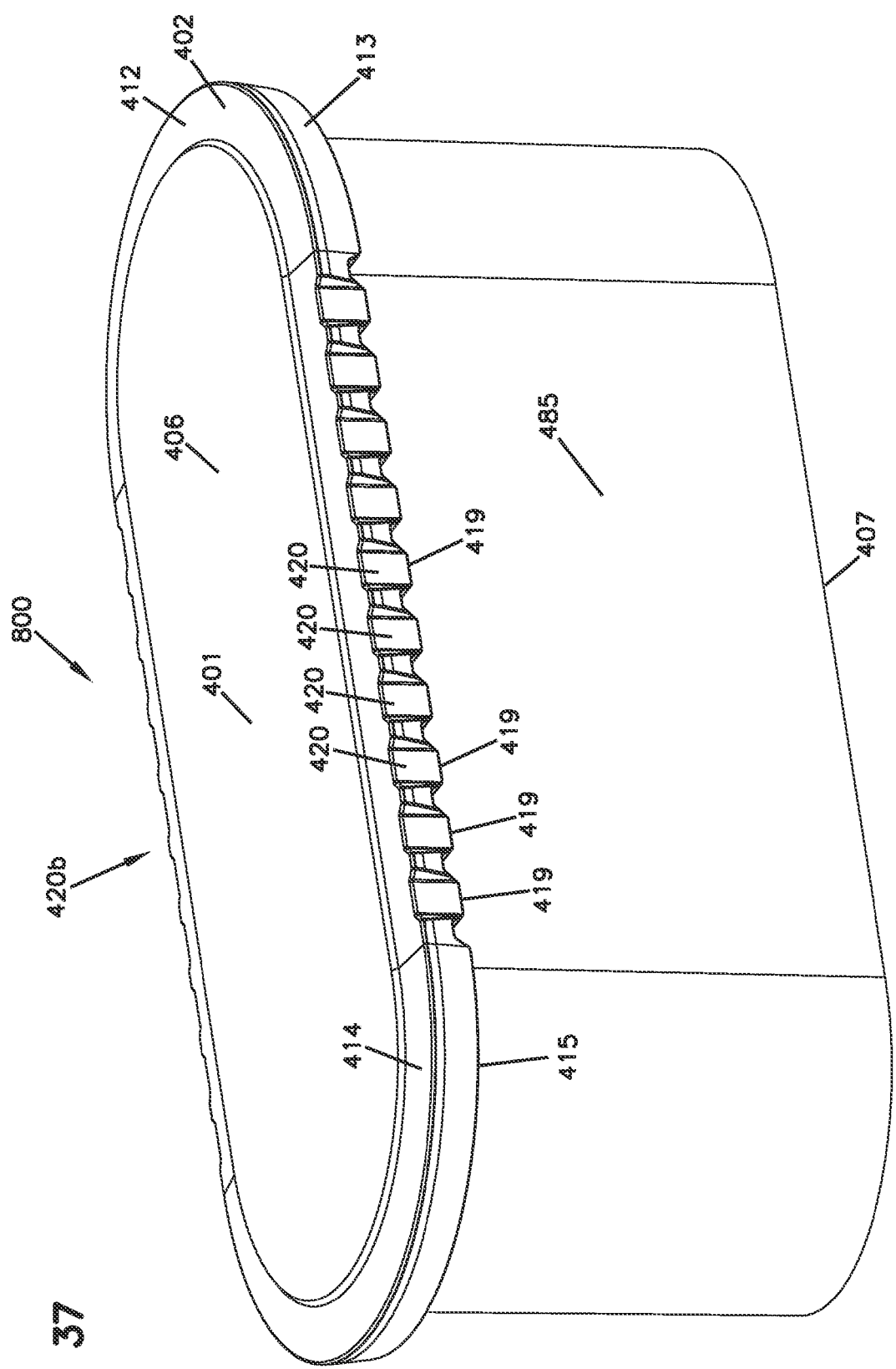
FIG. 37 is a schematic perspective view of a seventh embodiment of a filter cartridge according to the present disclosure.
Figure 38:
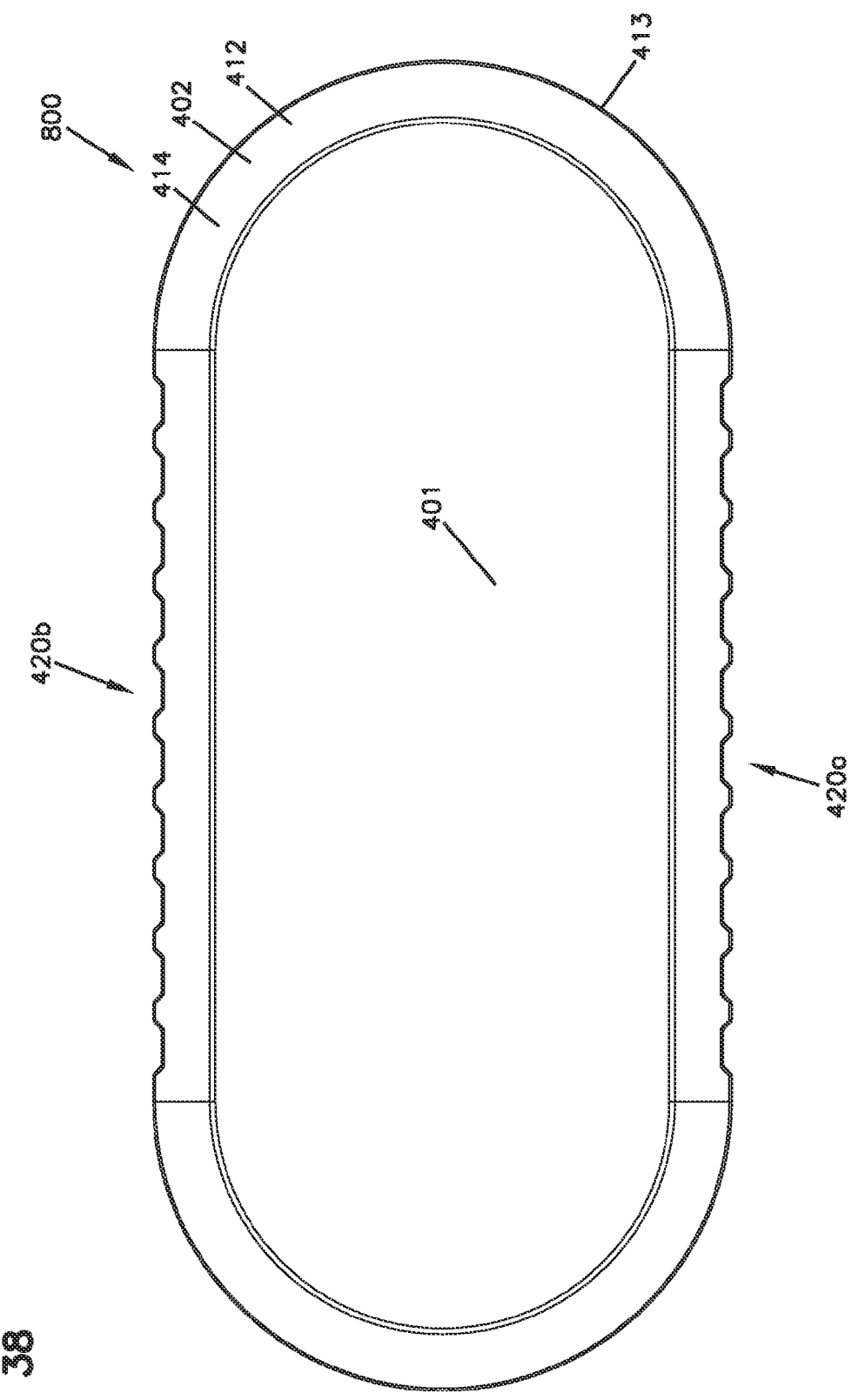
FIG. 38 is a schematic top plan view of the filter cartridge of FIG. 37.
Figure 39:
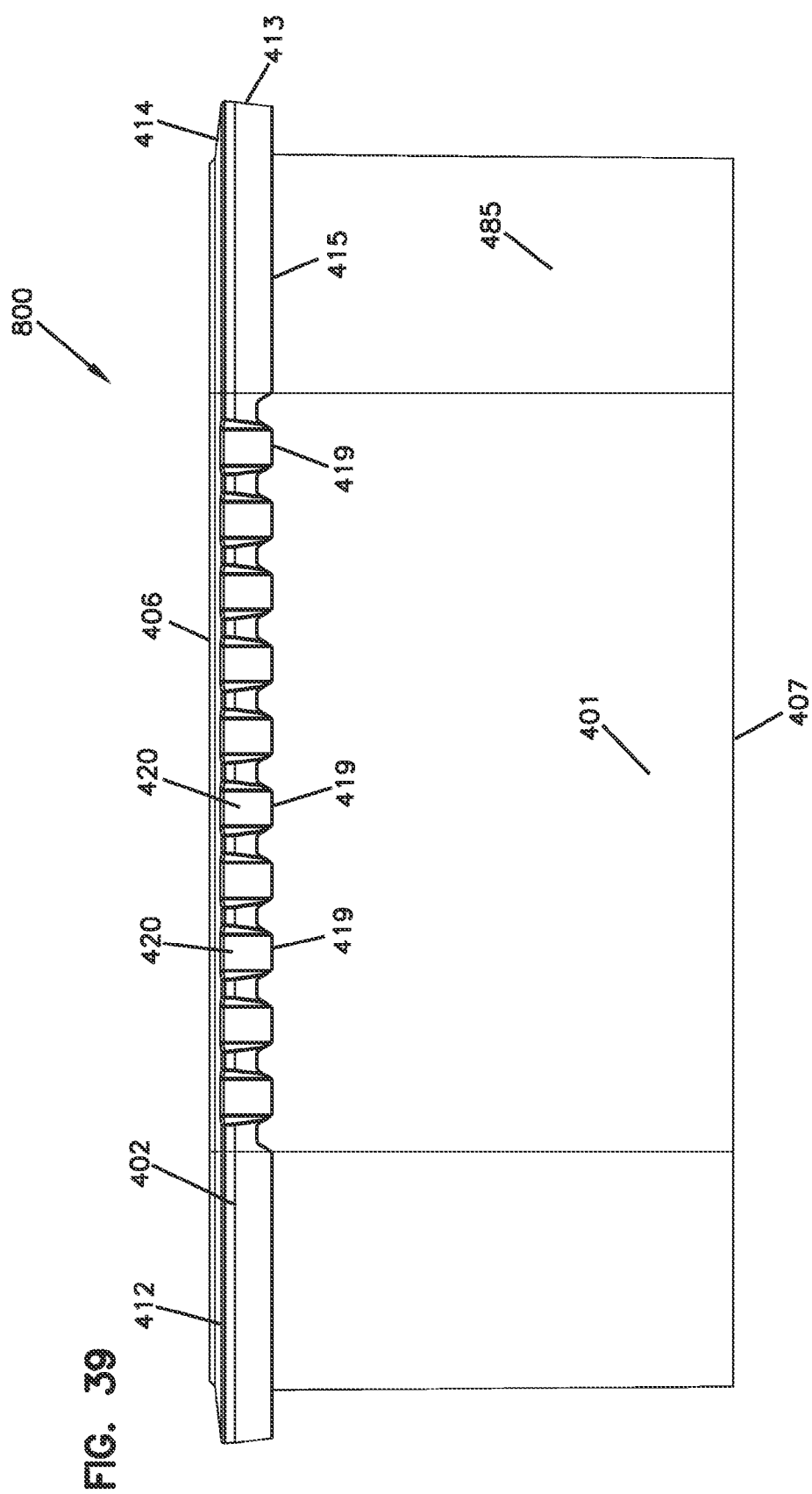
FIG. 39 is a schematic side elevational view of the filter cartridge of FIG. 37.
Figure 40:
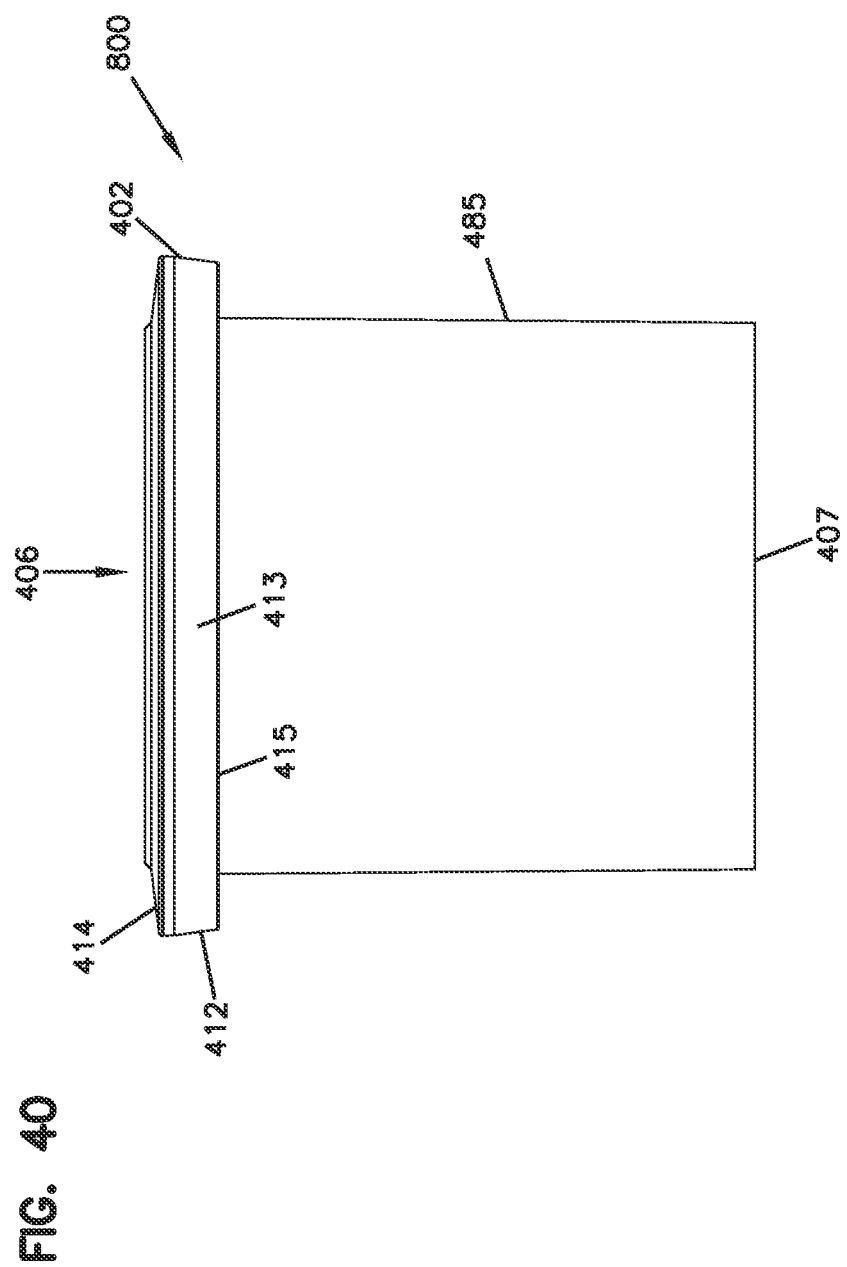
FIG. 40 is a schematic narrow or curved end elevational view of the filter cartridge of FIG. 39.
Figure 41:
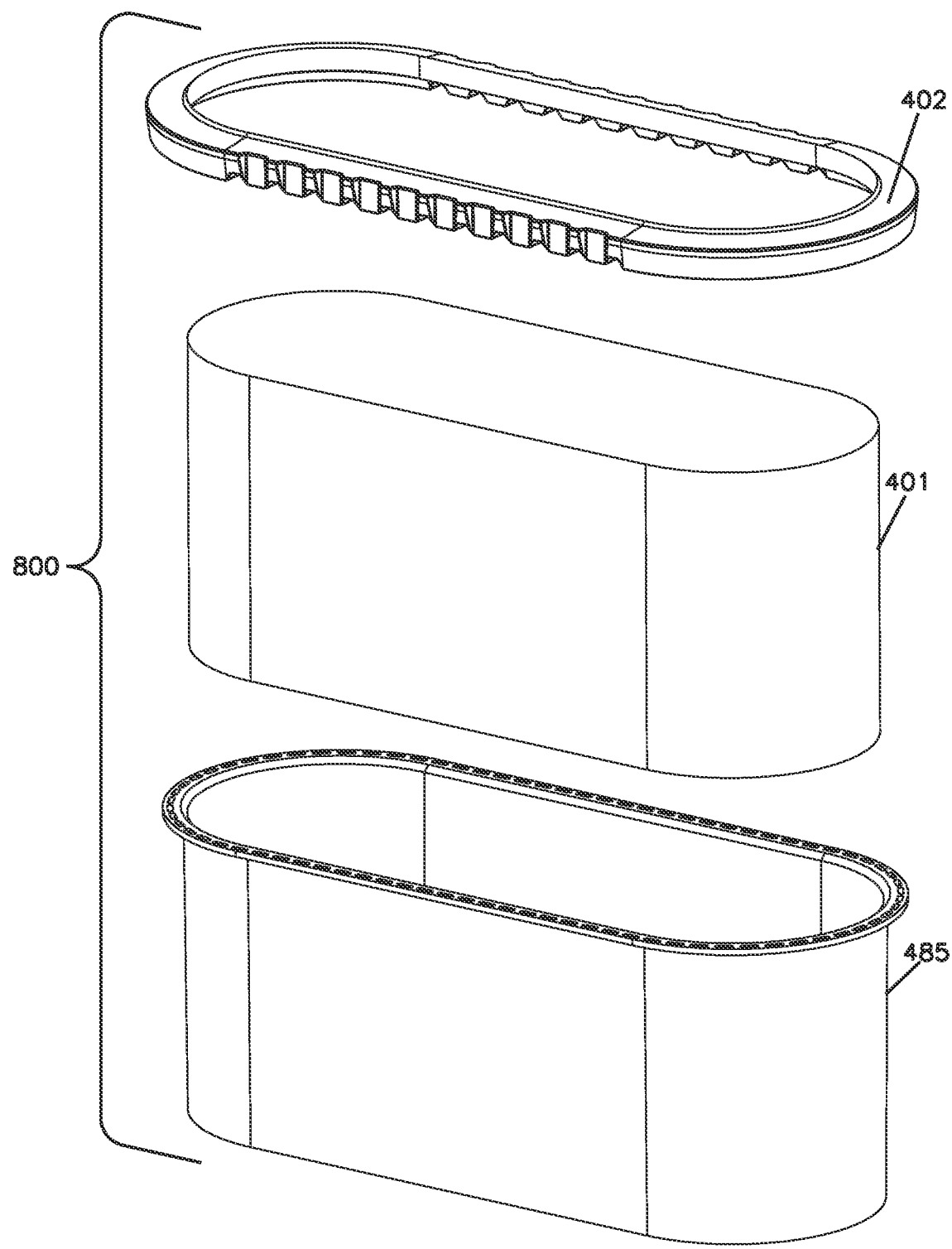
FIG. 41 is an exploded perspective view of the filter cartridge of FIG. 39.

The length of extension in a peripheral (perimeter) direction around the media pack, of any given recess section, for example, section 420a or 420b, FIG. 9, can be varied substantially. In FIG. 11, a relatively long extension is shown. In FIG. 37, relatively short extensions (but, multiple example of them) are shown. Typically, the length peripherally, i.e., in a perimeter direction, of the recess region will be at least 8 mm.

Typically, when the surface 415 includes steps, each step will have a length of extension over which it is relatively flat or straight, in a perimeter or peripheral extension relative to adjacent portion of the seal material. The length of this section will vary considerably, depending on the length of the step.

A variety of media or media pack definitions can be used. When the media pack has a straight side section. Often that straight side section will extend over a peripheral length of extension of at least 40 mm, often 50 mm or more.

In the example arrangements depicted, the seal arrangement 402 (comprising seal 412) is generally positioned adjacent one of the flow ends 406, 407. This is typical, but alternatives are possible.

Also, the peripheral seal 412 is generally depicted with a central plane therethrough extending generally perpendicularly to a direction between the flow surfaces 406, 407. This is typical, but alternatives with a central plane through the seal member 412 extending at an angle to surfaces 406, 407 are possible.

Typically, even the contoured surfaces 413, 415 of the seal arrangement have substantially flat, or relatively flat, planar sections. Often, in at least 10% of its total perimeter extension (usually at least 20%, often at least 50%) it is flat. These can comprise spaced sections.

Herein, when it is said that a projection arrangement or contour member is "peripherally discontinuous," or is similarly characterized, it is meant that the features do not extend peripherally completely around the media pack or other feature involved. Each of the depicted contour recesses in surface 413, and projections or steps in surface 415, are "peripherally discontinuous" in this context.

III. Selected Variations and Advantages

The principles described herein can be applied in a wide variety of applications. It has been shown how a projection member, (for example, step member or step arrangement) can comprise a single projection, in the axial direction, or multiple projections in an axial direction.

It has been shown that when multiple steps are used, they can be positioned around the cartridge periphery such that they are symmetrically positioned. That is, the cartridge can be rotated 180° around a central axis, and still align with the housing, due to symmetry of the seal arrangement and engaging portions of the housing. This may be desirable in some instances, when it is intended that the cartridge and housing be configured so that the cartridge can be installed in either of two rotational orientations.

However, in some instances, it may be desirable to construct the cartridge such that it can be only installed in a single orientation. When this is the case, asymmetry can be introduced into provide interference if an attempt is made to improperly (rotationally) install the cartridge. For example, if: (1) the arrangement of FIG. 9 is implemented with only the recess section 402a, and without the recess section 402b or with the recess section 402b being of different size, and/or only with the step arrangement in alignment with recess 402a and not in alignment with region 402b or with the steps not being mirror images; and, (2) the corresponding housing of similarly configured, the cartridge can only be installed in one rotational orientation around a central axis. This can be of particular assistance, in helping to ensure the right cartridge is installed. Also, in some instances it can be used to help obtain consistency of air flow from the exit ends of a population of cartridges, relative to any mass air flow sensor in the system, to lead to improved operation of the mass air flow sensor system.

In some arrangements described, the projection in the axial direction, (air flow direction), has generally been aligned with recess sections in the seal arrangement. While this is typical, alternatives are possible. In some instances, for example, a peripheral recess and a seal surface feature can be located at a different peripheral locations (i.e., different perimeter locations around the media pack).

In the arrangements depicted, the recess arrangement and step arrangements are shown along straight sections of the pinched seal member of the media pack. One or more can be located along curved section, if desired.

In the example depicted in FIG. 10A, the housing sections 462, 463 between which the pinch seal is compressed, comprise an inlet section and an opposite outlet section. This will be typical in many applications. However, as explained above, in some instances the inlet and outlet can be contained in the same housing section, with the housing configured such that an access cover can provide the pressure for sealing without itself also carrying the air flow inlet for the housing.

IV. Selected Additional/Alternate Embodiments and Features, FIGS. 50-85

A. General

In general, FIGS. 1-49 correspond to Figures included in U.S. Provisional 61/841,005, filed Jun. 28, 2013. The previous descriptions of those Figures generally conform to the disclosure of U.S. Ser. No. 61/841,005, although some variation in specific terminology and other editing has been made.

Herein, in FIGS. 50-85, additional embodiments are described, which relate to applications of the various principles characterized in U.S. Ser. No. 61/841,005. The additional embodiments help with understanding, on a broad basis, a wide variety of the types of practices that can be improved, using selected principles as characterized herein.

It is noted that the various principles discussed herein in connection with FIGS. 50-85 can be applied with the principles discussed in connection with FIGS. 1-49. That is, various selected features of any given embodiment can be applied in other embodiments, or be adapted for such application.

B. A First Additional Air Cleaner Assembly and Components, FIGS. 50-62*i*

In FIGS. 50-62*i*, an example additional embodiment of an air cleaner assembly, and components therefor, is provided. In FIG. 50, a perspective view of such an air cleaner assembly 1001 is provided. The air cleaner assembly 1001 comprises a housing 1002 with an internally received, serviceable, filter cartridge 1004. By "serviceable" in its context, it is meant that the filter cartridge 1004 is a replaceable part; i.e., it can be removed from housing 1002 and be refurbished or be replaced.

Still referring to FIG. 50, in general the housing 1002 defines an interior 1002*i* in which the cartridge 1004 is removably positioned. The housing 1002 generally includes an air flow inlet arrangement 1005 and an air flow outlet arrangement 1006. In the example depicted, the air flow inlet arrangement 1005 and the air flow outlet arrangement 1006 are such that each is depicted as having a single tube structure, although alternatives are possible. Also, in the example depicted, the air flow inlet arrangement 1005 is a side inlet; i.e., it extends through a side portion of the housing 1002. In contrast, outlet arrangement 1006 is shows as an end, axial, outlet arrangement. In this context, the term "axial" is generally meant to refer to a direction generally corresponding to a direction between opposite ends of the cartridge 1004; and, the term "side inlet" is meant to refer to an inlet that is generally directed for flow therethrough (of air) in a direction across the axial direction (whether orthogonal, as shown, or at another angle).

In general terms, the term "axial" end can be used to refer to a flow in a direction between the opposite ends of the cartridge. Although there may be some variations in the specific course of flow depending on the type media used, the "axial" flow direction can be generally characterized as being from the most upstream end of the cartridge to the most downstream end.

Alternative locations and/or flow direction alternatives for the inlet arrangement 1005 and outlet arrangement 1006 are possible, with the present techniques.

Still referring to FIG. 50, the housing 1002 depicted includes two sections, depicted as a housing bottom (or base or bottom or base section) 1008 and a removable access cover 1009. The access cover 1009 is removably secured to the base 1008, in the example depicted by over center latches 1010, although alternative connectors are possible. As will be understood from further descriptions, the particular access cover 1009 depicted is optionally configured to help direct air flow in a desirable manner, as the air enters the housing 1002 through inlet arrangement 1005.

Still referring to FIG. 50, it is noted that the inlet arrangement 1005 is positioned in the housing base 1008. Alternatives are possible. For example the inlet arrangement 1005 can be positioned in an alternate form of access cover.

In FIG. 51, an exploded perspective view of air cleaner assembly 1001 is depicted. The view of FIG. 51 generally shows parts of a completed air cleaner assembly 1001, that can be readily separated from one another in normal use. Thus, access cover 1009, serviceable filter cartridge 1004 and housing base 1008 are viewable.

It is noted that in FIG. 51, the assembly 1001 is depicted with no safety or secondary filter cartridge. The principles used in air cleaner assemblies according to the present disclosure can be applied in arrangements that do have a secondary or safety filter cartridge therein. Indeed, the seal features described can even be used on safety filters.

Also, referring to FIG. 51, it is noted the assembly 1001 is depicted without a precleaner. Precleaners of various types can be used with the principles of the present disclosure.

Still referring to FIG. 51, and especially the housing base 1008, it is noted that the base 1008 is depicted with an optional mounting pad 1012, by which the base 1008 (and the resulting assembly 1001) can be secured to equipment for use, leaving the access cover 1004 free for removal during servicing. The assembly depicted is particularly convenient, since both the inlet 1005 and outlet 1006 are attached to the housing base 1008. Thus, air ducts or tubes connected to tubes 1005 and 1006 do not have to be moved, when the access cover 1009 is removed for servicing.

Air cleaner assembly 1001 would typically be used as an engine (air intake) air filter assembly or air cleaner, for an internal combustion engine of a vehicle or other equipment. Of course, the principles characterized herein can be applied in a variety of alternate applications.

Still referring to FIG. 51, the air filter cartridge 1004 has a first and second, opposite, flow ends and comprises filter media 1015, which has first and second, opposite, ends (or flow faces) 1015*a* 1015*b*, which correspond to the cartridge flow ends with the media 1015 extending therebetween. Typically, when the assembly 1001 is as depicted, end 1015*a* is an inlet flow end, for unfiltered air, and, end 1015*b* is an opposite outlet flow end for filtered air, although an alternate flow direction is possible with principles characterized herein.

The media 1015 is depicted schematically, and without detail. It would typically comprise one of the media arrangements generally characterized herein above, typically having media flutes (or pleat tips) extending between the ends (or flow faces) 1015*a*, 1015*b*. Adjacent one or both of the ends or flow faces 1015*a*, 1015*b* the various flutes (or pleat tips) can be modified in shape, in accord with principles discussed above.

The particular filter cartridge 1004, depicted, comprises media 1015 configured in a shape with a first long cross-dimension and a second short cross-dimension, perpendicular to the long dimension. This is typical, but alternatives are possible. Also, the media 1015 is depicted with an oval outer perimeter shape. However, alternatives are possible, in accord with the above descriptions of usable media. This indicates a general principle, applicable with all embodiments characterized herein, i.e. alternatives are possible, including, for example, ones that are rectangular.

Referring to FIG. 51, the filter cartridge 1004 also includes housing seal arrangement 1020. The housing seal arrangement 1020 may be generally in accord with the seal arrangements described herein above. The particular example seal arrangement 1020 depicted is discussed herein below in more detail, in connection with other Figures.

Referring to FIG. 51, for the depicted embodiment, the housing sections 1008, 1009 are generally configured so that each has a portion which will engage housing seal arrangement 1020, during assembly, in a manner applying pressure axially (i.e. in the direction of flow through the housing (and cartridge 1004) during filtering) to the seal arrangement 1020, causing appropriate sealing with the housing 1002. The particular housing seal arrangement 1020 depicted, is an axial pinch seal, which is pinched between: a pressure flange 1022 on access cover 1009; and, a sealing shelf or flange 1023 on housing base 1008, during use. For the example depicted, pressure flange 1022 extends well into housing base 1008, during installation. Although, alternatives are possible, in the example depicted, the amount of this extension for flange 1022 is typically least 50 mm, usually at least 60 mm and often within the range of 80-200 mm.

In general terms, and although alternatives are possible, the example access cover 1009 depicted, comprises a side wall 1009s extending between pressure flange 1022 and access cover outer end 1009e. The access cover 1009 includes an air flow passage way or aperture arrangement 1025 in (through) sidewall 1009s, positioned for passage therethrough of air entering from inlet 1005. Further, the depicted access cover 1009 includes an end flow directing vane or curved flow-directing surface 1026, positioned to help turn lateral or side-directed air entering through aperture 1025 in a direction toward cartridge 1004, during use.

Figure 51A:
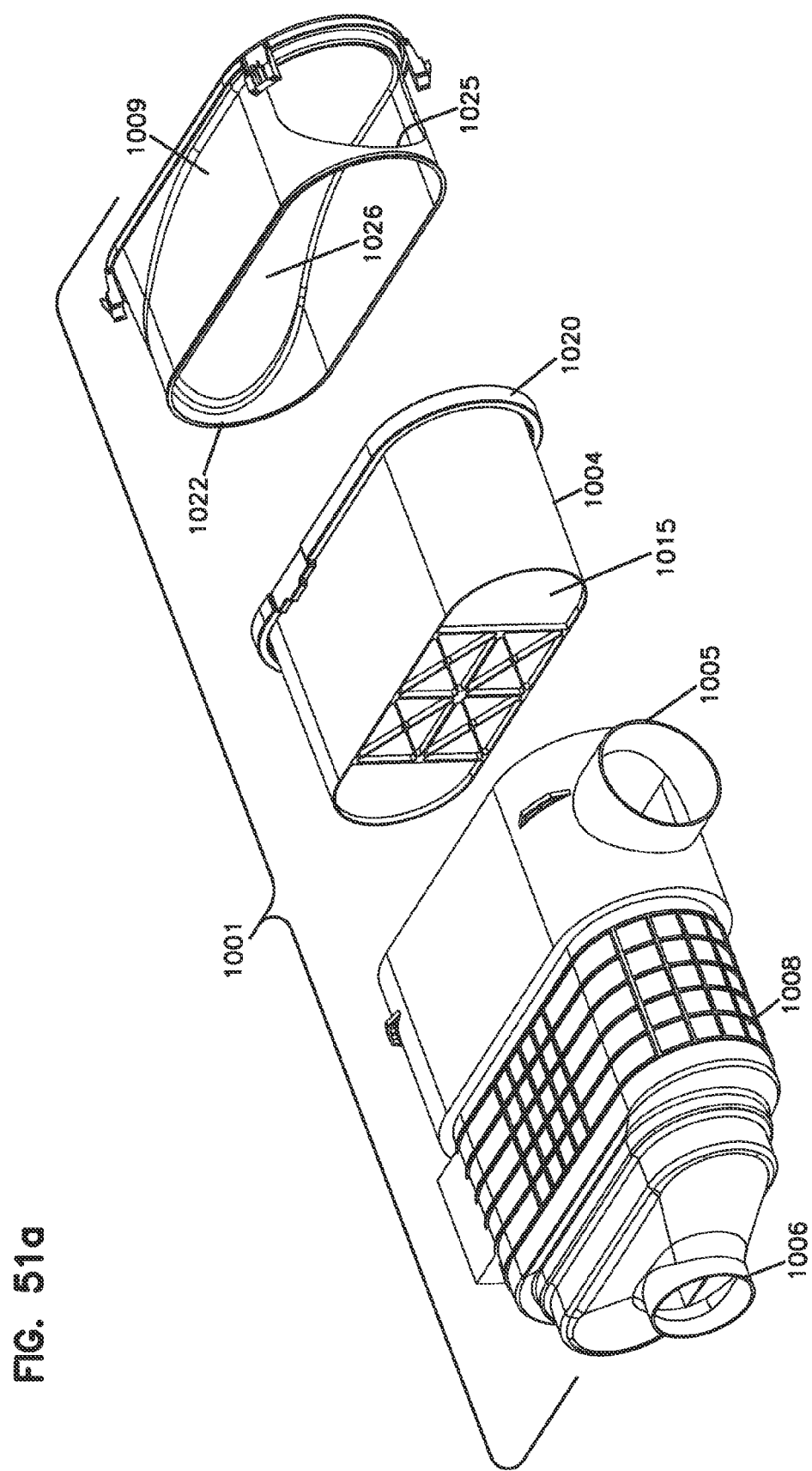
FIG. 51a is a second, exploded, perspective view of the air cleaner assembly of FIG. 50.

In FIG. 51a, a second perspective view of assembly 1001 is depicted. It is noted that the over-center latches 1010 are not depicted in FIG. 51a. The same reference numerals as used in FIG. 51 are used to indicate the same components. In FIG. 51a, the view is toward a "bottom" end of the components by comparison to FIG. 51, which is toward an opposite "top" end. (Of course the assembly can be oriented in use with the flow direction being horizontal).

Figure 51B:
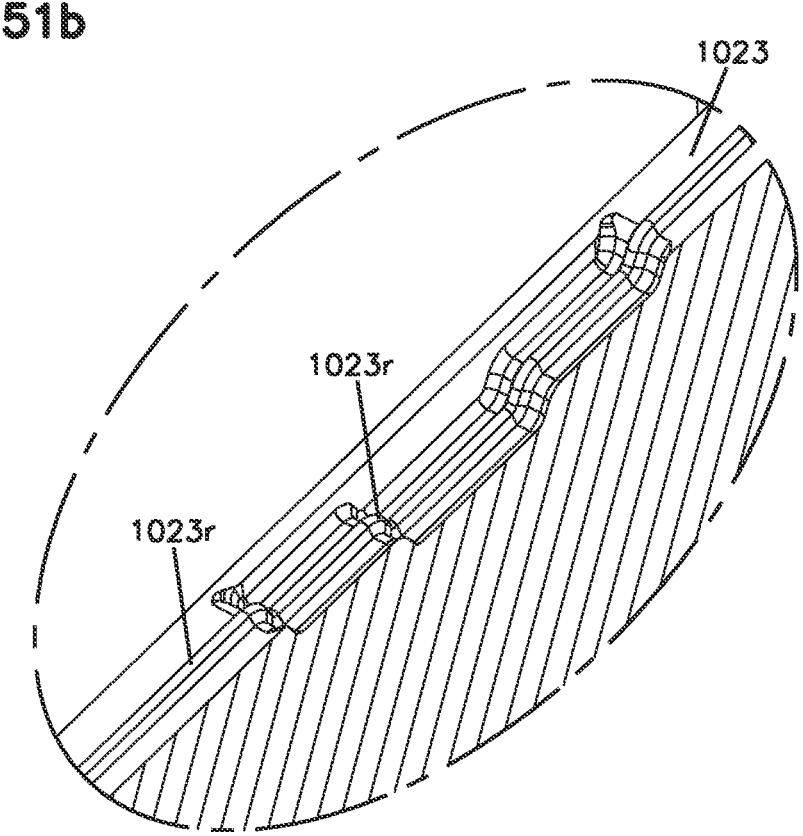
FIG. 51b is an enlarged, fragmentary, schematic perspective view of an identified portion of an air cleaner housing section of FIG. 51, with a portion broken away to show detail.

In FIG. 51b, an enlarged (schematic) fragmentary view is shown of a portion of the housing base 1008, identified in FIG. 51 at 51b, with portions broken away. In particular what is viewable is a portion of the sealing shelf or sealing surface 1023 against which the housing seal arrangement 1020 is pressed during sealing. This portion is discussed further herein below.

In FIG. 52, a top plan view of the air cleaner assembly 1001 is provided; the view being taken toward access cover 1009. Latches 1010 can be seen securing the housing section comprising access cover 1009 to the housing section comprising base 1008, FIG. 50, (i.e. to a remainder of the housing 1002).

In FIG. 53, a schematic (long-dimension) cross-sectional view taken generally along line 53-53, FIG. 52 is provided. Here, the cartridge 1004 can be viewed as operably (and removably) positioned within the housing interior 1002i. The flow directing vane or surface 1026 can be seen tapering or extending (turning) toward end 1015a, as it extends away from the inlet 1005, to helping direct (turn) inlet air (from inlet 1005) toward (into) end or face 1015a of the media 1015. The particular surface 1026 depicted is an arcuate, curved, surface, but alternatives are possible.

The air will travel axially through leaving 1002, to be filtered as it passes through the media 1015 and exits through flow end (or face) 1015b, and eventually outlet 1006. Again, the media 1015 is depicted schematically, and any of the variety of the media arrangements characterized herein can be used. In FIG. 53, note the housing seal arrangement 1020 being engaged by pressure flange 1022 and being biased against housing surface 1023, for sealing.

As will be understood from FIG. 53, and the previously described FIGS. 50-52, for the example assembly 1001 depicted, the cartridge 1004, and the housing 1002, have a "long cross-dimension" (or long dimension) and a "short cross-dimension" (or short dimension) Herein the term "long cross-dimension", and variants thereof, is meant to include a dimension generally corresponding to the longer internal cross-dimension (generally perpendicular to axial flow) of the housing and/or cartridge. The term "short cross-dimension", and variations is meant to refer to a cross-section taken generally perpendicularly to the long dimension (usually when the media is widest in this dimension) and still generally perpendicular to axial flow.

In FIG. 53a, an enlarged fragmentary view of an identified portion of FIG. 53 is shown. Here, housing seal arrangement 1020 can be more clearly seen biased by pressure flange 1022 against housing shelf or sealing surface 1023 for sealing. Optional rib 1023r, analogous to ribs previously described herein, can be used in surface 1023 to facilitate sealing.

Figure 54:
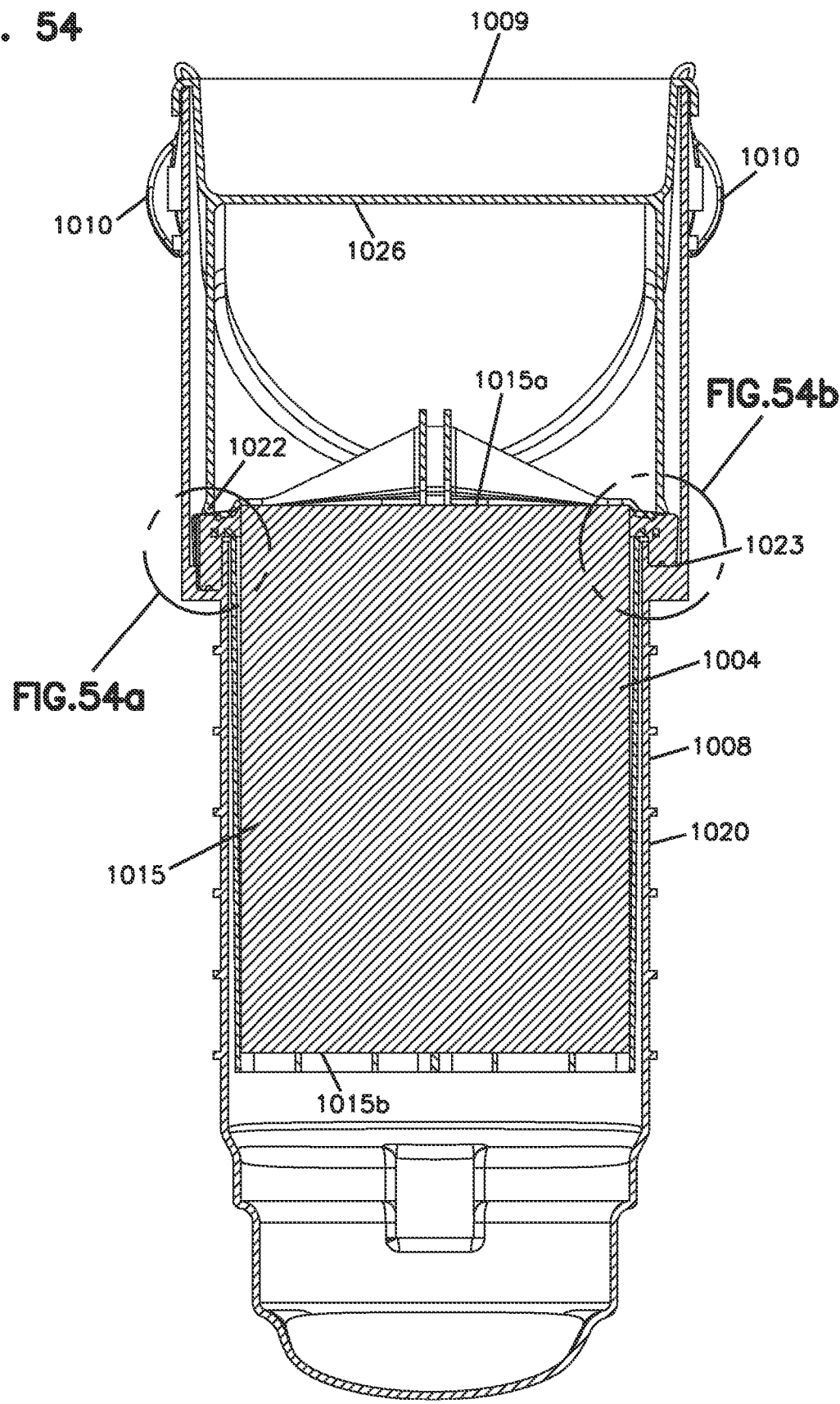
FIG. 54 is a second schematic, cross-sectional view of the air cleaner assembly of FIGS. 50 and 51, taken generally along line 54-54, FIG. 52.

In FIG. 54, a short-dimension cross-sectional view taken generally along line 54-54, FIG. 52 is shown; selected features previously characterized herein and/or described herein below being indicated by like reference numerals.

In FIG. 54a, an enlarged fragmentary cross-sectional view of an identified portion of FIG. 54 is shown. In FIG. 54a, a cross-sectional view is taken through a contoured section of the housing seal arrangement 1020. Contoured sections are discussed further herein below. In general reference to FIG. 54a, one can see pressure flange 1022 biasing housing seal arrangement 1020 against housing seal surface or shelf 1023, and also against optional rib 1023r, in the housing base 1008.

In FIG. 54b, an enlarged fragmentary schematic cross-sectional view of a second identified portion of FIG. 54 is shown. Here, the cross-section is taken through a non-contoured portion of section of the housing seal arrangement 1020. Here, again, pressure flange 1022 and access cover 1009 can be seen biasing the housing seal arrangement 1020 axially against seal surface or shelf 1023 (and optional rib 1023r) in the housing base 1008.

Figure 54C:
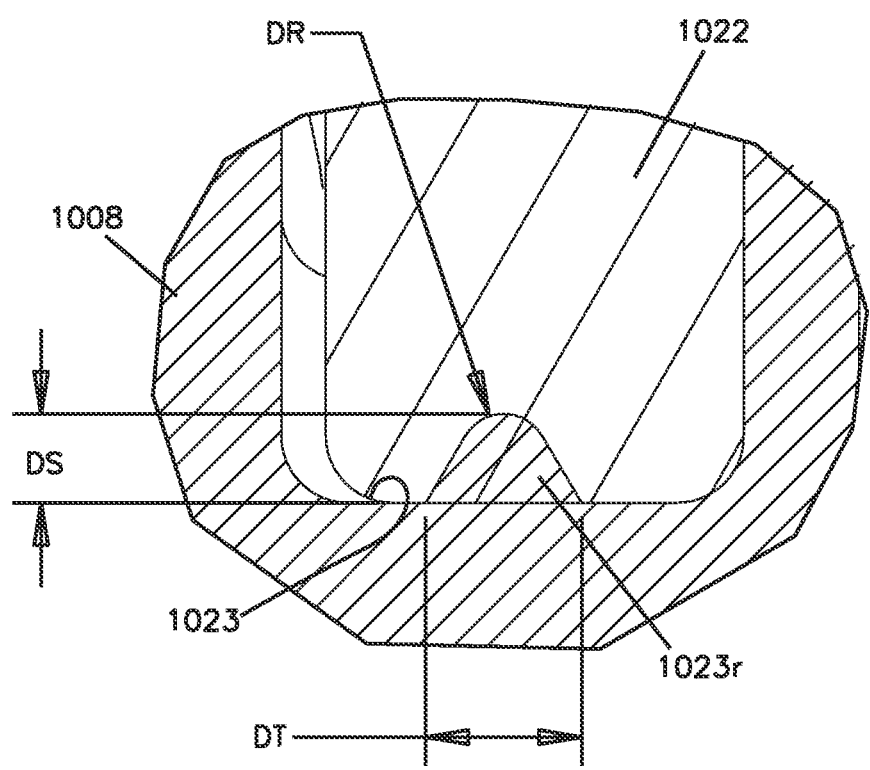

FIG. 54c, an enlarged fragmentary view of an identified portion of FIG. 54a is shown. Here, in enlarged fragmentary view, the optional rib 1023r on the seal surface 1023 can be seen with housing seal arrangement 1022 pressed into engagement therewith, to facilitate sealing.

Figure 55:
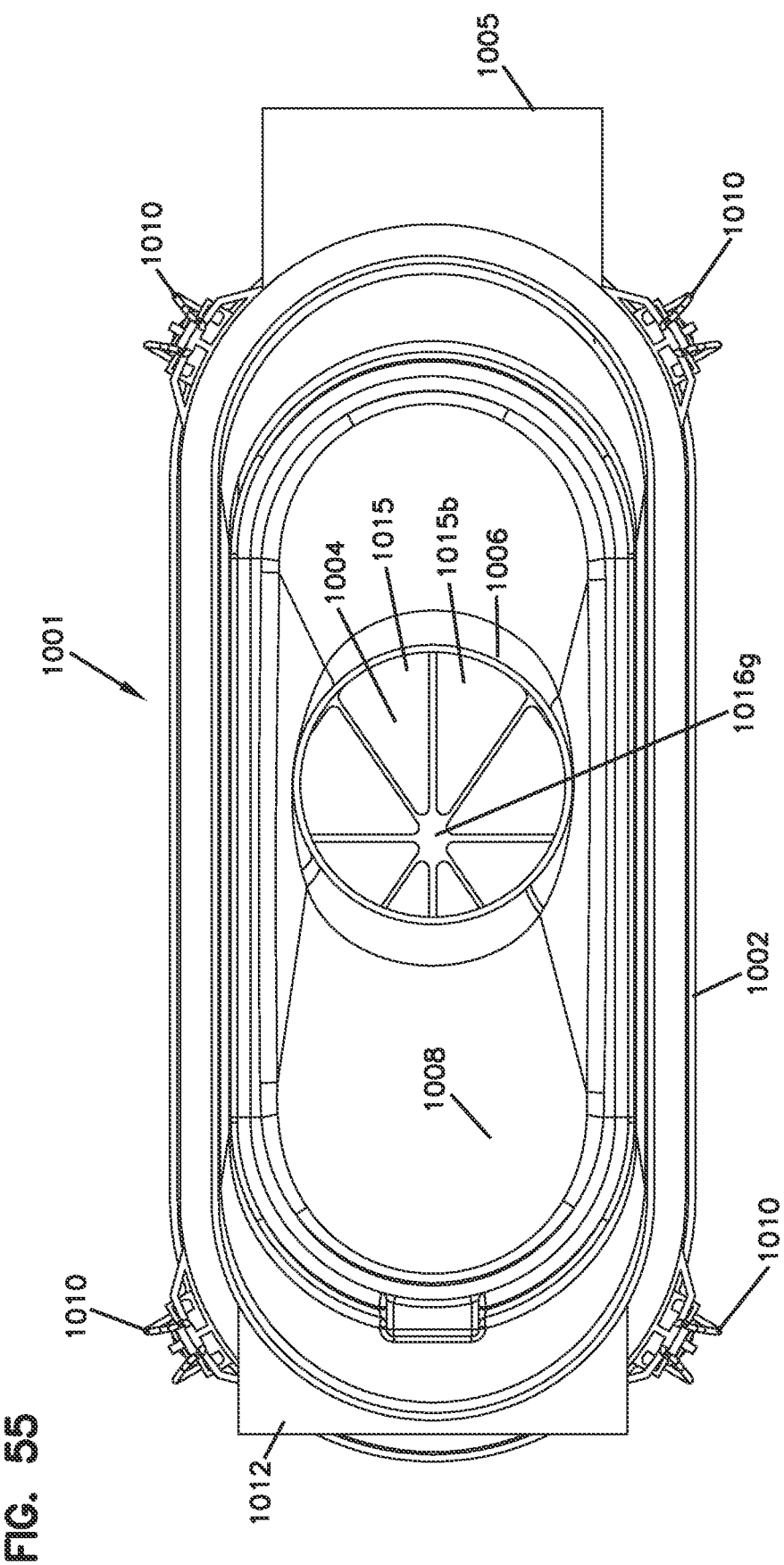
FIG. 55 is a schematic bottom plan view of the air cleaner assembly of FIGS. 50 and 51.

In FIG. 55, a bottom plan view of air cleaner assembly 1001 is provided. Here, a portion of cartridge 1004 is viewable through outlet 1006. It can be seen that this portion, which corresponds to end 1015b of media 1015, includes an optional grid 1016g thereacross, discussed below.

Figure 56:
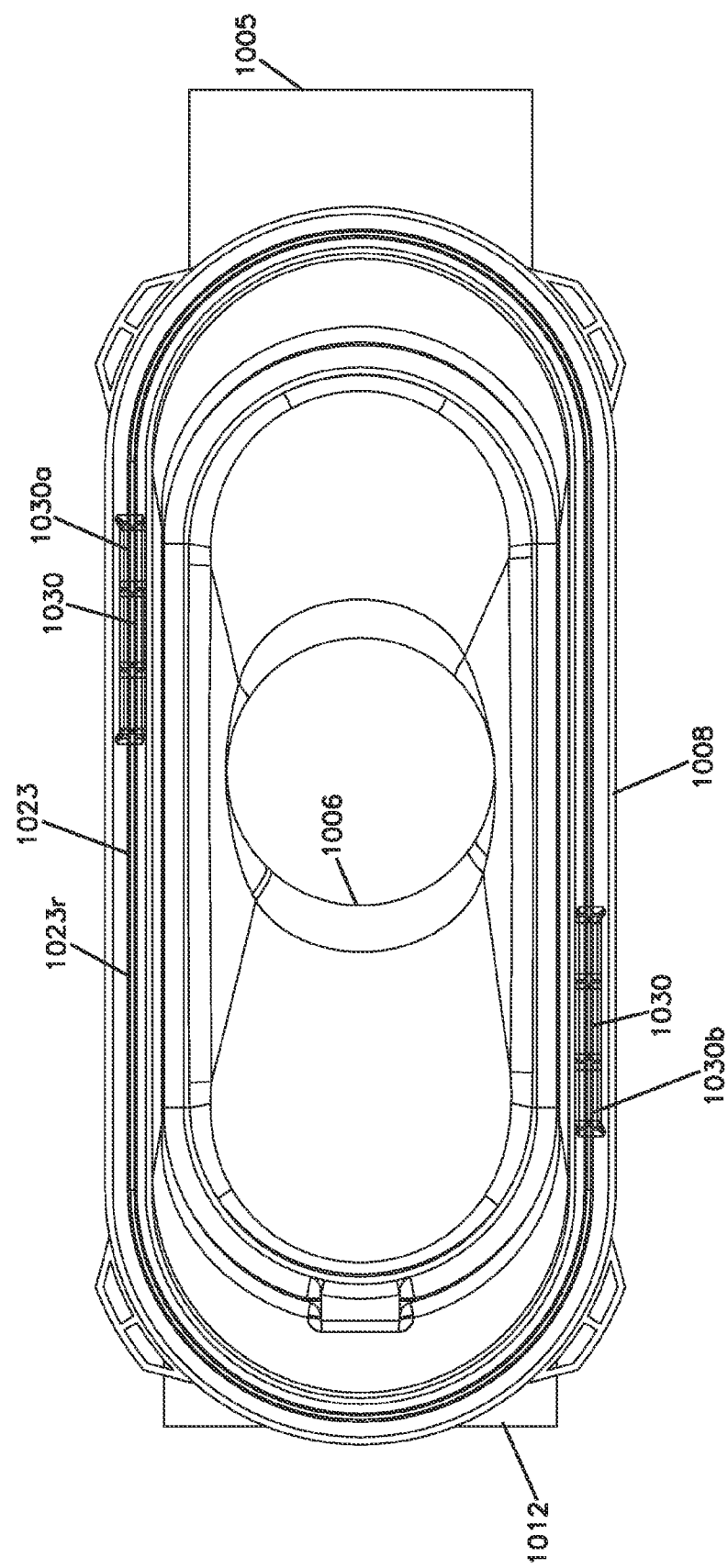
FIG. 56 is a schematic top plan view of a housing base or bottom section of the air cleaner assembly of FIGS. 50 and 51.

In FIG. 56, top plan view of the housing base 1008 is provided, with no cartridge installed. Here, surface 1023 with optional rib 1023r is shown. It is noted that surface 1023 is contoured and thus includes a contoured member of a contoured, housing, projection/recess sealing arrangement therein at 1030a. In the example depicted, the contour member 1030 is provided in two contoured sections 1030a, 1030b, although alternatives are possible. These sections are configured to sealingly mate with appropriate contoured portions of the housing seal arrangement 1020 on the cartridge 1004, as discussed further below (and as generally is in accord with the principles described previously herein for other embodiments).

Figure 57:
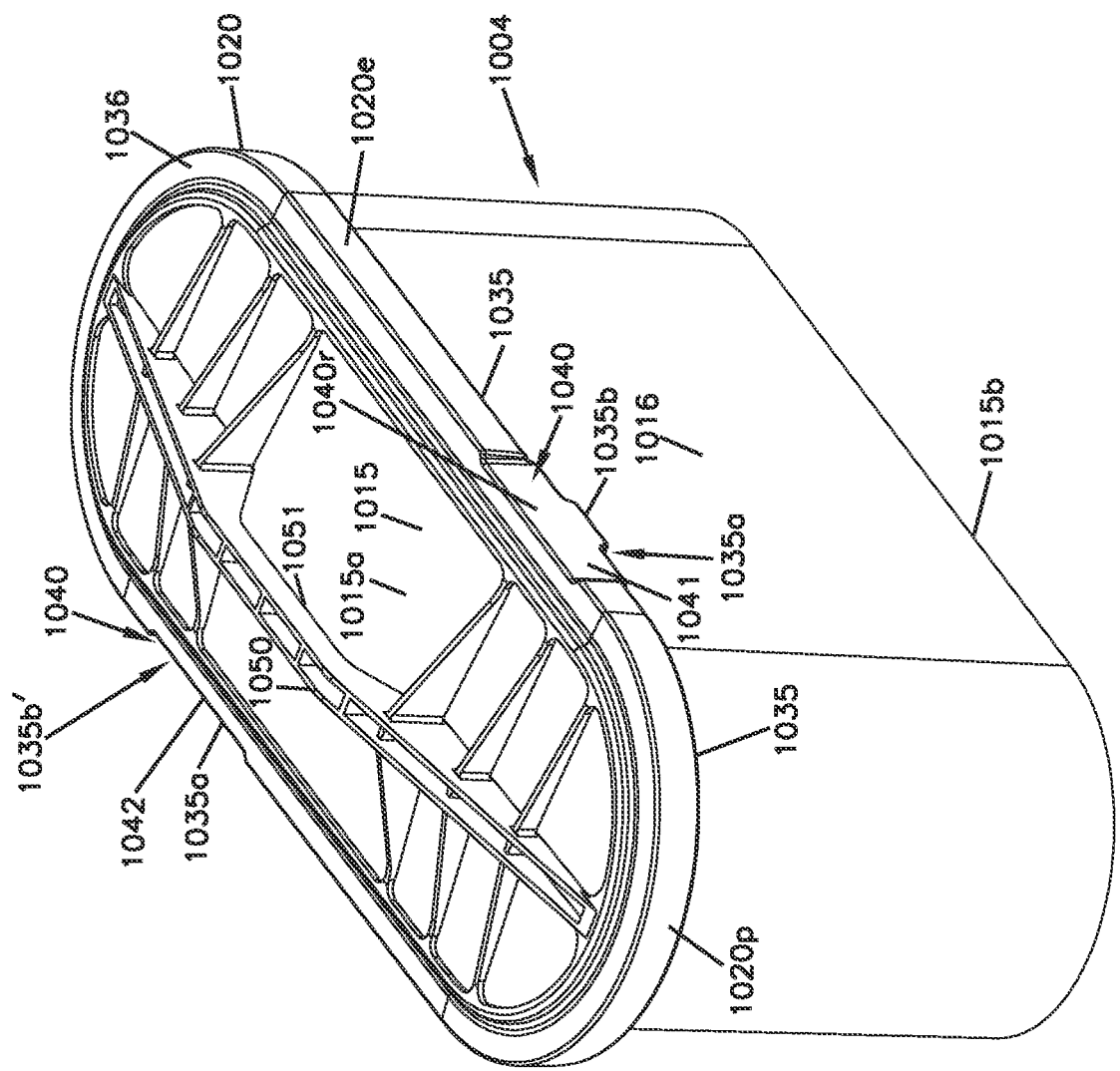
FIG. 57 is a schematic, enlarged perspective view of a filter cartridge usable in the assembly of FIGS. 50 and 51.

In FIG. 57, a perspective view of cartridge 1004 is depicted. Again, the cartridge 1004 comprises media or media pack 1015 having media extending between opposite ends (or flow faces) 1015a, 1015b. The media 1015 would generally comprise one of the types of media characterized herein; typically having media ridges extending between opposite flow ends (or faces) 1015a, 1015b. The media ridges may be in the form of flutes (for example: as single faced flutes or, as pleats) depending on the type of media involved.

As discussed previously, the particular media 1015, depicted is shown with a generally oval outer peripheral (or perimeter) shape, although alternatives are possible.

In FIG. 57, the cartridge 1004 is depicted with a shield, sheath or shell 1016 extending around the media 1015 in extension from seal arrangement 1620 to end 1015b, i.e. between (or nearly completely between) ends 1015a, 1015b. Alternatives are possible, including cartridges with no shield or a partial shield. When used, typically the shield extends over at least 80% of an axial dimension of the media, usually at least 90% of this dimension.

As indicated previously, the cartridge 1004 includes a housing seal arrangement 1020 thereon. The housing seal arrangement 1020, generally, includes the first axial seal housing engagement surface thereon. An example such surface is indicated generally at 1035. It is this first axial seal housing engagement surface 1035, which is generally configured to sealingly (and advantageously) engage a selected housing surface 1023 in use. The particular first axial seal housing engagement surface 1035 depicted, generally includes a contoured axial seal surface section 1035a, having a first member of a contoured housing engagement projection/recess member 1035b thereon. This member 1035b is a contour member configured to engage a matching or mating contoured surface portion of the housing, an example being indicated in FIG. 56 at 1030b.

The particular contoured portion or section 1035b depicted, comprises a contoured section configured as a stepped region generally analogous to ones discussed herein above, and as discussed further herein below.

It is noted that the contour member 1035a, for the arrangement depicted, comprises two, spaced, contoured members or sections 1035b, 1035b' positioned along opposite sides of cartridge 1004. Although this is typical, alternatives (for example only one contour section or more than two) are possible.

Herein, the terms "contour", "contoured" "contouring" and variants thereof, when used in connection with an axial sealing surface of a housing seal arrangement, or a corresponding axial sealing surface for engagement with a housing, is meant to refer to an axially directed contouring positioned along a direction of extension generally peripheral to the cartridge, i.e. in a perimeter direction. The contoured sections generally include non-contoured portions therein, for example when shaped in a stepped manner as previously discussed. In some applications, contoured section, when measured over a distance between where each contoured section starts and to where than contoured section ends (all sections being added together) is typically relatively short, by comparison to a total extension of the surface in which it is positioned, in peripheral extension, around the media. While this is not required, it is typical in many instances. Usually the contoured sections, when measured in this manner, in total comprise no more than 50% of the total perimeter extension of the seal surface in which they are positioned, usually no more than 40%, often no more than 30%, and in some instances no more than 20%.

For the example cartridge 1004, depicted, the housing seal arrangement 1020 comprises an axial pinch seal arrangement or member 1020p, similar to previously described embodiments, and having first and second, opposite (axially directed) axial surfaces 1035, 1036. In the example depicted, surface 1036 is generally smooth and featureless, i.e. is non-contoured, in extension around the media 1015. This is typical for an arrangement in which surface 1035 is part of a molded-in-place member and is a downstream and more critical sealing surface, and surface 1036 (which is also part of a molded-in-place member) is engaged by the access cover at an upstream location, with sealing not being required or being as critical. Alternatives, of course, are possible.

Still referring to FIG. 57, the housing seal arrangement 1020, depicted, includes a peripheral perimeter edge or edge surface, indicated at 1020e that extends around the media 1015 at a location between surfaces 1035, 1036. Peripheral perimeter edge surface 1020e optionally includes a first member of a peripheral edge projection/recess contour therein, indicated generally at 1040. In the example depicted, the contour member 1040 is a recess member 1040r, although alternatives are possible. The particular recess member 1040r, depicted, comprises two sections 1041 and 1042 in perimeter edge 1020e, although alternatives (for example only one section or more than two sections) are possible.

Herein above, contouring in surface 1035 was generally characterized and can be understood to be a form of "axial contouring." The contouring in perimeter edge 1020e is generally not axial, but rather is typically referred to as "peripheral", "perimeter" or "peripheral perimeter" (edge) contouring and is generally in a direction orthogonal to axial contouring. Typically, a total length of contouring (length of contoured section added together) in the peripheral or perimeter edge 1020e is, in many applications, not a majority of the total extension of perimeter extension or perimeter extension at edge 1020e, i.e. is not more than 50% of that extension, usually not more than 40%, typically not more than 30% and in some instances no more than 20%, although alternatives are possible. As with axial contouring, the dimension indication of the amount of extension of a given contoured section is meant to be a distance from where the contoured section starts, to where that contoured section ends, and may include, within a contoured region, sections that are, themselves, flat and not contoured.

It is noted that for the particular example depicted, axial contour section 1035a is axially aligned with peripheral edge projection/recess (prescribed or perimeter) contour 1040. By this it is meant that the contour member or section 1035a with two sections 1035b, 1035b' is positioned in the same portion of the housing seal arrangement 1020, as the peripheral edge projection recess contour 1040 (reflected in sections 1041a and 1042, respectively). This is typical, for reasons indicated herein, but alternatives are possible.

Still referring to FIG. 57, the cartridge 1004, depicted, includes a handle arrangement 1050 thereon. The handle arrangement 1050, for the example cartridge 1004 depicted, is described in detail further herein below. In general, it includes a central bridge 1051 that extends over a central portion of the media 1015 (or face 1015a) allowing a person to get a portion of their fingers under the bridge 1051 to grasp the cartridge 1004 during servicing. Further, the particular handle 1050 depicted, is positioned with a peripheral portion disposed proximate the media (relative to the handle bridge) embedded within a portion of the perimeter housing seal arrangement 1020. This is a particularly convenient arrangement, when the housing seal arrangement 1020 comprises a molded-in-place section that has the axial sealing surface 1035 thereon.

In general, the type of handle arrangement 1050 depicted in the example cartridge 1054 of FIG. 57, will sometimes be referred to herein as a center bridge (or center bridge handle arrangement) because the handle includes a portion 1051 (that extends over the media end or face 1015*a*) under which a person can put portions of fingers. However, it is noted that the alternate handle arraignments, for example, ones of the type characterized herein above in connection with other figures can be used with cartridges otherwise in general accord with cartridge 1004.

In the example assembly indicated, the handle arrangement 1050 is positioned approximate the same end of the cartridge, as the housing seal arrangement. Further, the handle arrangement is configured so that, preferably, there is no portion of the handle arrangement or preform structure on which it is positioned, located between the bridge and the media. Further, typically, when used with the preferred techniques herein, the handle arrangement is not attached to any structure around which the media is positioned. Indeed preferably the media (when it comprises a fluted sheet secured to a facing sheet, and is coiled) is not coiled around any preformed structure. Further, with typical preferred handle arrangements characterized herein, no portion of the housing seal arrangement comprises a radially directed seal. Of course, alternatives to each of these are possible.

Figure 58:
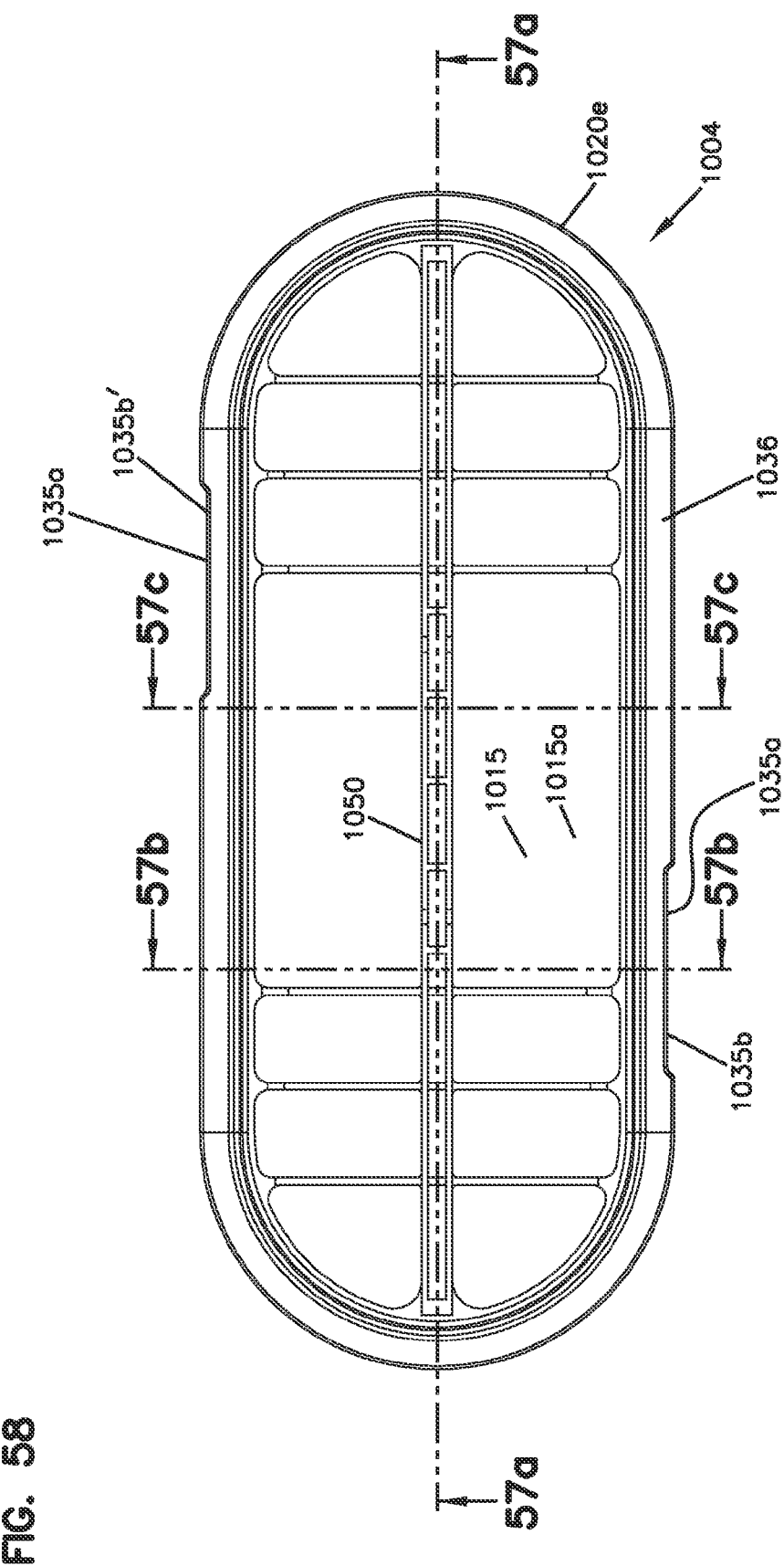
FIG. 58 is a top plan view of the filter cartridge of FIG. 57.

In FIG. 58, a top plan view of the cartridge 1004 is depicted. Features previously characterized herein or as characterized below, are indicated by like reference numerals.

Attention is now directed to FIG. 57*a*, a long-dimension cross-sectional view taken generally along line 57*a*-57*a*, in FIG. 58. In FIG. 57*a*, media 1015 is schematically depicted, with opposite flow ends (or flow faces) 1015*a*, 1015*b*. Handle arrangement 1050 with center bridge 1051 is viewable. Also viewable is the housing seal arrangement 1020 in cross-section. It is noted that the cross-section of FIG. 57*a* is taken through portions of the housing seal arrangement 1020 that do not comprise contoured regions or sections. Indeed, the regions through which the cross-section is taken in FIG. 57*a*, are regions in alignment with narrow ends of the media 1015 and not the sides. Although contouring can be positioned in these regions, in many applications it will be preferred to have contouring only alongside sections (especially ones which are straight) rather than the end sections (especially ones which are curved) for convenience of manufacture and assembly.

Referring to FIG. 57*a* it can be seen that the example cartridge 1024 includes an optional sheath or shell 1016 that extends around the media 1015. Further, the shell 1016 includes optional bottom grid 1016*g* that extends across, and in support of, end 1015*b* of the media 1015. Further, the shell 1016 includes a peripheral (or perimeter) flange or seal support 1016*f* on which the housing seal arrangement 1020 is positioned for support. The flange 1015*f* may include optional flow apertures therethrough for resin flow during formation of molded-in-place parts of 1020.

Still referring to FIG. 57*a*, it can be seen that the handle 1050 includes a peripheral portion 1050*p*, proximate the media, relative to the bridge, embedded within a molded-in-place portion of the seal arrangement 1020. This will be a convenient way of securing the handle 1050, when it is preformed, to the cartridge 1004 (when a molded-in-place housing seal arrangement is used).

Figure 57B:
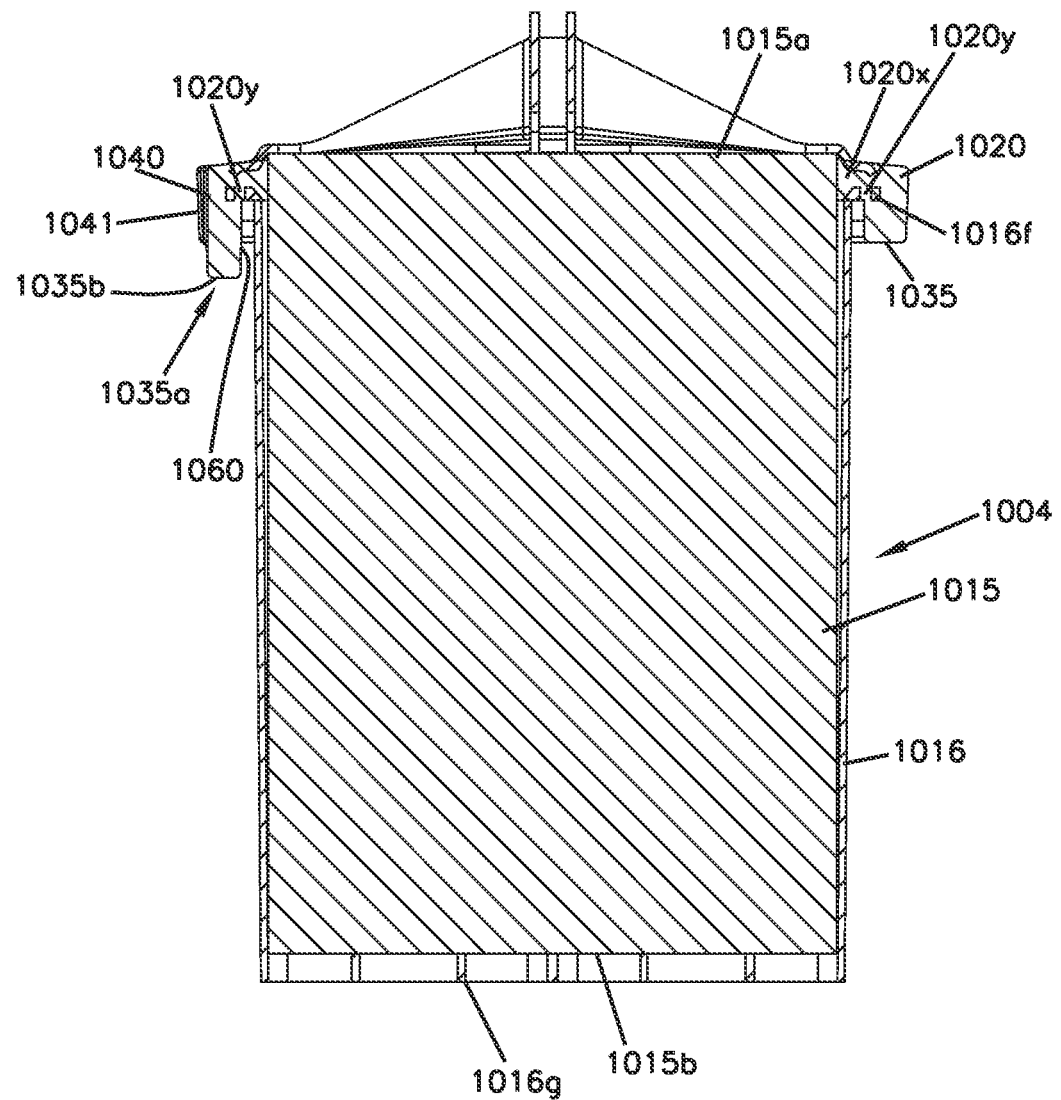
FIG. 57b is a schematic, short dimension, cross-sectional view taken generally along line 57b-57b, FIG. 58.

In FIG. 57*b*, a schematic, cross-sectional view is shown, in this instance a short dimension cross-sectional view, taken generally along 57*b*, 57*b*, FIG. 58. Here, apertures in flange 1016*f* can be seen in cross-section. Also referring to housing seal arrangement 1020, in contoured surface 1035 the cross-section is taken through a contoured portion 1035*a*, in particular through portion 1035*b*. It can be seen that this contour portion (similarly to contoured portions characterized herein in certain other embodiments), is a portion projecting away from end or end surface 1015*a* and toward end or end surface 1015*b*.

Optional receiver recess (or trough) 1060 (in particular portion 1041) located between a portion of seal arrangement 1020 and the media 1015 can be viewed. This optional receiver recess 1060 can be as generally characterized herein above in connection with other embodiments. It can provide that seal arrangement 1020 will project into a trough in the housing, when installed. This is shown in FIG. 54*a*, with seal 1020 projecting into a housing through, if desired at surface 1023, outer housing surface 1008*y* and inner flange 1008*x*.

Referring to FIG. 57*b*, at 1020*x*, a portion of molded-in-place material of housing seal arrangement 1020, that secures the housing seal arrangement 1020 directly to the media 1015 is shown. This also can be in accord with arrangements characterized herein above. It is noted that in order to conveniently accommodate section 1020*x* securing the housing seal arrangement 1020 directly to the media 1015, shell 1016 stops a little short of end face 1015*a*. This will be typical in many applications, but alternatives are possible.

In FIG. 57*b*, attention is directed to material from which the housing seal arrangement 1020 is molded, in the regions 1020*y*. In these regions, the resin material to be molded-in-place to form housing seal arrangement 1020 is shown having flowed through apertures in flange 1016*f* prior to full cure.

Figure 57C:
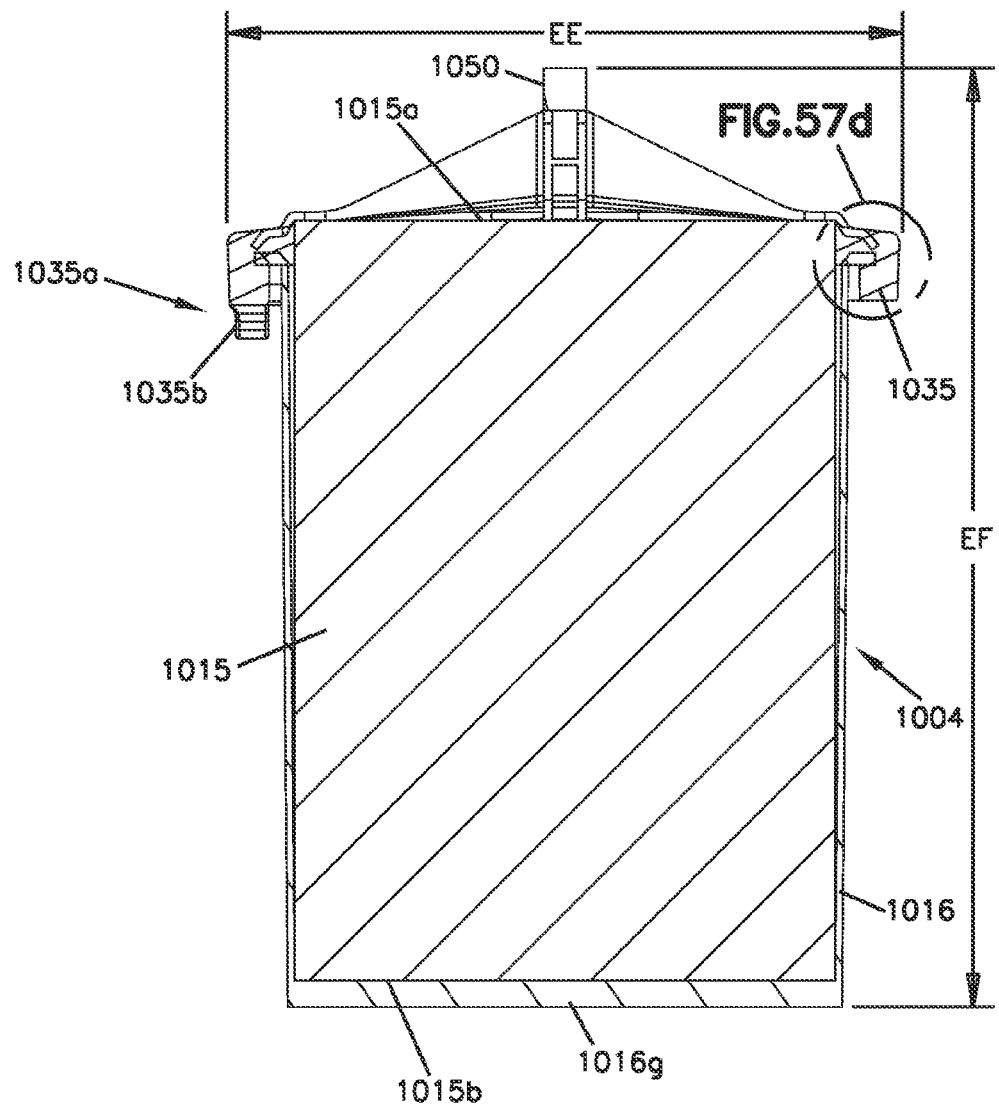
FIG. 57c is a schematic short dimension cross-sectional view of a cartridge of FIG. 57, taken generally along line FIG. 57c-57c, FIG. 58.

Attention is now directed to FIG. 57*c*. Here, a short-dimension cross-section, indicated in FIG. 58*a* at line 57*c*-57*c*, is taken through two portions of the housing seal arrangement 1020, neither of which comprises a contoured section. However, one of the contoured sections 1035*b* is viewable in FIG. 57, beyond where the cross-section occurs.

Figure 57D:
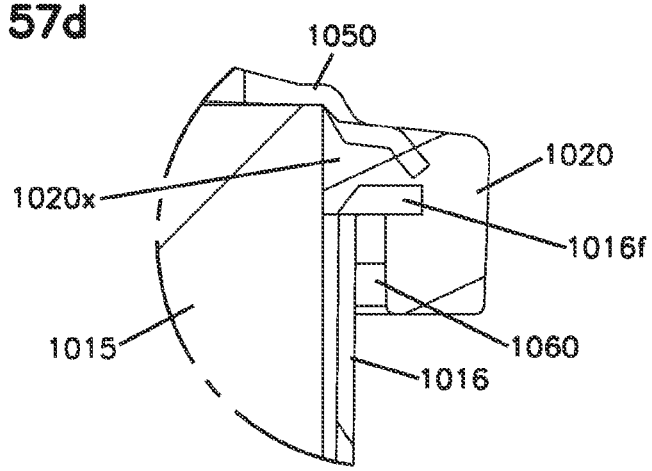
FIG. 57d is an enlarged fragmentary schematic view of an identified portion of FIG. 57c.

FIG. 57*d* is an enlarged fragmentary view of an identified portion of FIG. 57*c*. Here, a peripheral portion of the handle arrangement 1050 embedded within a molded-in-place portion of housing seal arrangement 1020 is depicted. Also, portion 1020*x* securing the housing seal arrangement via molded-in-place material, to the media 1015 is shown. Further, flange 1016*f*, on shell 1016 can be seen. Also, receiver 1060 is viewable, oriented to receive projecting therein, a portion of the housing during assembly. This is discussed further below.

Figure 59:
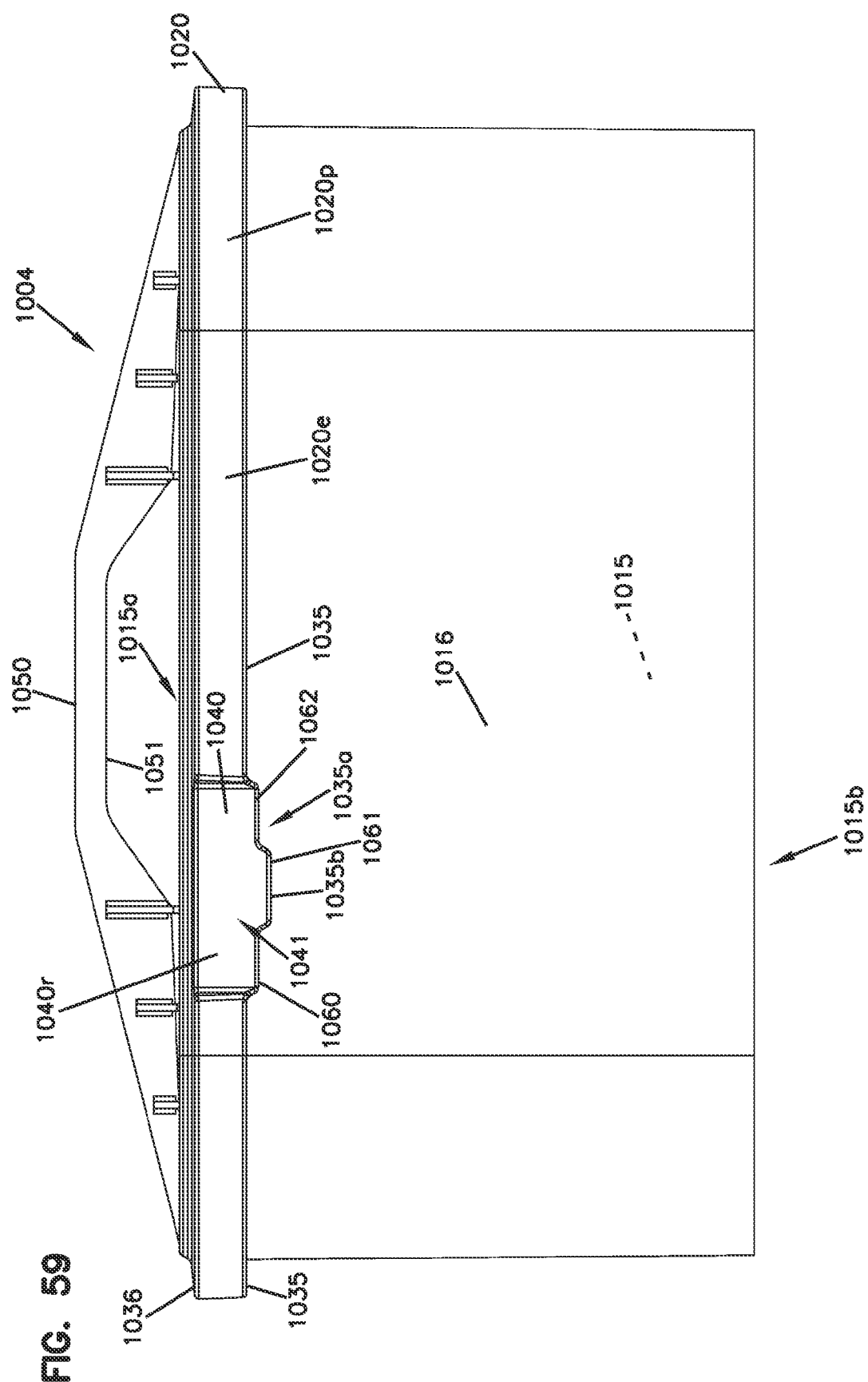
FIG. 59 is a schematic side elevational view of the filter cartridge of FIG. 57; for the particular cartridge depicted in FIG. 57, an opposite side elevational view would be the same in general appearance.

Attention is now directed to FIG. 59, in which an enlarged side elevational view of cartridge 1004 is provided. In accord with previous discussions, generally media 1015 is shown surrounded by optional shield or sheath 1016, positioned to extend media at least 80%, usually at least 90% and sometimes completely, axially, between opposite axial flow ends or faces 1015*a*, 1015*b*; i.e. from seal arrangement 1020 to and 1015*b*. Typically, again, the media 1015 would be configured to have flutes (or pleat tips) also extending completely or nearly completely between the opposite cartridge ends (flow faces) 1015*a*, 105*b*. The media 1015 can be in a variety of forms, including the various ones discussed involving either: fluted media formed from a corrugated sheet with a facing sheet thereon; or, multiple pleated loops. Of course, the principles can be applied with a stacked arrangement as generally characterized herein above. Indeed, other types of media can be used, but will not usually be preferred.

In general, housing seal arrangement 1020, with a first axial housing engagement surface 1035 comprising contoured axial seal or sealing surface section 1035a in accord with the present descriptions is provided. In the example, housing seal arrangement 1020, again, is an axial pinch seal 1020p having first and second, opposite, axial housing engagement surfaces 1035, 1036, of which (for the embodiment depicted) surface 1035 is a more critical surface for sealing, since it is downstream and toward the housing base.

Also, viewable in FIG. 59 is the handle arrangement 1050 including the center bridge 1051 for gripping. The center bridge, again (referring to FIG. 57) is generally positioned over a central portion of the media end 1015a.

In general terms, as previously discussed, the housing seal arrangement 1020 includes a contoured axial seal surface section 1035a having at least a first housing engagement projection/recess member (contour) 1035b thereon. Alternately stated, first housing engagement projection/recess member 1035a comprises at least one contoured projection section 1035b. Indeed, as can be seen in FIG. 57, there are two housing engagement projection/recess sections 1035b, 1035b' in member 1035a, for the example shown.

For the particular example depicted, FIG. 59, the housing engagement projection/recess members 1035b is a projection member, i.e. it projects axially in a direction toward end 1015b and away from end 1015a; or, alternatively stated, it projects axially away from surface 1036 and adjacent non-contoured portions of surface 1035, in a direction toward end 1015b.

The particular first housing engagement projection/recess contour section 1035b depicted, includes (optionally) a first end step section 1060, a central step section 1061 and a second end step section 1062, although alternative contouring is possible. The depicted central section 1061 is positioned between the first and second end step sections 1060, 1062; and, the central step section 1061 projects toward the flow end 1015b from each of the first end step section 1060 and second end step section 1062. This can be in accord with analogous features discussed herein with respect to other embodiments.

As discussed with previous arrangements, each one of the first end step section 1061, the second end step section 1062 and the central step section 1061 preferably extends, without axial contouring, therein over a peripheral length of at least 5 mm, and preferably over a peripheral length of at least 10 mm, although alternatives are possible. Often the amount of extension is within the range of 10-40 mm, inclusive, for end sections 1060, 1062 and at least 30 mm (for example 30-60 mm) for the central section 1061, i.e. each is within a range of 10-60 mm, inclusive.

As indicated above in connection with FIG. 57, it will be apparent from other figures discussed with respect to the embodiments of FIGS. 50-62i, the cartridge 1004 depicted is shown with a housing seal arrangement 1020 that includes a second contoured section 1035b', which is configured analogously to section 1035b. Indeed, for the example depicted, the housing seal arrangement 1020 is configured to optionally have symmetry with respect to the contoured sections, and the general shape thereof, upon rotation 180° around a central axis extending therethrough from face 1015a to face 1015b. This symmetry, referred to herein as "rotational symmetry" or "180° rotational symmetry" is not required, but can be advantageous with housing seal arrangements 1020 in accord with the present disclosure. When it is used, it can provide that the cartridge 1054 can be conveniently installed (when gripped) in either of two rotational orientations.

Still referring to FIG. 59, and as discussed in connection with FIG. 57, housing seal arrangement 1020 depicted, also includes a peripheral edge surface 1020e having a first member 1041 of a peripheral projection/recess (peripheral or perimeter) contour 1040 therein. In the example depicted, this member 1040 is a recess member 1040r, but alternatives are possible. As indicated in connection with FIG. 57, in the example depicted, the peripheral edge surface includes two regions 1041, 1042 corresponding to peripheral edge projections recess contours, spaced by non-contoured portions of edge 1020e.

In the example depicted, and as previously described, contour 1035b is axially aligned with the peripheral edge projection/recess contour section 1040. This is typical, but alternatives are possible.

As previously indicated, the particular housing seal arrangement 1020 depicted is configured as an axial pinch seal member 1020p. Typically, when a molded-in-place seal member is used, a maximum distance between surfaces 1035, 1036, whether in a contour or not, as characterized herein with previous embodiments, although alternatives are possible.

Figure 60:
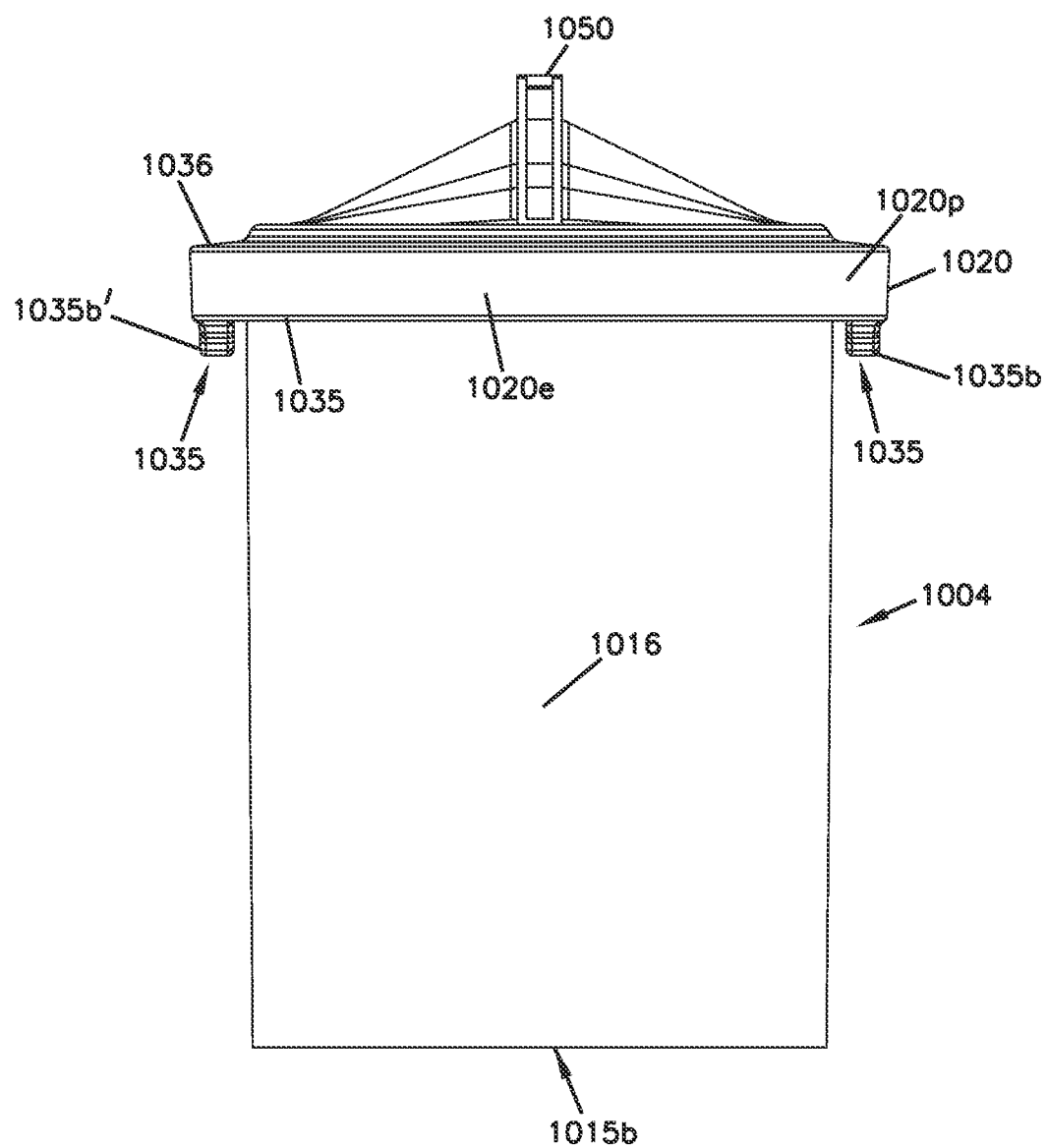
FIG. 60 is a schematic end elevational view of the filter cartridge of FIG. 57; for the particular cartridge depicted in FIG. 57, an opposite end elevational view to the view of FIG. 60 would generally be the same.

In FIG. 60, an end elevational view of cartridge 1004 is depicted. Here, each of the contour sections 1035b, 1035b' can be viewed. Other features previously discussed are indicated in FIG. 60 by like reference numerals.

Figure 61:
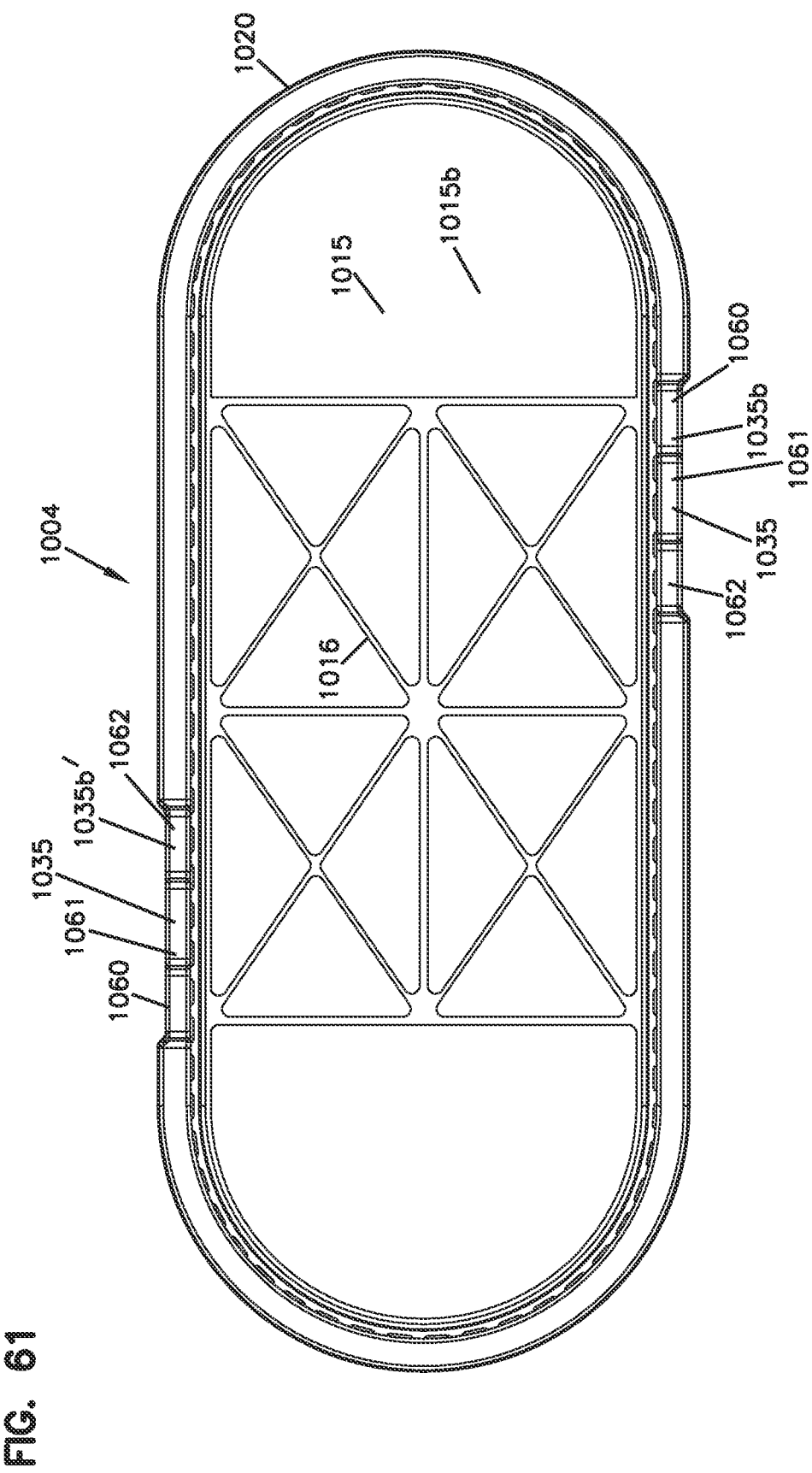
FIG. 61 is a schematic bottom view of the filter cartridge of FIG. 57.

In FIG. 61, a bottom plan view of cartridge 1004 is provided. Here projections or contoured sections 1035b, 1035b' are viewable. Also, from the figure one can further understand the 180° rotational symmetry of the housing seal arrangement 1020. Further, grid 1016, adjacent end 1015b of media 1015 is viewable.

Figure 62:
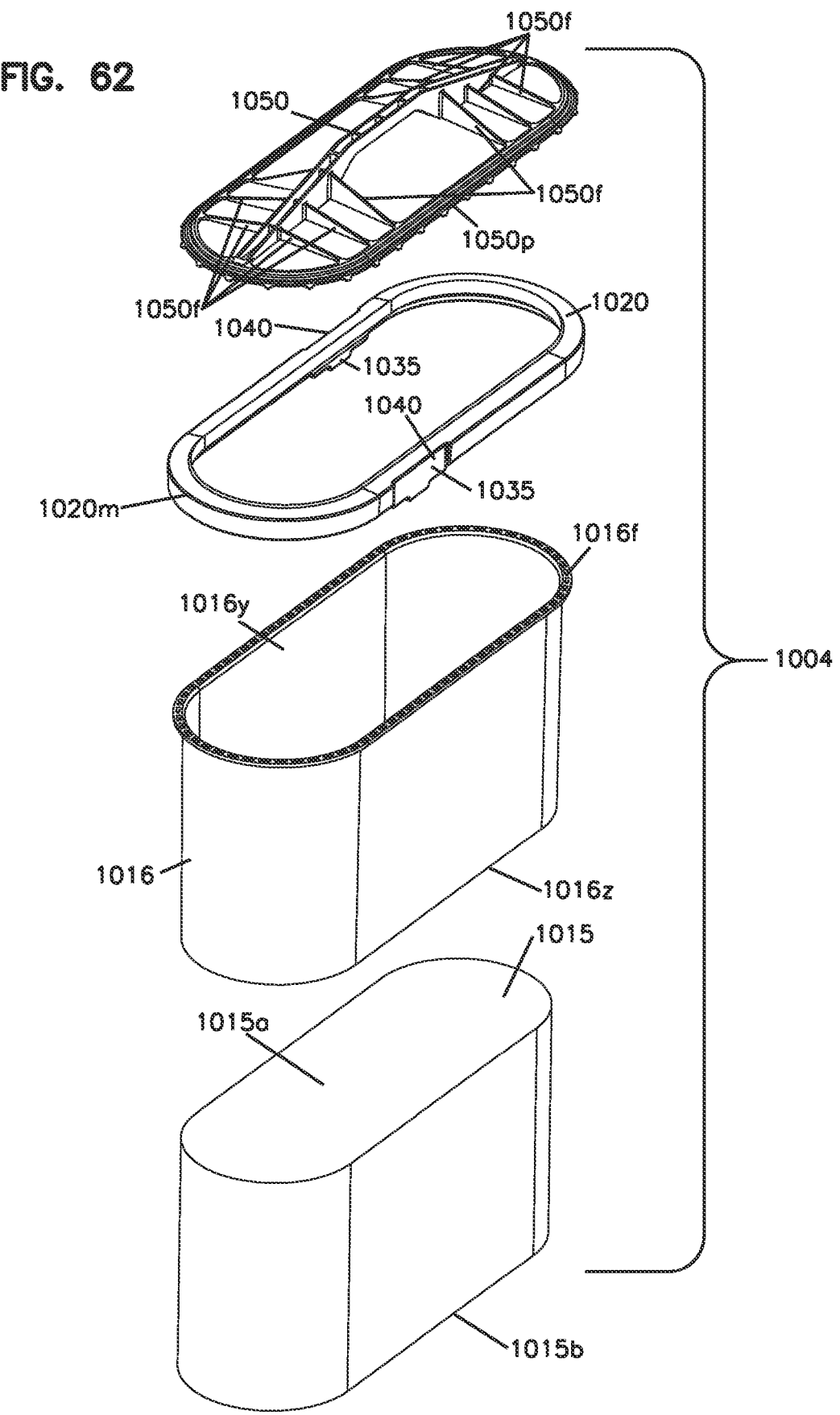
FIG. 62 is a first schematic exploded perspective view of the filter cartridge of FIG. 57.

In FIG. 62, an exploded view of cartridge 1004 is depicted. It is noted that once assembled, cartridge 1004 would normally not be taken apart, or indeed be often capable of being taken apart. However, from the exploded view of FIG. 62 one can understand more fully the piece components or parts from which the cartridge 1004 can, in some applications, be formed.

By the characterization in the previous paragraph, it is not meant to be suggested that cartridge arrangements cannot be used in which the features of the seal arrangement are positioned on a portion separable from the media. Such applications are possible, but with the techniques described herein, but they would typically not be preferred.

Referring to FIG. 62, media 1015 is shown preformed in a configuration appropriate for the shape of cartridge desired. It would normally be inserted into a preform shell or sheath 1016, through open end 1016y; the opposite end 1016z including optional grid 1016g, FIG. 61 thereacross. One can see, in FIG. 62, flange 1016f with apertures therethrough. These are flow apertures for the resin that is used to form molded-in-place portions of the housing seal arrangement 1020.

After the media 1015 has been provided with the optional sheath 1016, the handle 1050 is brought against surface 1015a. The resulting sub-assembly would be positioned in a mold appropriate for molding the molded-in-place portions 1020m of housing seal arrangement 1020. Typically, the housing seal arrangement 1020 will be molded from a seal material similar to those characterized herein above.

From a review of the above characterized process, and in the general configuration of housing seal arrangement 1020, one can understand why it is advantageous to include axial alignment between the contoured sections 1035a or surface 1035 and edge projection/recess contour sections 1040. A reason for this is that edge recess sections 1040 make the housing seal arrangement 1020 thinner (in cross-dimension perpendicular to air flow) and facilitate resin volume management in the mold creating the contoured projections 1035. Alternately stated, a resin volume reduction provided by recesses 1040 can be accompanied by a resin volume expansion resulting from projection sections 1035. This will be typical and advantageous, but is not required in all applications of the techniques described herein.

In more general terms, a projection member of a projection/recess contour on a axial sealing surface can be characterized as having a flow direction cross-dimension area of $A_1$. This would correspond, for example, to the cross-sectional area depicted in FIG. 54a. In some instances, the housing seal arrangement will also be configured so that in a non-contoured section, the flow direction cross-dimension area (the area visible in FIG. 54b) would be area $A_2$ with a $A_1$ being substantially similar to $A_2$ (in this context, substantially similar meaning $A_1=0.9$-$1.1$ $A_2$). Typically, the two sections will be shaped with a cross-section area as would be $A_1=0.92$-$1.08$ $A_2$, preferably, $A_1=0.95$-$1.05$ $A_2$. Herein, the term "flow direction cross-sectional" or similar terms are meant to refer to a cross-section in a plane parallel to the direction between the opposite flow ends of the cartridge. $A_1$ would be the cross-sectional area taken through a maximum portion of projection; and, $A_2$ would be a cross-sectional area taken through a portion of the seal arrangement that does not have a contour therein. Of course, alternatives are possible.

Still referring to FIG. 62, a perimeter portion 1050p of handle member 1050 can be viewed, which will become embedded with the molded-in-place material of housing seal arrangement 1020 securing the handle 1050 and the resulting cartridge 1004. Also, the handle 1050 includes strengthens fins 1050 extending thereacross In FIG. 62a, a second exploded perspective view of cartridge 1004 is depicted, in this instance, showing bottom features not viewable in FIG. 61. In FIG. 62a, similar reference numerals are used to indicate similar features.

Figure 62B:
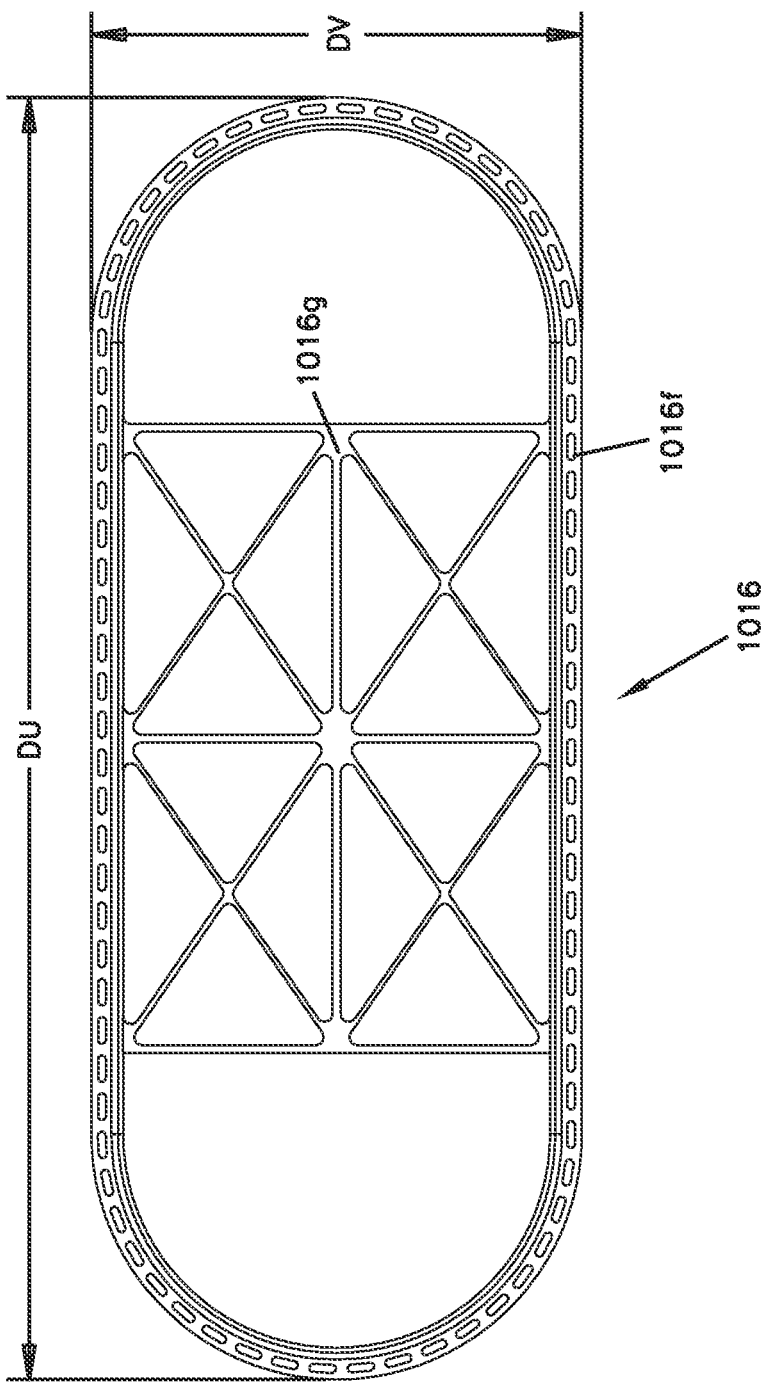
FIG. 62b is a schematic top plan view of a shell component depicted in the exploded view of FIG. 62.

In FIG. 62b, a top plan view of the shell component 1016 is shown.

Figure 62C:
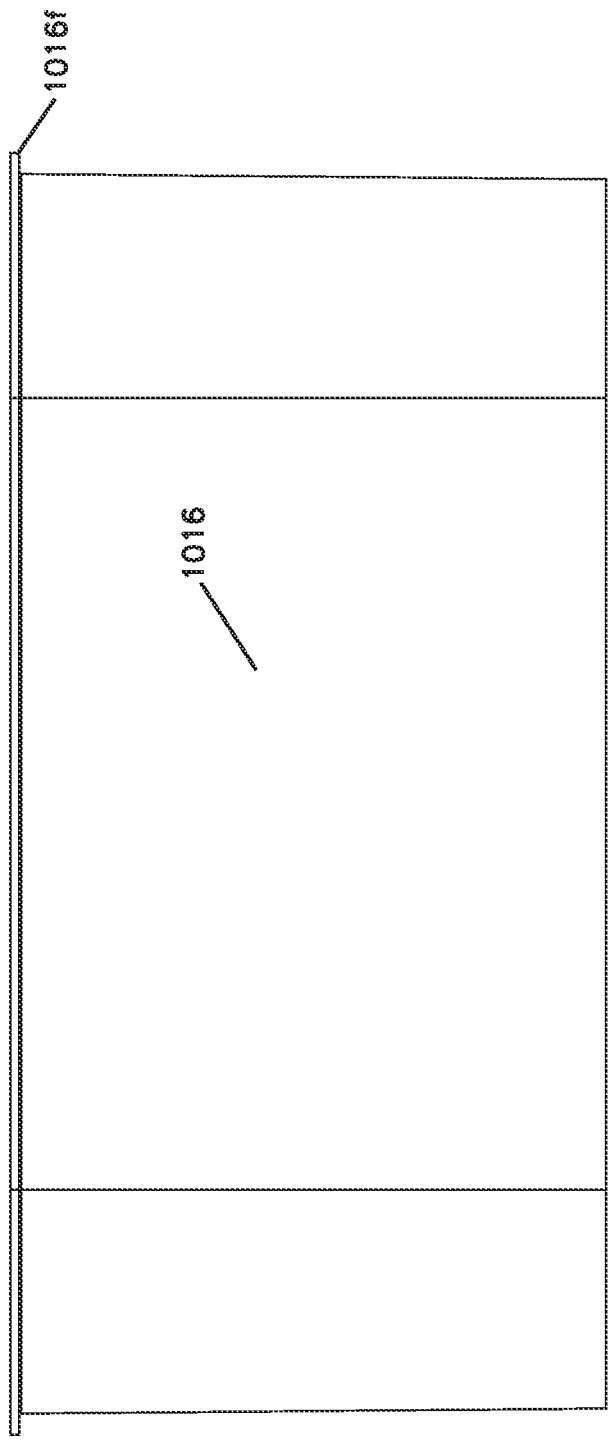
FIG. 62c is a schematic side elevational view of the shell component depicted in FIG. 62b.

In FIG. 62c, a side elevational view of the shell 1016 is shown.

Figure 62D:
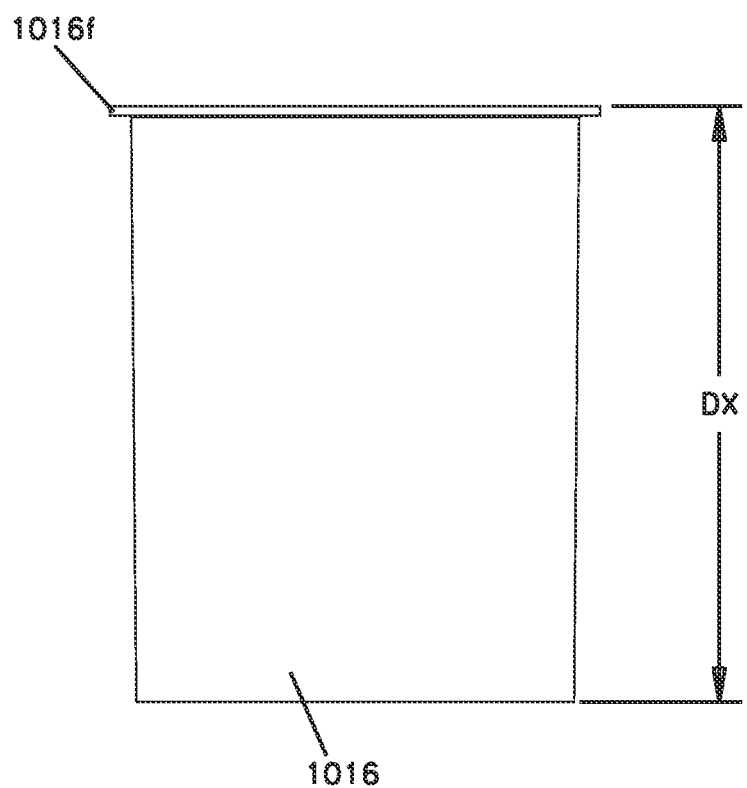
FIG. 62d is a schematic end elevational view of the shell component depicted in FIG. 62b.

In FIG. 62d, an end elevational view of the shell 1016 is shown.

Figure 62G:
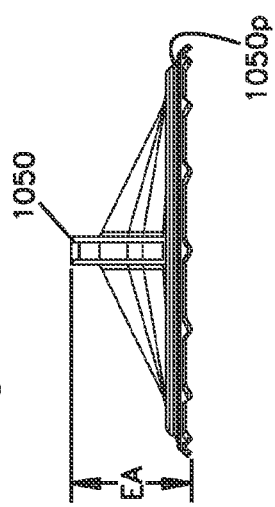
FIG. 62g is a schematic end elevational view of the handle component depicted in FIG. 62e.
Figure 62E:
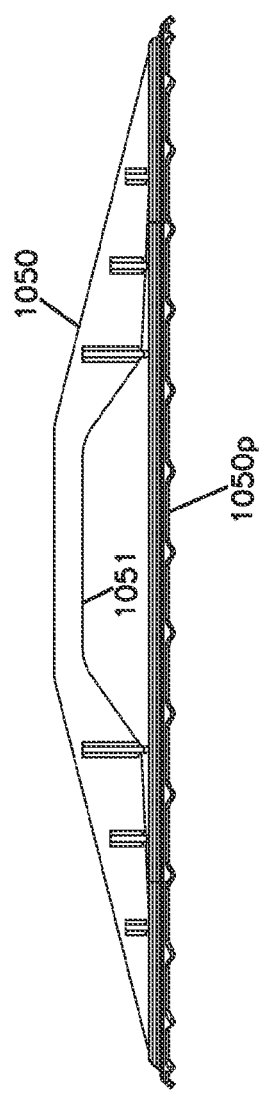
FIG. 62e is a schematic side elevational view of a handle component depicted in FIG. 62.

In FIG. 62e a side elevational view of the handle arrangement 1050 is shown.

Figure 62F:
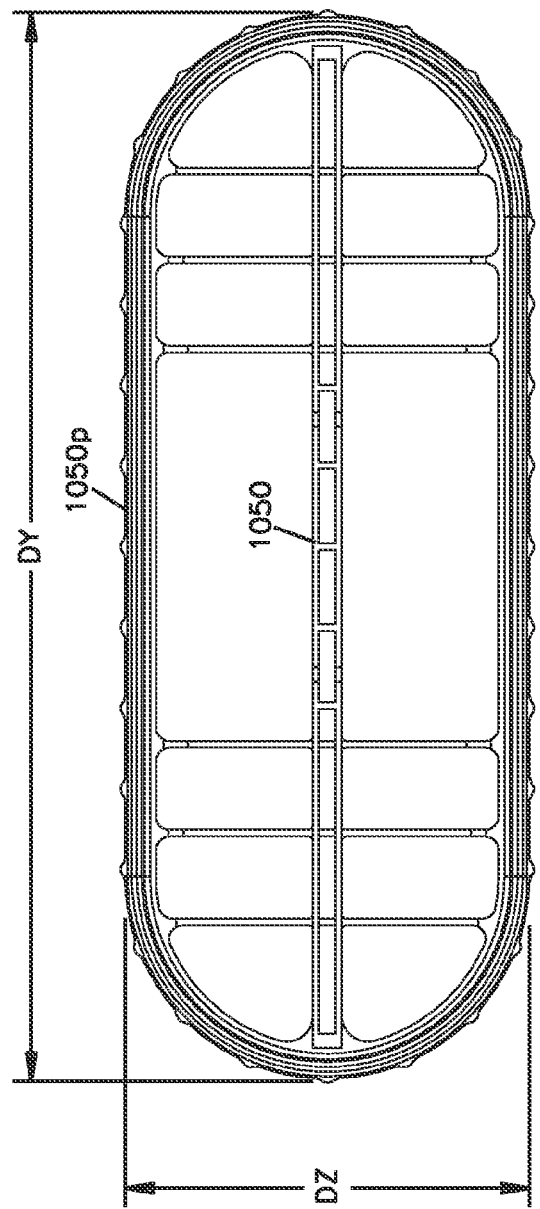
FIG. 62f is a schematic top plan view of the handle component depicted in FIG. 62e.

In FIG. 62f, a top plan view of the handle arrangement 62e is shown.

In FIG. 62g, an end elevational view of the handle arrangement 1050 is shown.

Figure 62H:
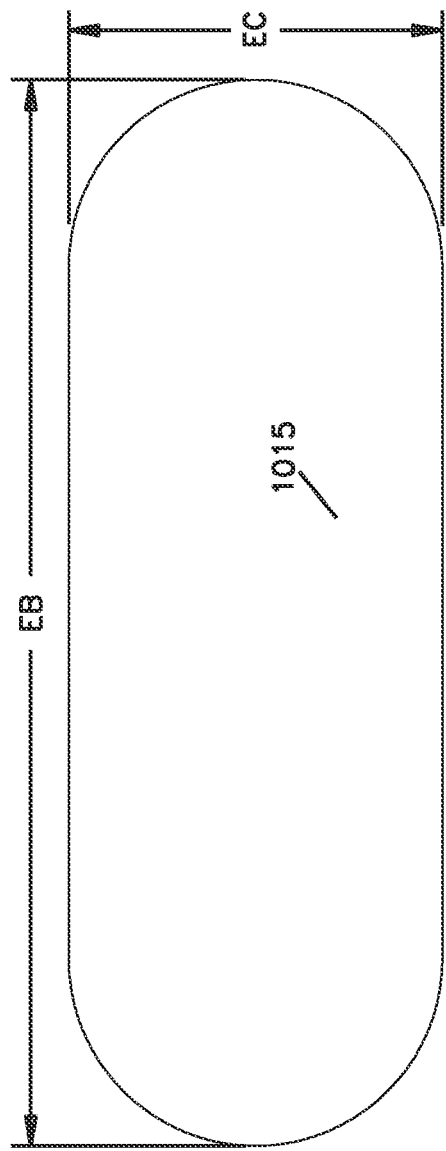
FIG. 62h is a schematic top plan view of a media arrangement used in the cartridge of FIG. 62.

In FIG. 62h, a schematic top plan view of the media 1015 is shown.

Figure 62I:
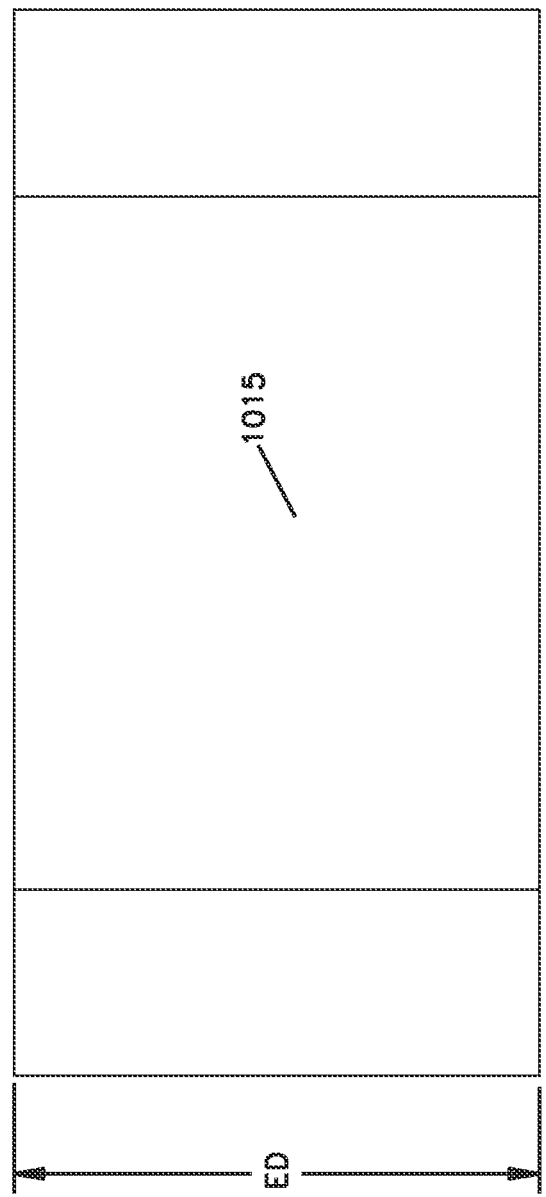
FIG. 62i is a schematic side elevational view of the media component of FIG. 62h.

In FIG. 62i, a side elevational view of the media 1015 is shown.

It is noted that in selected ones of FIGS. 50-62i, example dimensions are indicated. The dimensions are meant to indicate an example working system. Of course, variations from the dimensions indicated can be used. There is specific requirement, then, that an assembly be constructed to the dimensions or relative dimensions indicated.

Referring to these figures, the dimensions of an example working system are as follows: in FIG. 54c, DR=2 mm; DS=2 mm; DT=3.5 mm; in FIG. 57c, EE=200 mm; EF=278 mm; in FIG. 62b, DU=481 mm; DV=184 mm; in FIG. 62d, DX=223 mm; in FIG. 62f, DY=481 mm; DZ=182 mm; in FIG. 62h, EB=457 mm; EC=160 mm; and, in FIG. 62i, ED=225 mm.

Attention is now directed back to FIG. 53a. Here, a portion or perimeter ridge projection 1008x on the housing base 1008 can be seen projecting into optional receiver recess 1060 located between a portion of housing seal arrangement 1060 and the media 1015. Typically, this ridge 1008x would be continuous in extension around the media 1015, as will recess 1040, although alternatives are possible.

It is noted that the housing may include an optional portion that projects into a perimeter recess 1040r in a perimeter edge contoured portion 1040. This can be as discussed above for other embodiments. An example of this, for the embodiment of FIGS. 50-62i can be understood by reference to FIG. 54a, where housing section 1008y is shown projecting peripherally into a portion of recess 1040r.

It is noted that, when used, the peripheral perimeter recesses 1040r may be slanted in extension between opposite ends, for example analogously to those discussed above in connection with other figures.

In the example assembly of FIGS. 50-62i, pressure against the housing seal member was provided by the access cover having a pressure flange engaging the peripheral seal arrangement. Alternatively, the access cover can push on alternate portions of the cartridge, for example on a handle member with the pressure distributed to the perimeter.

It is noted that in the example depicted, the housing includes no feature that interacts with the handle member. However, the housing access could be provided with a member that engages the handle member (to apply pressure or to otherwise stabilize the assembly).

In the example characterized, various features are characterized as comprising a preform rigid member, for example a shell and support flange, and also a handle member. These portions can be molded from a plastic, such as a polypropylene or nylon plastic, although alternatives are possible.

It is noted that the housing seal arrangements for the embodiment of FIGS. 50-62i generally include a contour arrangement that is "discontinuous" in extension and around the media. Also, the optional peripheral perimeter edge contouring is discontinuous in extension around the media. In each case, this is typical with applications according to the present disclosure.

C. Usable Variations and Principles Involving Use of a Flexible Lip Member on the Housing Seal Arrangement; and, Selected Alternatives and Example Features, FIGS. 63-77

Herein above in connection with the embodiment of FIGS. 50-62i, a housing seal arrangement 1020 was characterized and depicted which, in the specific example shown, comprised a pinch seal member 1020p pinched in engagement with, and between, pressure flanges on separable housing sections during installation. Further, the specific example housing seal arrangement 1020 depicted, was not a preform, but rather was a molded-in-place member, generated during formation of the resulting cartridge 1004. Alternatives to each (or both) of these are possible.

In the embodiment of FIGS. 63-77 an air cleaner assembly and features are depicted, which indicate how the principles characterized herein can be applied when the housing seal arrangement is a flexible lip, for example formed as part of a preformed gasket. It will be understood that these principles can be applied with many of the general features characterized herein above, and/or with various variations of media configurations of the type characterized herein.

Figure 63:
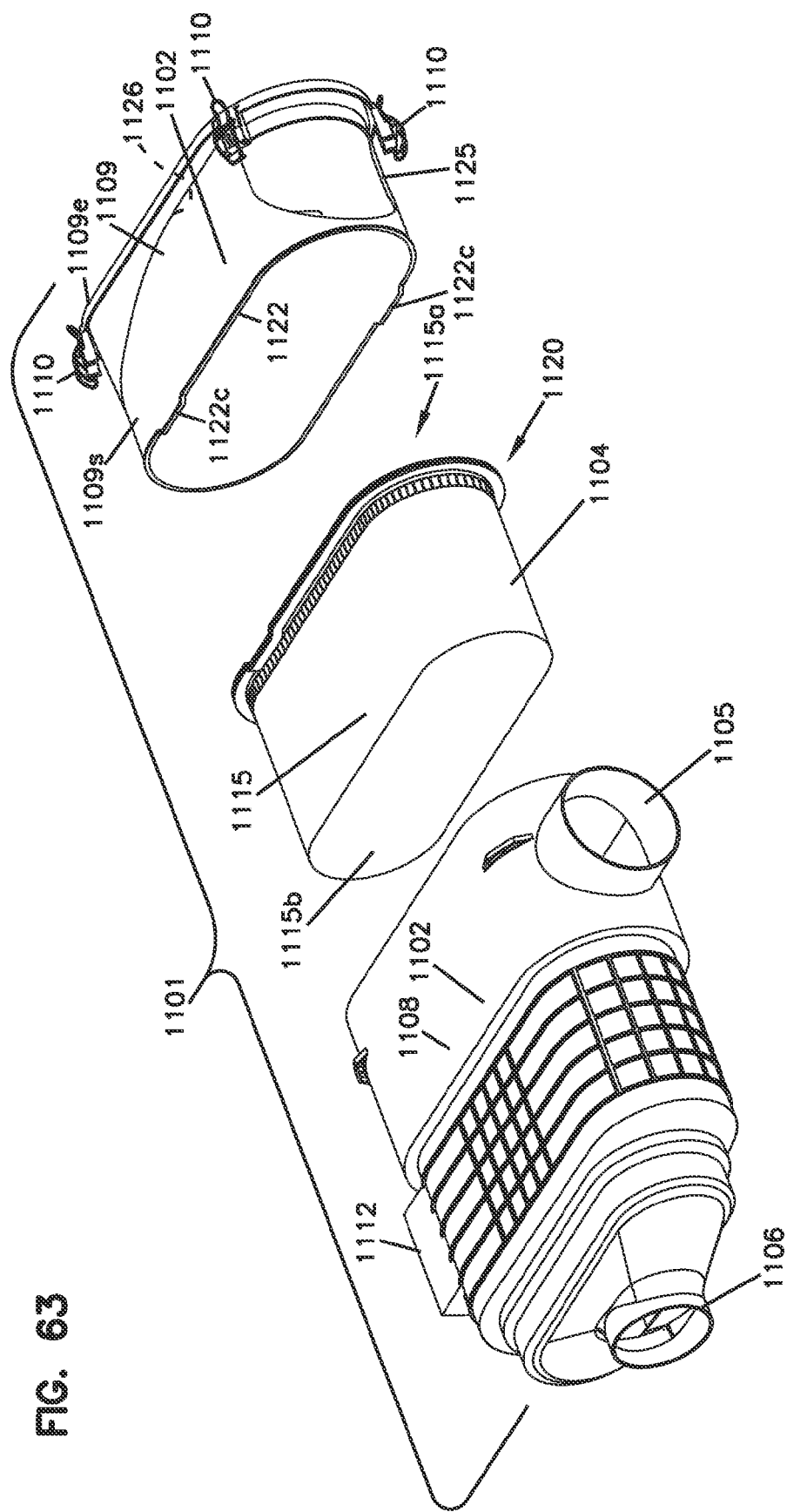
FIG. 63 is a schematic exploded view of a further alternate air cleaner assembly according to the present disclosure.

In FIG. 63, an exploded perspective view of an air cleaner assembly 1101 is provided. The air cleaner assembly 1101 is depicted such that the parts viewed would normally be separable parts in use. It is noted that no safety or secondary filter cartridge is depicted, but one could be used with the assembly in accord with the techniques characterized. (Indeed, a safety cartridge can even be provided with seal features as characterized herein). Also, although no precleaner is depicted, a precleaner could be used with the principles characterized herein in connection with air cleaner assembly 1101. The air cleaner assembly 1101 depicted generally comprises a housing 1102 with an internally received, serviceable, filter cartridge 1104.

The housing 1102, generally, includes an air flow inlet arrangement 1105 and an air flow outlet arrangement 1106. In the example depicted, the air flow inlet arrangement 1105 and the air flow outlet arrangement 1106 are each depicted as having a single tube structure, although alternatives are possible. As with the arrangement of FIG. 50, the air flow inlet arrangement 1105 is depicted as a side inlet, and the outlet arrangement 1106 as an end axial outlet arrangement. This is typical, but variations are possible.

Referring to FIG. 63, in general the housing 1102 includes two sections, depicted as a housing base section 1108 and a removable access cover 1109. The access cover 1109 is shown removably securable to the base 1108 by over center latches 1110, although alternative connectors are possible. As with the arrangement of FIG. 50, the access cover 1109 is configured to help direct air flow in a desirable manner, as the air enters the housing through the inlet arrangement 1105.

Still referring to FIG. 63, it is noted that the inlet arrangement 1105 is positioned on the housing base 1108. Alternatives are possible, for example, the inlet arrangement 1105 can be positioned on an access cover.

Still referring to FIG. 63, and especially to the housing base 1108, it is noted that the base 1108 depicted, can be very similar to the base 1108 previously discussed. This is not required, but a nearly identical base is used as the example. Thus, the base 1108 includes a mounting pad 1112 by which the base 1108 (and the resulting assembly 1101) can be secured to equipment for use.

Still referring to FIG. 63, the air filter cartridge 1104 comprises filter media 1115 which extends between first and second, opposite, flow ends 1115*a*, 1115*b*. As with the arrangement of FIG. 50, when the assembly 1101 is as depicted, end 1115*a* is an inlet flow end (or face) for unfiltered air and end 1115*b* is an outlet flow end (or face) for filtered air, although an alternate flow direction is possible with principles characterized herein.

As with the embodiment of FIGS. 50-62*i*, the media 1115 is depicted schematically and without detail. It would typically comprise one of the media arrangements generally characterized as herein above, typically having media pleat tips or flutes, extending between the flow ends (or faces) 1015*a*, 1015*b*, which correspond to opposite flow ends of the cartridge. Also, adjacent one or both of the faces 1015*a*, 1015*b*, the various flutes or pleats can be modified in shape, in accord with the principles discussed above.

As with the arrangements of FIGS. 60-62*i*, a particular filter cartridge 1104 depicted, comprises media 1115 configured in a shape with a long cross-dimension and a short cross-dimension (each perpendicular to an axial direction). This is typical, but again alternatives are possible. Also, the media 1115 is depicted with an oval outer perimeter shape, but alternatives are possible, including ones, for example, that are rectangular. This is generally as described herein above for other embodiments.

Referring to FIG. 63, the filter cartridge 1104 also includes a housing seal arrangement 1120. The particular housing seal arrangement 1120 depicted is discussed herein below in more detail, in connection with other figures.

Referring to FIG. 63, for the depicted embodiment, the housing sections 1108, 1109 are generally configured so that each has a portion which will engage the housing seal arrangement 1120, during assembly, in a manner of applying pressure axially (i.e. in a direction of flow through the cartridge 1104 during filtering) to the seal arrangement 1120, causing appropriate sealing with the housing 1108. The particular housing seal arrangement 1120 depicted, then, is an axial (pinch) seal assembly or seal. The axial seal arrangement 1120 in installation, is compressed or pinched between: pressure flange 1122 on an access cover 1109; and, a sealing shelf or flange (not viewable but see shelf 1023, FIG. 64) and housing base 1108 during use. As with the assembly of FIGS. 50-62, the pressure flange 1122 extends well into the housing base 1108 during installation. Again, although alternatives are possible, in the example depicted, this amount of extension for flange 1122 is typically at least 40 mm usually at least 60 mm and often within the range of 80-200 mm.

In general terms, and analogously to the example of FIGS. 50-62, the example access cover 1109 depicted, comprises a sidewall 1109*s*, extending between pressure flange 1122 and access cover outer end 1109*e*. The access cover 1109 includes an air flow passageway or aperture arrangement 1125 in sidewall 1109*s* positioned for passage therethrough of air entering inlet 1105. Also, the access cover 1109 can include an end flow directing surface 1126 (for example a vane or arcuate, curved flow directing surface) (see FIG. 64) analogous to surface 1026 as discussed above.

Still referring to FIG. 63, it is noted that pressure flange 1122 (unlike pressure flange 1022) has an edge surface with some contouring thereon, indicated generally at 1122*c*. This edge contouring 1122*c* (which is optional but can be advantageous in some applications involving a preformed flexible lip gasket member) is discussed below.

In FIG. 64, a schematic cross-sectional view of the air cleaner assembly 1101 is depicted. The cross-sectional view is generally along the longer cross-dimension of the cartridge 1104 and housing 1102. The view is schematic and is meant to generally indicate that except for specific features discussed herein in connection with the housing seal arrangement 1120, the assembly 1101 may be generally analogous to assembly 1001, FIG. 523. It is noted that the cross-sectional view of FIG. 64 is from an opposite side to that viewable in FIG. 63.

In FIG. 65, a second schematic cross-sectional view is provided, in this instance along a short dimension of the housing 1102 and cartridge 1105. Here, the cross-sectional view is taken so that it passes through one of two contoured sections of the housing seal arrangement 1120. This is discussed further below.

Figure 65A:
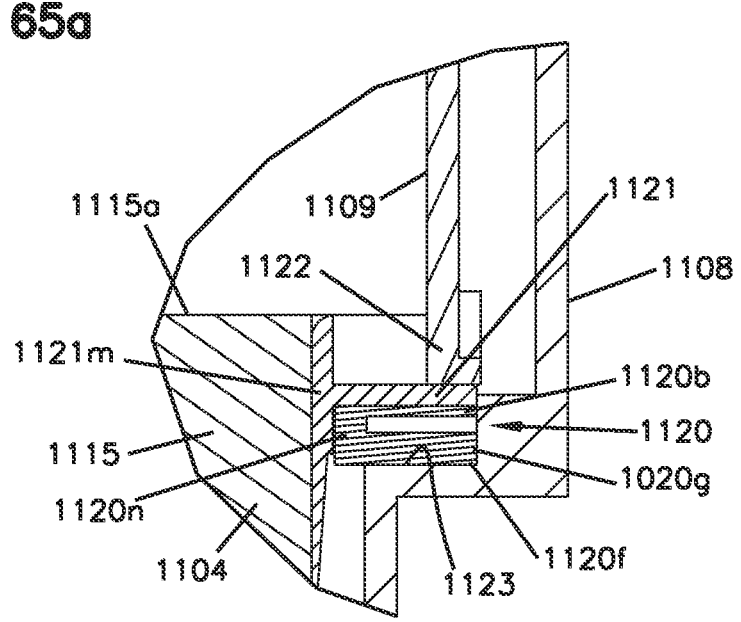
FIG. 65a is an enlarged fragmentary view of an identified portion of FIG. 65.

In FIG. 65*a* a schematic fragmentary view of an identified portion of FIG. 65 is shown. Here, the housing seal arrangement 1120 can be seen as comprising a (resilient) seal or gasket member 1020*g* positioned on a remainder of the cartridge 1104.

In the example depicted, the gasket member 1120*g* is a preform, resilient, member made in advance of assembly of the cartridge 1115 and not as a molded-in-place component. The gasket 1120*g* would typically be secured to structure on a cartridge 1104 by adhesive or the like. The particular gasket 1120*g* depicted includes a resilient, flexible, lip section 1120*f* that can function to generate sealing against a flange or pressure shelf 1123 in the housing base 1108 as discussed herein below. The particular gasket 1120*g* depicted includes first and second lips, 1120*f* and 1120*b*, spaced from one another and joined by gasket section 1120*n*. The example lips or flanges 1120*f* and 1120*b* generally (when not deformed) extend parallel to one another. It is noted that in the example they are of different thicknesses, with lip 1120*f* being thicker, typically 1.5-5 times thicker, although alternatives are possible. Lip 1120*b* in a typical application would be flexible when formed, but then would be secured by adhesive to a rigid support flange or pressure flange indicated generally at 1121. The particular pressure flange 1121 depicted is configured as part of the housing seal arrangement 1120 to be engaged by a pressure flange 1122 on the access cover 1109. The pressure flange 1121 is shown extending outwardly from a mounting ring 1121*m* part of a support 1121*s* that would be preformed and then be secured to the media 1115 in extension therearound.

Typically, flange 1121 and support 1121*s* would be preformed from a hard plastic material; and, gasket 1120*g* would be preformed from a resilient material and be attached to the support 1121*s* (i.e. combination of flange 1120, and a remainder 1120*m* of support 1121*s*) by appropriate means such as an adhesive. The resulting structure be secured in place the media pack 1115.

Whether or not the gasket 1120*g* is secured to the support 1121*s* before or after the support 1121*s* is secured to the media 1115 is a matter of design/assembly choice, depending on convenience for the assembly process used.

It is noted that the housing seal arrangement 1120, and in particular lip 1120*f*, has an outer peripheral edge or edge section indicated generally at 1120*e*. This edge is discussed further below.

Figure 65B:
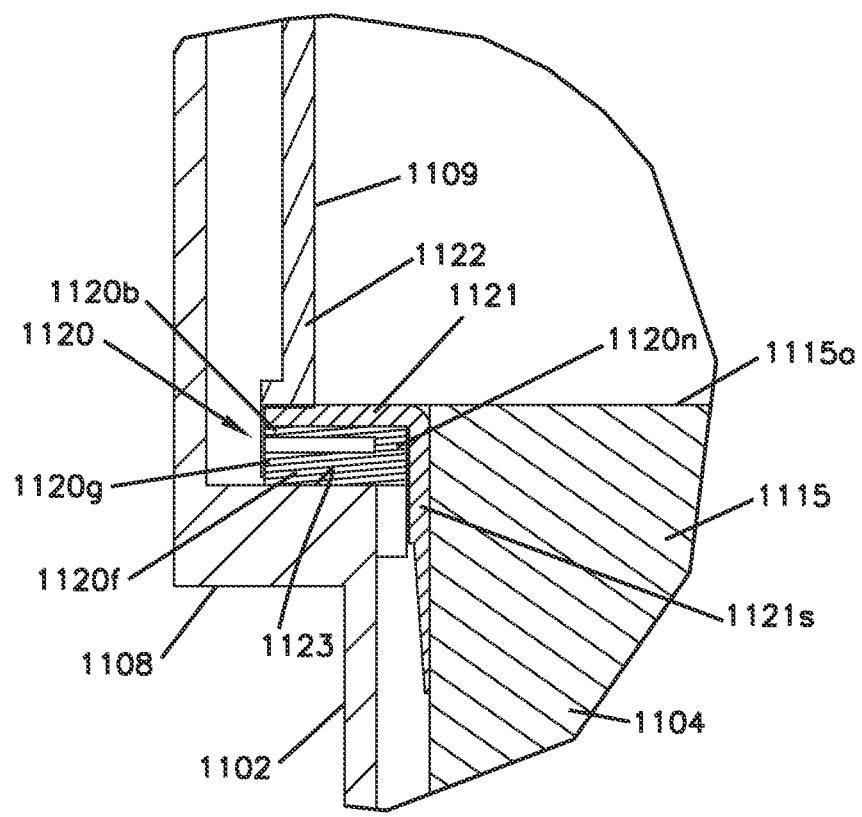
FIG. 65b is an enlarged, fragmentary, schematic cross-sectional view of a second identified portion of FIG. 65.

In FIG. 65*b*, a second cross-sectional view taken generally where indicated in FIG. 65 is shown. The cross-sectional view in FIG. 65*b* is through a portion of the housing seal arrangement 1120 where there is no contouring of the type characterized herein. Like reference numerals to those discussed above in connection with FIG. 65*a* indicate analogous structure and features.

In FIG. 66, cartridge 1104 is depicted in perspective view. Like reference numerals to those discussed above in connection with FIGS. 63-65*b* indicate like features. Referring to FIG. 66, the housing seal arrangement 1120, comprising support 1121*s* with gasket 1120*g* thereon, is viewable. Viewable, a portion of gasket 1120*g*, is flexible lip 1120*f*.

Still referring to FIG. 66, it is noted that for the embodiment depicted, the cartridge 1104 does not include a sheath extending therearound in extension between media ends 1115*a* and 1115*b*, i.e. between the seal support 1121*s* and end 1115*b*. While such a sheath or shield could be used, the example is meant to indicate that alternatives are possible. (This alternative can be applied with any of the embodiments characterized herein). The support 1121*s* can be seen as having an upper pressure flange 1121 and an axial mounting projection section 1121*m*, as previously described. The section 1121*m* is shown comprising flexible tabs in a portion thereof, to facilitate filtering and securing to the media 1115.

In FIG. 66, it can be seen that the housing seal arrangement 1120 is contoured. In particular, the housing seal arrangement 1120 includes opposite surfaces 1135, 1136. Surface 1135 is a surface generally analogous to surface 1035, except it comprises a surface of a flexible lip 1120*f* facing away from end 1115*a* and toward 1115*b*. The surface 1135 in the example depicted, is configured with contour sections somewhat analogous to member 1035 discussed above. More specifically, surface 1135 is a contoured surface having axial projection/recess portion 1135*a* therein, in the example depicted, comprising two contoured (projection) sections 1035*b*, 1035*b*'. In the example shown, each of sections 1135*b*, 1135*b*' comprises a single step 1135*c*, although alternatives are possible.

In the example depicted, the steps 1135*c* are positioned for a 180° rotational symmetry of the housing seal component of the type discussed above, but alternatives are possible.

It is noted that in the example depicted, a peripheral perimeter edge 1135*e* of member 1135 does not includes a projection/recess peripheral or perimeter edge contour section. However, it could include such a section, for example, as a recess or projection, in some embodiments according to the present disclosure. Also, since a relatively thin flexible lip is used for member for surface 1135, typically the shelf 1123 would not include an optional rib analogous to rib 1023*r* previously discussed, but in some applications it could.

It is noted that with the arrangement depicted, there is no receiver trough or recess positioned between the seal arrangement 1120 and the media. Thus, the housing would not have a trough into which the seal arrangement 1120 projects, but rather would have a shelf without any internal peripheral projection thereon.

For the example cartridge 1104 depicted, surface 1136, which is not part of the gasket 1120, but rather as part of support 1121*s*, is also shown with a contouring, indicated generally at 1138. This contouring is in the hard material of support 1121*s*, and generally mates with contouring in support 1123, for reasons discussed below.

Referring to FIG. 66 and previously discussed FIGS. 62-65*b*, general operation of housing seal arrangement 1120 can be understood. The housing seal arrangement 1120 is an axial housing seal arrangement, operating as a pinch seal arrangement, since, in use, it is pinched between housing sections 1109, 1108. However the gasket 1120*g* itself is not a pinch seal gasket in the same manner as gasket 1020 above, since the pressure applied directly to gasket 1120*g*, is from support or pressure flange 1121 on the cartridge, with pressure being ultimately provided by the housing section 1109 via pressure flange 1122. This is a convenient arrangement when the lip 11201 is flexible relatively thin lip (whether preformed or molded-in-place) having a thickness of about 5 mm or less typically on the order of about 1-4 mm, inclusive.

It is noted that the pressure flange 1122, FIG. 62, as previously discussed, include contoured section 1122*c* (in the example comprising two sections) thereon. These sections are configured to mate with recesses 1138 in support 1120*s* during assembly. It is noted that, in some instances, pressure could be applied in a manner adequate to seal, even if these optional projections 1122*c* were not used, as long as the majority of the pressure flange 1122 contacts and applies appropriate pressure to surface 1120*s*. It is also noted that if surface 1120*s* did not include recesses 1138 therein, a similar pressure affect could be obtained, with appropriate modifications in the pressure flange 1122.

Figure 67:
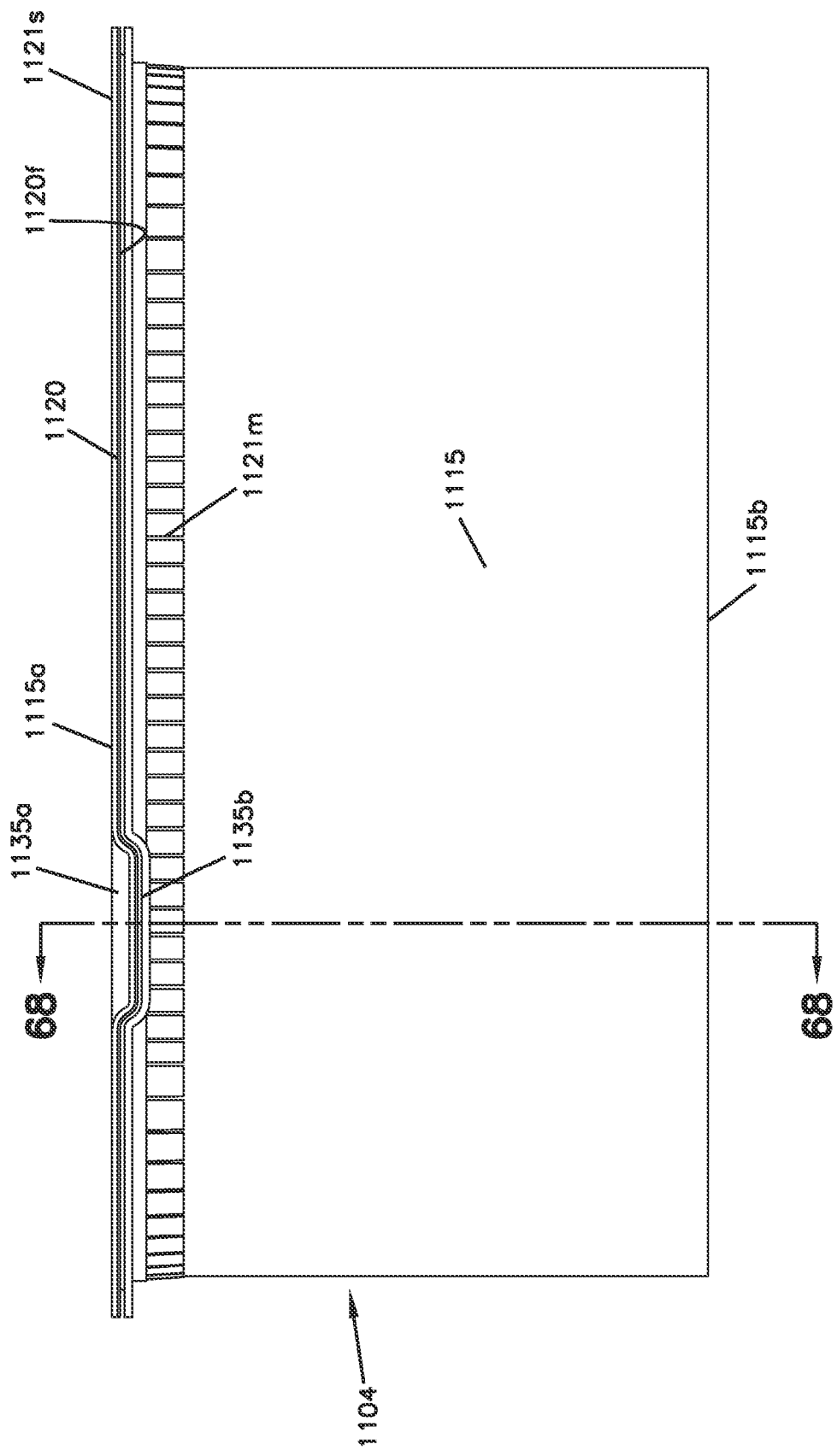
FIG. 67 is a schematic side elevational view of the filter cartridge of FIG. 66; the specific example cartridge of FIG. 66 being such that an opposite side elevational view would be similar in appearance.

In FIG. 67, a side elevational view taken toward the long side of the cartridge 1104 is depicted. Here, features previously discussed, are indicated by like reference numerals.

In FIG. 68, a cross-sectional view taken along lines 68-68, FIG. 67 is viewable. It is noted that the cross-section extends through one of the contoured sections 1135.

Figure 68A:
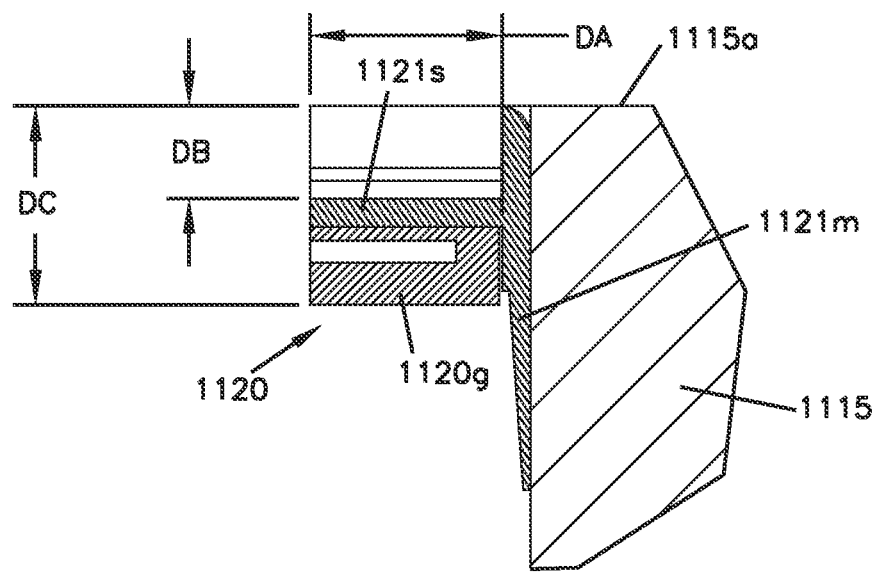
FIG. 68a is a schematic, enlarged fragmentary view of a first identified portion of FIG. 68.

FIG. 68*a* is an enlarged fragmentary portion of FIG. 68. Features previously discussed are indicated by like reference numerals.

Figure 68B:
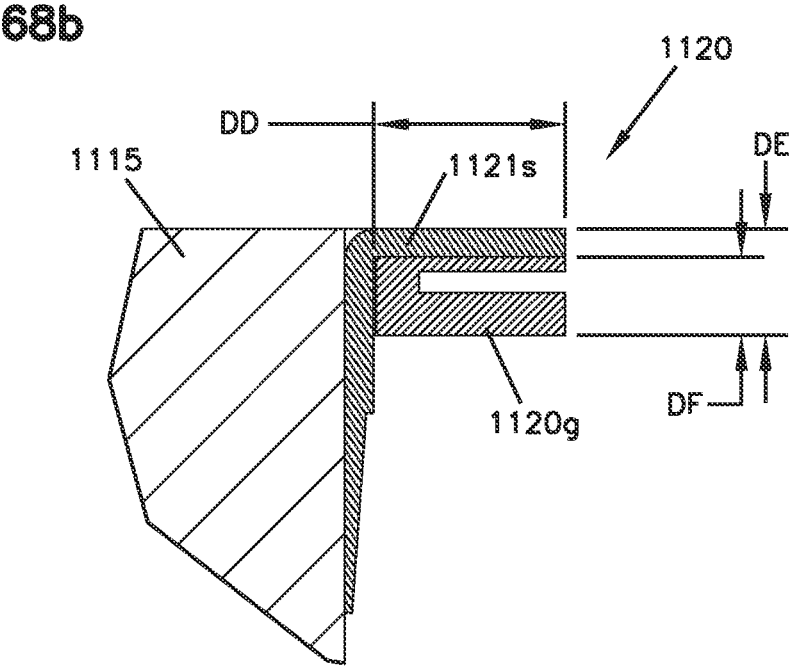
FIG. 68b is a schematic, enlarged, fragmentary view of a second identified portion of FIG. 68.

In FIG. 68*b*, an enlarged fragmentary view is provided of the second portion of FIG. 68. Here, the cross-section is through a portion of the housing seal arrangement 1120 that does not have the contouring therein. Features previously discussed are indicated by like reference numerals.

It is noted that the gasket 1120*g* can be preformed to have contouring therein corresponding to the contoured sections 1135*a* (1135*b*, 1135*b*') or it can be formed without any contouring but sufficiently thin and flexible will adopt such contouring when secured to the support 1120*s*, when the support 1120*s* is formed with contouring.

In FIG. 69, gasket 1120g is depicted. Here it is shown preformed with contouring therein, contoured sections being indicated at 1135 and 1135b' respectively.

Figure 69A:
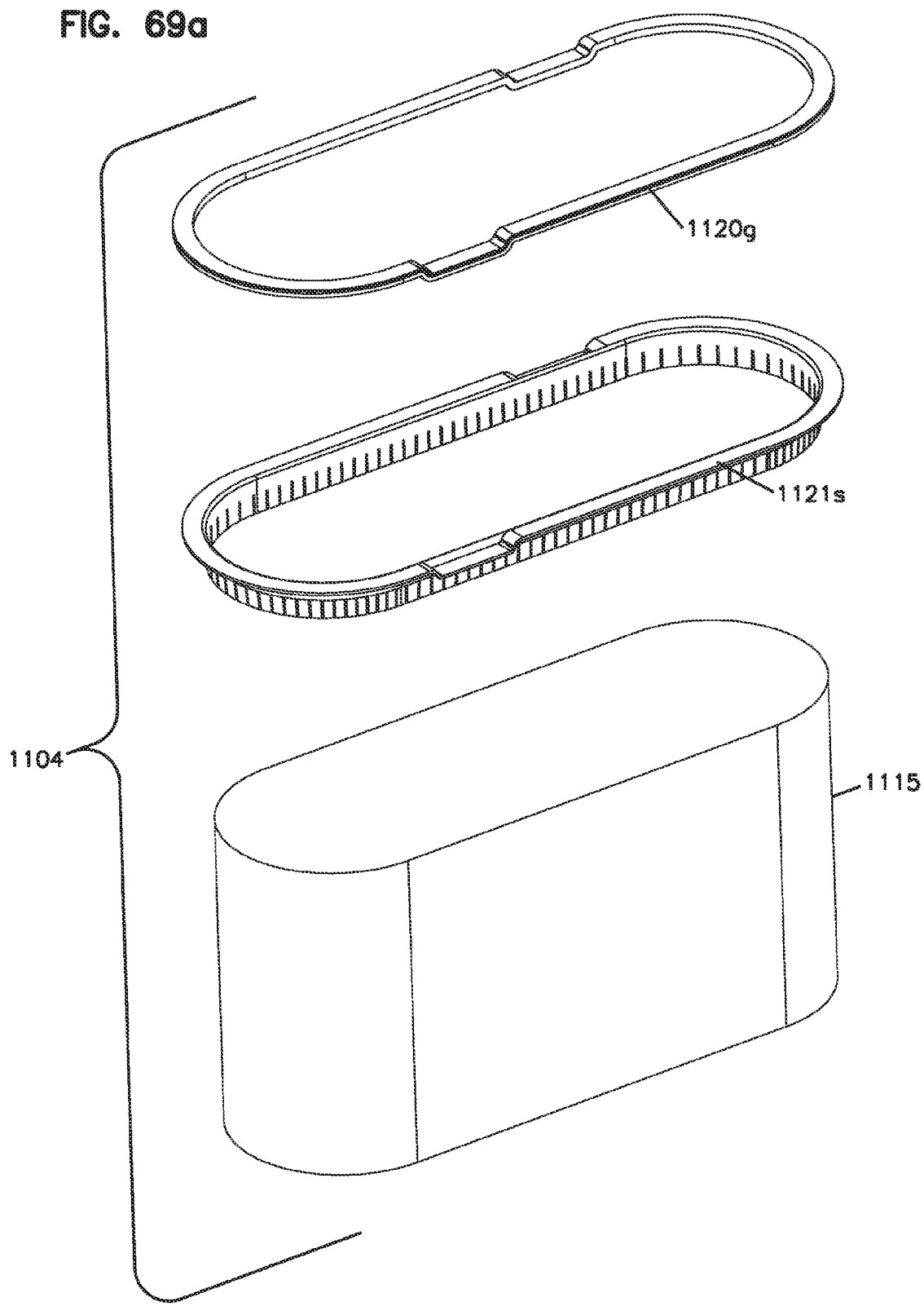
FIG. 69a is a schematic, exploded, perspective view of the filter cartridge of FIG. 66.

In FIG. 69a, an exploded view of the cartridge 1104 is depicted. The gasket 1120g is depicted in association with support 1121s. It is noted that the exploded view of FIG. 69a shows the gasket 1120g above the support 1121s, which would not be the normal assembly. Rather, the gasket 1120g would typically be positioned underneath the support 1121s. However, assembly with the gasket on top of the support is possible, in alternate applications of the techniques described herein.

Figure 70:
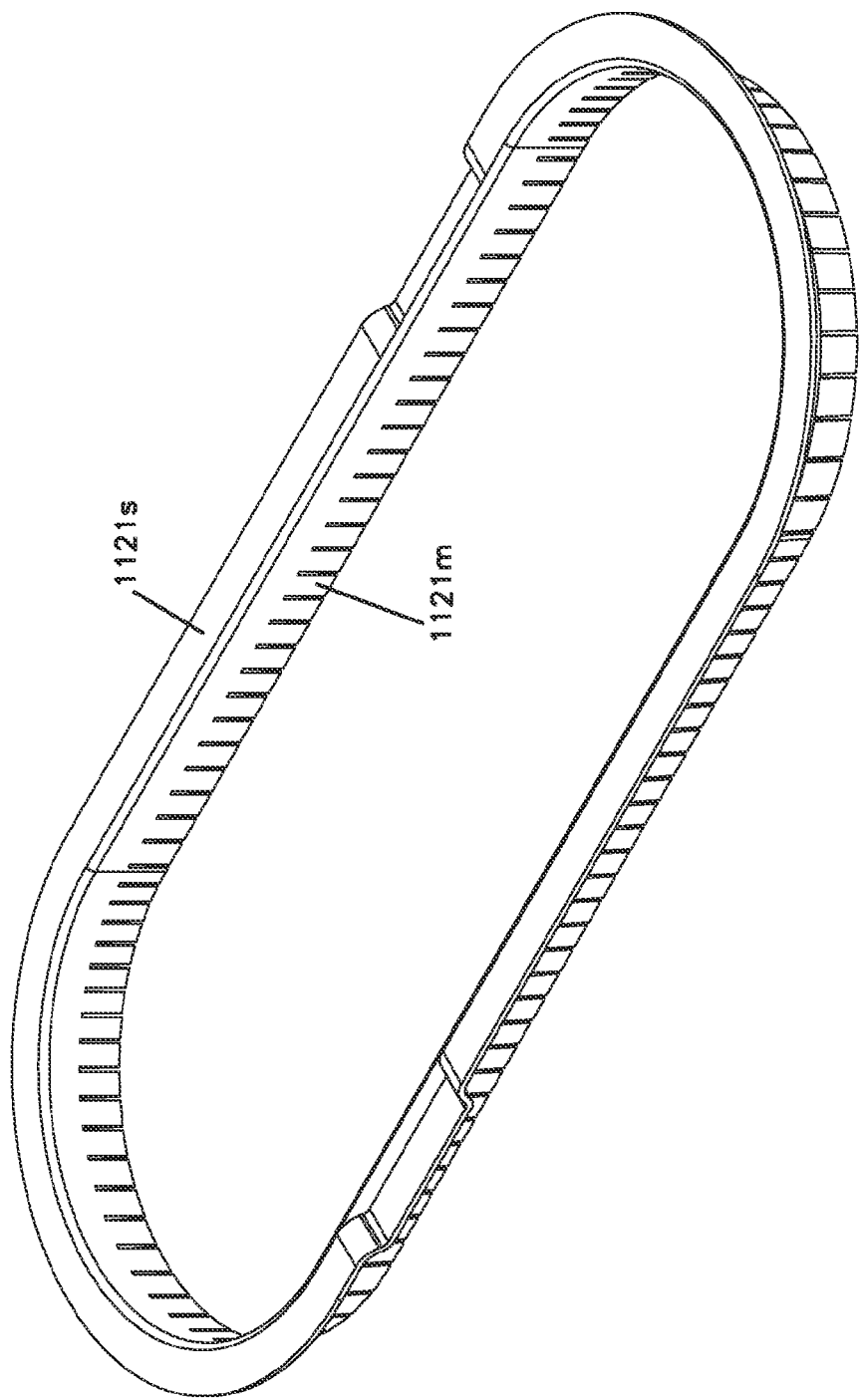
FIG. 70 is a schematic perspective view of a seal support member of the filter cartridge of FIG. 66.

In FIG. 70, the support 1121s is shown in perspective view.

Figure 71:
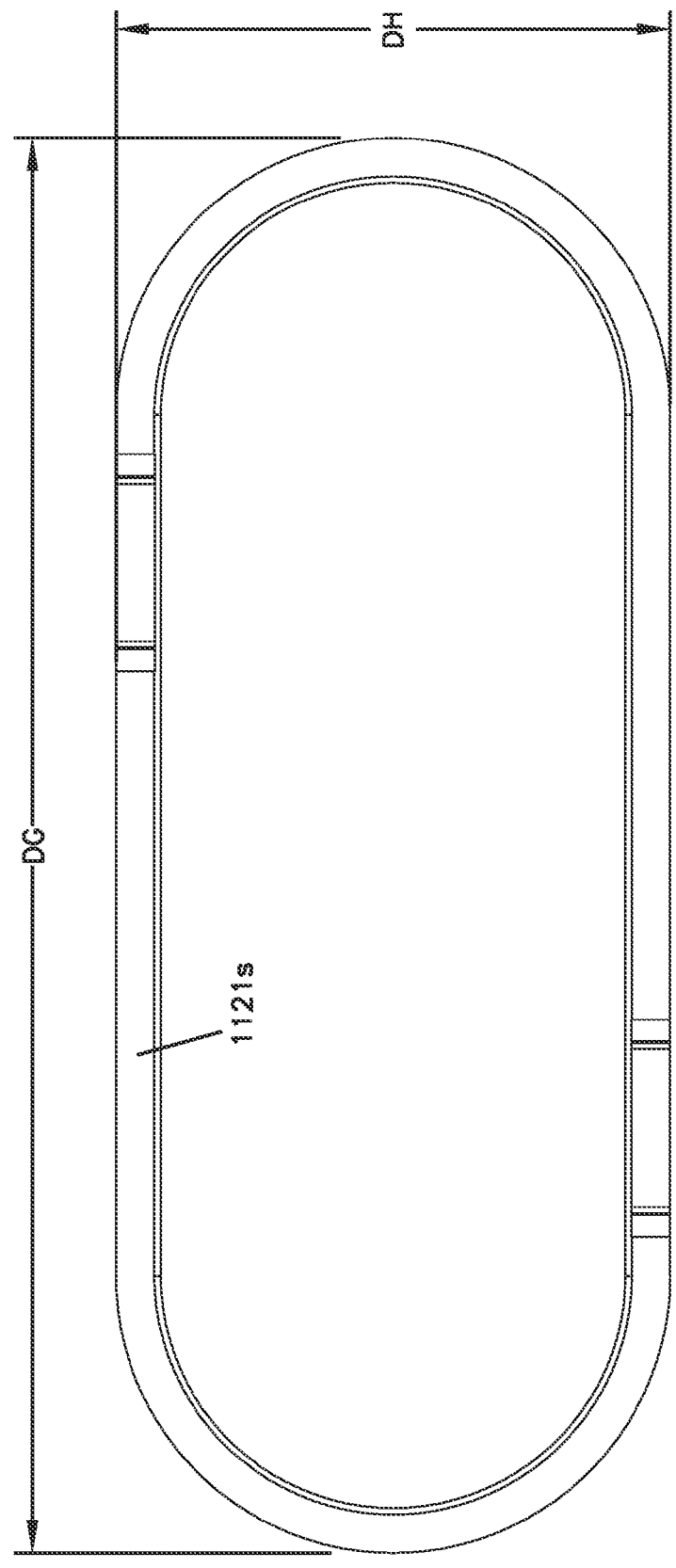
FIG. 71 is a schematic, top-plan view of the seal support member of FIG. 70.

In FIG. 71, a top plan view of the support 1121s is shown.

Figure 72:
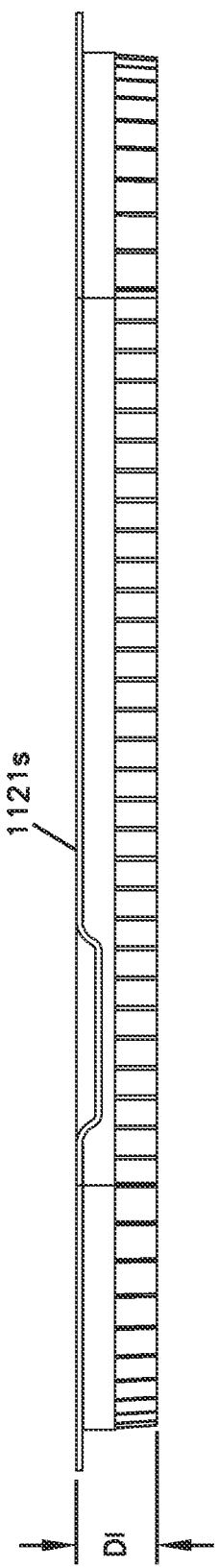
FIG. 72 is a schematic, side-elevational view of the seal support member of FIGS. 70 and 71.

In FIG. 72, a side elevational view of support 1121s is shown.

Figure 73:
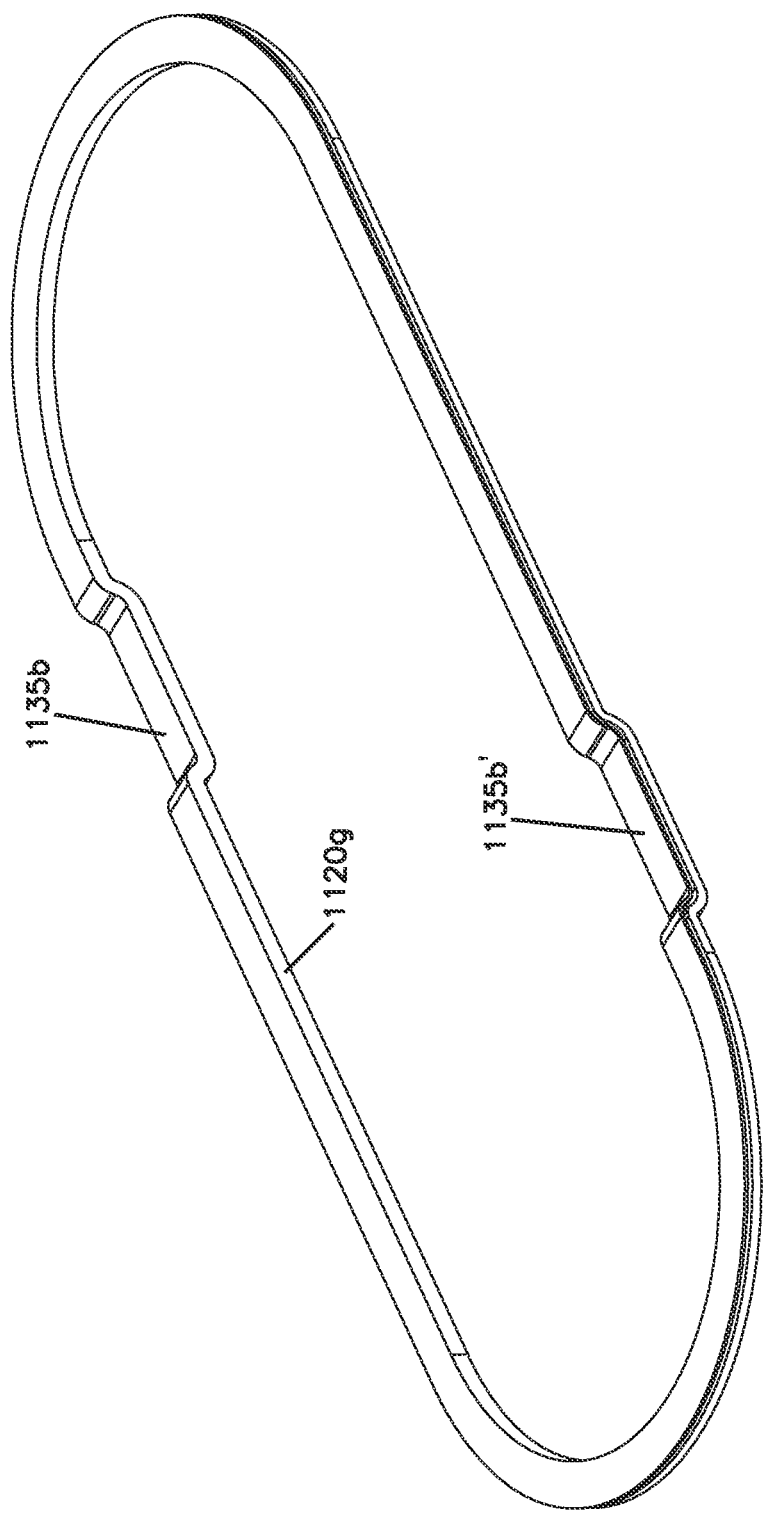
FIG. 73 is a schematic perspective view of a seal member component of the filter cartridge of FIG. 66.

In FIG. 73, a preform gasket 1120g is shown in perspective view. It is noted that it is shown formed with contoured sections 1135b, 1135b' therein.

Referring to FIG. 73 is noted that the contoured sections 1135b, 1135b' in gasket 1120g occur along both the sealing surface and the upper surface the upper surface being secured to the support flange. The reason for contouring in the upper surface is to facilitate mating with the access cover and seal support and also because it helped to maintain a constant thickness in the gasket 1120g throughout to facilitate manufacture. Alternatives are possible.

Figure 74:
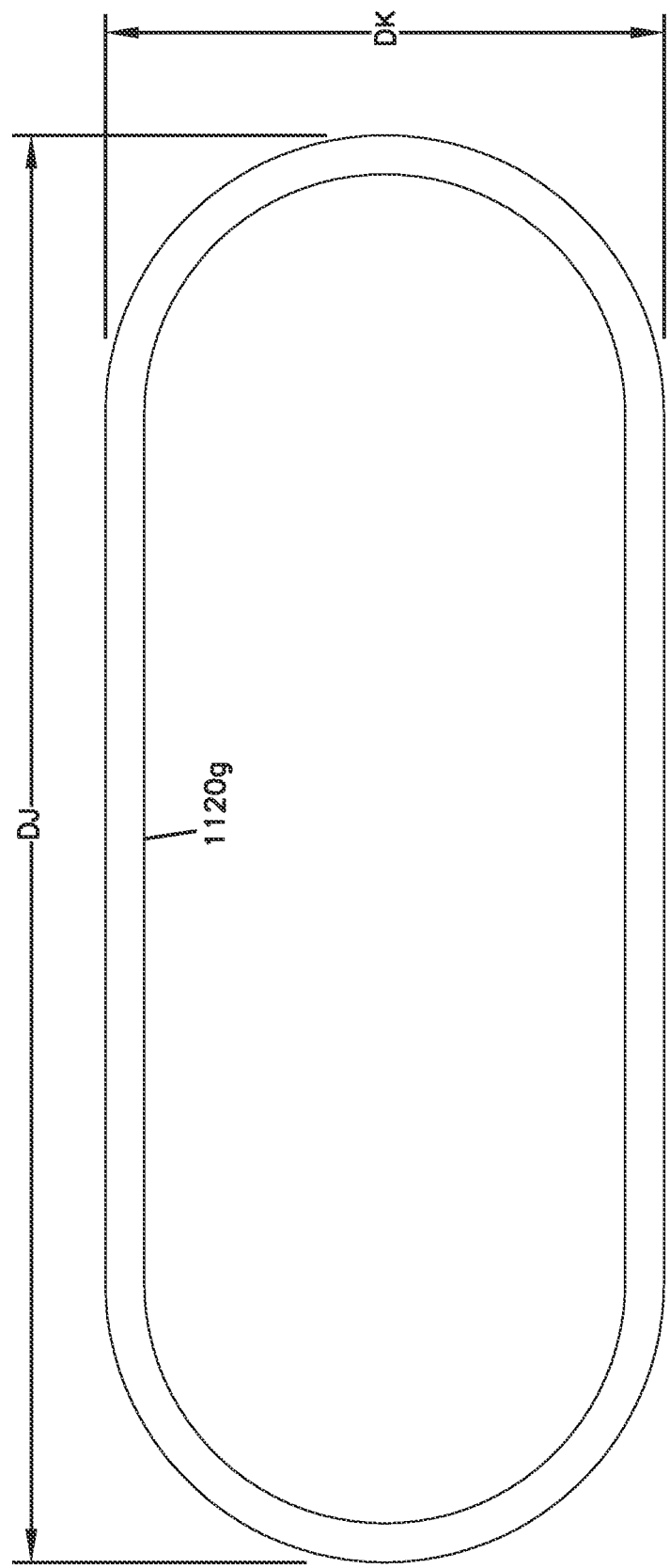
FIG. 74 is a schematic, plan view of the seal member component of FIG. 73.

Indeed, in FIG. 74, the top plan view of a gasket generally corresponding to gasket 1120g is shown. However, here no deformation areas are depicted. This is meant to indicate an example in which the deformation would not be pre-made in the gasket 1120g, but rather the gasket would be made without contouring in the various surfaces, with the desired contouring in the gasket as mounted resulting by attaching the flexible gasket to the support 1121s which would have preformed contouring therein.

Figure 75:
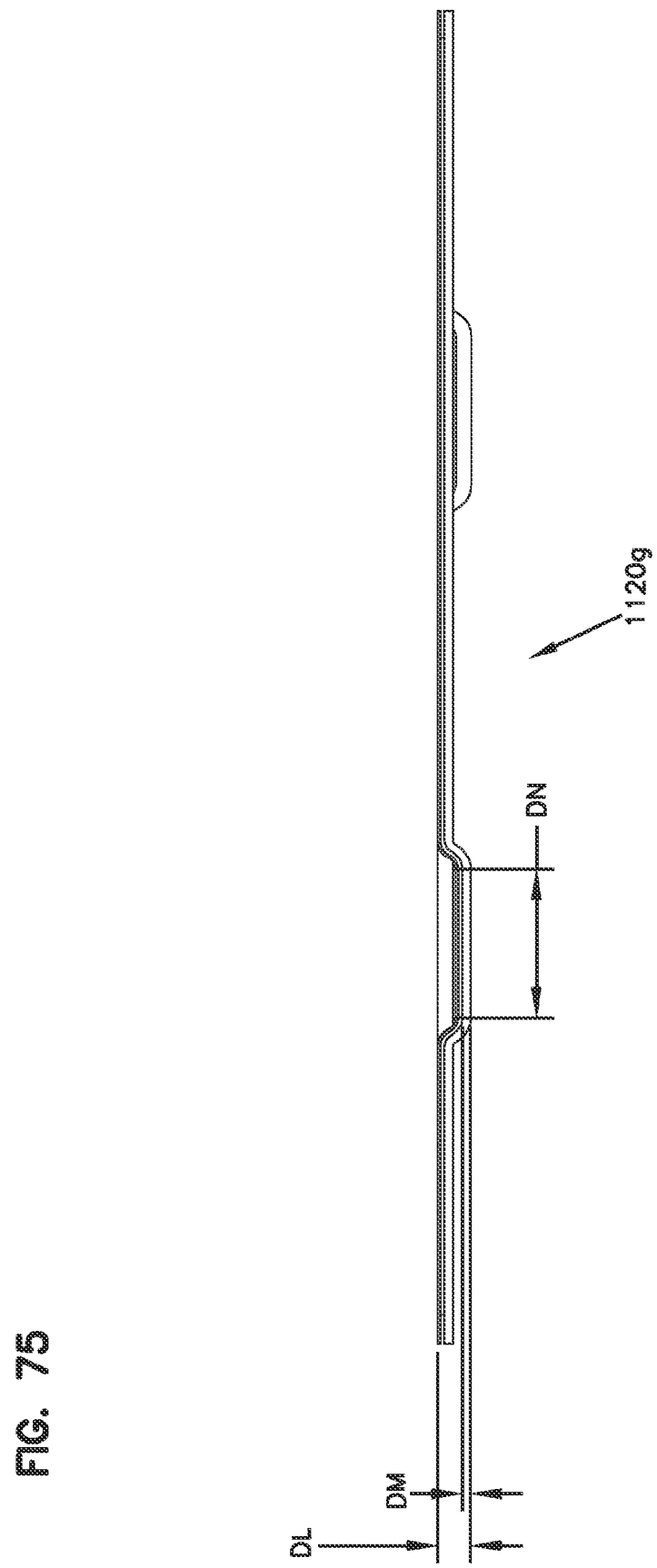
FIG. 75 is a schematic, side elevational view of the seal member component of FIG. 73.

In FIG. 75, a side elevational view of gasket 1120g is shown. Here, the gasket 1120g having deformed or contoured sections therein.

Figure 76:
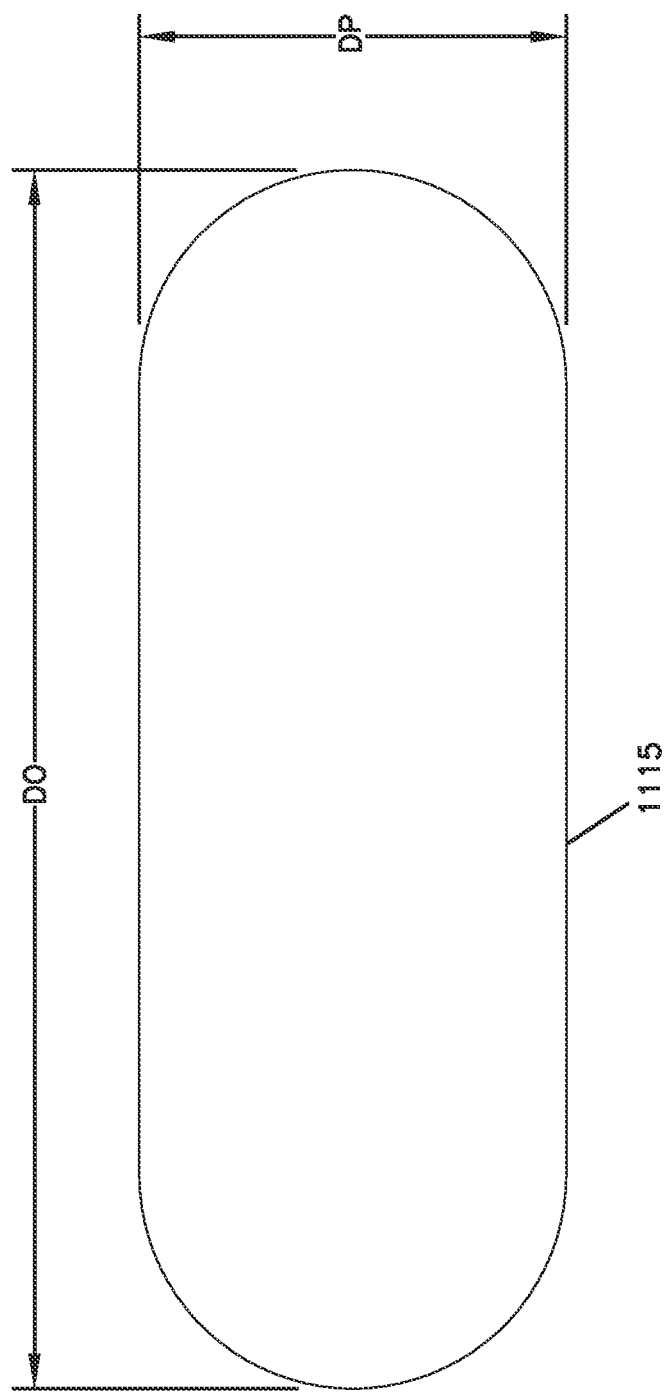
FIG. 76 is a schematic top plan view of a media component of the filter cartridge of FIG. 66.
Figure 77:
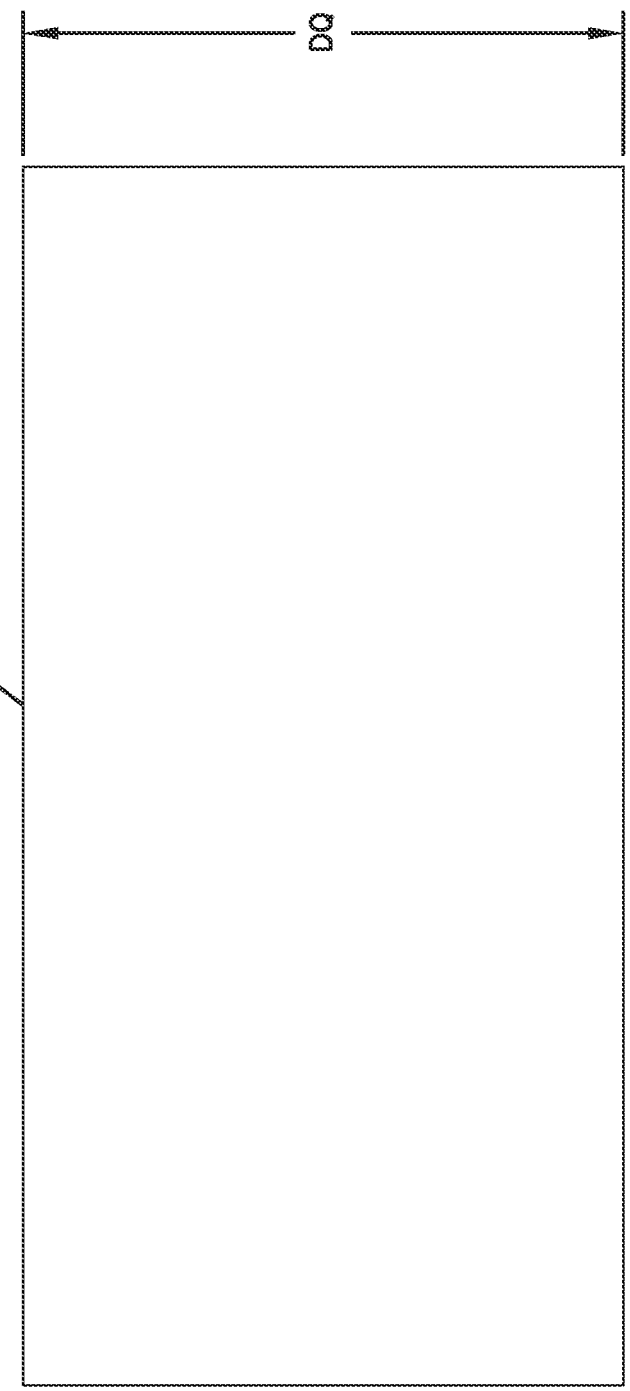
FIG. 77 is a schematic, side-elevational view of the media component of FIG. 76.

In FIG. 76, a top schematic view of a media perimeter configuration for media 1115 is shown. In FIG. 77, a side elevational view of the media perimeter 1115 is shown.

In FIGS. 63-77, some example dimensions are provided, as indication of a usable example arrangement. Alternate arrangements can be used. The example dimensions are as follows: In FIG. 68a, DA=13.5 mm; DB=6.5 mm; DC=14 mm; in FIG. 68b, DD=13.5 mm; DE=7.5 mm; and, DF=5.5 mm; in FIG. 71, DG=458 mm; and, DH=191 mm; in FIG. 72, DI=27 mm; in FIG. 74, DJ=488 mm; and, DK=191 mm; in FIG. 75, DL=6-20 mm; DM=3 mm; and, DN=15-70 mm; in FIG. 76, DO=457 mm; and, DP=160 mm; and, in FIG. 77, DQ=225 mm.

From a review of FIGS. 63-77 and the general principles discussed above, various alternate applications of the techniques described herein can be understood. In particular, the housing seal arrangement can comprise a flexible lip member. The flexible lip member can itself be pinched between housing portions, or it can have one sealing surface for engagement with the housing, and be positioned for compression to occur as a result of application of a pressure flange on the cartridge itself (under inducement from a housing section). The flexible lip member can comprise a member of a preformed gasket, or it can be molded-in-place. It can be formed from a variety of materials, and will typically a TPE (thermoplastic elastomer).

A housing seal arrangement using such a flexible seal member can be provided with an axial surface contour in accord with the general principles herein comprising a projection/recess contour arrangement. The projection/recess contour arrangement can comprise a stepped section (and comprise a section with more than one step if desired). It can comprise more than one contoured section or step section in the gasket member. It can be provided with 180° rotational symmetry if desired, but this is not required.

The seal can be formed to have the contouring in the gasket as molded, or it can be configured so that the support on which the support is positioned causes the deformation to provide the contouring. The gasket can be provided with contouring in both surfaces, which would be typical with a relatively thin flexible seal.

A particular gasket is depicted, which has two aligned lips connected by a central or joining section. One of the lips is used for mounting engaging the flange on the cartridge, the other lip comprising a flexible lip member that forms the axial seal with the housing.

The arrangement including a flexible lip can be provided without an edge contouring if desired, as shown in the previously discussed arrangement. It can, however, alternatively be provided with edge contouring if desired.

It is noted that in some applications of techniques described herein, a housing seal arrangement, using a single flexible lip member, can be provided without a rigid pressure flange on the cartridge. When this is the case, the flexible lip would then be pinched between two contoured sections of the housing, to provide the contouring in installation. That is, such a gasket might not have axial surface contouring in as it would appear on the cartridge when initially formed, but rather would be configured sufficiently thin and flexible so that it would deform to the desired contouring, as a result of being pinched between mating sections of a housing to form an arrangement, typically with contour (for example a step or stepped arrangement) as characterized herein. When this is the case, and a reference is made to a contoured axial surface of the cartridge, the reference is meant to the cartridge as installed. Of course, this type of arrangement could optionally be provided with edge contouring, if desired. It is noted that the cartridge 1104 of FIGS. 63-77 is depicted without handle arrangement thereon. Any of the handle arrangements previously discussed herein, and alternatives, can be provided or adapted for use with such a cartridge. For example, the support 1020s could be performed with a handle member thereon, if desired.

D. A Further Example Cartridge in Accord with Principles Characterized Herein, FIGS. 78-81a As indicated previously, arrangements according to the present disclosure can include a variety of contouring in the housing seal arrangement. Examples discussed above in connection with any of these described embodiments can be applied in others. An example alternative contouring is shown in the cartridge of FIGS. 78-81a.

Figure 78:
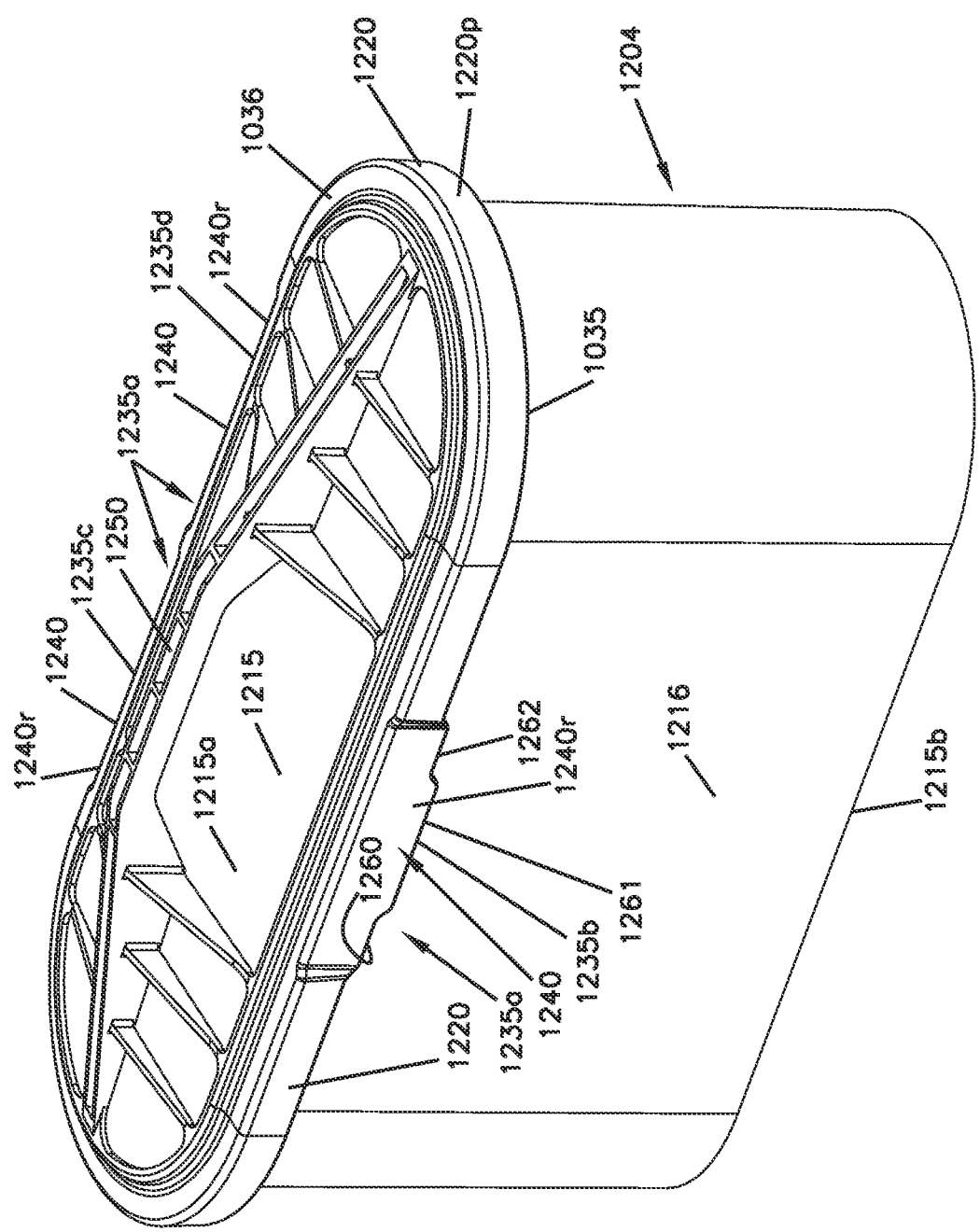

Referring to FIG. 78, cartridge 1204 is depicted having first and second, opposite, flow ends and generally comprising media 1215 positioned in extension between opposite end faces or ends 1215a, 1215b. In the example depicted, in FIG. 78, the cartridge 1204 includes a shield or sheath 1216 and a handle arrangement 1250. Thus far characterized, the cartridge 1204 is generally analogous to cartridge 1004, previously discussed.

Still referring to FIG. 78, cartridge 1204 depicted comprises a housing seal arrangement 1220, in the example depicted comprising a molded-in-place housing pinch seal 1220p. Pinch seal arrangement 1220p generally has opposite surfaces 1035, 1036 with at least one of the surfaces 1035 comprising contoured axial seal surface.

In the arrangement depicted, the housing seal arrangement 1220 includes a peripheral edge 1020e having a peripheral perimeter edge projection/recess arrangement 1240 therein, in the example depicted, comprising a recess arrangement 1240r.

Referring to FIG. 78, the housing arrangement 1220 includes, on surface 1035, a contour arrangement 1235a which is asymmetric with respect to rotation around a central axis between ends 1215a, 1215b. Also, the housing seal arrangement includes more than one stepped section.

In the example depicted, the housing seal arrangement 1220 comprises a first stepped section 1235b and second and third stepped sections 1235c and 1235d. The first stepped section 1235b is positioned along one side of the cartridge 1220, and the two sections 1235c, 1235d are positioned adjacent to, and spaced from, one another, along an opposite side. In the example shown, the stepped sections 1235b, 1235c, 1235d, except for location, are similar to one another in shape. This would be typical, but is not required in all applications.

Thus, and referring to FIG. 78, stepped section 1235a include first and second end steps 1260, 1262 with central step 1261 therebetween.

Figure 79:
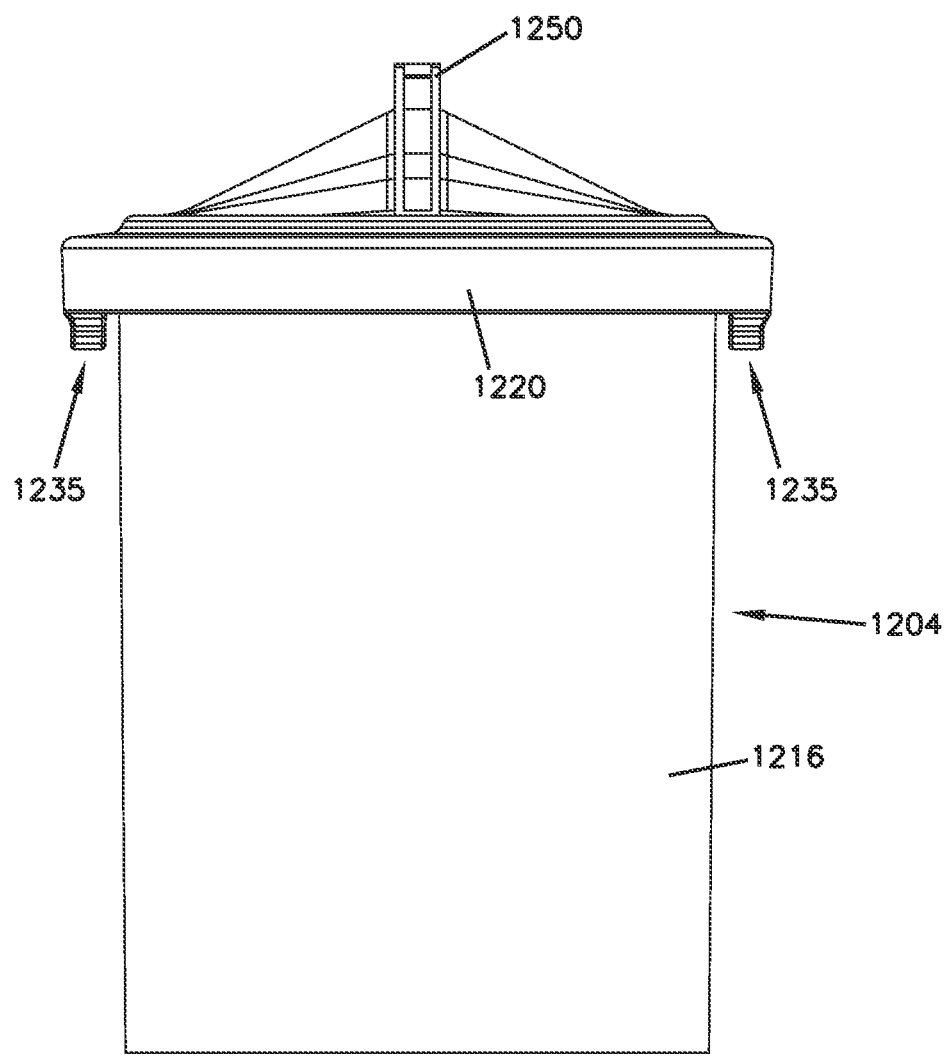

In FIG. 79, an end elevational view of cartridge 1204 is depicted. Features previously characterized can be viewed herein.

In FIG. 80, the side elevational view taken toward an opposite side to that viewable in FIG. 78 is shown. Here sections 1235d and 1235c can be viewed.

Figure 81:
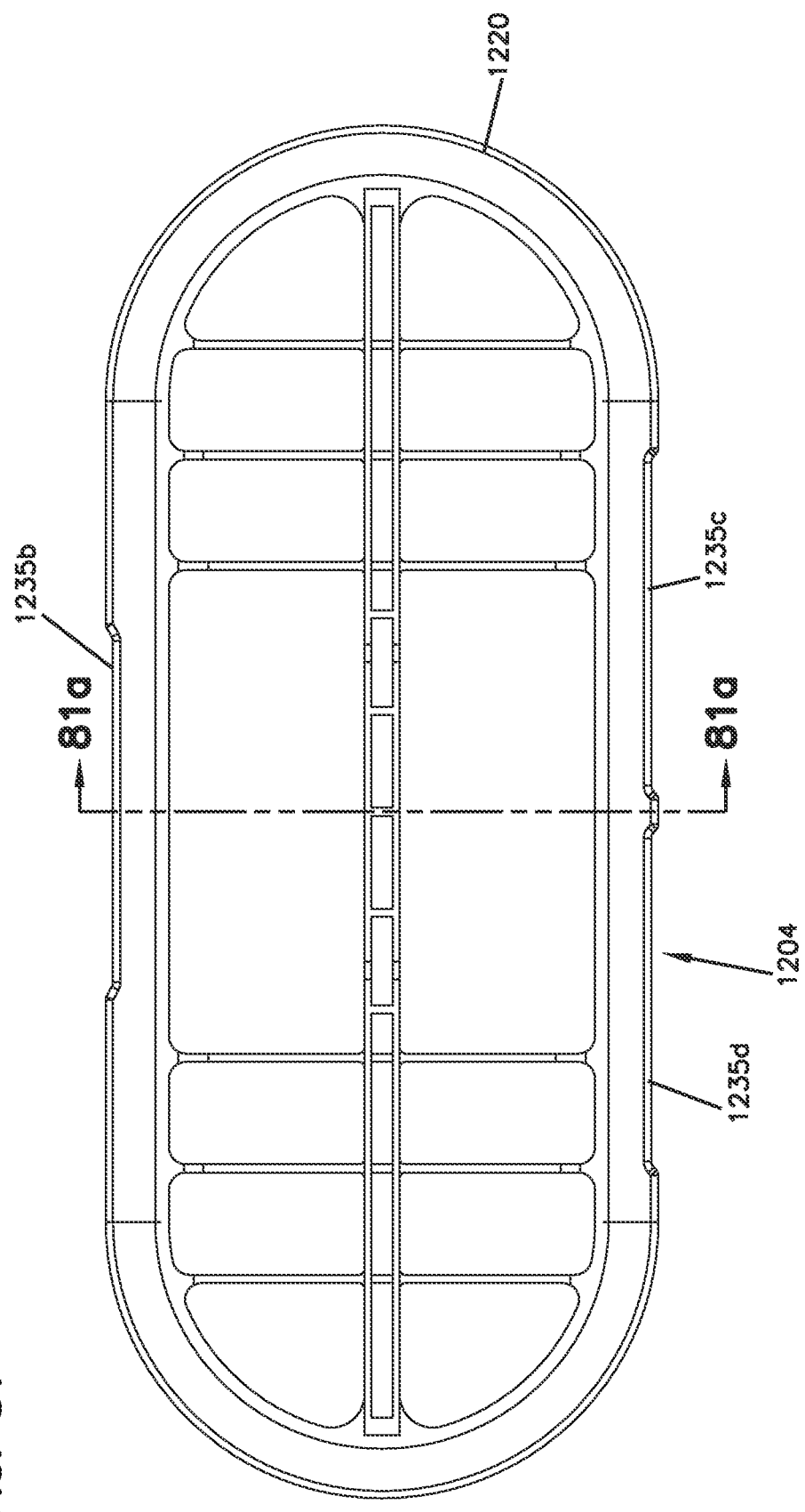

In FIG. 81, an enlarged fragmentary view of step 1235c is shown. It is noted that the other steps 1235b, 1235d are generally analogous, but alternatives are possible.

In FIG. 81, a top plan view of cartridge 1004 is provided. Here, analogous features to ones previously described are viewable.

Figure 81A:
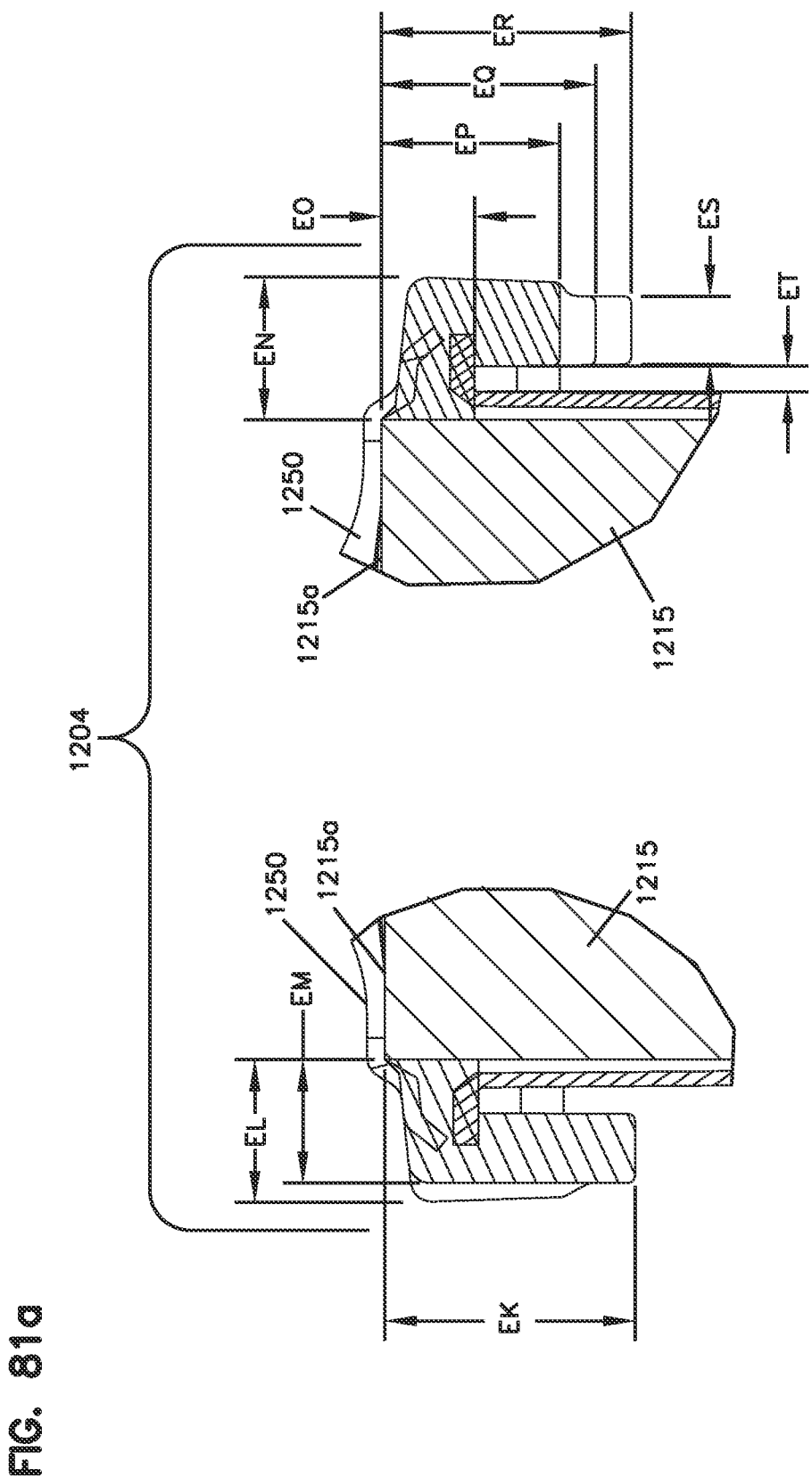

In FIG. 81a, an enlarged fragmentary schematic view taken along portions of line 81a-81a, FIG. 81 are shown. Here, analogous features to ones previously described are shown.

It is noted that in the embodiment of FIGS. 78-81, example dimensions were indicated. Although alternative dimensions are usable, the example depicted, it is meant to indicate a working arrangement. The example dimensions would be as follows; in FIG. 80, EG=10-25 mm, preferably 19 mm; EH=5 mm; EI=10-40 mm, preferably 32.5 mm; EJ=30.60 mm, preferably 46, angle XY=15°-75°, more preferably 30°-60°, typically 45°, radius 12=2-10 mm, more preferably 6 mm; in FIG. 81a, EK=35 mm; EL=20 mm; EM=17.3 mm; EN=20 mm; EO=13 mm; EP=25 mm; EQ=30 mm; ER=35 mm; ES=9.53 mm; and ET=3.6 mm.

In more general terms, the embodiment of FIGS. 78-81a was meant to indicate general principles applicable with many of the variations characterized here. In particular, multiple contour sections and contour sections in a contour surface of the seal arrangement can be provided, and there is no requirement that the same number of locations be used along each side of the cartridge, nor is symmetry required.

It is noted that as discussed, the various stepped sections can be the same as one another, but they can be different from one another as well.

E. A Further Example Filter Cartridge, FIG. 82-85

As thus far characterized, the contour section of the housing seal arrangement has generally been depicted projecting away from an end of the cartridge having a handle thereon (or inlet flow face thereon). In more general terms, the housing seal arrangement is generally positioned adjacent one end of the cartridge, and in the example depicted, the projection portion of the contour (or the contour portion of the housing seal arrangement) is generally away from that end and toward the opposite. Alternative arrangements can be used.

An example is depicted in FIGS. 82-85. Here, the filter cartridge 1304 may be generally analogous to those previously discussed, having first and second, opposite, flow ends and including: media 1315, with opposite ends or flow surfaces 1315a, 1315b; housing seal arrangement 1320 with opposite surfaces 1335, 1336; shield or sheath 1316 and handle arrangement 1350. However, it is noted that contouring is indicated at 1336c in surface 1336, and, opposite surface 1335 is not contoured.

It also noted that in the example depicted, the contoured sections 1336c are projection sections, although one could be a projection section, one could be a recess section, or both could be recess sections. Further it is noted that each is oriented without a peripheral perimeter recess section oriented therewith, but alternatives are possible.

Figure 82:
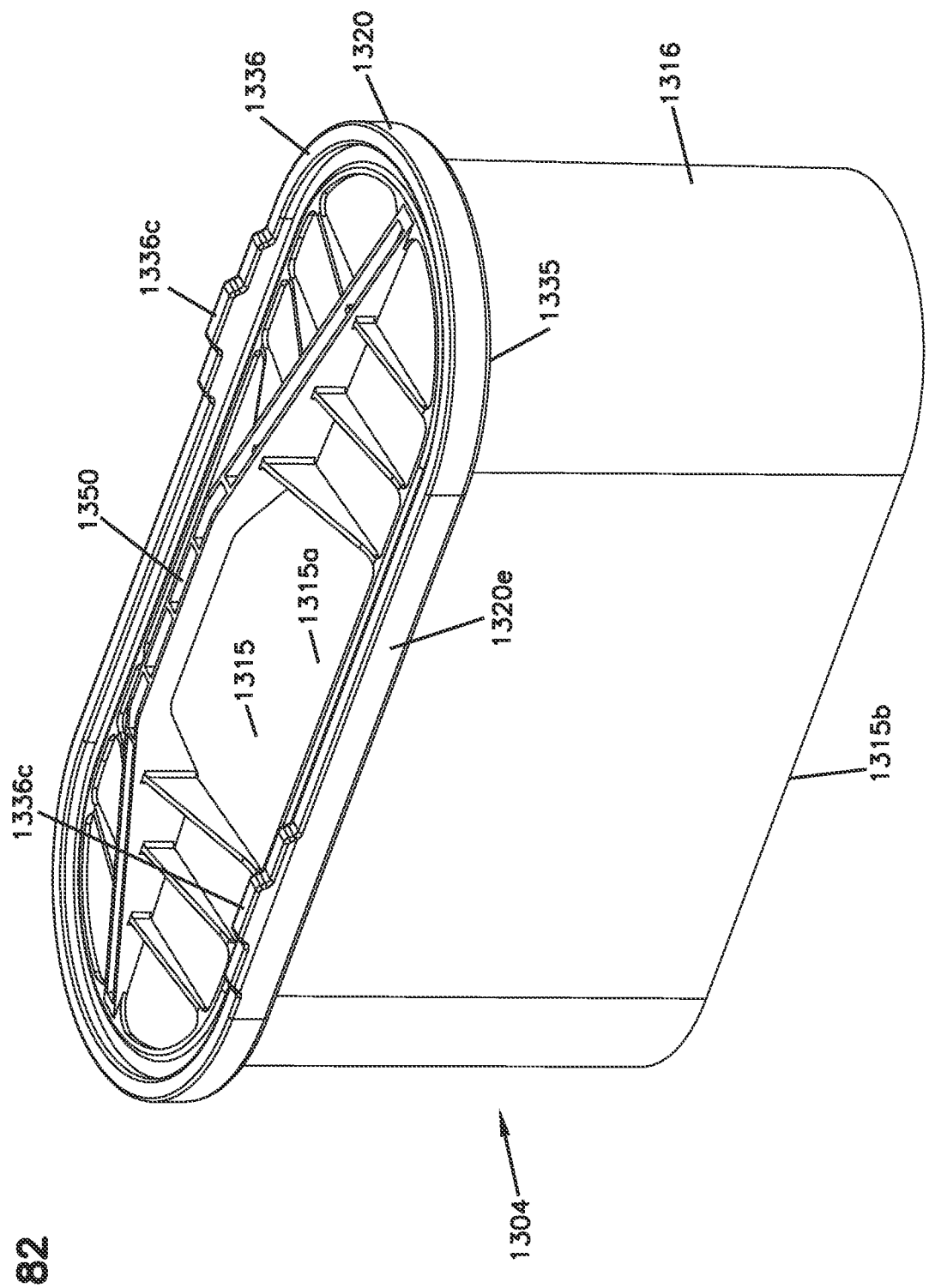
Figure 83:
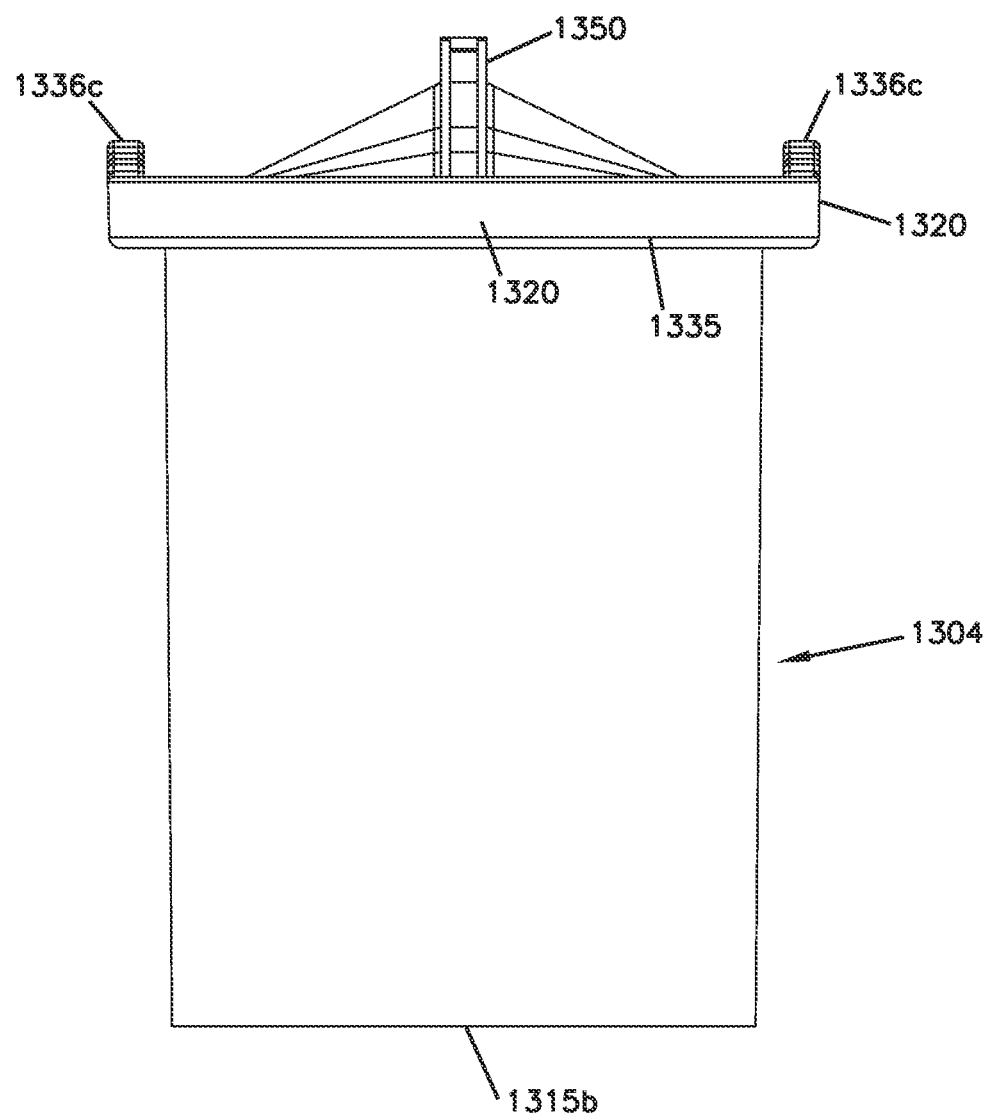

In FIG. 82, an end elevational view of the cartridge 1304 is provided. In FIG. 84, a top plan view is provided. In FIG. 85, a long dimension side elevational view of cartridge 1304 is provided.

The embodiment of FIGS. 82-85 is meant to generally indicate that the principles of the present application are not intended to be limited to an arrangement in which projection only occurs from face 1315a toward surface 1315b. Rather, it can extend away from both surfaces. Further, in FIG. 82, it is noted that the peripheral perimeter edge 1320e does not have any projection/recess contour therein. This is merely to indicate that any of the embodiments could be provided without an optional edge contour if desired.

It is also noted that the applications could be applied in arrangements in which each of the surfaces 1335, 1336 (or analogous surface in another embodiment) has a member of a projection/contour arrangement therein. Also, it is not required that all members be either a projection member or recess member, but rather some could be one and some could be another.

F. Some General Applicable Principles and Features

1. Features Relating to Seal Symmetry/Asymmetry

In the various embodiments described herein, both with respect to FIGS. 50-85 and also with respect to the earlier described embodiments of FIGS. 1-49. Features of symmetry/asymmetry are discussed with respect to the housing seal arrangement. A variety of possibilities can be practiced with the techniques described herein.

A first characterized concept with respect to symmetry, is rotational symmetry. Rotational symmetry as discussed herein is symmetry in rotation around an axis that extends through a center of the cartridge, in the direction between the opposite flow ends or flow faces. It can be characterized as a central axis around which the housing seal arrangement extends. A seal member housing or seal arrangement has rotational symmetry, or 180° rotational symmetry, if it can be rotated 180° and align with itself. Examples of rotational symmetry or 180° rotational symmetry are provided for example, by the embodiment depicted in FIG. 57. The example of FIG. 78 on the other hand, represents rotational asymmetry; i.e. the arrangement does not align with itself unless rotated through a full 360°.

Planar symmetry or asymmetry can also be defined for the housing seal arrangement or seal member. In general, for arrangements that have a long cross-sectional axis and a shorter axis, generally the longer axis plane would be a plane through the center of the housing seal arrangement in long-dimension; and, a short-dimension, plane would be a plane through the short dimension at a center of, and perpendicular to, the long dimension. With respect to any defined plane, planar symmetry would be a situation in which the housing seal arrangement defines a mirror image on an opposite side of the plane from a first side. With asymmetry, there would be no such mirror image.

An example of long-dimension planar symmetry is provided, for example, in the embodiment of FIG. 12. Long-dimension planar asymmetry is reflected for example in the embodiment of FIG. 57.

Short-dimension plane symmetry is shown in the embodiment of FIG. 78. Short dimension planar asymmetry is shown for example in the embodiments of FIG. 57.

An arrangement can have both long-dimension planar symmetry and a short-dimension planar symmetry. An arrangement can have long-dimension planar symmetry and short dimension planar asymmetry. An arrangement can have long-dimension asymmetry and short dimension symmetry. An arrangement can be asymmetric with respect to each of the long-dimension plane and short dimension plane.

Any of the variety of arrangements in variations characterized herein, can be applied with any of the types of symmetries or asymmetries characterized. The selected symmetries/asymmetries features with respect to rotational and the two planar definitions can be used in a variety of ways to advantage.

For example, rotational symmetry can be used to allow that a cartridge can be rotated in either of a plurality of orientations for installation, for example two, which can be convenient in some applications. On the other hand, if it is desired to allow for only one rotation, for example to manage a possible MAFS (mass air flow sensor) issue or other issues, this can be accommodated as well. Further, the combination of symmetry/asymmetry characterizations can be used to provide a unique appearing cartridge with respect to any selected system. This can facilitate servicing, i.e. recognition of the appropriate service part for the system of concern.

2. Step Definitions

In many of the embodiments characterized herein, the contoured axial surface section of the projection/receiver housing axial seal arrangement, is shown as having a stepped (or step) configuration. In general terms, each contoured section within an contoured surface, will tend to not extend over more than about 200 mm and typically not more than about 180 mm, in extension along a periphery or perimeter of the media. Typically, within a stepped region, each step has a non-contoured (flat) section extending at least 5 mm, and usually at least 10 mm, often at least 20 mm, in many instances at least 30 mm, sometimes at least 40 mm, usually within the range of 10-80 mm.

Typically, when a contoured section comprises multiple steps, each step, in maximum relief from an adjacent portion of the housing seal surface, extends at least 2 mm, often at least 5 mm, typically at least 8 mm, for example at least 10 mm, usually not more than 80 mm, and in many applications, within the range of 10-60 mm, inclusive.

Generally, where each step transitions to a next step, an angle of extension of a straight transition section to a first step section or other flat section of the seal arrangement is within the range of about 35°-85° with a radius of curvature at each end being non-sharp, to facilitate engagement with the housing surface. Preferably the radius of curvature where the transition section engages a flat perimeter section (either one of the steps or a non-contoured portion of the adjacent axial seal surface) has a radius of at least 2 mm, usually within the range of 2-10 mm, often within the range of 4-8 mm, inclusive. In some instances, it can be characterized as having a radius of at least 8 mm, and can be quite large. The issues relating to the radius of curvature at the similar sizes of the transition ends (not too sharp a radius so as to inhibit sealing) is different than issues control the radius of curvature at the larger end of the range. It should typically be sufficiently large for good sealing, but not so large that undesirable extra length of perimeter is needed to manage the transition. Examples of these ends of transition sections are shown at Z, FIG. 80.

It is also noted that when the peripheral perimeter edge has a recesses toward the media, the contour will have end transition regions where they engage the non-contoured portion of the edge. Examples of these are shown in FIG. 90 at R. Typically, the radius of curvature at these locations should be within the range of 2-6 mm, inclusive for convenient transitions.

Figure 80A:
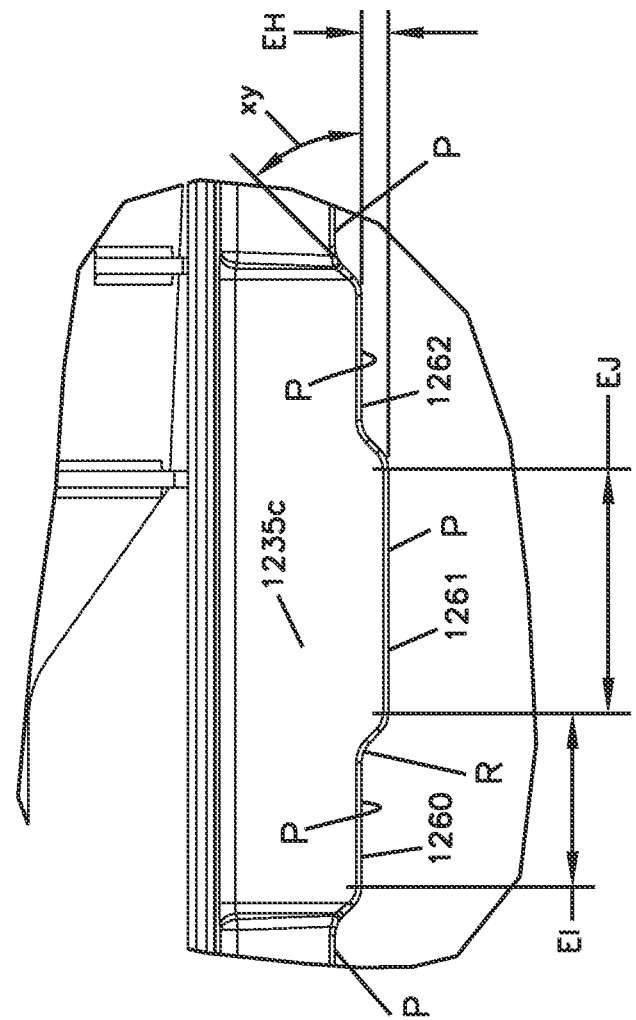

Typically, when the regions are stepped, for example as characterized in FIG. 80a, the stepped portion of each projection is located with a non-contoured portion in a plane generally parallel to the non-contoured surface of the next adjacent step or the non-contoured portion of the same axial seal surface, with a planes separated by at least 2 mm, usually at least 5 mm, sometimes at least 10 mm. In some instances, it can be quite large, for example at least 20 mm. These planes can be understood by reference to the sections indicated at P, FIG. 80a.

3. General Applications of the Techniques to Alternate Embodiments

In general, the specific features and techniques characterized herein, with respect to any given embodiment, can be applied or adapted to be applied in other embodiments as well. The embodiments characterized are not meant to be exclusive to one another, with respect to available features for use. Thus, alternate handle arrangements, media and media pack configurations, and specific housing seal arrangement features can be used with a variety of the techniques characterized.

V. General Summary and Characterizations

A. General Summary

According to the present disclosure, techniques and features for filter cartridges are characterized. Typically the filter cartridges are of the type that can be used in an air cleaner assembly, as a service part. A typical application would be for filtering combustion air directed to the intake of an internal combustion engine of a vehicle or other equipment.

In general terms, a filter cartridge is provided. The cartridge has first and second flow ends and comprises filter media, positioned to filter fluid (air) directed between the flow ends. A variety of media types are characterized, having media (flutes or pleat tips) extending between the first and second flow ends. The term "flutes" is meant to refer to pleats or other types of corrugations.

Example media types includes those which have a fluted sheet secured to a facing sheet, formed into a media pack. Such arrangements may be corrugated or may comprise a stack of individual strips of single faced media.

Other media types characterized are ones in which the cartridge has multiple, spaced, pleated media extensions extending between the first and second flow ends.

The first and second flow ends can comprise flow faces, i.e. faces of the cartridge into which, or from which, air flow occurs.

In general, the filter cartridge includes a seal arrangement. The seal arrangement may comprise, for example, a pinch seal arrangement. In general, the seal arrangement has a first axial housing engagement (seal) surface, i.e. (seal) a surface which is directed axially and which is configured to engage a housing surface, with sealing, in use. The first axial seal housing seal engagement surface includes a contoured axial surface section thereon, having at least a first housing engagement projection/recess member thereon.

In general terms, seal arrangements characterized herein include seal members that have first and second, opposite, axially directed surfaces, one of which is the first axial seal housing engagement surface. When the seal member is a pinch seal member, each of the opposite axial surfaces engages the housing, in a typical application. In some arrangements, the flexible lip member can be provided, with one surface that engages the housing and an opposite surface that engages a seal support on the cartridge.

A typical housing seal arrangement, or seal member, characterized herein has an outer peripheral, perimeter, edge or edge surface. That peripheral edge or peripheral perimeter edge surface is the edge or surface of the seal member that faces away from the media in extension around the cartridge. In various example arrangements characterized herein, this seal arrangement includes an optional first member of a peripheral edge projection/recess contour therein. In certain examples, this first member of a peripheral edge projection/recess contour includes a first recess member, which may comprise a single recess section or multiple spaced recess sections in the peripheral edge surface.

The first housing engagement projection/recess member in the contoured axial seal surface section can comprise either a recess member or a projection member. Indeed, in some arrangements it can include both a recess member and a projection member.

Among the variations characterized as usable herein, is an arrangement in which the first housing engagement projection/recess member comprises at least one projection section, and examples are characterized in which include more than one, spaced, projection section.

In certain example arrangements characterized herein, the first housing engagement projection/recess member comprises a stepped arrangement including a first end step section projecting toward a flow end; a central step section projecting toward the same selected flow end; and, a second end step section projecting toward the same selected flow end; with: the central step section being positioned between the first and second end step sections; and, with the central step section projecting toward the selected flow end from each of the first end step section and second step section. In a typical arrangement, each one of the first end step section and the second end step section and the central step section extends, without axial contouring over a peripheral length of at least 5 mm, typically a peripheral length of at least 10 mm, often more Herein, examples are depicted and described in which the seal arrangement includes both a housing projection/recess member on the axial sealing surface; and, a peripheral, perimeter, edge projection/recess contour on the seal arrangement peripheral perimeter edge, the two being in axial alignment with one another; i.e. located over the same perimeter extension of the seal arrangement (typically on the resilient seal member). This would typically be the case whether each comprises one member or more than one member.

As indicated previously, selected example arrangements are described in which the seal arrangement comprises a pinch seal arrangement having an outer peripheral edge surface and first and second, opposite, pinch seal engagement surfaces with one of the first and second, opposite, pinch seal (housing engagement) surfaces being the axial seal engagement surface with a contoured section thereon, having at least a first housing engagement projection/recess member therein.

Certain examples are shown in which the opposite pinch seal housing engagement surface from the one with the first housing engagement projection/recess member is itself not contoured, for example in complete continuous peripheral extension around the media.

In typical arrangements, in which the housing seal arrangement comprises a molded-in-place seal member having first and second, opposite, pinch seal housing engagement surfaces, the surfaces are spaced apart at least 5 mm and not more than 50 mm.

In typical arrangements which include an optional peripheral perimeter edge projection/recess contour, typically that contour has a relief relative to adjacent portions of the edge, at least 1 mm and not more than 10 mm.

Typically when the peripheral perimeter edge projection/recess contour is present, any section of it extends over a peripheral perimeter distance of at least 5 mm, typically at least 10 mm.

As discussed herein above, the media can be provided with a plurality of shapes, including ones that have non-circular outer peripheries, such as oval peripheries or rectangular peripheries. In a typical arrangement, the outer periphery has at least one straight section extending over a distance of at least 40 mm. When such is the case, typically any peripheral perimeter edge projection/recess contour includes a section in overlap with that straight side section of the media. Also, typically a projection/recess contour in the axial sealing surface is in orientation with the overlap straight side section. Of course, there can be more than one straight side section and more than one section of projection/recess contour.

Indeed, examples of this are shown in instances where the media has an oval perimeter with two opposite straight sides and two opposite curved ends; and, in the examples where the media has a rectangular perimeter. In a variety of examples depicted herein, a first flow end of the media is an inlet flow end and a seal arrangement is positioned adjacent to that inlet flow end, although it may be spaced therefrom slightly. Alternates are possible.

Example arrangements are depicted in which the first and second opposite flow ends are generally planar, and the seal arrangement is generally positioned in a plane parallel to one of the flow ends. Alternatives are possible.

The arrangements characterized herein are particularly convenient for application in cartridges in which the media has significant dimension or extension between the first and second flow ends. For example, on the order of at least 80 mm, usually at least 100 mm, often 150 mm or more, for example 200 mm or more.

Filter cartridge variations are characterized herein that include a handle arrangement thereon. The handle arrangement may be provided to project in a direction away from the pinch seal member on the first and second flow ends. An example peripheral handle arrangement is shown in some embodiments, including ones having at least two, spaced, optional handle projections. Examples with the two spaced handle projections positioned adjacent peripherally opposite portions of the media pack are described.

Another type of handle member characterized is a handle member having a central handle bridge positioned over a flow end of the media.

These handle arrangements can be used in a connection with the variety of the arrangements characterized herein, and in other applications to advantage.

In some examples, the seal arrangement comprises seal member or resilient seal member which is a portion of a molded-in-place member, and the handle member is secured to a remainder of the cartridge by the molded-in-place member. To accomplish this, the handle member may be provided with a peripheral rim section, for example by which it is secured to the molded-in-place member. In certain example arrangements characterized herein, the seal arrangement includes an axial pinch seal having first and second, opposite, housing engagement surfaces; and, the cartridge is configured such that a pinch seal housing engagement surface is positioned on a portion of the pinch seal arrangement spaced from the media by receiver space. That receiver space can be configured to extend completely peripherally around the media, and can be configured to receive portion of a housing projection therein, between the engagement surface of the media, during installation.

In these examples, the radially inner surface of the axial pinch seal arrangement can be contoured, for example in extension toward the second pinch seal housing engagement surface. In an example characterized, a slanted section that slants away from the media as it extends toward the second pinch seal housing engagement surface is shown and described. It is noted that in certain examples characterized herein, the housing seal arrangement includes a portion molded directly to the filter media. When this is done, it will typically be adjacent a flow end, i.e. adjacent a first (typically in use, inlet) flow end.

In some examples characterized herein, the seal arrangement is positioned on a seal support, typically a rigid preform member. This can provide the seal arrangement with some support in use. In certain examples, the seal support is positioned on preform shell surrounding the media pack. However, whether or not a seal support is provided, preform shell can provide some advantage in protecting the media.

The preform shell, when used, can be provided with an end grid in extension across a flow end of the media. It can also include a receiver extending from that flow end to a location surrounded by the media.

In some arrangements, instead of molded-in-place, the seal arrangement can comprise a preform gasket member positioned around a filter media. An example of such gasket member is characterized, which includes a flexible seal or lip member positioned to flex toward or away from a pressure surface on a seal support. The particular example gasket is shown which has first and second lateral lips or flanges. In an example, one of the flanges or lips, in particular the one which engages the housing, is thicker than the first flange. A typical such preformed gasket member would comprise a tpe (thermoplastic elastomer).

As indicated above, example cartridge arrangements when the media pack has a non-circular outer perimeter are characterized. In many instances, they will be cross-sections that have a long dimension and a short dimension, with a ratio of the long dimension to the short dimension being at least 1.3:1, typically within the range of 1.3:1 to 5:1, inclusive, although alternatives are possible. Some examples are provided in range of ratios is within 1.5:1 to 3.5:1, inclusive.

Example arrangements are provided in which a significant portion of the axial housing seal engagement surface (or sealing surface) that is contoured, is also flat, typically 10% of it being flat, often at least 20% of it being flat, and in many instances 50% or more.

When the peripheral perimeter edge surface is contoured, and those contours are recesses, typically the recesses are at least 1 mm deep, in direction toward the media. Often it is at least 2 mm deep in maximum dimension, in a direction toward the media.

Typically, when the contoured section of the first axial housing engagement surface is a projection member, that projection member has a maximum dimension axially of at least 2 mm from an adjacent non-contoured portion of the surface, typically at least 3 mm, and often 5 mm, or more. The housing seal engagement surface when it includes a projection can be provided with stepped transition sections therein, for example extending at an angle within the range 35°-85°, typically 40°-80°, often 45°-60°, inclusive, relative to a plane in perpendicular direction between the flow ends.

It is noted that the outer peripheral perimeter edge surface can be provided with a portion tapering toward the media pack in extension axially.

Herein, a variety of symmetry arrangements have been characterized. For example, the outer peripheral perimeter edge surface can be provided radially asymmetric around a central axis, as can a housing engagement surface or sealing surface. Alternatively, one or both can be provided with 180° rotational symmetry in extensions around a central axis.

Also herein above, planar symmetry and asymmetry configurations are characterized, with respect to each or both of the long dimension cross-section or short dimension cross-section, for the seal arrangement.

Also, according to the present disclosure, air cleaner assemblies are characterized. A typical air cleaner assembly is one which includes a housing having a first housing section and a second housing section, and a filter cartridge in accord with the various ones of the characterizations provided herein positioned within the housing, with a first axial seal housing engagement surface biased against a portion of one housing section by the other housing section. Often it is biased against a housing seal surface that is surrounded by a peripheral flange or wall section.

Typically, the housing seal surface includes at least one peripheral discontinuous projection/recess contour member therein, which mates with or is engaged by a projection/recess contour member on a housing seal surface in the cartridge.

Typically, the housing seal surface on each of the cartridge and housing can include one stepped member therein, often more than one stepped member.

Examples are described in which the housing also has, on a peripheral flange, a peripheral perimeter edge projection recess contour configured to engage or mate with a peripheral perimeter edge projection/recess contour on the cartridge, i.e. on the cartridge seal member. Various numbers of the projection/recesses are characterized.

Examples are characterized in which the housing includes on access cover section having a pressure flange thereon and the housing includes a base section having a sealing surface thereon, the pressure flange being positioned on a portion of access cover that projects at least well into the base section, when the cartridge is sealed in position.

Examples are characterized in which the housing has a base section with the housing flow inlet arrangement and a housing flow outlet arrangement therein, for example, with a housing flow inlet arrangement being a side inlet. In this situation, the housing access cover, which would be an end section, would not have a flow inlet or flow outlet to the overall housing thereon.

Often the housing is provided with a section having a surface with a curved flow directing surface or vane thereon oriented to turn flow from a side inlet toward the cartridge.

There is no specific requirement that all air cleaner assemblies, components and features be applied with all of the characterizations provided herein, in order to obtain some advantage in accord with the present disclosure. The teachings are meant to be applicable in a variety of arrangements, including alternates to the ones depicted, and alternate to the particular combinations of features depicted herein.

B. Selected Characterizations

1. A filter cartridge characterized by: (a) first and second, opposite, flow ends; (b) media positioned to filter fluid flow between the first and second, opposite, flow ends; and, (c) a seal arrangement having a first axial seal housing engagement surface; (i) the first axial seal housing engagement surface including a contoured axial seal surface section having at least a first housing engagement projection/recess member thereon.
2. A filter cartridge according to characterization 1 wherein: (a) the media extends over a distance of at least 80 mm in a direction between the first and second flow ends.
3. A filter cartridge according to any one of characterizations 1-2 wherein: (a) the media extends over a distance of at least 150 mm in a direction between the first and second flow ends.
4. A filter cartridge according to any one of characterizations 1-3 wherein: (a) the media extends over a distance of at least 180 mm in a direction between the first and second flow ends.
5. A filter cartridge according to any one of characterizations 1-4 wherein: (a) the seal arrangement includes a peripheral, perimeter, edge surface having a first member of a peripheral edge projection/recess contour therein.
6. A filter cartridge according to characterization 5 wherein: (a) the first member of a peripheral edge projection/recess contour includes a first recess member.
7. A filter cartridge according to any one of characterizations 5 and 6 wherein: (a) the first member of a peripheral projection/recess contour comprises multiple, spaced, recesses in the peripheral edge surface.
8. A filter cartridge according to any one of characterizations 1-7 wherein: (a) the first housing engagement projection/recess member comprises at least one projection section.
9. A filter cartridge according to any one of the characterizations 1-8 wherein: (a) the first housing engagement projection/recess member comprises: a first end step section, projecting toward a selected flow end; a central step section projecting toward the selected flow end; and, a second end step section projecting toward the selected flow end; (i) the central step section being positioned between the first and second end step sections; and, (ii) the central step section projecting toward the selected flow end from each of the first end step section and the second end step section.
10. A filter cartridge according to characterizations 9 wherein: (a) each one of the first end step section, the second end step section and the central step section extends, without axial contouring, over a peripheral length of at least 5 mm.
11. A filter cartridge according to any one of characterizations 9 and 10 wherein: (a) each one of the first end step section, the second end step section and the central step section extends, without axial contouring, over a peripheral length of at least 10 mm.
12. A filter cartridge according to any one of characterizations 7-11 wherein: (a) each one of the first end step section, the second end step section and the central step section extends, without axial contouring, over a peripheral length of at least 20 mm.
13. A filter cartridge according to any one of characterizations 1-12 wherein: (a) the housing engagement projection/recess member comprises at least one projection that includes at least one section that extends over a peripheral, perimeter, distance of at least 30 mm, without contouring in that section.
14. A filter cartridge according to any one of characterizations 1-13 wherein: (a) the housing engagement projection/recess member comprises at least one projection that includes at least one section that extends over a peripheral, perimeter, distance of at least 10 mm without contouring in that section.
15. A filter cartridge according to any one of characterizations 1-14 wherein: (a) the housing engagement projection/recess member comprises at least one projection that includes at least one section that extends over a peripheral, perimeter, distance of at least 20 mm without contouring in that section.
16. A filter cartridge according to any one of characterizations 1-15 wherein: (a) the housing engagement projection/recess member comprises at least one projection that includes at least one section that extends over a peripheral, perimeter, distance of at least 30 mm without contouring in that section.
17. A filter cartridge according to any one of characterizations 1-16 wherein: (a) the housing engagement projection/recess member comprises at least one projection that includes at least two sections that each extend, without contouring therein, over a peripheral perimeter distance of at least 30 mm.
18. A filter cartridge according to any one of characterizations 1-17 wherein: (a) the housing engagement projection/recess member comprises at least one projection that includes at least one section that extends over a peripheral perimeter distance of at least 40 mm without contouring in that section.
19. A filter cartridge according to any one of characterizations 1-18 wherein: (a) the seal arrangement includes a peripheral, perimeter, edge surface having a first member of a peripheral, perimeter, projection/recess contour therein; and (b) the housing projection/recess member includes a projection section positioned in a portion of the first edge seal housing engagement surface at a location in axial alignment with the first member of the peripheral projection/recess contour in the peripheral edge surface.
20. A filter cartridge according to characterization 19 wherein: (a) the peripheral, perimeter, projection recess contour includes first and second, spaced, edge contour sections; and, (b) the housing engagement projection/recess member includes spaced axial seal surface contour sections therein; (i) each axial seal surface contour section being axially aligned with an associated one of the edge contour sections.
21. A filter cartridge according to any one of characterizations 1-20 wherein: (a) the seal arrangement includes a peripheral edge surface having at least two spaced recess sections therein.
22. A filter cartridge according to characterization 21 wherein: (a) the first housing engagement projection/recess member includes a projection portion in axial alignment with each recess section in the peripheral edge surface.
23. A filter cartridge according to any one of characterizations 1-22 wherein: (a) the seal arrangement comprises a pinch seal arrangement having: an outer peripheral edge surface; and, first and second, opposite, pinch seal housing engagement surfaces; (i) at least a selected one of the first and second, opposite, pinch seal housing engagement surfaces including the contoured axial seal surface section having at least the first housing engagement projection/recess member therein.
24. A filter cartridge according to characterization 23 wherein: (a) the second pinch seal housing engagement surface includes the contoured axial seal surface section with the first housing engagement projection/recess member therein; and, (b) the opposite first pinch seal housing engagement surface does not include a housing engagement projection/recess member therein.
25. A filter cartridge according to characterization 24 wherein: (a) the first pinch seal housing engagement surface includes a non-contoured pressure flange engagement section that has a complete, continuous, peripheral extension around the media.
26. A filter cartridge according to any one of characterizations 23-25 wherein: (a) a distance between the first and second, opposite, pinch seal housing engagement surfaces is at least 5 mm and not more than 50 mm.
27. A filter cartridge according to characterization 26 wherein: (a) the pinch seal arrangement has a peripheral, perimeter, edge with a first member of a peripheral, perimeter, edge projection/recess contour thereon; (i) the first member of a peripheral, perimeter, edge projection/recess contour having a maximum contour relief of at least 1 mm and not more than 10 mm. 28. A filter cartridge according to characterization 27 wherein: (a) the first member of a peripheral, perimeter, edge projection/recess contour comprises a section with straight edge surface section extending over a peripheral, perimeter, distance of at least 5 mm. 29. A filter cartridge according to any one of characterizations 27 and 28 wherein: (a) the first member of a peripheral edge projection/recess contour comprises a recess member. 30. A filter cartridge according to any one of characterizations 27-29 wherein: (a) the first member of a peripheral, perimeter, edge projection/recess contour in the pinch seal arrangement comprises a recess member having at least two spaced recess sections.

31. A filter cartridge comprising: (a) first and second, opposite, flow ends; (b) filter media positioned to filter fluid flow between the first and second, opposite, flow ends; and, (c) a pinch seal arrangement having: an outer peripheral edge surface; and, first and second, opposite, pinch seal housing engagement surfaces; (i) the second one of the first and second, opposite, pinch seal housing engagement surfaces being a contoured housing engagement surface; and (ii) the first one of the first and second, opposite, pinch seal housing engagement surfaces having a peripherally continuous pressure flange engagement section that is not contoured as a mirror image of the contoured housing engagement surface of the second pinch seal housing engagement surface. 32. A filter cartridge according to characterization 31 wherein: (a) the peripherally continuous pressure flange engagement section is a non-contoured pressure flange engagement section. 33. A filter cartridge according to any one of characterizations 31 and 32 wherein: (a) the peripheral edge surface of the pinch seal arrangement includes a first member of a peripheral, perimeter, projection/recess edge contour therein. 34. A filter cartridge according to characterization 33 wherein: (a) the contoured housing arrangement surface includes a housing engagement projection member positioned in a portion of the pinch seal arrangement in axial alignment with the first member of a peripheral, perimeter, projection/recess edge contour.
35. A filter cartridge according to characterization 34 wherein: (a) the peripheral, perimeter, projection/recess edge contour includes first and second, spaced, edge contour sections; and, (b) the housing engagement projection/recess member includes spaced, axial seal surface contour sections therein; (i) each axial seal surface contour section being axially aligned with an associated one of the edge contour sections. 36. A filter cartridge according to any one of characterizations 34 and 35 wherein: (a) the first member of the peripheral, perimeter, projection/recess edge contour comprises multiple, spaced, recesses in the peripheral surface. 37. A filter cartridge according to any one of characterizations 31-36 wherein: (a) the contoured housing engagement surface includes at least one housing engagement projection member comprising multiple step sections. 38. A filter cartridge according to any one of characterizations 31-37 wherein: (a) a peripheral, perimeter, edge surface of the seal arrangement includes a section of a first member of a peripheral, perimeter, edge projection/recess contour in overlap with a straight section of the media. 39. A filter cartridge according to any one of characterizations 1-38 wherein: (a) the first axial seal housing engagement surface includes at least one housing engagement projection member in overlap with a straight section of the media. 40. A filter cartridge according to any one of characterizations 1-39 wherein: (a) the first flow end of the filter cartridge media is an inlet flow end; (b) the seal arrangement is positioned adjacent the inlet flow end; and, (c) the first axial seal housing engagement surface faces in a direction toward the second flow end of the cartridge. 41. A filter cartridge according to any one of characterizations 1-40 wherein: (a) the seal arrangement comprises an axial pinch seal having first and second, opposite, pinch seal housing engagement surfaces; and (b) a minimal distance between the first and second, opposite, pinch seal housing engagement surfaces is at least 5 mm.

42. A filter cartridge according to characterization 41 wherein: (a) a minimal distance between the first and second, opposite, pinch seal housing engagement surfaces is at least 10 mm. 43. A filter cartridge according to any one of characterizations 41 and 42 wherein: (a) a maximum distance between the first and second, opposite, pinch seal surfaces is no greater than 50 mm. 44. A filter cartridge according to any one of characterizations 41-43 wherein: (a) a maximum distance between the first and second, opposite, pinch seal surfaces is no greater than 40 mm. 45. A filter cartridge according to any one of characterizations 1-44 including: (a) a handle arrangement projecting in a direction away from the pinch seal member and the first and second flow ends. 46. A filter cartridge according to characterization 45 wherein: (a) the handle arrangement comprises a peripheral handle arrangement.
47. A filter cartridge according to any one of characterizations 45 and 46 wherein: (a) the handle arrangement comprises at least two, spaced, handle projections. 48. A filter cartridge according to characterization 47 wherein: (a) the two, spaced, handle projections are positioned adjacent peripherally opposite portions of the media. 49. A filter cartridge according to any one of characterizations 1-45 including: (a) a handle member including a central handle bridge positioned at a first flow end of the cartridge. 50. A filter cartridge according to characterization 49 wherein: (a) the seal arrangement comprises a portion of a molded-in-place member; and, (b) the handle member is secured to a remainder of the cartridge by the molded-in-place member. 51. A filter cartridge according to any one of characterizations 49 and 50 wherein: (a) the handle member includes a peripheral rim section; the handle member being positioned with the peripheral rim section disposed proximate the media, relative to the central handle bridge. 52. A filter cartridge according to characterization 51 wherein: (a) the handle member is secured to the media by a molded-in-place member. 53. A filter cartridge according to any one of characterizations 1-52 wherein: (a) the seal arrangement comprises an axial pinch seal having first and second, opposite, housing engagement surfaces; and, (b) the second pinch seal housing engagement surface is positioned on a portion of the pinch seal arrangement spaced from the media by a receiver space. 54. A filter cartridge according to characterization 53 wherein: (a) the receiver space extends completely, peripherally, around the media. 55. A filter cartridge according to any one of characterizations 53 and 54 wherein: (a) a radially inner surface of the axial pinch seal arrangement in alignment with, and surrounding, the receiver space is contoured in extension toward the second pinch seal housing engagement surface. 56. A filter cartridge according to characterization 55 wherein: (a) the radially inner surface of the pinch seal arrangement has a first slanted section that slants away from the media, as it extends toward the second pinch seal housing engagement surface.

57. A filter cartridge according to characterization 56 wherein: (a) the radially inner surface of the pinch seal arrangement has a second section positioned adjacent the first slanted section that extends toward the second pinch seal housing engagement surface at a different angle, relative to the media, then the first slanted section. 58. A filter cartridge according to any one of characterizations 1-57 wherein: (a) the seal arrangement comprises a portion molded-in-place.

59. A filter cartridge according to any one of characterizations 1-58 wherein: (a) the housing seal arrangement includes a portion molded directly to the filter media. 60. A filter cartridge according to any one of characterizations 1-59 wherein: (a) the seal arrangement comprises a portion molded directly to the filter media at a location adjacent the first flow end. 61. A filter cartridge according to any one of characterizations 1-60 wherein: (a) the seal arrangement comprises a portion molded-in-place on a seal support. 62. A filter cartridge according to any one of characterizations 1-61 wherein: (a) the seal arrangement comprises a portion molded-in-place on a seal support; (i) the seal support having a plurality of apertures therethrough, thorough with portions of the molded-in-place portion extend. 63. A filter cartridge according to any one of characterizations 1-62 including: (a) a preformed shell surrounding the media and extending over at least a portion of an axial length of the media. 64. A filter cartridge according to any one of characterizations 1-63 including: (a) a preformed shell surrounding the media and extending over at least 80% of an axial length of the media.

65. A filter cartridge according to any one of characterizations 63 and 64 wherein: (a) the seal arrangement comprises a portion molded-in-place on a pinch seal support; and (b) the seal support is integral with the preformed shell. 66. A filter cartridge according to any one of characterizations 63-65 wherein: (a) the preformed shell includes an end grid adjacent, and in at least partial extension across, the second flow end. 67. A filter cartridge according to any one of characterizations 1-66 including: (a) a receiver projection extending from the second flow end of the media to a location surrounded by media. 68. A filter cartridge according to characterization 67 wherein: (a) the receiver projection defines a receiver recess projecting into the media from the second flow end. 69. A filter cartridge according to each one of characterizations 67 and 68 wherein: (a) the receiver projection is integral with a support that includes a shell surrounding the media pack. 70. A filter cartridge according to any one of characterizations 1-69 including: (a) a shell positioned around the media pack; the shell having an end with the first flow end of the media extending outwardly therefrom. 71. A filter cartridge according to any one of characterizations 1-70 including: (a) a handle arrangement having at least one handle member comprising molded-in-place material on a handle support. 72. A filter cartridge according to any one of characterizations 1-71 wherein: (a) the seal arrangement comprises a preformed gasket member positioned around the filter media. 73. A filter cartridge according to characterization 72 including: (a) a preformed seal support having a pressure surface positioned surrounding the filter media and secured thereto; (i) the preformed gasket member being positioned to be pressed by the pressure surface of the preformed seal support when the filter cartridge is positioned for use.

74. A filter cartridge according to characterization 73 wherein: (a) a preformed gasket member comprises a flexible lip positioned to flex relative to the pressure surface. 75. A filter cartridge according to characterization 74 wherein: (a) the preformed gasket includes a first lateral flange adjacent the pressure surface. 76. A filter cartridge according to characterization 75 wherein: (a) the preformed gasket has a second lateral flange spaced from the first lateral flange. 77. A filter cartridge according to characterization 76 wherein: (a) the second lateral flange is thicker than the first lateral flange. 78. A filter cartridge according to any one of characterizations 72-77 wherein: (a) the preformed gasket member comprises a thermoplastic elastomer. 79. A filter cartridge according to any one of characterizations 72-79 wherein: (a) the seal arrangement comprises a peripheral pinch seal gasket surrounding the media. 80. A filter cartridge according to any one of characterizations 1-79 wherein: (a) the media has a non-circular outer periphery with a cross-section having a ratio of a long dimension to a short dimension of at least 1.3:1. 81. A filter cartridge according to any one of characterizations 1-80 wherein: (a) the media has a non-circular outer periphery with a cross-section having a ratio of a long dimension to a short dimension within the range of 1.3:1 to 5:1, inclusive.

82. A filter cartridge according to any one of characterizations 1-81 wherein: (a) the media has a non-circular outer periphery with a cross-section having a ratio of a long dimension to a short dimension within the range of 1.5:1 to 3.5:1, inclusive. 83. A filter cartridge according to any one of characterizations 1-82 wherein: (a) the first axial seal housing engagement surface includes a flat portion extending over at least 10% of the perimeter of the media. 84. A filter cartridge according to any one of characterizations 1-83 wherein: (a) the first axial seal housing engagement surface includes a flat portion extending around at least 20% of the perimeter of the media. 85. A filter cartridge according to any one of characterizations 1-84 wherein: (a) an outer peripheral perimeter edge surface of the seal arrangement has at least one recess at least 1 mm deep therein, in a direction toward the media. 86. A filter cartridge according to any one of characterizations 1-84 wherein: (a) an outer peripheral edge surface of the seal arrangement has a plurality of recesses, each at least 1 mm deep in a direction toward the media. 87. A filter cartridge according to any one of characterizations 1-86 wherein: (a) an outer peripheral edge surface of the seal arrangement has at least one recess having a depth of at least 2 mm therein, in a direction toward the media.

88. A filter cartridge according to any one of characterizations 1-87 wherein: (a) an outer peripheral surface of the seal arrangement has a plurality of recesses each having a depth of at least 2 mm in a direction toward the media. 89. A filter cartridge according to any one of characterizations 1-88 wherein: (a) at least one axial projection engagement surface includes a plurality of projections therein; (i) each axial projection extending axially at least 2 mm from an adjacent portion of the first axial seal housing engagement surface. 90. A filter cartridge according to any one of characterizations 1-89 wherein: (a) the first axial seal housing engagement surface includes a plurality of projections therein; (i) at least two of the projections extending axially at least 2 mm from an adjacent portion of the first axial seal housing engagement surface. 91. A filter cartridge according to any one of characterizations 1-90 wherein: (a) the first axial seal housing engagement surface includes a plurality of projections therein; (i) at least two of the projections extending axially at least 3 mm from an adjacent portion of the first axial seal housing engagement surface. 92. A filter cartridge according to any one of characterizations 1-91 wherein: (a) the first axial seal housing engagement surface includes at least two step transition sections therein, each extending as an angle with the range of 35° to 85° inclusive, relative to a plane perpendicular to a direction between the flow ends.

93. A filter cartridge according to any one of characterizations 1-92 wherein: (a) the first axial seal housing engagement surface includes at least two step transition sections therein, each extending as an angle with the range of 40° to 80° inclusive, relative to a plane perpendicular to a direction between the flow ends. 94. A filter cartridge according to any one of characterizations 1-93 wherein: (a) an outer peripheral edge surface of the first axial seal arrangement includes a portion tapering toward the media pack in extension in a direction from a first pinch seal housing engagement surface toward a second pinch seal housing engagement surface.

95. A filter cartridge according to any one of characterizations 1-94 wherein: (a) the first housing engagement projection/recess member comprises a stepped projection member having opposite end transition portions each with a radius within the range of 2-10 mm, inclusive. 96. A filter cartridge according to any one of characterizations 1-95 wherein: (a) the first housing engagement projection/recess member comprises a stepped projection member having opposite end transition portions each with a radius within the range of 4-8 mm, inclusive. 97. A filter cartridge according to any one of characterizations 1-96 wherein: (a) the first housing engagement projection/recess member comprises a stepped projection member having opposite end transition portions each with a radius of at least 8 mm. 98. A filter cartridge according to any one of characterizations 1-97 wherein: (a) the seal arrangement includes a peripheral, perimeter, edge surface having a first member of a peripheral edge projection/recess contour therein; (i) the first member of the peripheral edge projection/recess contour comprising at least one edge recess member; each edge recess member extending between opposite end transition portions; each end portion having a radius within the range of 2-6 mm, inclusive. 99. A filter cartridge according to any one of characterizations 1-98 wherein: (a) the first housing engagement projection/recess member comprises at least a first portion with a first contour projection of maximum extension; (i) the first portion having a flow direction cross dimensional area of A1; (b) the housing seal arrangement as a non-contoured second portion; (i) the second portion having a flow direction cross-dimensional area of A2; (ii) A1 being substantially similar to A2.

100. A filter cartridge according to any one of characterizations 1-99 wherein: (a) the first housing engagement projection/recess member comprises at least a first portion with a first contour projection of maximum extension; (i) the first portion having a flow direction cross dimensional area of A1; (b) the housing seal arrangement as a non-contoured second portion; (i) the second portion having a flow direction cross-dimensional area of A2; (ii) wherein A1=0.92-1.08 A2 101. A filter cartridge according to any one of characterizations 1-100 wherein: (a) the first housing engagement projection/recess member comprises at least a first portion with a first contour projection of maximum extension; (i) the first portion having a flow direction cross dimensional area of A1; (b) the housing seal arrangement as a non-contoured second portion; (i) the second portion having a flow direction cross-dimensional area of A2; (ii) wherein A1=0.95-1.05 A2. 102. A filter cartridge according to any one of characterizations 1-101 wherein: (a) the media is fluted in extension in a direction between the first and second flow ends. 103. A filter cartridge according to any one of characterizations 1-102 wherein: (a) the media comprises fluted media secured to facing media. 104. A filter cartridge according to any one of characterizations 1-103 wherein: (a) the media comprises a coiled arrangement of fluted media secured to facing media. 105. A filter cartridge according to any one of characterizations 1-104 wherein: (a) the media comprises a stack of strips of fluted media secured to facing media. 106. A filter cartridge according to any one of characterizations 1-105 wherein: (a) the media comprises pleats having pleat tips that extend in a direction between the first and second flow ends.

107. A filter cartridge according to characterization 106 wherein: (a) the media comprises a first pleated media coil surrounding a second pleated media coil. 108. A filter cartridge according to any one of characterizations 1-107 wherein: (a) the media has a non-circular outer periphery. 109. A filter cartridge according to any one of characterizations 1-108 wherein: (a) the media has an oval outer periphery. 110. A filter cartridge according to any one of characterizations 1-109 wherein: (a) the media has a generally rectangular outer periphery. 111. A filter cartridge according to any one of characterizations 1-110 wherein: (a) the media has an outer periphery with at least one straight side section extending over a distance of at least 40 mm. 112. A filter cartridge in accord with any one of characterizations 1-111 wherein: (a) the media has an oval outer periphery with two, opposite, straight sides and two, opposite, curved ends. 113. A filter cartridge according to any one of characterizations 1-112 wherein: (a) the first flow end of the cartridge is an inlet flow end; (b) the seal arrangement is positioned adjacent the inlet flow end; and, (c) the first axial seal housing engagement surface faces in a direction toward the second flow end of the cartridge. 114. A filter cartridge according to any one of characterizations 1-113 wherein: (a) the first flow end is generally planar; and, (b) the seal arrangement is generally positioned in a plane parallel to the first flow end.

115. A filter cartridge according to any one of characterizations 1-114 wherein: (a) an outer peripheral, perimeter, edge surface of the pinch seal arrangement is peripherally radially asymmetric around a central axis. 116. A filter cartridge according to any one of characterizations 1-115 wherein: (a) the housing axial engagement surface member is peripherally radially asymmetric around a central axis. 117. A filter cartridge according to any one of characterizations 1-115 wherein: (a) the seal arrangement is configured with 180° rotational symmetry in extension around a central axis. 118. A filter cartridge according to any one of characterizations 1-115 wherein: (a) the seal arrangement has a long cross-dimension and a short cross-dimension; and, (b) the seal arrangement is configured with a long dimension plane of symmetry. 119. A filter cartridge according to any one of characterizations 1-115 wherein: (a) the seal arrangement has a long cross-dimension and a short cross-dimension; and, (b) the seal arrangement is configured with a short dimension plane of symmetry. 120. A filter cartridge according to any one of characterizations 1-115 wherein: (a) the seal arrangement does not have 180° rotational, symmetry in extension around a central axis.

121. A filter cartridge comprising: (a) filter media comprising first and second flow ends, with media ridges extending therebetween; and, (b) a seal arrangement having: an outer peripheral, perimeter, edge; and, a first, axial seal housing engagement surface; (i) the peripheral, perimeter, edge being a contoured surface that is asymmetrical in extension around a central axis. 122. A filter cartridge according to characterization 121 wherein: (a) the first axial seal housing engagement surface is a contoured surface that is asymmetrical in extension around a central axis.
123. A filter cartridge comprising: (a) a filter media pack comprising first and second flow ends, with flutes or pleat tips extending therebetween; and, (b) a housing seal arrangement having: an outer peripheral, perimeter, edge; and, a first axial seal housing engagement surface; (i) the first axial seal housing engagement surface being a contoured surface that is asymmetrical in extension around a central axis. 124. A filter cartridge according to any one of characterizations 121-123 wherein: (a) the cartridge is otherwise in accord with any one of characterizations 1-114.
125. A filter cartridge comprising: (a) filter media comprising first and second flow ends, with media having flutes or pleat tips extending therebetween; and, (b) a seal arrangement having: an outer peripheral, perimeter, edge; and, a first, axial seal housing engagement surface; (i) the peripheral, perimeter, edge being a contoured surface that has 180° rotational symmetry in extension around a central axis. 126. A filter cartridge according to characterization 125 wherein: (a) the first axial seal housing engagement surface is a contoured surface that has 180° symmetry in extension around a central axis.
127. A filter cartridge comprising: (a) a filter media pack comprising first and second flow ends, with flutes or pleat tips extending therebetween; and, (b) a housing seal arrangement having: an outer peripheral, perimeter, edge; and, a first axial seal housing engagement surface; (i) the first axial seal housing engagement surface being a contoured surface that has 180° rotational symmetry in extension around a central axis. 128. A filter cartridge according to any one of characterizations 125-127 wherein: (a) the cartridge is otherwise in accord with any one of characterizations 1-114.
129. A filter cartridge comprising: (a) first and second, opposite, flow ends; (b) filter media positioned to filter fluid flow between the first and second, opposite, flow ends; and, (c) a seal arrangement having a first axial seal housing engagement surface configured to form, in use, a seal against a housing section with the axial seal housing engagement surface being contoured to provide a non-contoured section in a first plane, and a contoured section having a portion in a second plane, parallel to the first plane, and spaced therefrom by a distance of at least 2 mm.
130. A filter cartridge according to characterization 129 wherein: (a) the axial seal housing engagement surface is contoured to form, in use, a seal against a housing section with the axial seal housing engagement surface being contoured to provide a non-contoured section in a first plane, and a contoured section having a portion in a second plane, parallel to the first plane, and spaced therefrom by a distance of at least 5 mm. 131. A filter cartridge according to any one of characterizations 129-130 wherein: (a) the axial seal housing engagement surface is contoured to form, in use, a seal against a housing section with the axial seal housing engagement surface being contoured to provide a non-contoured section in a first plane, and a contoured section having a portion in a second plane, parallel to the first plane, and spaced therefrom by a distance of at least 10 mm. 132. A filter cartridge according to any one of characterizations 129-131 wherein: (a) the axial seal housing engagement surface is contoured to form, in use, a seal against a housing section with the axial seal housing engagement surface being contoured to provide a non-contoured section in a first plane, and a contoured section having a portion in a second plane, parallel to the first plane, and spaced therefrom by a distance of at least 20 mm.
133. A filter cartridge according to any one of characterizations 129-132 wherein: (a) the cartridge is also in accord with any one of characterizations 1-128.
134. A filter cartridge comprising: (a) a filter media pack comprising first and second flow ends; with media extending therebetween; (i) the media including flutes extending between flow ends; and, (b) a pinch seal arrangement having: an outer peripheral surface; and, first and second, opposite, pinch seal housing engagement surfaces; (i) the outer peripheral surface having a first member of a projection/recess contour therein; and, (ii) at least one of the first and second, opposite, pinch seal housing engagement surfaces being a contoured seal surface with at least one housing engagement projection/recess member therein.
135. A filter cartridge comprising: (a) a filter media pack comprising first and second flow ends, with media extending therebetween; (i) the media including flutes extending between the flow ends; and, (c) a pinch seal arrangement having: an outer peripheral surface; and, first and second, opposite, pinch seal housing engagement surfaces; (i) the second one of the first and second, opposite, pinch seal housing engagement surfaces being a contoured housing engagement surface; and (ii) the first one of the first and second, opposite, pinch seal housing engagement surfaces having a peripherally continuous pressure flange engagement section that is not contoured as a mirror image of the contoured housing engagement surface of the second pinch seal housing engagement surface.
136. A filter cartridge comprising: (a) a filter media pack comprising first and second flow ends, with media extending therebetween; (i) the media including flutes extending between the flow ends; and, (c) a pinch seal arrangement having: an outer peripheral surface; and, first and second, opposite, pinch seal housing engagement surfaces; (i) the peripheral surface having a first member of a projection/recess contour therein; and (ii) a distance between the first and second, opposite, pinch seal housing engagement surfaces being at least 5 mm and not more than 50 mm; and (iii) the first member of a projection/recess contour having a maximum contour relief of at least 1 mm and not more than 10 mm.
137. A filter cartridge comprising: (a) a filter media pack comprising first and second flow ends, with media extending therebetween; (i) the media including flutes extending between the flow ends; and, (b) a pinch seal arrangement having: an outer peripheral surface; and, first and second, opposite, pinch seal housing engagement surfaces; (i) the peripheral surface being a contoured surface that is asymmetrical in extension around a central axis.
138. A filter cartridge comprising: (a) a filter media pack comprising first and second flow ends, with media extending therebetween; (i) the media including flutes extending between the flow ends; and, (b) a pinch seal arrangement having: an outer peripheral surface; and, first and second, opposite, pinch seal housing engagement surfaces; (i) at least one of the first and second, opposite, pinch seal housing engagement surfaces being a contoured surface that is asymmetrical in extension around a central axis.
139. A filter cartridge comprising: (a) filter media pack comprising first and second, opposite, flow ends with media extending therebetween; (i) the media including flutes extending between flow ends; (b) a pinch seal arrangement having: an outer peripheral surface; and, a pinch seal housing engagement surface; and, (c) a handle arrangement comprising a peripheral handle arrangement comprising at least two, spaced, handle projections positioned adjacent peripherally opposite portions of the media.

140. A filter cartridge comprising: (a) filter media pack comprising first and second, opposite, flow ends with media extending therebetween; (i) the media including flutes extending between flow ends; (b) a pinch seal arrangement positioned adjacent the first flow end and having: an outer peripheral surface; and, a pinch seal housing engagement surface; and, (c) a handle arrangement comprising a handle member including a central handle bridge positioned at a first flow end of the media with the bridge extending over the media with no portion of the handle therebetween; (i) the handle member including a peripheral rim section disposed proximate the media, relative to the central handle bridge. 141. A filter cartridge according to characterization 140 wherein: (a) the pinch seal arrangement includes a molded-in-place portion; and, (b) the handle member is secured to the media by the molded-in-place portion. Typically and preferably the filter cartridge is in accord with characterizations 140 or 141, wherein the handle member includes no portion surrounded by the media, also preferably the cartridge includes no radially directed seal adjacent the first flow end. 142. A filter cartridge according to any one of characterizations 134-141 that is otherwise in accord with any one of characterizations 1-114.

143. An air cleaner assembly comprising: (a) a housing having a first housing section and a second housing section; and, (b) a filter cartridge according to any one of characterizations 1-142 positioned within the housing with an axial seal housing engagement surface biased against one housing section by the other housing section. 144. An air cleaner assembly according to characterization 143 wherein: (a) the second housing section includes a housing seal surface surround by a peripheral flange. 145. An air cleaner assembly according to characterization 144 wherein: (a) the housing seal surface includes at least one peripherally discontinuous projection/recess contour member therein; and (b) the axial seal housing engagement surface includes at least one housing projection/recess contour member in sealing engagement with the projection/recess contour member on the housing seal surface. 146. An air cleaner assembly according to characterization 145 wherein: (a) the housing seal surface includes at least one stepped recess therein. 147. An air cleaner assembly according to characterization 146 wherein: (a) the housing seal surface includes at least two stepped recesses therein.

148. An air cleaner assembly according to characterizations 142-147 wherein: (a) the peripheral flange on the second housing section includes at least a second member of a peripheral, perimeter, edge projection/recess contour arrangement positioned in engagement with a first member of a peripheral, perimeter, projection/recess contour arrangement on an outer peripheral, perimeter, edge of a seal member the housing seal arrangement on the cartridge.

149. An air cleaner assembly according to characterization 148 wherein: (a) the second member of a peripheral, perimeter, edge projection/recess contour arrangement comprises at least one projection on the housing extending toward the media; and (b) the first member of a peripheral, perimeter, edge projection/recess contour arrangement comprises at least one recess extending toward the media.

150. An air cleaner assembly according to characterization 149 wherein: (a) the second member of a peripheral, perimeter, edge projection/recess contour arrangement comprises at least two projections on the housing extending toward the media; and (b) the second member of a peripheral, perimeter, projection/recess contour arrangement comprises at least two recesses an the seal member extending toward the media. 151. An air cleaner assembly according to any of characterizations 143-150 wherein: (a) the second housing section includes a seal trough surrounded by the peripheral flange and surrounding an inner flange; (i) the seal trough including the seal compression surface extending between the peripheral flange and the inner flange. 152. An air cleaner housing according to any one of characterizations 143-151 wherein: (a) the housing seal surface on the second housing section includes a seal rib projection therein.

153. An air cleaner assembly according to any one of characterizations 151 and 152 wherein: (a) the housing seal arrangement includes a portion that projects into the seal trough; and; (b) the inner flange projects into a receiving recess located between the portion of the housing seal arrangement and the media. 154. An air cleaner assembly according to any one of characterizations 142-153 wherein: (a) the filter cartridge housing seal arrangement is configured so that it engages the housing in a sealing manner, in only a single rotational configuration relative to a central axis. 155. An air cleaner assembly according to any one of characterizations 142-153 wherein: (a) the filter cartridge housing seal arrangement is configured to engage the housing in a sealing manner, in any of a plurality of rotational configurations relative to a central axis. 156. An air cleaner assembly according to any one of characterizations 142-155 wherein: (a) the housing comprises an access cover section having a pressure flange thereon; and, (b) the housing includes a base section having a sealing surface thereon; (i) the pressure flange being positioned on a portion of the access cover section that projects into the base section, when the cartridge is sealed in position. 157. An air cleaner assembly according to any one of characterizations 142-156 wherein: (a) the housing comprises an access cover section having a pressure flange thereon; and, (b) the housing includes a base section having a sealing surface thereon; (i) the pressure flange being positioned on a portion of the access cover section that projects at least 50 mm into the base section, when the cartridge is sealed in position.

158. An air cleaner assembly according to any one of characterizations 142-157 wherein: (a) the housing comprises an access cover section having a pressure flange thereon; and, (b) the housing includes a base section having a sealing surface thereon; (i) the preform flange being positioned on a portion of the access cover section that projects at least 60 mm into the base section, when the cartridge is sealed in position. 159. An air cleaner assembly according to any one of characterizations 142-158 wherein: (a) the housing has a base section with a housing flow inlet arrangement and a housing flow outlet arrangement thereon; (i) the housing flow inlet arrangement being a side inlet. 160. An air cleaner assembly according to characterization 159 wherein: (a) the housing access cover includes a flow directing surface thereon oriented to turn flow from the side inlet toward the cartridge. 161. An air cleaner assembly according to any one of characterizations 159 and 160 wherein: (a) the housing access cover includes an arcuate, curved, flow directing surface thereon oriented to turn flow from the side inlet toward the cartridge.

162. A housing for an air cleaner; the housing comprising: (a) a housing having a first housing section and a second housing section; (i) the second housing section including a seal compression surface surrounded by an outer peripheral flange; and, (ii) the seal compression surface including at least one peripherally discontinuous projection/recess member therein. 163. A housing according to characterizations 162 wherein: (a) the outer peripheral flange including an inner surface having one member of a projection/recess contour therein; and, 164. A housing according to any characterization 163 wherein: (a) the outer peripheral flange inner surface includes a projection thereon, extending inwardly. 165. A housing according to any one of characterizations 161-164 wherein: (a) the outer peripheral flange includes multiple, spaced, projections thereon. 166. A housing according to any one of characterizations 161-165 wherein: (a) the seal compression surface includes a plurality of peripherally spaced recesses therein. 167. A housing according to any one of c characterizations 161-166 wherein: (a) the second housing section includes an inner flange spaced from the outer flange by the seal compression surface. 168. A housing according to any one of characterizations 161-167 wherein: (a) the seal compression surface includes a seal rib. 169. A housing according to any one of characterizations 161-168 wherein: (a) the at least one projection/recess member comprises a peripherally discontinuous recess at least 1 mm deep relative to adjacent portions of the seal compression surface. 170. A housing according to any one of characterizations 161-169 wherein: (a) the at least one projection/recess member comprises a step recess with transition ends extending at an angle within the range of 35° to 85°, inclusive, relative to a plane of adjacent portions of the seal compression surface. 171. A housing according to any one of characterizations 161-170 wherein: (a) the at least one projection/recess member comprises a step recess with transition ends extending at an angle within the range of 40° to 80°, inclusive, relative to a plane of adjacent portions of the seal compression surface. 172. A housing according to any one of characterizations 161-171 wherein: (a) the at least one projection/recess member comprises a step recess with transition ends extending at an angle of 45° to 75° inclusive relative to a plane of the adjacent portions of seal compression surface.

173. A housing for an air cleaner; the housing comprising: (a) a housing having a first housing section and a second housing section; (i) the second housing section including a seal compression surface surrounded by an outer peripheral flange; (ii) at least one of the inner surface of the inner flange and seal compression surface being asymmetric around a central axis.

174. A housing according to characterization 173 wherein: (a) the outer peripheral flange has at least one projection on the inner surface. 175. A housing according to any one of characterizations 173 and 174 wherein: (a) the seal compression surface has at least one recess therein, projecting away from adjacent portion of the seal compression surface. 176. A housing according to any one of characterizations 173-175 wherein: (a) the housing is otherwise in accord with any one of characterization 161-172.

177. An air cleaner assembly including: (a) a housing in accord with any one of characterizations 157-175; and (b) a cartridge in accord with any one of characterizations 1-114 installed in the housing. 178. An air cleaner assembly according to characterizations 177 wherein: (a) the air cleaner assembly is also in accord with any one of characterizations 143-161.

What is claimed:

1. A filter cartridge comprising:
(a) a filter media pack comprising first and second flow ends, with media extending therebetween;
(b) a pinch seal arrangement having: an outer peripheral surface; and, first and second, opposite, pinch seal housing engagement surfaces;
 (i) the outer peripheral surface having a first member of a projection/recess contour therein comprising a first recess member in the outer peripheral surface; and,
(c) the second one of the first and second, opposite, pinch seal housing engagement surfaces being a contoured seal surface with at least one housing engagement projection/recess member therein;
 (i) the housing engagement projection/recess member comprising a projection arrangement positioned, in a portion of the pinch seal arrangement, in axial alignment with the first member of the projection/recess contour in the outer peripheral surface.

2. A filter cartridge according to claim 1 wherein:
(a) the first one of the first and second, opposite, pinch seal housing engagement surfaces has a peripherally continuous pressure flange engagement section that is not contoured as a mirror image of the contoured housing engagement surface of the second pinch seal housing engagement surface.

3. A filter cartridge according to claim 1 wherein:
(a) the first member of a projection/recess contour in the outer peripheral surface comprises multiple, spaced, recesses in the outer peripheral surface.

4. A filter cartridge according to claim 3 wherein:
(a) the first member of a projection/recess contour in the outer peripheral surface comprises two recess members each having a straight surface section extending over a distance of at least 5 mm.

5. A filter cartridge according to claim 1 wherein:
(a) the first member of a projection/recess contour in the outer peripheral surface has a maximum contour relief of at least 1 mm and not more than 10 mm.

6. A filter cartridge according to claim 1 wherein:
(a) the projection arrangement of the housing engagement projection/recess member in the second pinch seal housing engagement surface extends over no more than 50% of a total perimeter extension of the second pinch seal engagement surface.

7. A filter cartridge according to claim 1 wherein:
(a) the projection arrangement of the housing engagement projection/recess member on the second pinch seal housing engagement surface comprises at least one projection having a flat section extending over a distance of at least 40 mm.

8. A filter cartridge according to claim 1 wherein:
(a) the media pack comprises fluted media secured to facing media.

9. A filter cartridge according claim 8 wherein:
(a) the media pack comprises a coiled arrangement of fluted media secured to facing media.

10. A filter cartridge according to claim 1 wherein:
(a) the media pack has an outer periphery with at least one straight section extending over a distance of at least 40 mm.

11. A filter cartridge according to claim 10 wherein:
(a) the outer peripheral surface of the pinch seal arrangement includes the first member of a projection/recess contour positioned in overlap with a straight section of the media pack.

12. A filter cartridge according to claim 1 wherein:
(a) the media pack comprises a first pleated media coil surrounding a second pleated media coil.

13. A filter cartridge according to claim 1 including:
(a) a handle arrangement projecting in a direction away from the pinch seal member and the second flow end.

14. A filter cartridge according to claim 1 including:
(a) a preformed shell surrounding the media pack.

15. A filter cartridge according to claim 14 wherein:
(a) the preformed shell includes a grid, in at least partial extension across the second flow end.

16. A filter cartridge according to claim 1 wherein:
(a) the pinch seal arrangement comprises a portion molded directly to the media of the filter media pack.

17. A filter cartridge according to claim 1 wherein:
(a) the second one of the first and second, opposite, pinch seal housing engagement surfaces comprise at least two projections, each of which projects, axially, at least 3 mm from an adjacent portion of the second pinch seal housing engagement surface.

18. A filter cartridge according to claim 1 wherein:
(a) the outer peripheral surface of the pinch seal arrangement is peripherally radially symmetric around a central axis.

19. A filter cartridge according to claim 1 wherein:
(a) the first housing engagement projection/recess member comprises at least a first portion with a first contour projection of maximum extension;
  (i) the first portion having a flow direction cross dimensional area of $A_1$; and,
(b) the housing seal arrangement as a non-contoured second portion;
  (i) the second portion having a flow direction cross-dimensional area of $A_2$;
  (ii) wherein $A_1 = 0.92\text{-}1.08\,A_2$.

20. An air cleaner assembly including a filter cartridge in accord with claim 1 therein; the assembly comprising:
(a) a housing having a first housing section and a second housing section;
  (i) the first housing section comprising an access cover section having a pressure flange thereon;
  (ii) the second housing section comprising a base section having a seal compression surface thereon;
    (A) the pressure flange being positioned on a portion of the access cover section that projects at least 50 mm into the base section, when the filter cartridge is sealed in position; and,
    (B) the seal compression surface on the base section including a plurality of peripherally spaced recesses therein; and,
(b) the filter cartridge according to claim 1 positioned within the housing with the pinch seal housing engagement surface biased against the seal compression surface, on the base section, by the pressure flange on the access cover.

\* \* \* \* \*